United States Patent [19]

Holm-Kennedy et al.

[11] Patent Number: 4,951,510

[45] Date of Patent: Aug. 28, 1990

[54] MULTIDIMENSIONAL FORCE SENSOR

[75] Inventors: James W. Holm-Kennedy, Honolulu; Gordon P. Lee, Waipahu; Michael H. Kaneshiro, Pearl City, all of Hi.

[73] Assignee: University of Hawaii, Honolulu, Hi.

[21] Appl. No.: 220,073

[22] Filed: Jul. 14, 1988

[51] Int. Cl.$^5$ .......................... G01L 5/16; G01P 15/08
[52] U.S. Cl. .................................. 73/862.04; 73/510; 73/517 R
[58] Field of Search ................. 73/510, 517 A, 517 R, 73/651, 654, 862.04, 862.64, 505

[56] References Cited

U.S. PATENT DOCUMENTS

| | | |
|---|---|---|
| 4,315,693 | 2/1982 | Walker . |
| 4,342,227 | 8/1982 | Petersen et al. ...................... 73/510 |
| 4,430,895 | 2/1984 | Colton . |
| 4,483,194 | 11/1984 | Rudolf . |
| 4,522,072 | 6/1985 | Sulouff . |
| 4,552,028 | 11/1985 | Burckhardt et al. ............. 73/862.04 |
| 4,598,585 | 7/1986 | Boxenhorn ............................ 73/505 |
| 4,653,326 | 3/1987 | Danel et al. ....................... 73/517 R |

OTHER PUBLICATIONS

Stephen Terry, "A iniature Silicon Accelerometer with Built-In Damping", IEEE Solid State Sensor and Actuator Workshop, pp. 114–116, Jun., 1988.
P. W. Barth, Ph.D., Farzad Pourahmadi, Ph.D., R. Mayer, J. Poydock, K. Petersen, Ph.D., "A Monolithic Silicon Accelerometer with Integral Air Damping and Overrange Protection", IEEE Solid State Sensor and Actuator Workshop, pp. 35–38, Jun., 1988.
Roylance, Lynn Michelle and Angell, James B., "A Batch-Fabricated Silicon Accelerometer":, IEEE Transactions on Electron Devices, vol. ED-26, No. 12, Dec. 1979, pp. 1911–1917.
Isaacson, Eugene and Keller, Herbert, *Analysis of Numerical Methods*, John Wiley & Sons, Inc., New York, 1966, pp. 37–38.
Oki, A. K. and Muller, R. S., "Integrated Polysilicon Tactile Sensor", IEEE Solid State Sensors Workshop, Jun. 2, 1986, pp. 7–9.

*Primary Examiner*—Charles A. Ruehl
*Attorney, Agent, or Firm*—Martin E. Hsia

[57] ABSTRACT

A multibeam structure measures displacement of one or more response elements to detect multiple components of applied force. The flexible beams are each coupled to a response element which may be displaced by a force arising from linear acceleration, angular acceleration, fluid flow, electric/magnetic/gravitational fields, and others sources. The displacement of the response element is detected with a variety of sensing methods including capacitive and piezoresistive sensing.

24 Claims, 94 Drawing Sheets (a)

(b)

```
┌─────────────────────────────────────────┐
│                  582                     │
└─────────────────────────────────────────┘
```

MULTIDIMENSIONAL FORCE SENSOR

The present invention generally relates to accelerometers and force sensors, and particularly those capable of sensing multiple dimensions of force. Of particular interest are forces arising from linear acceleration, angular velocity (centrifugal force), angular acceleration, gravitational fields, electric fields, magnetic fields, viscous drag, and other frictional drag forces.

This specification includes Appendices, which are incorporated herein by reference, containing a computer program listing, various mathematical analyses, technical information on fabrication of some preferred embodiments of the invention, and discussion of device calibration and design considerations.

Because of the length of this specification, it has been organized into the sections set forth in the following table of contents:

TABLE OF CONTENTS

Background of the Invention
Summary of the Invention
Brief Description of the Drawings for the Specifications
Brief Description of the Drawings for the Appendices
 Description of Preferred Embodiments
 Three Beams One Aperture
 Three Beams Three Apertures
 One Beam One Aperture
 One Beam One Aperture Inclinometer
 Five Beams Five Apertures
 Four Beams One Aperture
 Multiple Beams Two Apertures
 Three dimensional Five Beams Four Apertures
 Design and Measurement Considerations
 Ill Conditioned Sensitivity Matrix: The Condition Number K
 Determination of Device Capability for Resolving Independent Force Components

APPENDIX

Appendix A.—Description of the Capacitive Sensing Methods and Capacitive Sensing
 Capacitive Sensing (Quantitative Treatment)
Appendix B.—Calibration Discussion (general discussion)
Appendix C.—Example of Calibration Procedure for the Five Beam Five Aperture Embodiment
 Use of the Theoretically Determined Sensitivity Coefficients
Appendix D.—Quantitative Analysis of Five Beam Five route Embodiment
 Mathematical Representation of the Piezoresistive Effect
 Stress Distribution of the Mass-Loaded Cantilever Beam
 Sensitivity Coefficients
Appendix E.—Condition Number (general discussion)
Appendix F.—Fabrication Description of Selected Embodiments
 Fabrication References
 Fabrication of the 5 Beams 5 Apertures Embodiment
 Features of a Fabrication Protocol for a 4 Beam 1 Aperture Embodiment
 Process Considerations
Appendix G.—Design Consideration Discussion
Appendix H.—Deflection of the Cantilever Beam
Appendix I.—Example of the Effect of the Device Dimension of the Transformation (Sensitivity Coefficient) Matrix Minimizing Condition Number
Five Beam Five Aperture Embodiment Program Listing for 9 Force Component Determination List of Symbols Program Listing
CLAIMS

BACKGROUND OF THE INVENTION

Force has magnitude and direction, i.e., it is a vector. Types of devices which are currently used to measure force include accelerometers utilizing capacitive, piezoelectric, and piezoresistive silicon structures. Such devices usually measure only a force magnitude, or perhaps only one single force component of a multiple component force vector. Such devices commonly use capacitive sensing or piezoresistive sensing.

Capacitive Sensing: Capacitive sensing can be used to measure force by detecting displacement. For example, movement of a first conducting surface with respect to a second stationary and parallel conducting surface results in a change in the capacitance between the conductors. The displacing force could cause a change in the spatial distance separating the two conducting surfaces or a change in the overlapping area of the conducting surfaces. A capacitance change therefore would be directly related to applied force or acceleration. Thus, a measurement of capacitance change results in a measurement of the force magnitude which caused the displacement of the conductor. Such structures as found in the current art often either do not discriminate with respect to force direction or, it they do, they generally discriminate in only a single direction. An example of such a device is described in Rudolf, U.S. Pat. No. 4,483,194 (incorporation by reference is intended), which describes a hinged cantilever structure which uses capacitance sensing for an accelerometer sensitive to a single dimension. The present invention described below provides several embodiments using capacitive sensing for the measurement of multiple components of force using a single monolithic device. Piezoresistive Sensing: Piezoresistive sensing can be used to measure force by detecting strain induced in a beam subject to a deflecting force. Piezoresistive devices use materials with strain dependent resistivity. Compressional strain results in a resistance change of opposite sign to that of tensile strain. The dependence of resistance changes on strain or force can be very nearly linear, especially over a defined range of force. The magnitude of a resistance change is a direct measure of strain and therefore a direct measure of a strain inducing force. Well known materials which display piezoresistive properties are semiconductors and metals., both have been previously used widely in strain gauges and accelerometers. Semiconductors tend to display a larger resistance change in response to applied force than do metals. However, semiconductors also tend to be more temperature sensitive than metals. This temperature sensitivity (as well as certain non-linearities) can be compensated for using IC compensation circuitry. One temperature circuit compensation approach is described in "A Batch-Fabricated Silicon Accelerometer," by L. M. Roylance, IEEE Transactions on Electron Devices, Vol. ED-26, 1911-1917 (incorporation by reference is intended). Silicon is often the piezoresistive material of choice because of its ruggedness and because of its advanced, versatile and accessible technology which lends itself well to the batch fabrication of piezoresistive force sensors. Silicon also has the advantage of being highly resistant to mechanical fatigue. Metallic strain gauges are much more susceptible to mechanical fatigue degradation. Several embodiments of the present invention described below provide methods for the independent measurement of multiple components of force using single monolithic devices and piezoresistive sensing methods.

Accelerometers: A variety of accelerometers is disclosed in prior patents and publications. Such devices often employ capacitive, piezoresistive, or piezoelectric sensing methods by utilizing an inertial mass attached to flexible semiconductor material to detect acceleration. The majority of these accelerometers have a single axis of sensitivity, or do not discriminate force direction. Multiple axis sensitivity accelerometers can be and have been achieved by combining multiple single axis resolving devices along more than one axis within a single hybrid accelerometer package. However, this approach tends to increase the size of the accelerometer. Related assembly can be costly. In addition, so-called single axis resolving devices may be prone to errors from off-axis acceleration components. An advantage in cost reduction, size, design options, and performance can be expected if a single monolithic structure is used to measure multiple independent components of a force.

There is also a need for developing improved sensing methods. Piezoresistive sensor methods are highly temperature dependent and require special efforts to eliminate the temperature dependence. Piezoresistor sensitivities are also doping and orientation dependent. Capacitive sensing methods have been used for some accelerometers and provide attractive features. They are relatively insensitive to temperature, are not doping dependent, and are easily fabricated. Multidimensional capacitive sensing methods capable of assisting in multidimensional sensing would be useful.

The article "A Batch-Fabricated Silicon Accelerometer" (L. M. Roylance and J. B. Angell), which appeared in IEEE Trans. on Electron Devices, Volume ED-26, No. 12, December 1979, pp. 1911-1917 (incorporation by reference is intended), describes a single cantilever beam etched from a single crystalline silicon with a diffused resistor acting as the strain sensing element. This device was designed with the intent to have maximum sensitivity to linear acceleration in a single direction only, i.e., to be insensitive t simultaneous acceleration in the other principle a cartesian directions.

Walker, U.S. Pat. No. 4,315,693 (incorporation by reference is intended), describes an optical sensing method for measuring angular acceleration using a passive ring Fabry-Perot interferometer. The system requires multiple lasers, and is necessarily large since three ring Fabry-Perot interferometers must be aligned along the principal axes to resolve the three components of rotation.

Sulouff et al., U.S. Pat. No. 4,522,072 (incorporation by reference is intended) describes a single mass loaded cantilever beam and claims "dual axis acceleration measurement."

Colton, U.S. Pat. No. 4,430,895 (incorporation by reference is intended) describes a central pedestal surrounded by a strain sensing membrane and states sensitivity to one and three components of linear acceleration.

There is a need for monolithic multidimensional force sensors that can be fabricated using existing technologies and that can resolve the various components of force. Accordingly, it is an object of this invention to provide an accelerometer capable of separating applied linear acceleration into its constituent components, i.e., of measuring force magnitude and direction. It is a further object of the invention to measure components of angular velocity and angular acceleration. It is a still further object of this invention to measure forces arising from gravitational, electric and magnetic fields. It is a still further object of this invention to measure acceleration or force components using capacitive or piezoresistive sensing methods, and to provide improved sensing methods.

SUMMARY OF THE INVENTION

These and other objects are achieved by a multidimensional force sensor comprising a main body, a plurality of beams attached to the main body, and methods for sensing displacement of the beams in response to force. The objects are also achieved using capacitor groupings and capacitor plate geometries. Response elements are attached to the beams to increase sensitivity of the sensor or to render the sensor sensitive to acceleration and forces such as those arising from gravity, and magnetic and electric fields. The methods for sensing displacement of the beams can be capacitive or piezoresistive, or of other types, and the invention can be configured in various ways to adapt it to specific applications.

The invention can be put to a wide variety of uses for the measurement of forces. For example, the invention could be used as an accelerometer that is capable of resolving all components of force acting on an object undergoing multidimensional acceleration, such as an out-of-control aircraft. Devices can be designed for linear acceleration and force measurement applications (such as x, y, and z directed linear forces). for centrifugal force applications and angular frequency measurement applications, and for angular acceleration applications. Devices can be designed to respond to field derived forces such as those originating from electric fields, magnetic fields, and gravitational fields. Other applications include automotive applications such as control of automotive suspension. Vibration magnitude and frequency measurement, shock measurement, and measurement of magnitude and direction of magnetic fields are useful applications. MicroG and milliG applications for low G environment such as space, or in free fall situations, are also useful applications of the device. The ability to design sensitivity to selected force components where the device is sensitive to certain force components and less sensitive to other preselected components is an attractive feature of the device. Simultaneous measurement of forces of multiple origins is also useful. Many other useful applications exist where sensing more than one force component is desired.

The capacitor sensor element inventions are also attractive. Reduced temperature sensitivity, multidimensional resolving structures, increased sensitivity structures, and force selectivity sensing, are all attractive features. Compatibility with other sensing methods allowing for mixed sensor elements on a single beam and response element is additionally attractive and provides multidimensional force resolving features and, in appropriate instances, reduced measurement errors of the force.

The invention can be manufactured using fabrication methods which permit flexibility of design, choice of sensing elements, and choice of architecture, dimensions and geometry. This provides opportunities for designing in sensitivity and sensitivity ranges and frequency response characteristics, determined by design features which include device dimensions, configuration and process control.

With appropriately chosen design and response elements, the invention can be used to measure the magnitude and direction of gravitational, electrical or magnetic fields. The response elements may consist of an inertial mass, suitably coated with, or constructed of, conducting, dielectric, or magnetic material such that an electric, gravitational, or magnetic field causes a force on the response element. Electric gravitational, and magnetic fields may be simultaneously measured by increasing the number of arms of suitable geometry so that one set of arms has response elements coated with or constructed of magnetic or magnetizable material, another set of or arms has response elements coated with or constructed of electrically polarizable material and a third set of arms has electrically and magnetically nonresponsive but massive that respond solely to accelerating forces such as gravity.

A further use of the invention is in electric or magnetic field sensing devices for proximity detection, object tracking, and position monitoring. In the case of magnetizable and magnetic objects, this can be accomplished by, for example, choosing response elements that are magnetized so that the beams will be displaced by the proximity of said object. Such devices could be used for fuses in explosive devices.

A further use of the invention would be to measure magnitude and direction of drag such as arising from fluid motion. Examples include air and water motion drag on response elements and/or supporting beams.

A further use of the invention would be to provide inclination measurements, including use as the balance monitoring and sensing mechanism (similar to an inner ear) for free standing or tethered robotics and for vehicles such as automobiles, trucks, boats, ships, and aircraft.

The preferred embodiments described herein will be described in terms of fabrication from silicon material which is usually the material of choice because of large and available, advanced and controlled technology, and because the use of silicon provides a convenient substrate on which to integrate signal conditioning circuitry. However, the fabrication of the invention is not limited to silicon material.

BRIEF DESCRIPTION OF THE DRAWINGS IN THE APPENDICES

Figure 34:
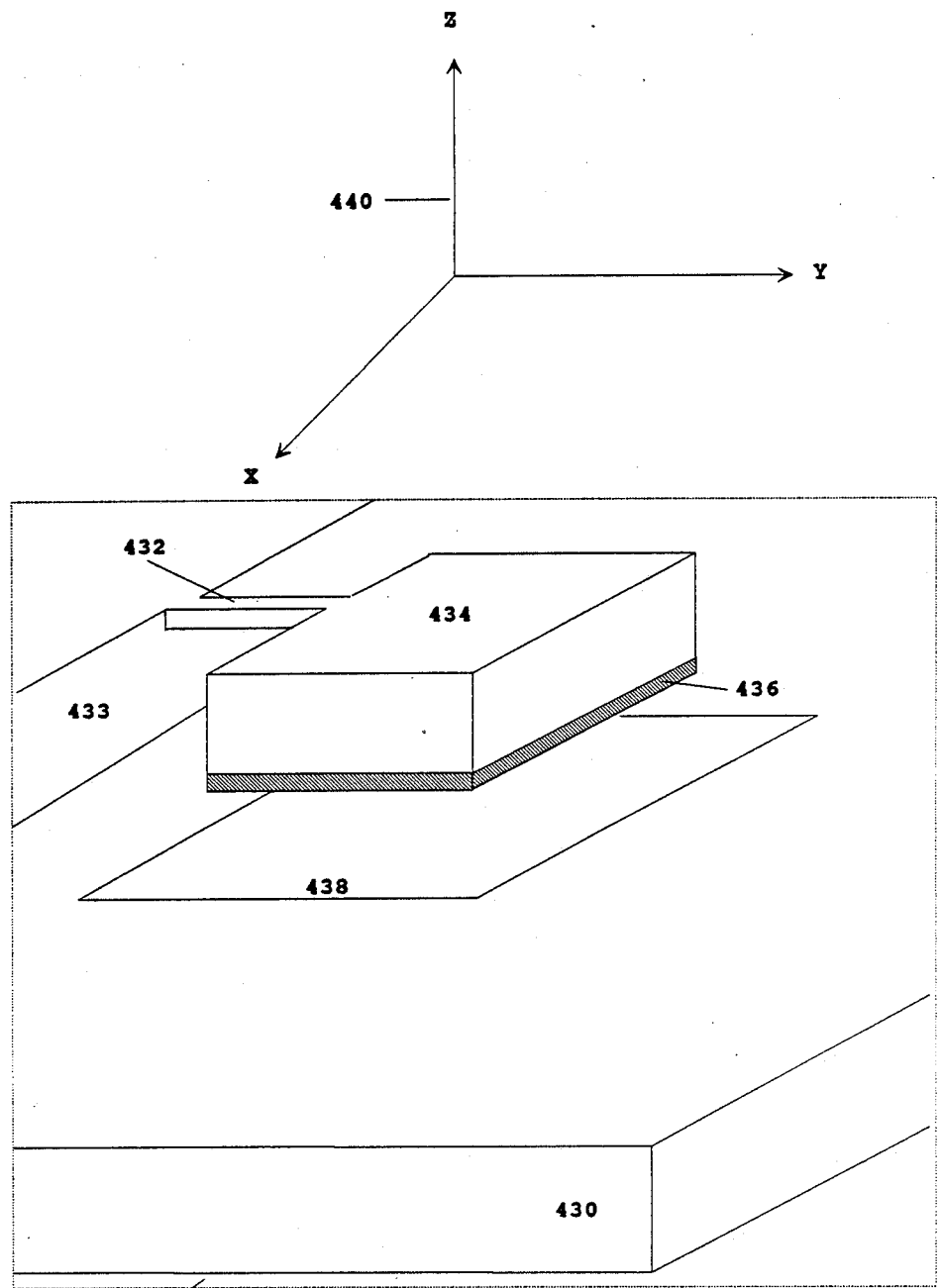

FIG. 34 is an oblique view of a Single Mode Capacitor Sensor Element.

Figure 35:
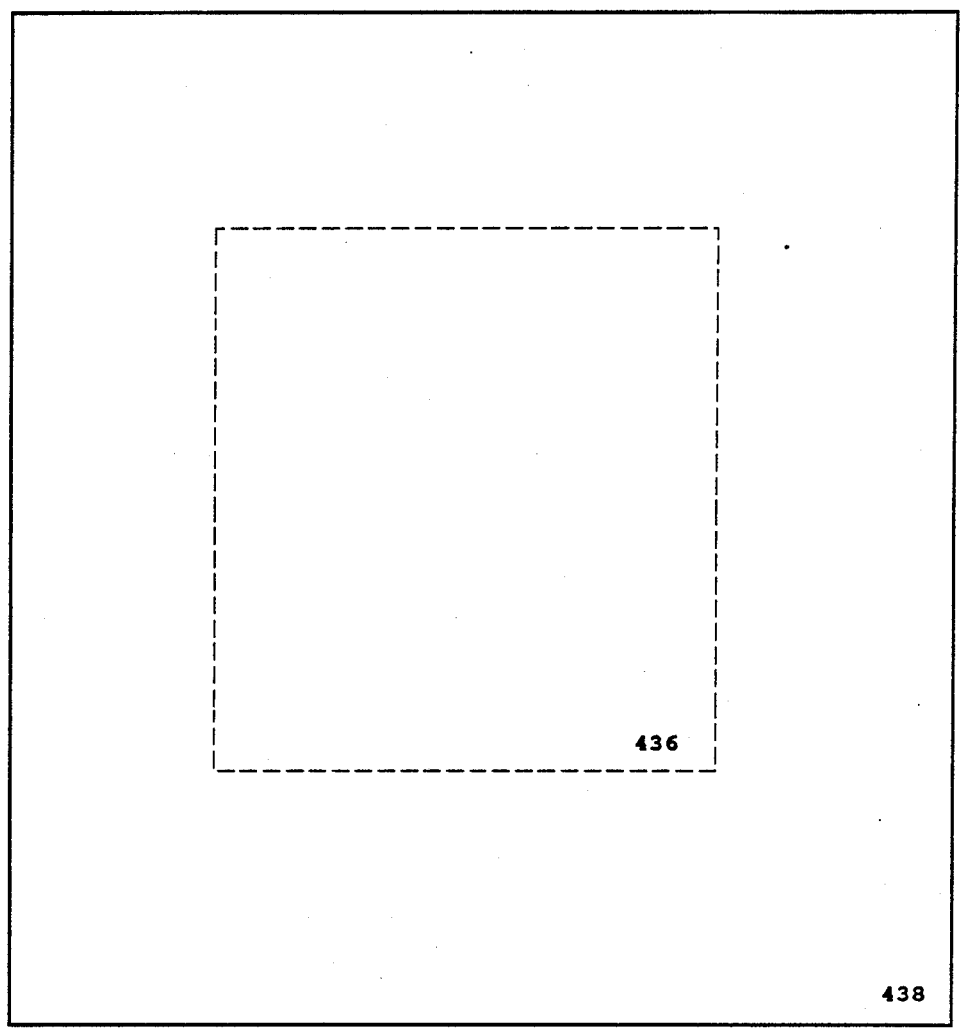

FIG. 35 is a top view of the Single Mode Capacitor Sensor Method Element capacitor plates.

Figure 36:
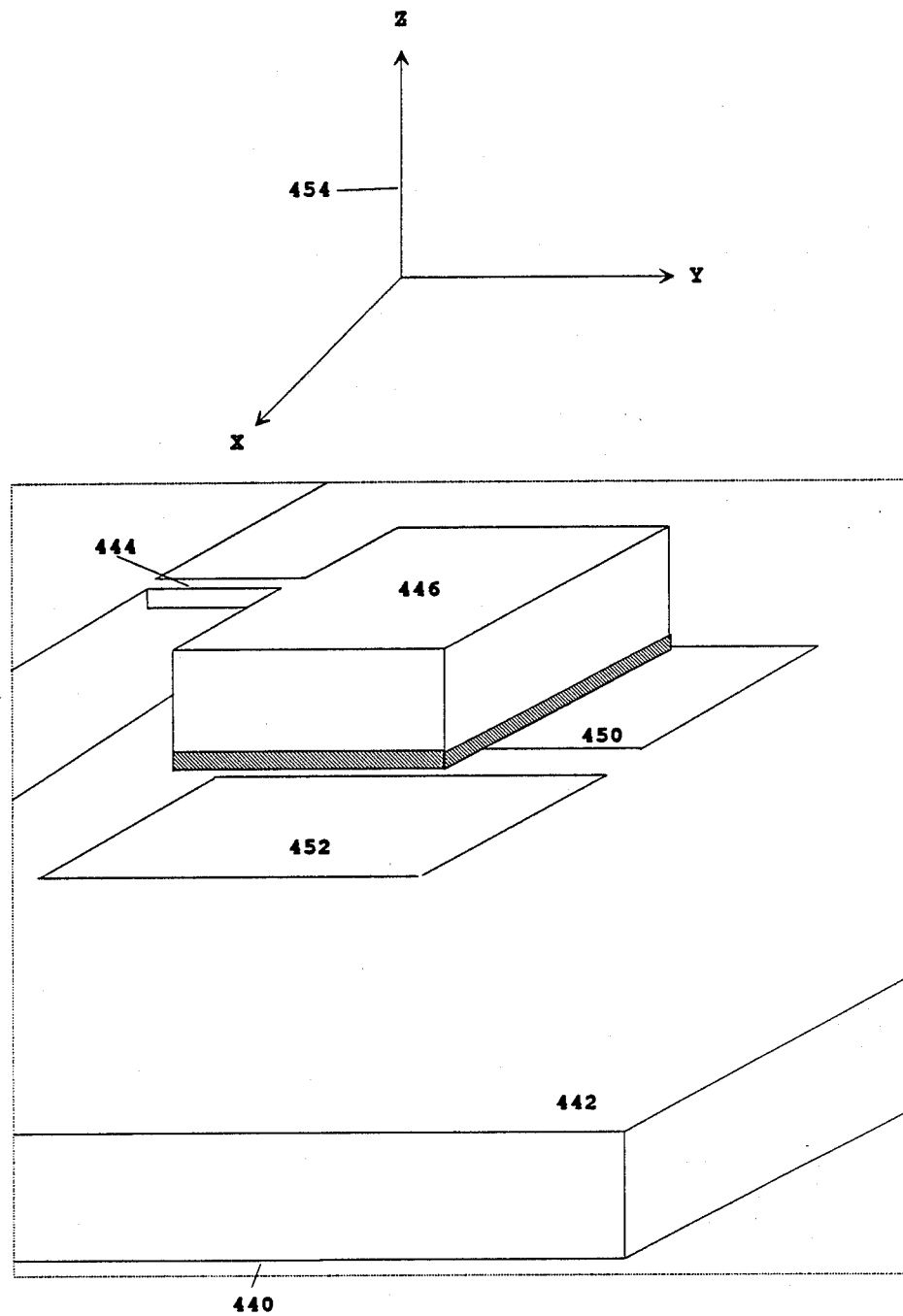

FIG. 36 is an oblique view of a Dual Mode Capacitor Sensor Element, beam and response element.

Figure 37:
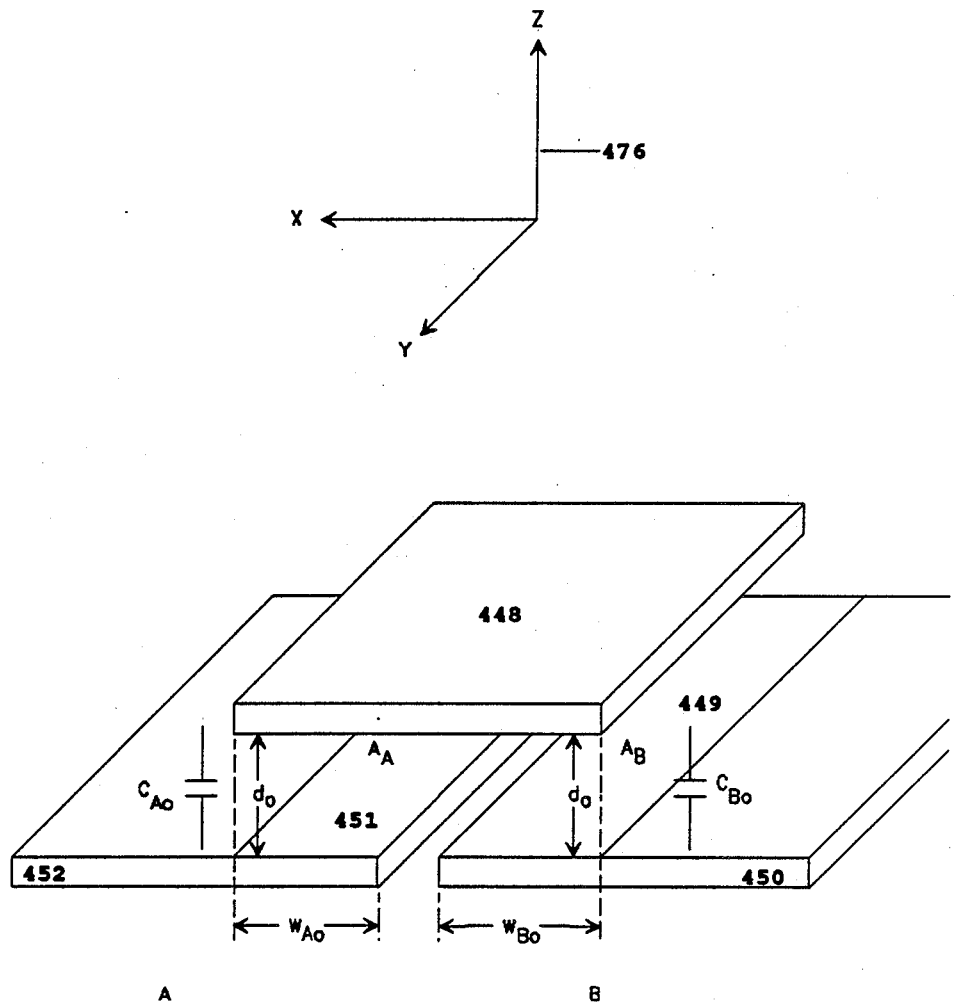

FIG. 37 is an oblique view of the capacitor plate arrangement for the Dual Mode Capacitor Force Sensor Element of FIG. 36.

Figure 38:
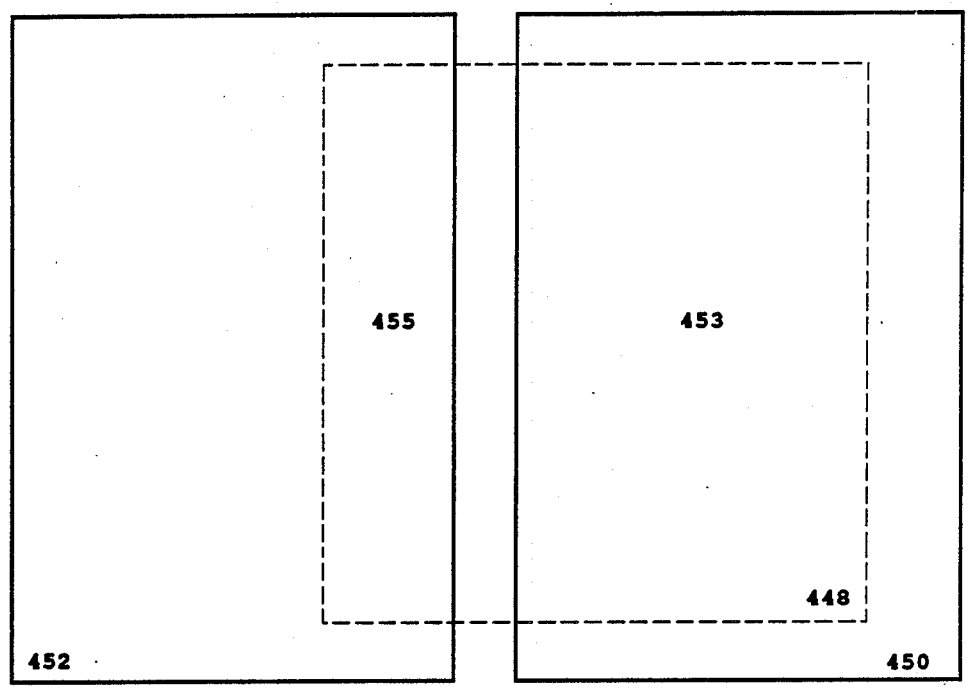

FIG. 38 is an top view of the Dual Mode Capacitor Sensor Element conducting plates where the response element has been displaced by a force having force components in the X and Z directions.

Figure 39:
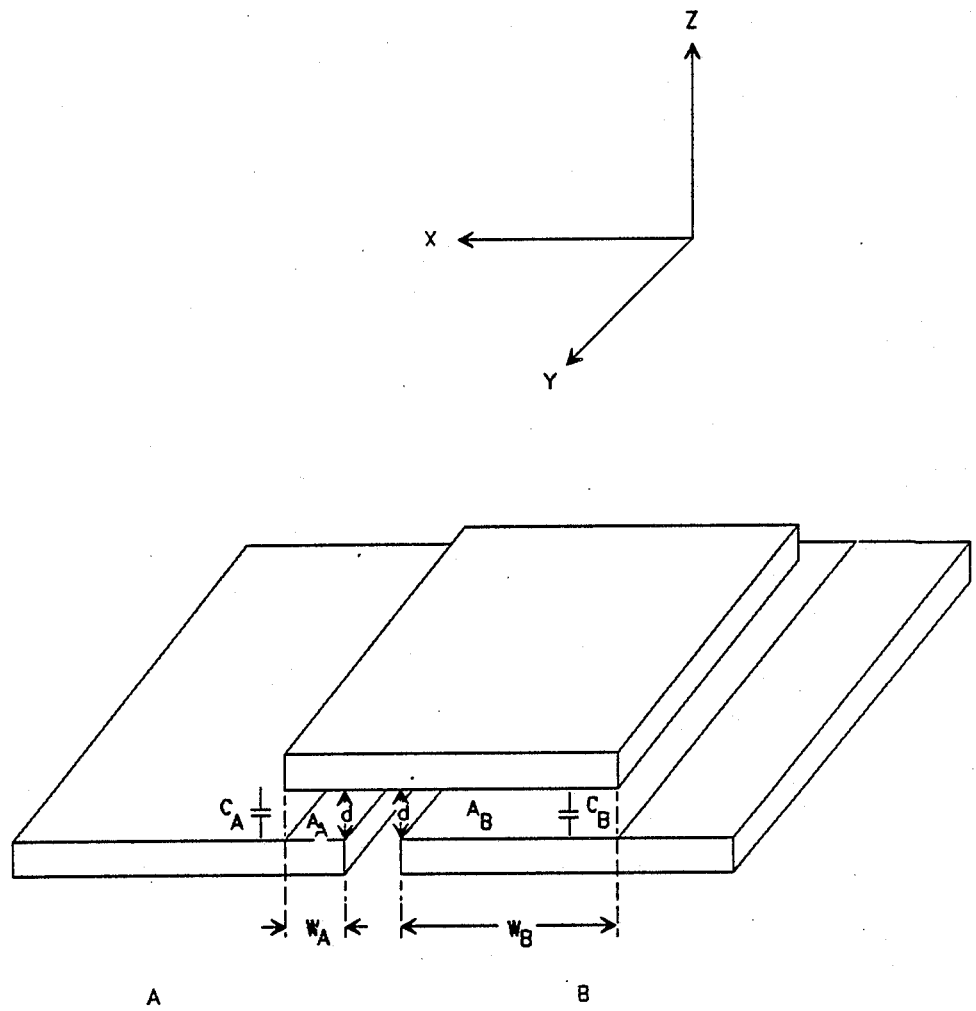

FIG. 39 is an oblique view of the Dual Mode Capacitor Sensor Element conducting plates of FIG. 38 where the response element has been displaced by a force with components in the X and Z directions, as in FIG. 38.

Figure 40:
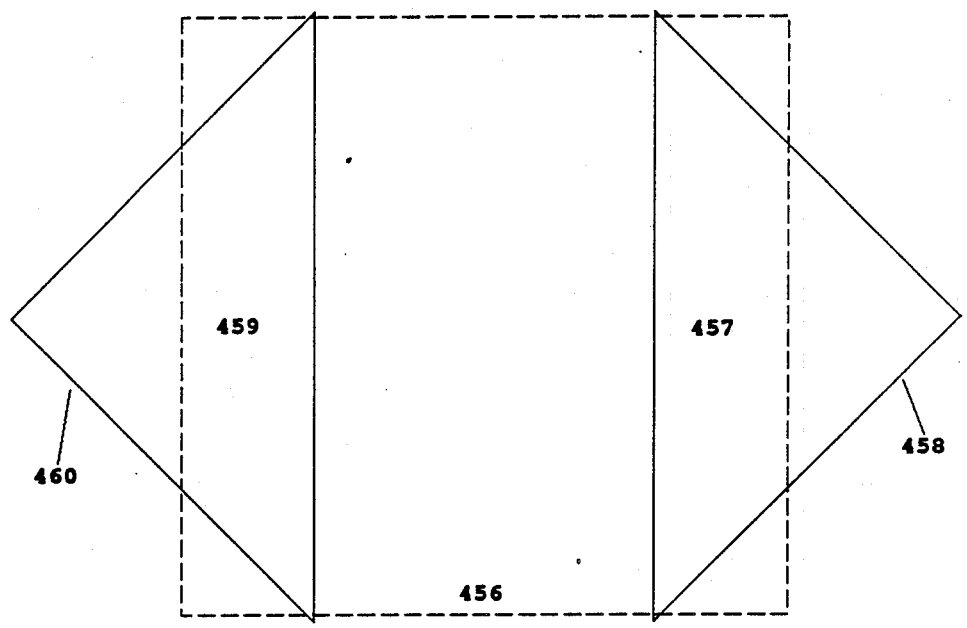

FIG. 40 is a top view of the Dual Mode Capacitor Force Sensor Element capacitor plates for a Special Geometry Capacitor Sensor Element.

Figure 41:
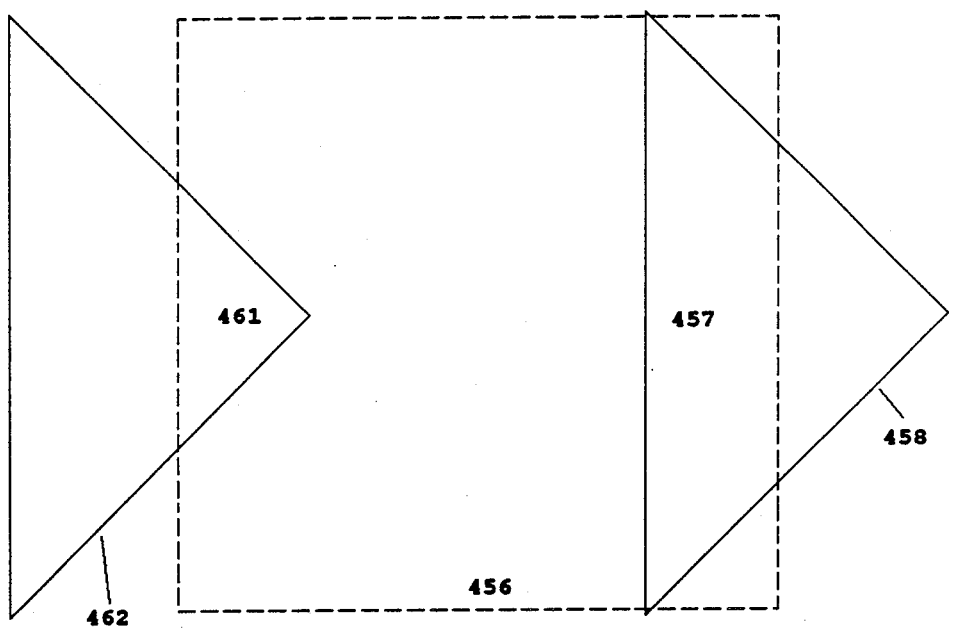

FIG. 41 is a top view of the capacitor plates for another Dual Mode Special Geometry Capacitor Sensor Element.

Figure 42A:
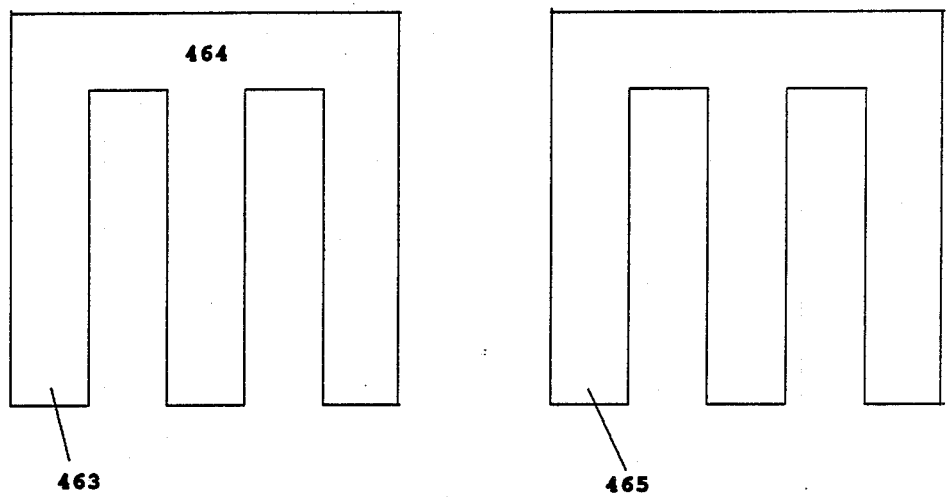

FIG. 42A is a top view of 2 sets of electrically interconnected metallic plates of stripe geometry. The capacitor plates are plates each a part of each of the two capacitors for a Dual Mode Capacitor Sensor Element.

Figure 42B:
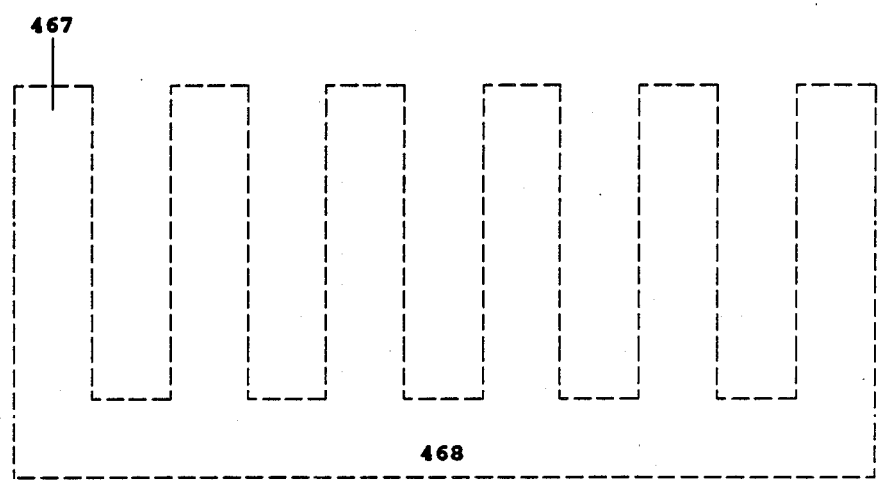

FIG. 42B is a top view of electrically interconnected metallic capacitor plate of stripe geometry. The capacitor plate is the common plate for the two capacitors of a Dual Mode Capacitor Sensor Element. The capacitor plates are two plates of a Stripe Geometry Dual Mode Capacitor Sensor Element.

Figure 43:
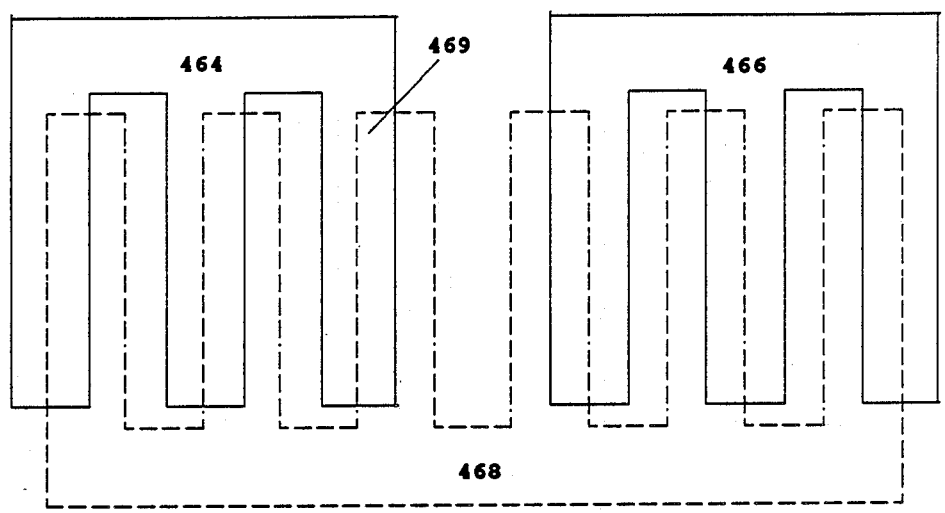

FIG. 43 is a top view of the overlap of the two sets of stripe capacitor electrodes of FIG. 42 showing alignment and capacitor plate overlap before displacement occurs.

Figure 44:
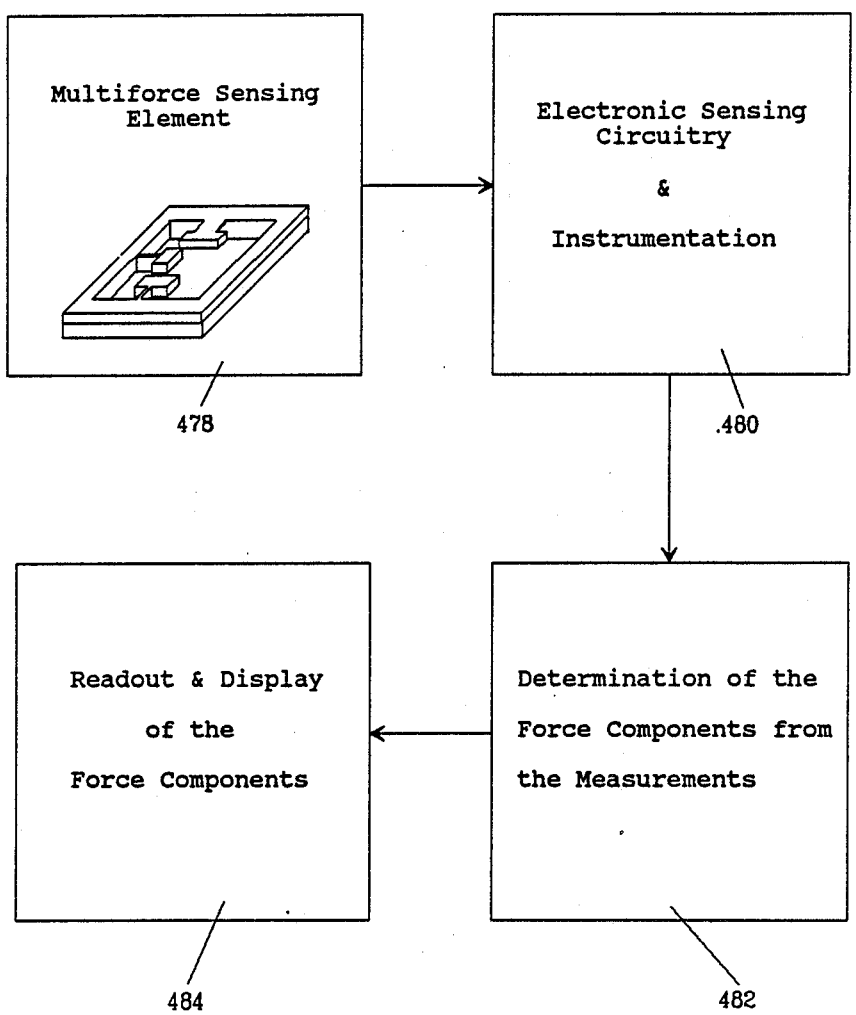

FIG. 44 is a block diagram of a force measurement system.

Figure 45:
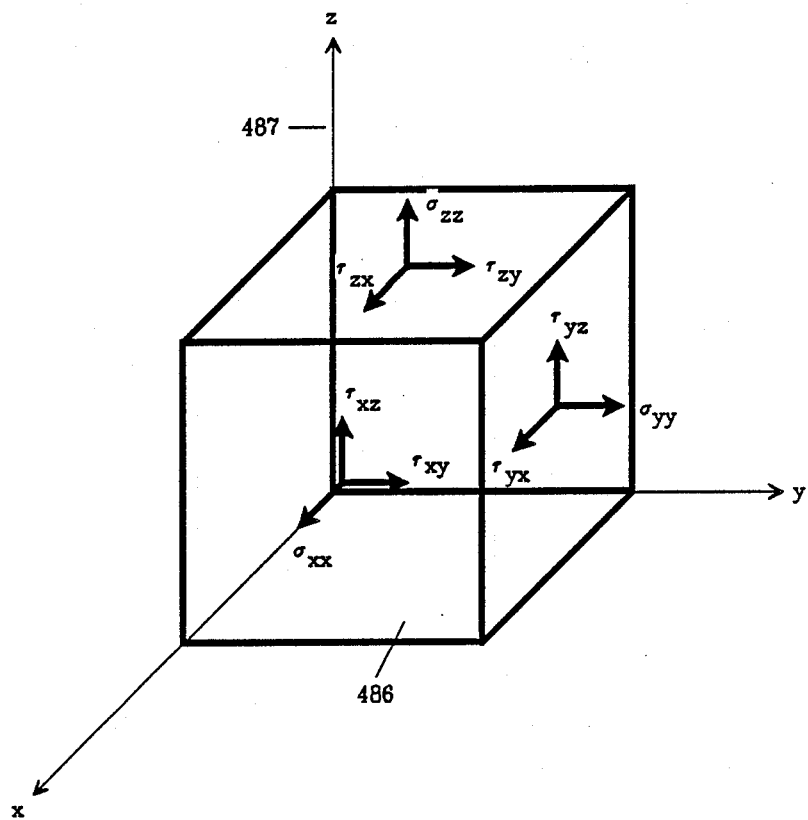

FIG. 45 is a diagram of a cubic element illustrating the components of stress.

Figure 46:
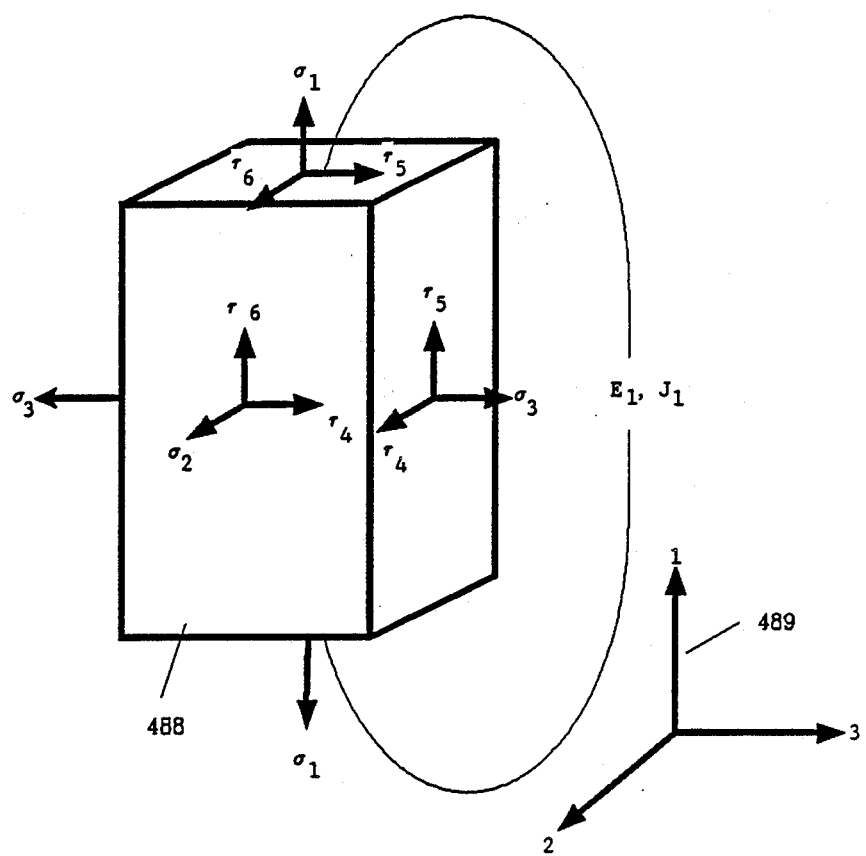

FIG. 46 is a resistive bar under normal tension. Both the electric field $E_1$ and the current density $J_1$ are taken along the same axis as the applied tension to measure the longitudinal piezoresistive change.

Figure 47:
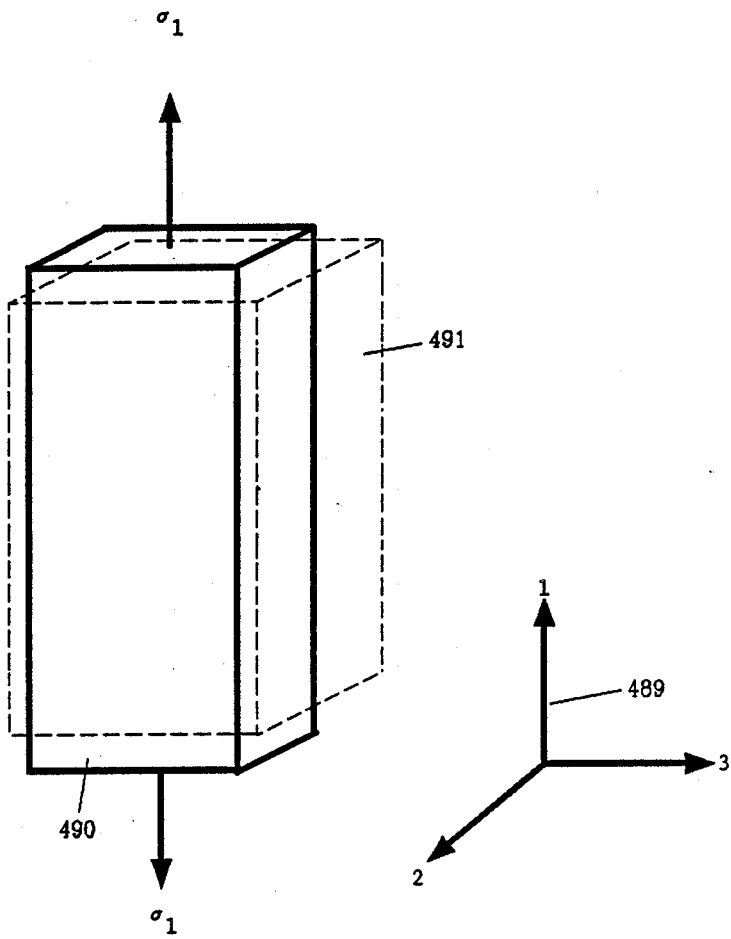

FIG. 47 is a diagram of a resistive bar under stress. The dimensions of the bar change due to the applied stress.

Figure 48:
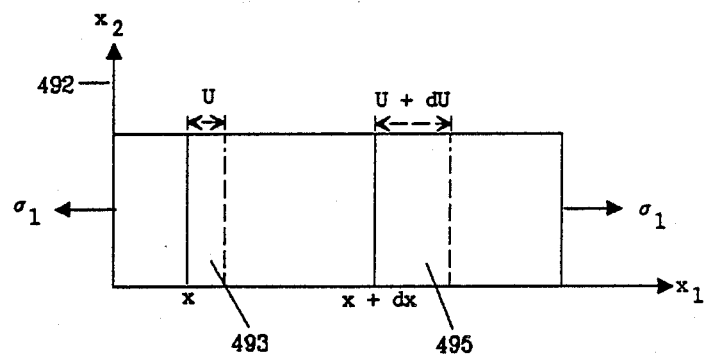
Figure 48:
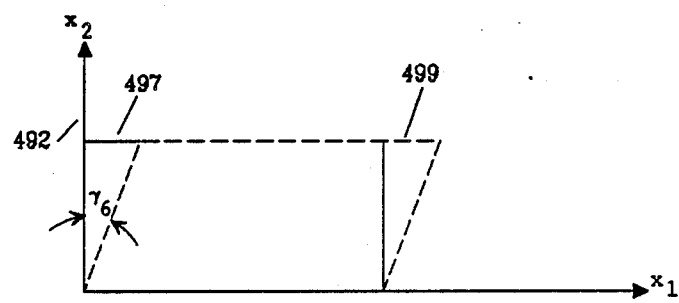

FIG. 48 is an illustration of components of strain. (a) Longitudinal strain and (b) shear strain components.

Figure 49:
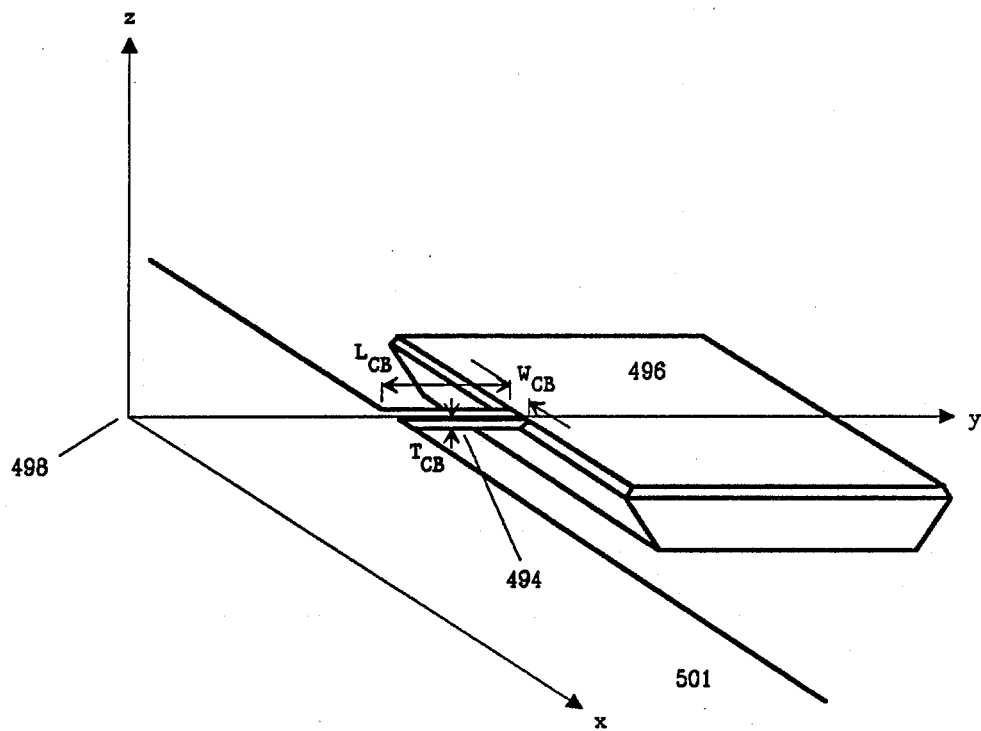

FIG. 49 is an oblique view of a mass-loaded cantilever beam. The cantilever beam is of length L, thickness H, and width W. The y-axis runs through the longitudinal axis of the cantilever beam.

Figure 50:
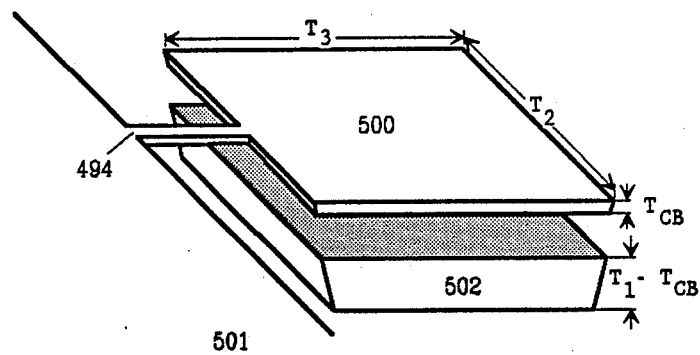

FIG. 50 is an oblique view of the mass-loaded cantilever beam. The response element has been separated into two components: the off-axis mass M and the on-axis mass m.

Figure 51:
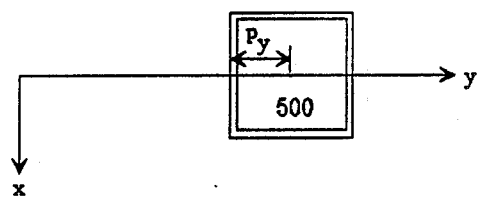
Figure 51:
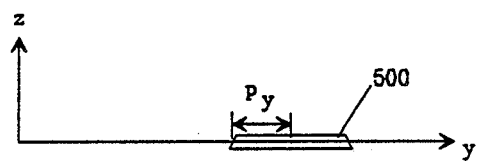
Figure 51:
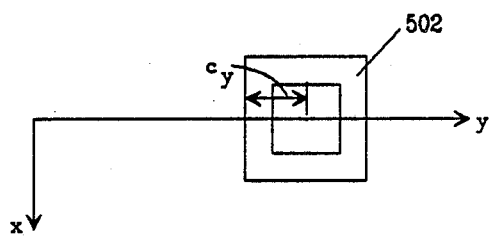
Figure 51:
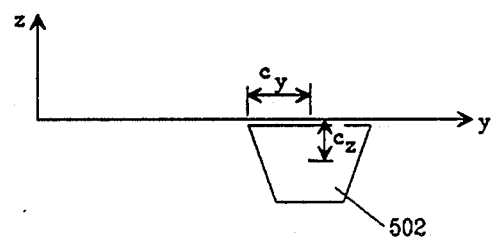

FIG. 51 (a) is top and side views of the on-axis mass. The center of mass is located at the coordinates (0, $p_y$, 0).

FIG. 51b is bottom and side views of the off-axis mass. The center of mass coordinates are located at the coordinates (0, $c_y$, $c_z$)

Figure 52:
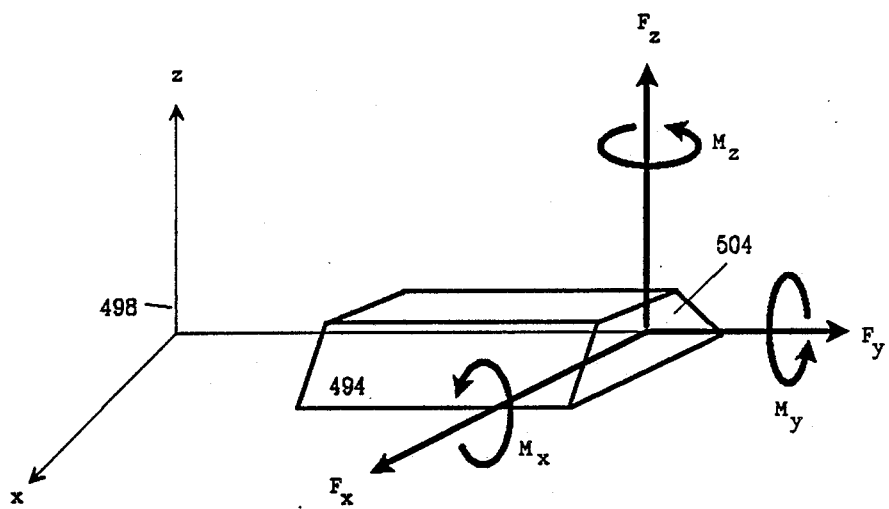

FIG. 52 is an oblique view of the cantilever beam. The response element has been replaced by a free body diagram. The force and moment components which act on the end of the cantilever beam are caused by acceleration of the response element.

Figure 53:
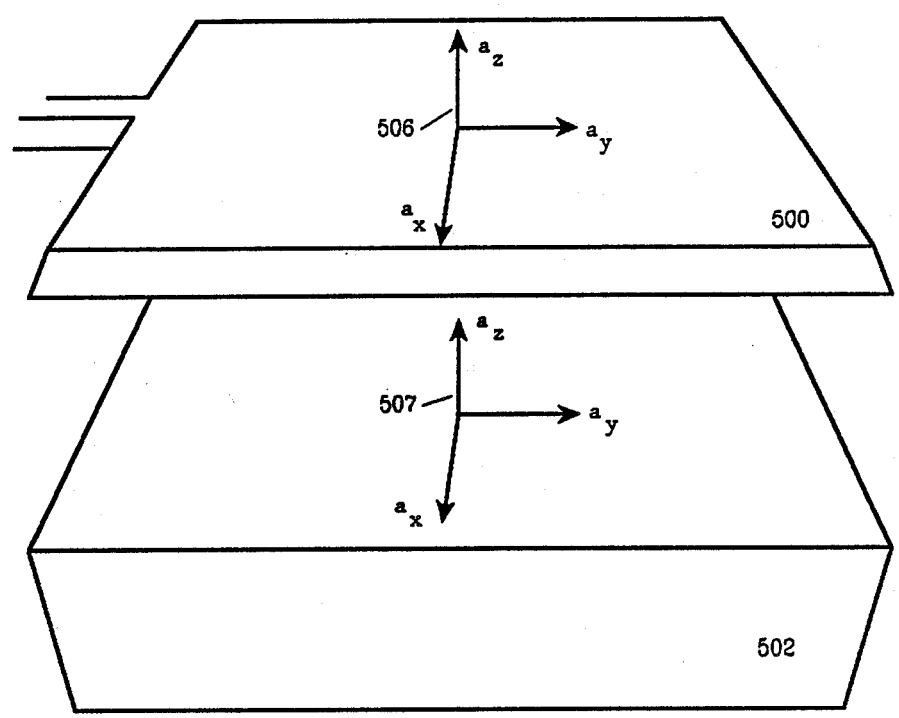

FIG. 53 is a perspective view of the on-axis mass and the off-axis mass. The vectors represent the components of linear acceleration which act on the response element.

Figure 54:
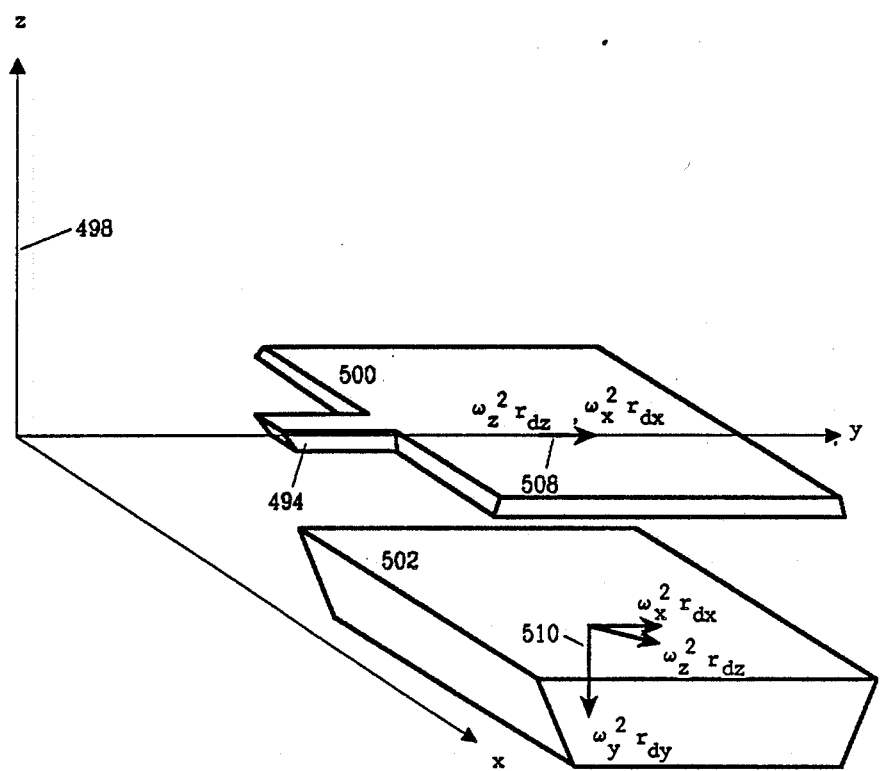

FIG. 54 is an oblique view of the mass-loaded cantilever beam. The vectors represent the angular velocity components acting on the on-axis mass m and the off-axis mass M.

Figure 55:
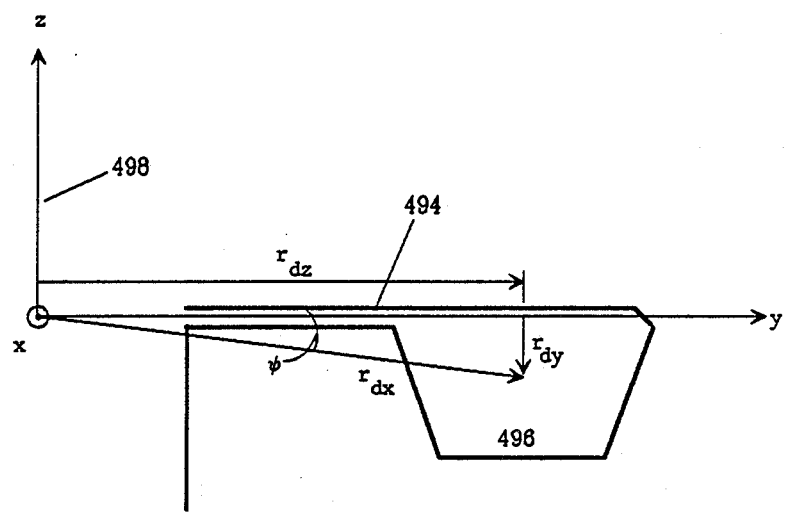

FIG. 55 is a side view of the mass-loaded cantilever beam showing the radial distances $r_{di}$. The angle is also defined as the angle between $r_{dx}$ and $r_{dz}$.

Figure 56:
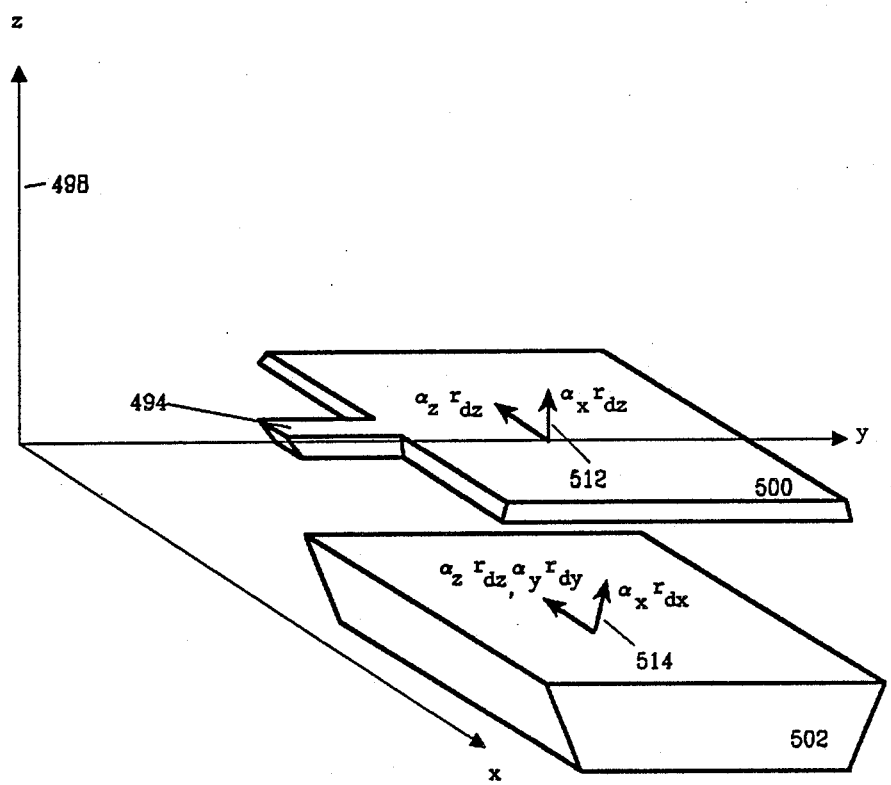

FIG. 56 is an oblique view of the mass-loaded cantilever beam. The vectors represent the acceleration components arising from angular motion acting on the on-axis mass m and the off-axis mass M.

Figure 57:
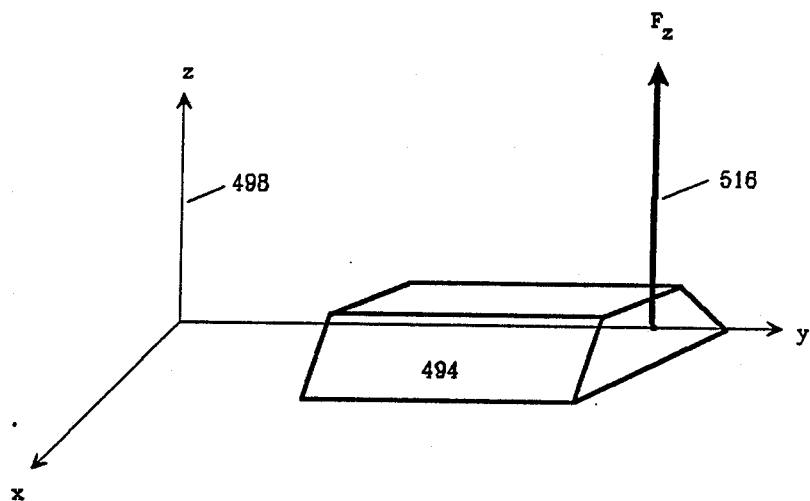

FIG. 57 is an oblique view of the cantilever beam with a vertical force $F_z$ applied at the free end.

Figure 58A:
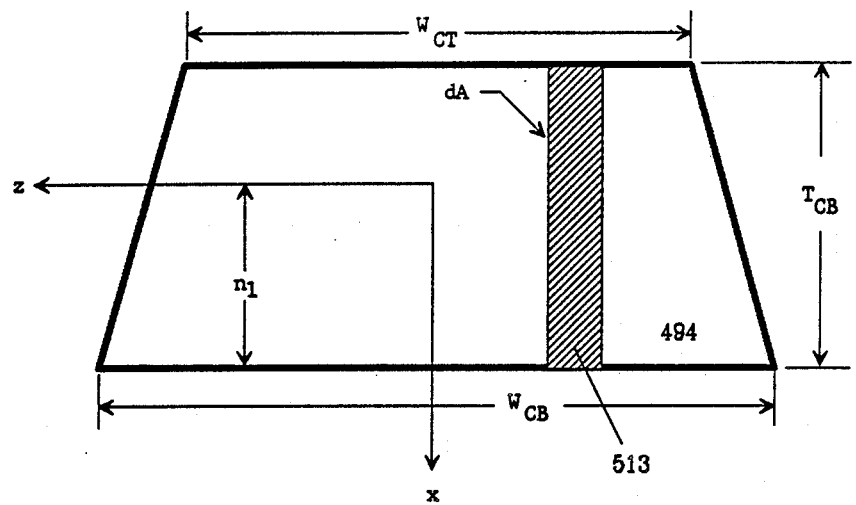

FIG. 58a is a cross sectional view of the cantilever beam. The elemental area $dA_{CB}$ is multiplied with the distance x and integrated from x to the neutral axis to obtain the shear stress component $\tau_{yz}$.

Figure 58B:
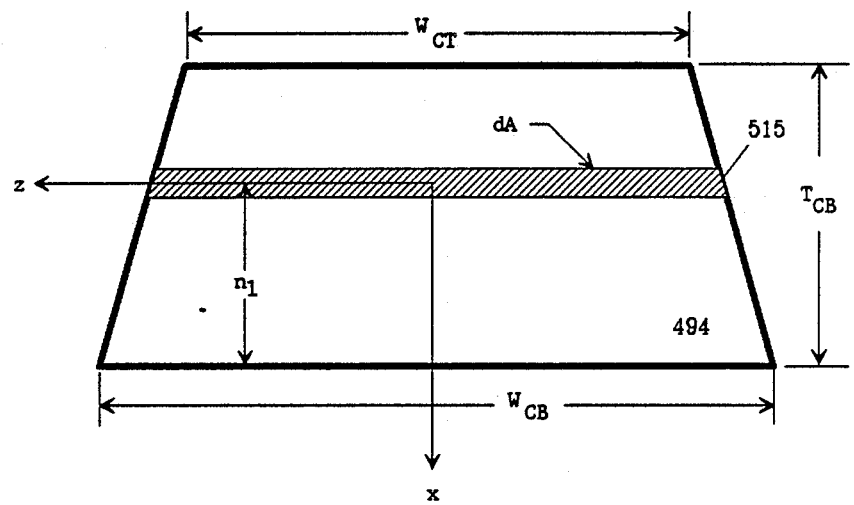

FIG. 58b is a cross sectional view of the cantilever beam. The elemental area $dA_{CB}$ is multiplied with the distance x and integrated from x to the neutral axis to obtain the shear stress component $\tau_{xy}$.

Figure 59:
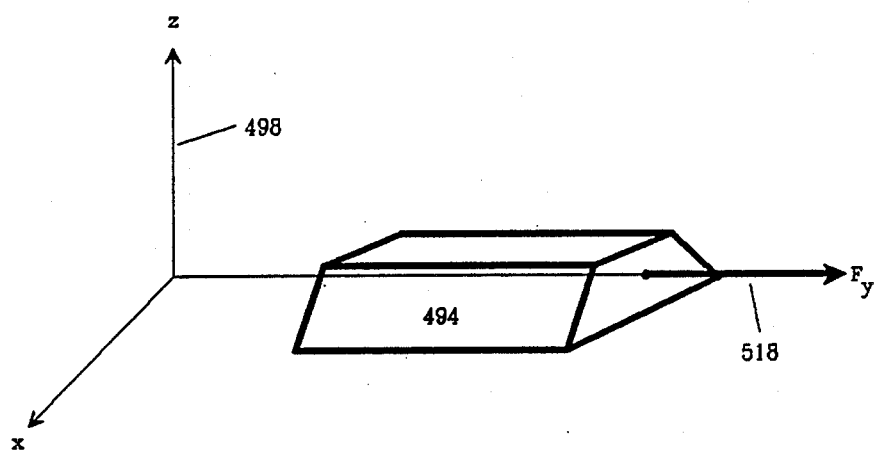

FIG. 59 is an oblique view of the cantilever beam with an axial force $F_y$ applied at the free end.

Figure 60:
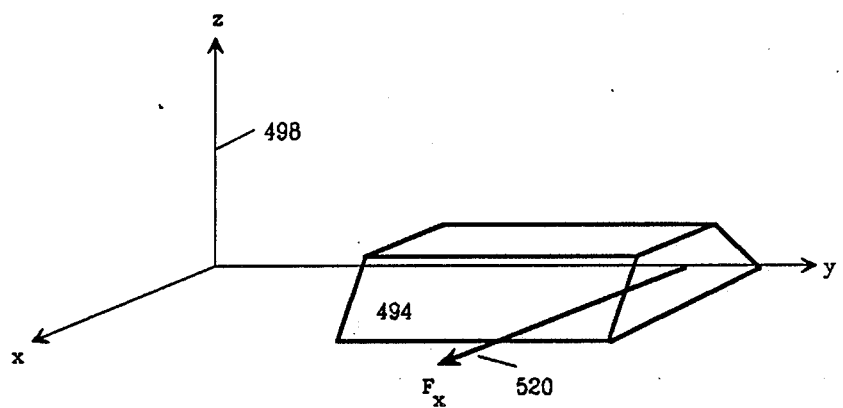

FIG. 60 is an oblique view of the cantilever beam with a lateral force $F_x$ applied at the free end.

Figure 61:
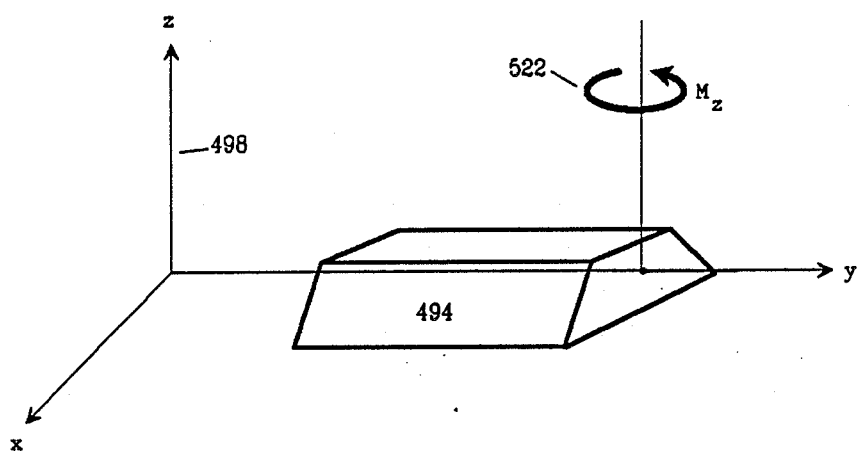

FIG. 61 is an oblique view of the cantilever beam. The response element has been replaced by a moment $M_z$ acting on the end of the cantilever beam.

Figure 62:
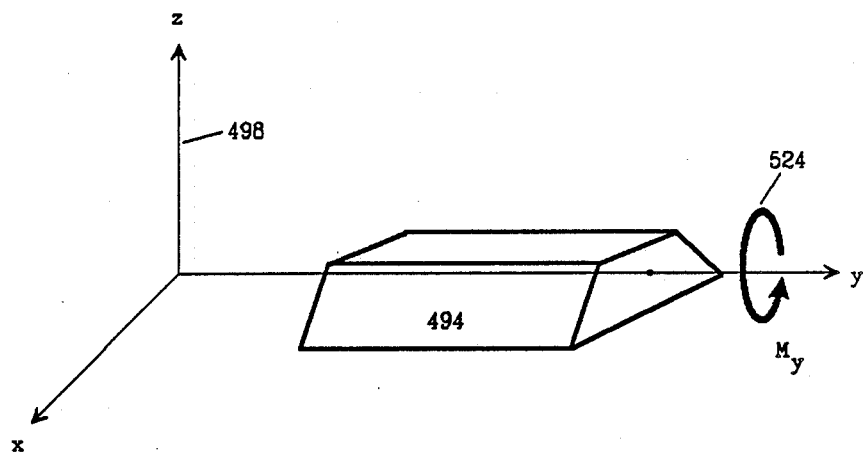

FIG. 62 is an oblique view of the cantilever beam. The response element has been replaced by a moment $M_y$ acting on the end of the cantilever beam.

Figure 63:
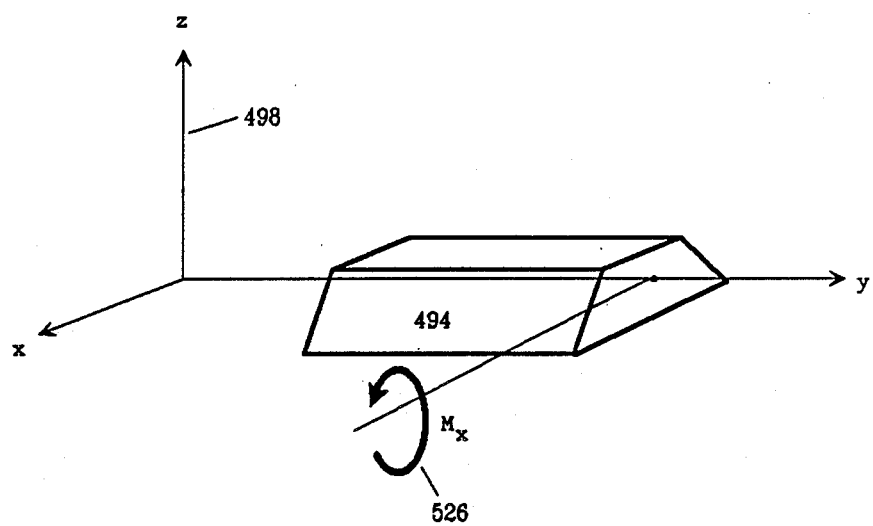

FIG. 63 is an oblique view of the cantilever beam. The response element has been replaced by a moment $M_x$ acting on the end of the cantilever beam.

Figure 64:
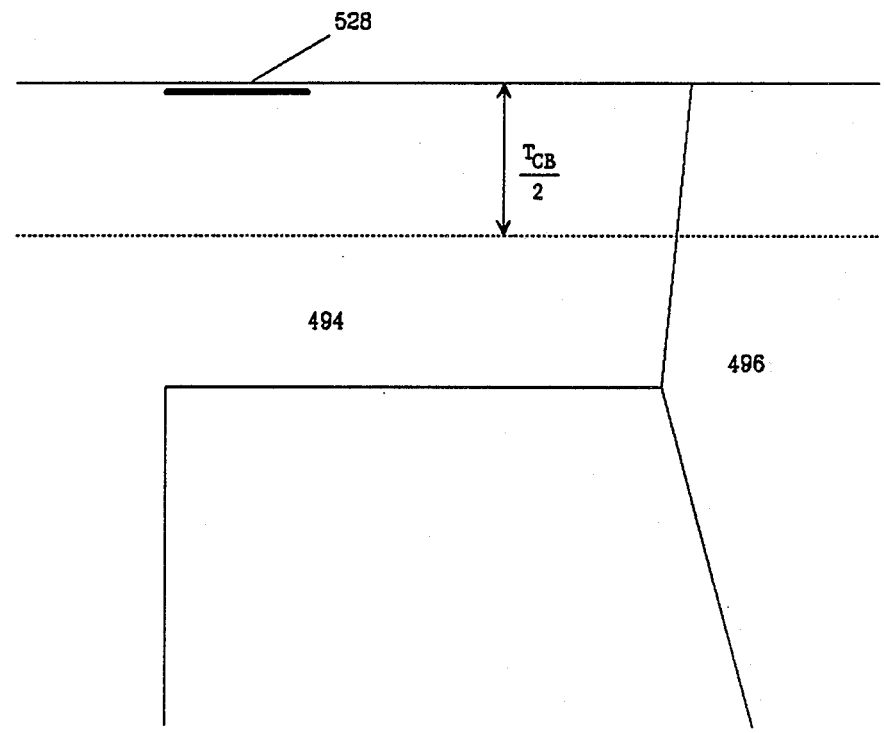

FIG. 64 is a cross sectional view of the mass-loaded cantilever beam. The piezoresistor resides at the surface of the cantilever beam. The z-coordinate of the piezoresistor is $-H/2$.

Figure 65:
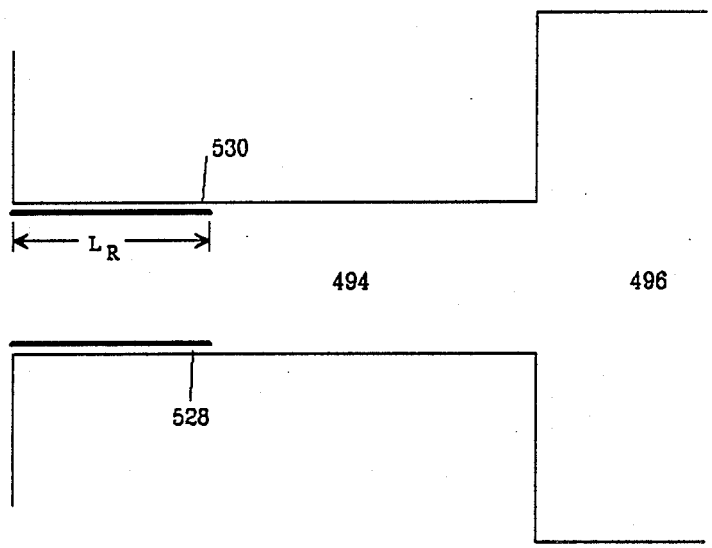

FIG. 65 is a top view of the mass-loaded cantilever beam. The piezoresistor length is $L_r$.

Figure 66:
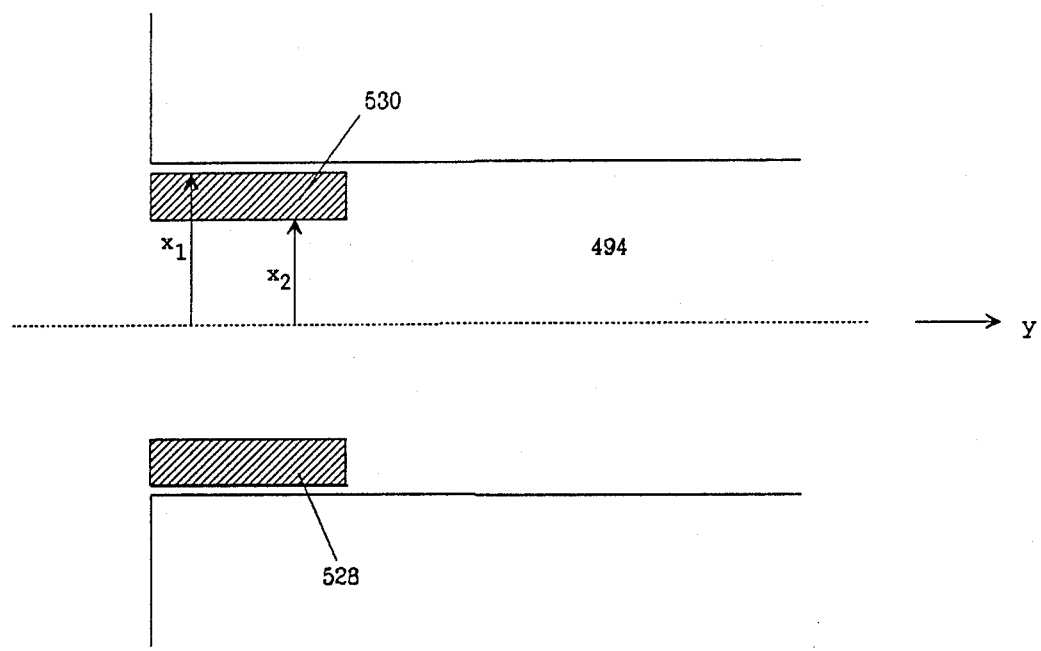

FIG. 66 is a top view of the cantilever beam. The piezoresistor location on the X-axis is taken as the average coordinate between $x_1$ and $x_2$.

Figure 67:
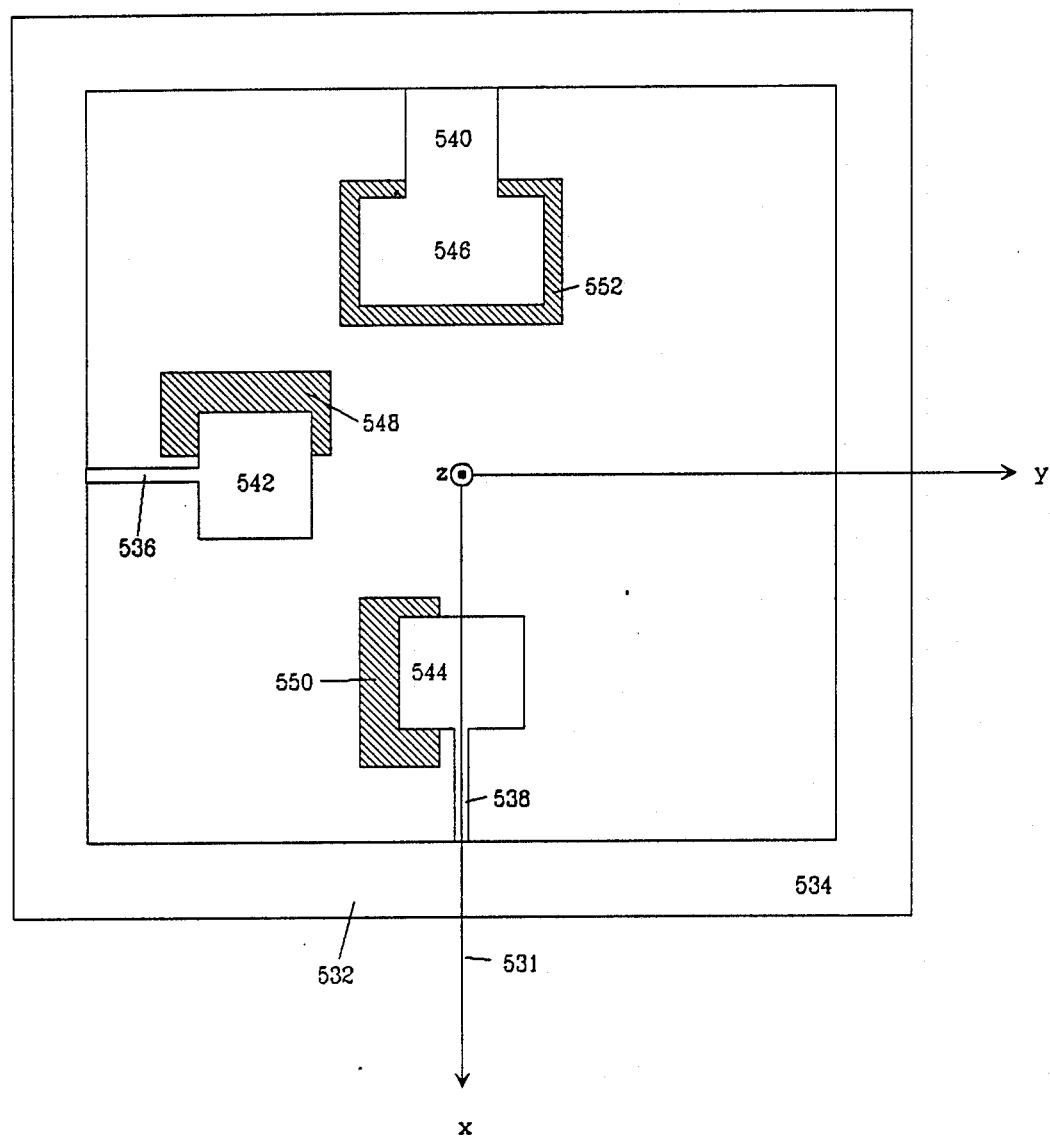

FIG. 67 is a top view of a low condition number linear accelerometer. The cantilever beams are "ribbon-like".

Figure 68:
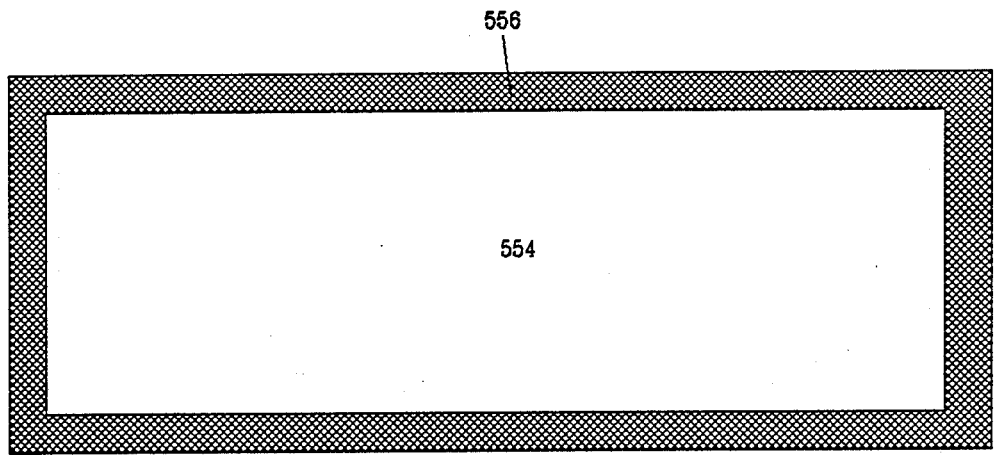

FIG. 68 is a cross sectional view of a silicon substrate surrounded by a layer of thermally grown oxide.

Figure 69:
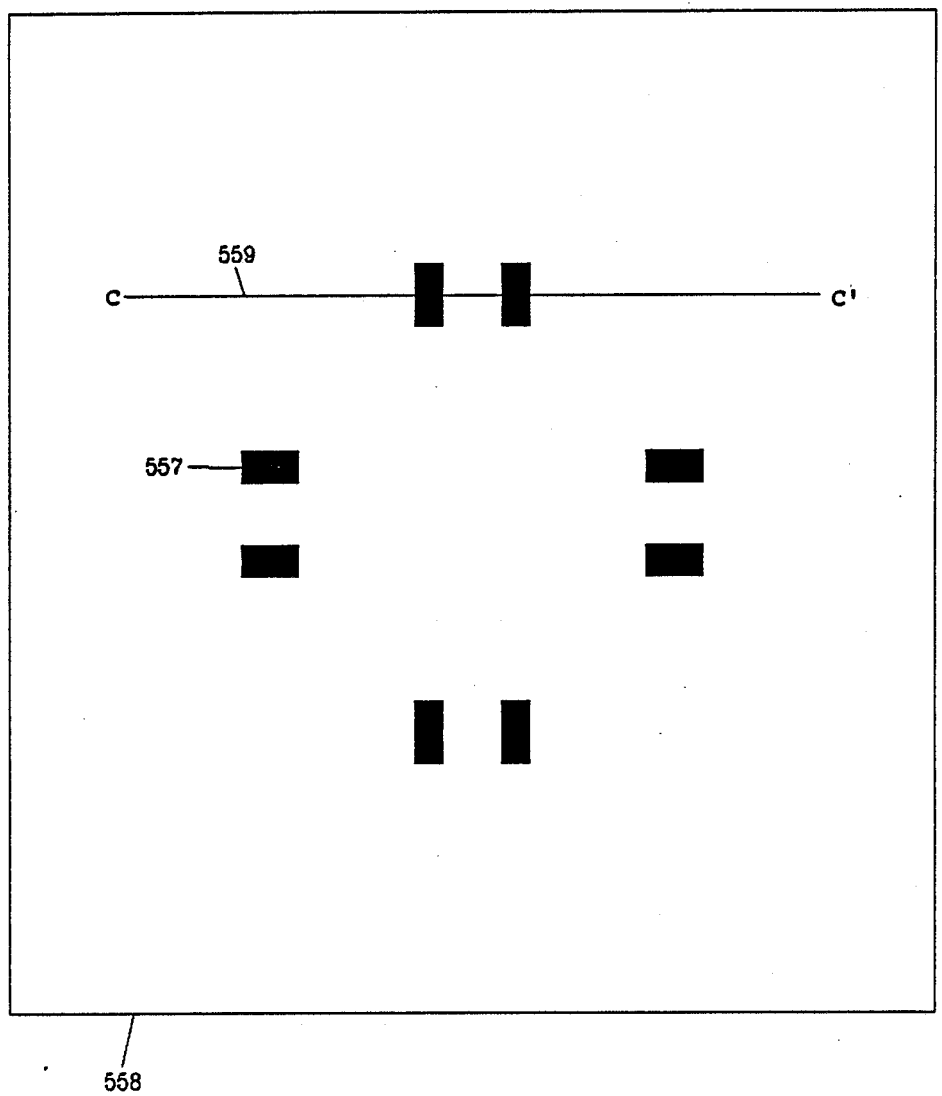

FIG. 69 is a top view of a mask which defines alignment marks which are to be etched through the substrate.

Figure 70:
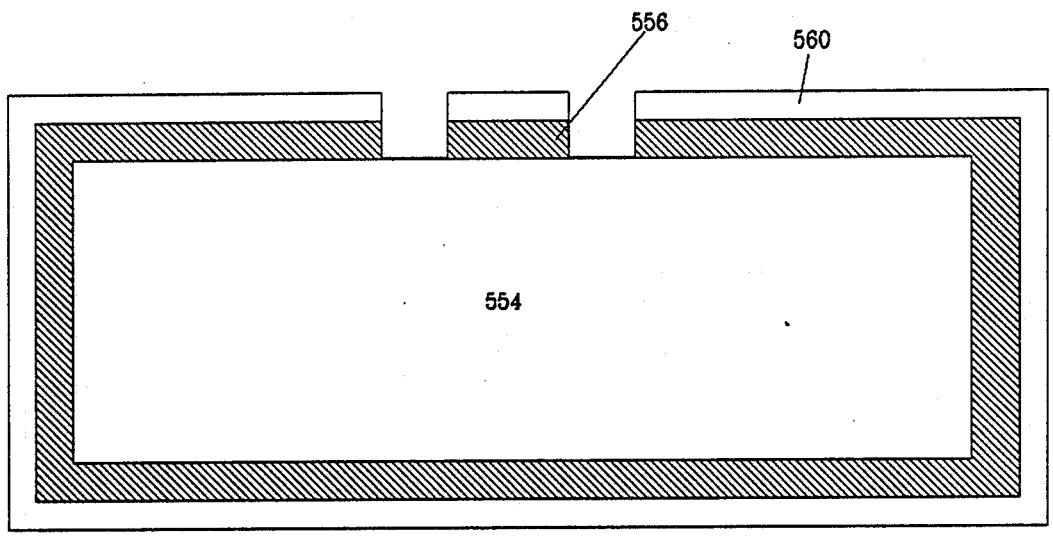

FIG. 70 is a cross sectional view of the silicon substrate surrounded with thermally grown oxide and photoresist. The photoresist has been used to create the oxide mask required for the creation of the alignment marks.

Figure 71:
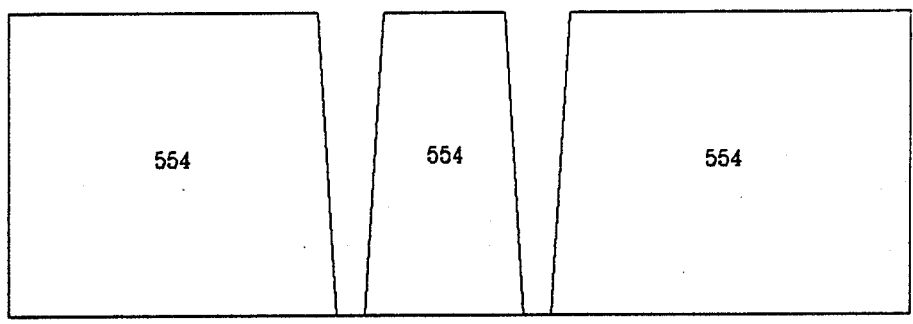

FIG. 71 is a cross sectional view of the substrate taken at line C-C' in FIG. 69 where the alignment marks have been etched through the thickness of the substrate.

Figure 72:
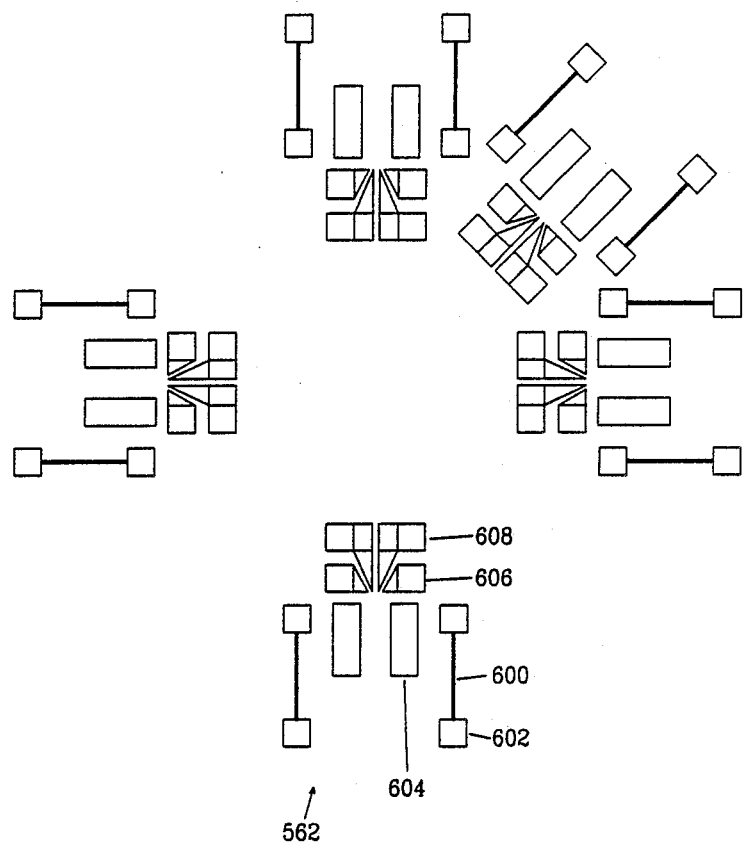

FIG. 72 is a mask pattern for defining the areas of diffusion.

Figure 73:
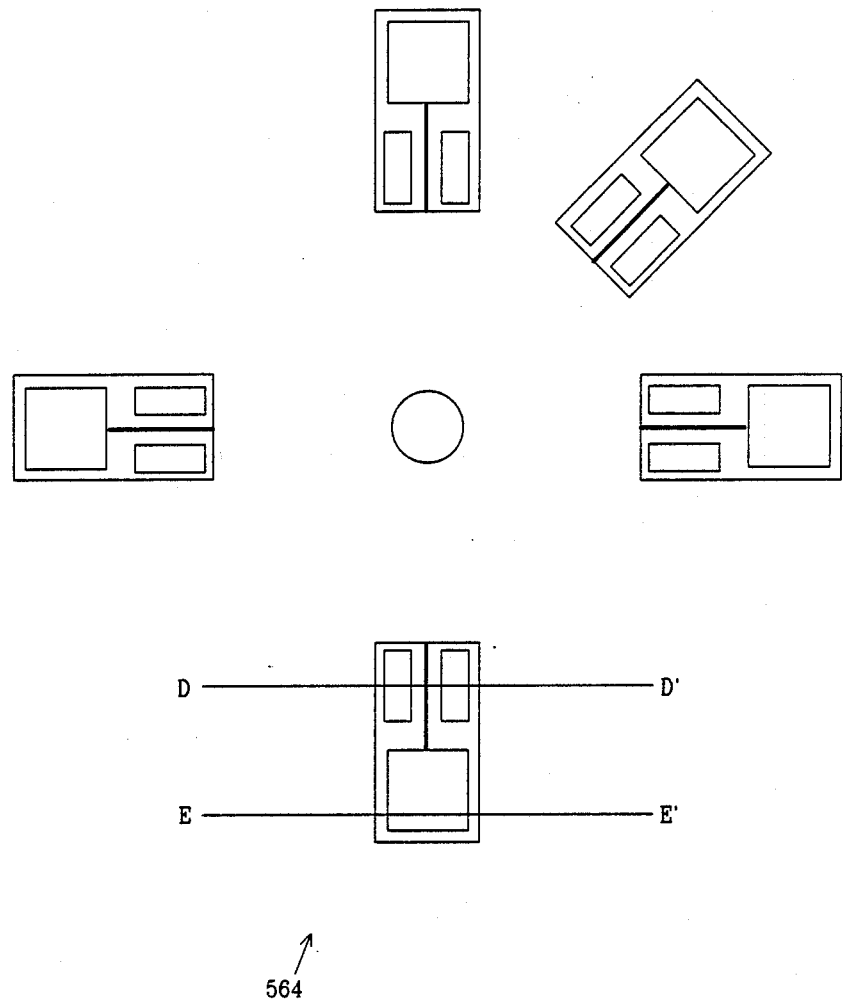

FIG. 73 is a mask pattern for outlining the features on the top of the substrate which are to be defined using an anisotropic etchant.

Figure 74:
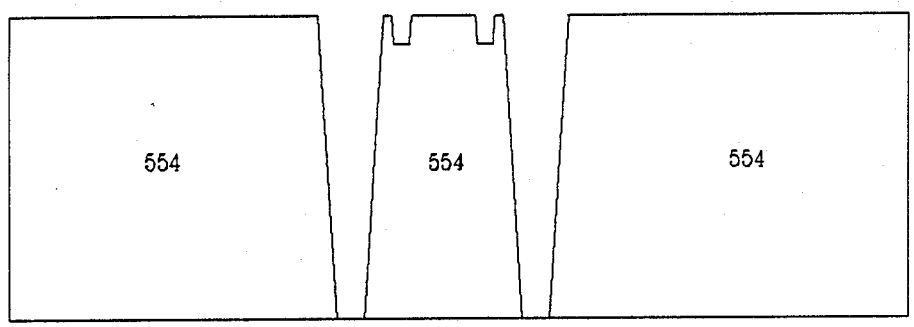

FIG. 74 is a cross sectional view of the substrate taken at line D-D' in FIG. 73 after a top etching defines a portion of a cantilever beam.

Figure 75:
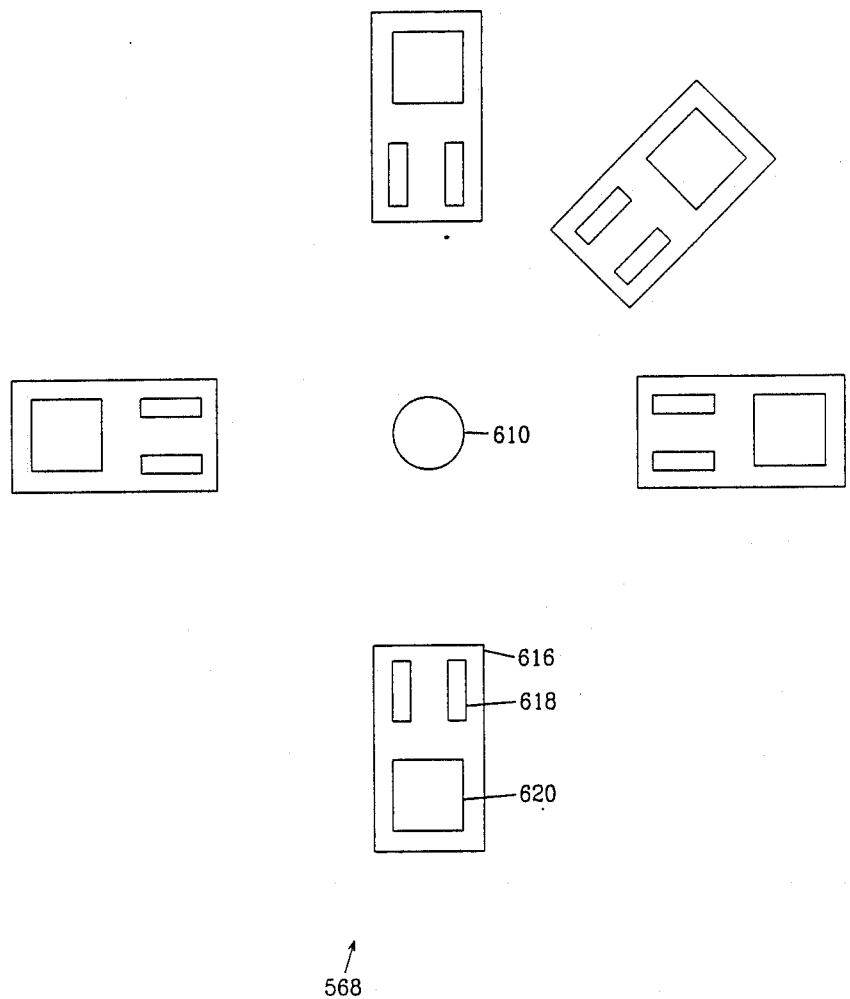

FIG. 75 is a mask pattern for outlining the features on the bottom of the substrate.

Figure 76:
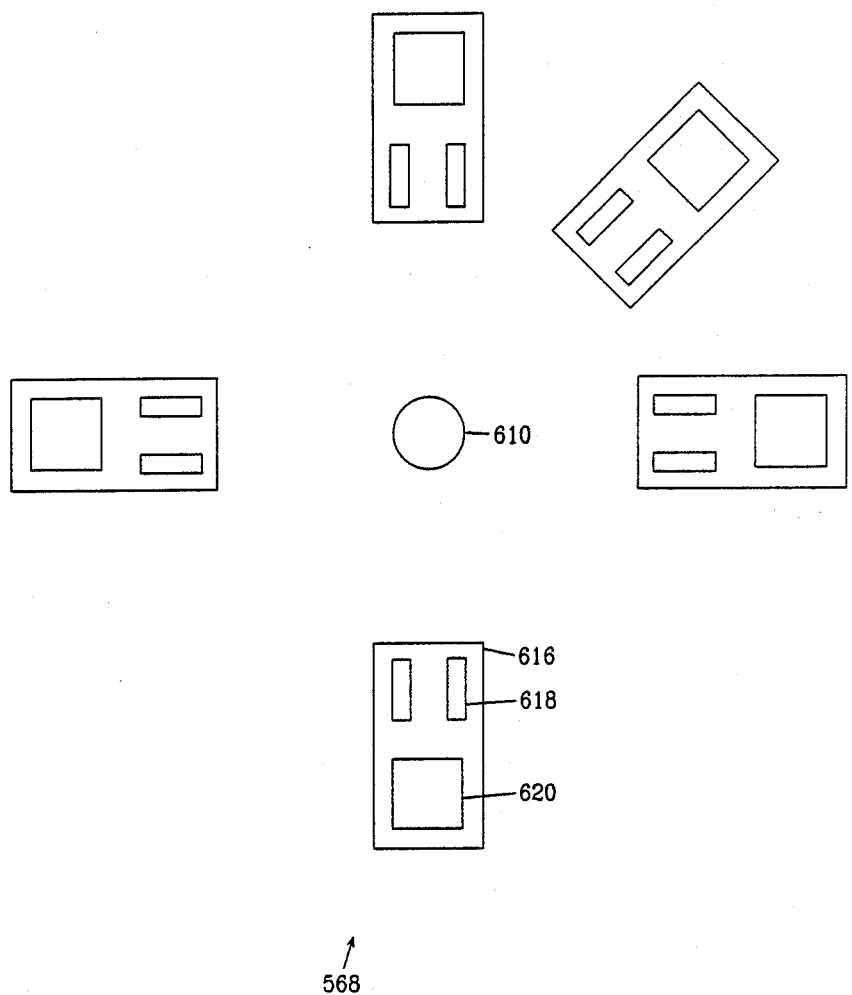

FIG. 76 is a mask pattern for outlining the features on the bottom of the substrate. The features are to be fabricated using an anisotropic etchant.

Figure 77:
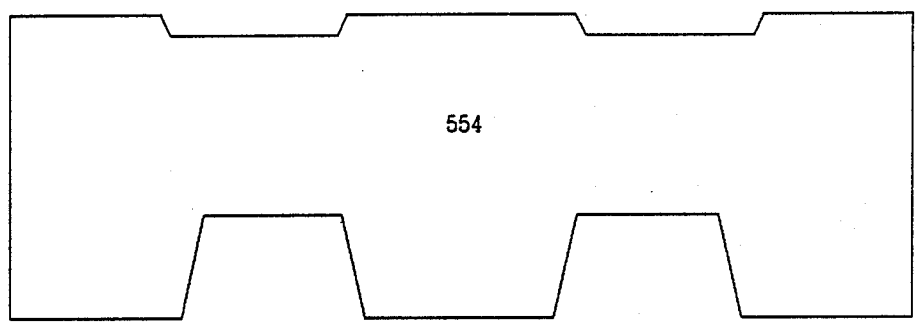

FIG. 77 is a cross sectional view of the substrate taken at line E-E' in FIG. 73 after the substrate has been partially etched from the bottom.

Figure 78:
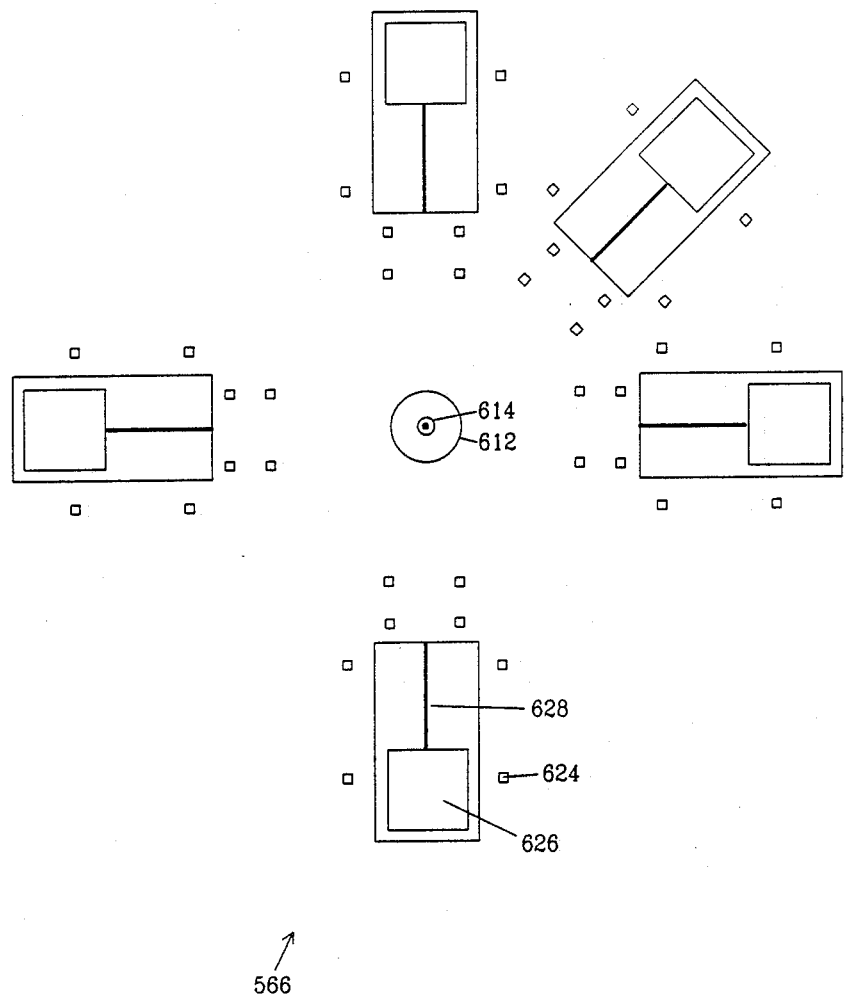

FIG. 78 is a mask pattern for defining the vias through the oxide for the purpose of providing paths for electrical contacts to the resistors.

Figure 79:
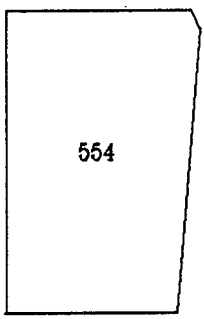
Figure 79:
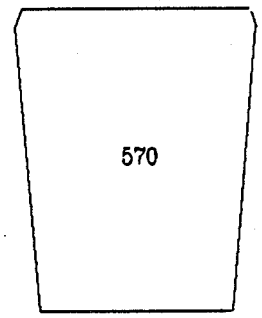
Figure 79:
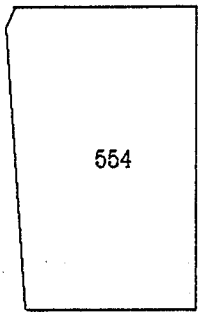

FIG. 79 is a cross sectional view of the substrate taken at line E-E' in FIG. 73 after a response element has been completely defined using an anisotropic etchant.

Figure 80:
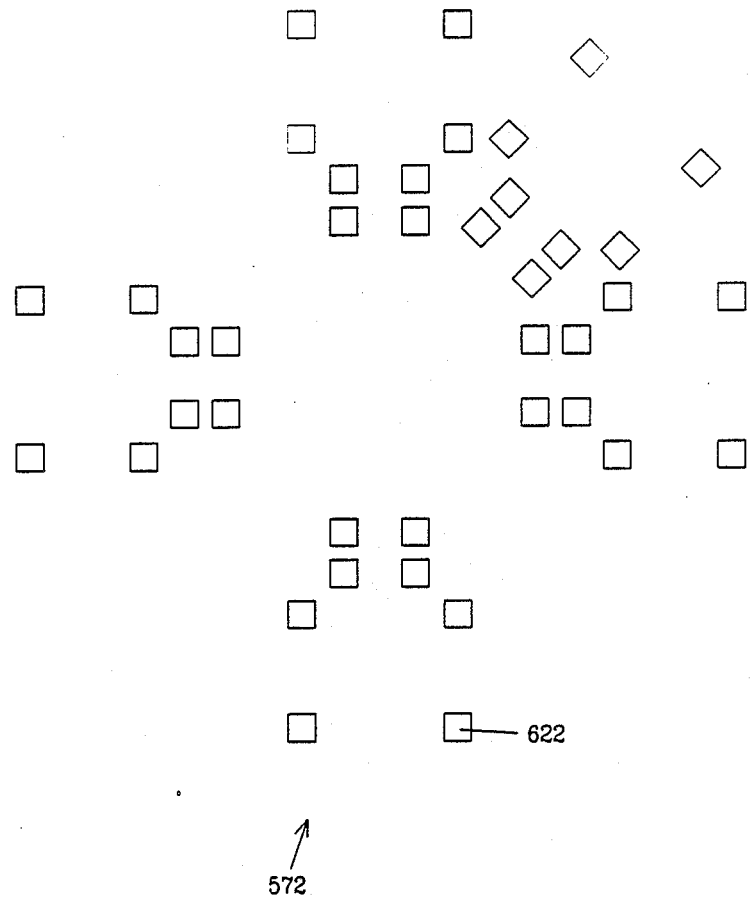

FIG. 80 is a shadow mask pattern to be used for selected pattern geometry aluminum evaporation. The patterned metal is intended provide electrical contact to the resistors.

Figure 18:
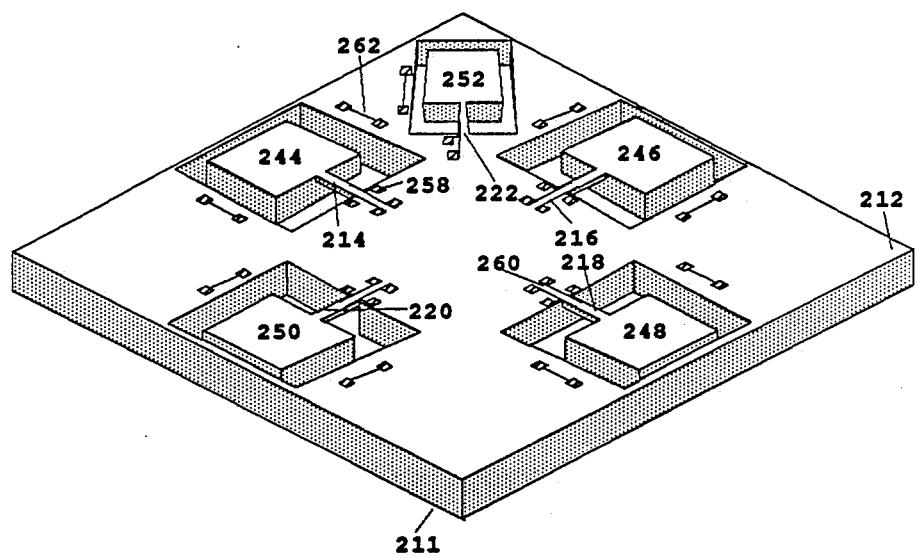
FIG. 18 is an oblique view of the Five Beam Five Aperture force Sensor Embodiment.
Figure 81:
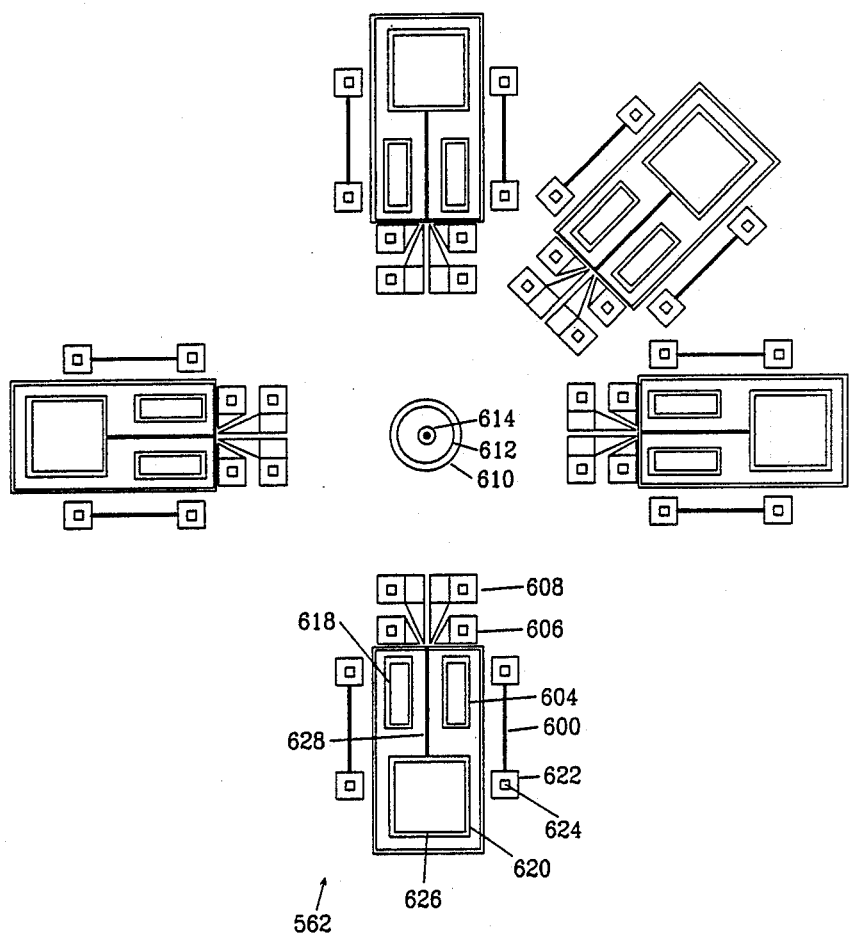

FIG. 81 is the amalgamation of design masks for fabricating the accelerometer of FIG. 18.

Figure 19:
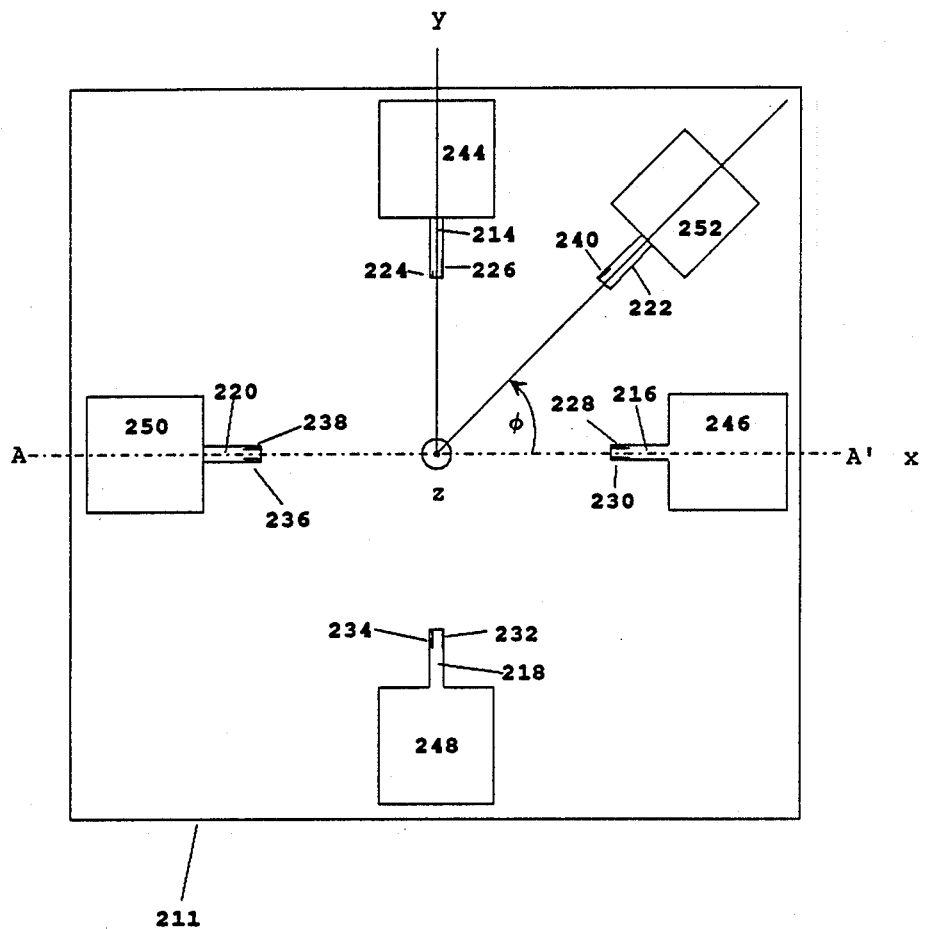
FIG. 19 is a top view of the Five Beam Five Aperture Force Sensor Embodiment.
Figure 82:
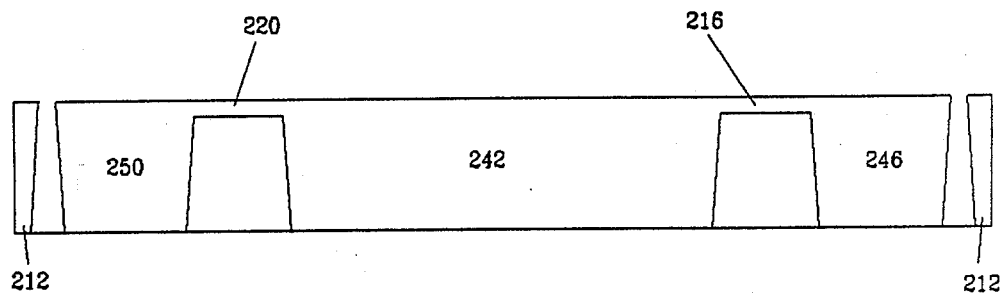

FIG. 82 is a cross sectional view taken along line A-A' in FIG. 19.

Figure 83:
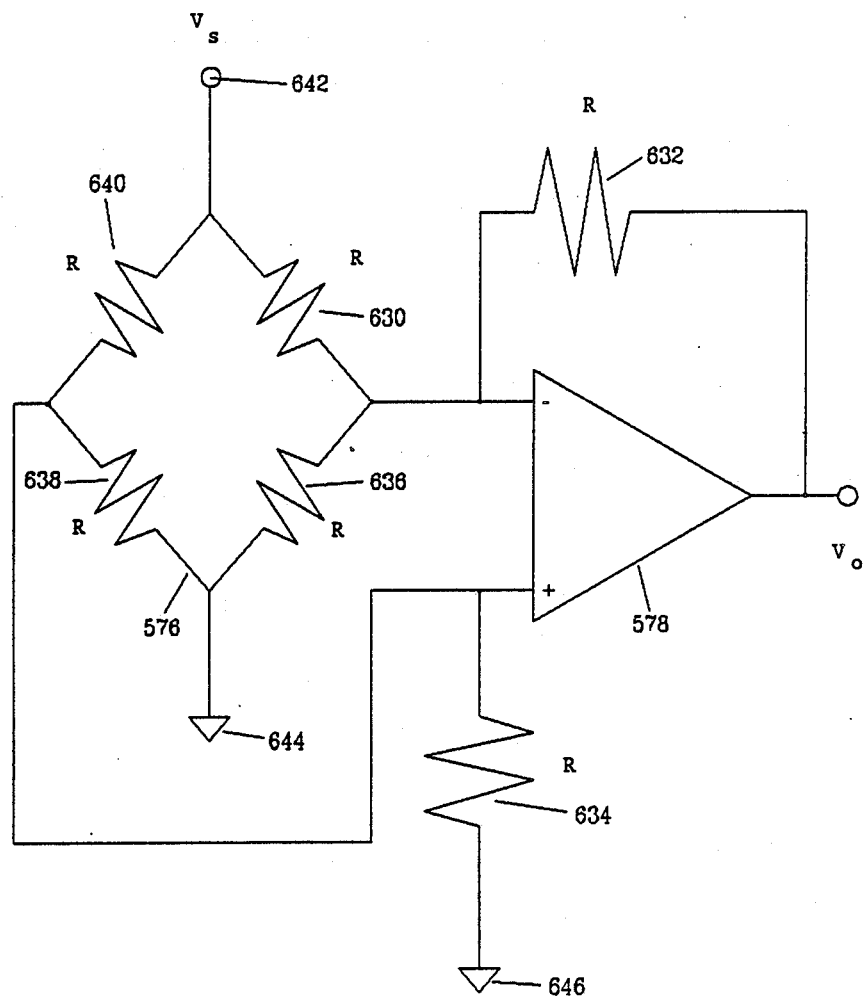
Figure 84:
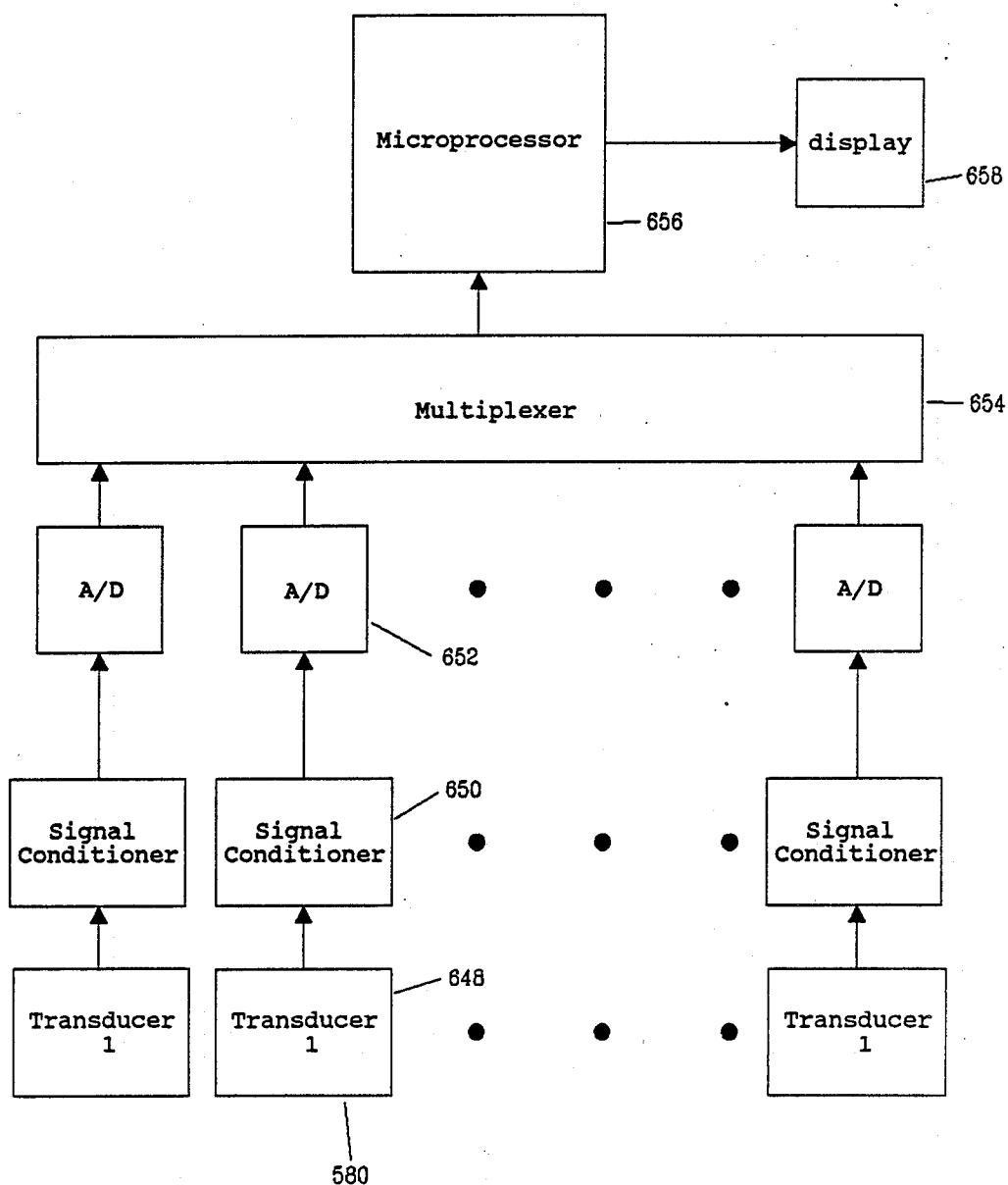

FIG. 83 is a schematic diagram of a Wheatstone bridge with an amplifying circuit, FIG. 84 is a block diagram representing an accelerometer system.

Figures 85, 86:
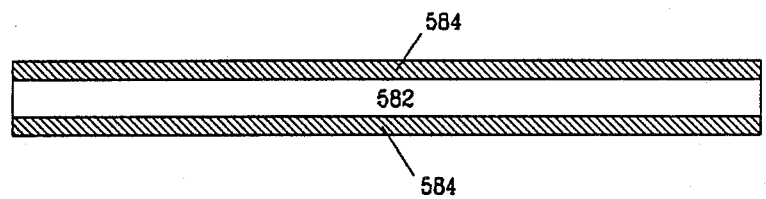

FIG. 85 represents a cross-sectional view of a starting silicon wafer intended for use for fabrication of a Four Beam One Aperture Embodiment. The cross section is along the line A-A' in FIG. 25.

FIG. 86 is a cross-sectional view of the wafer represented in FIG. 85 after an oxidation process has occurred.

Figure 87:
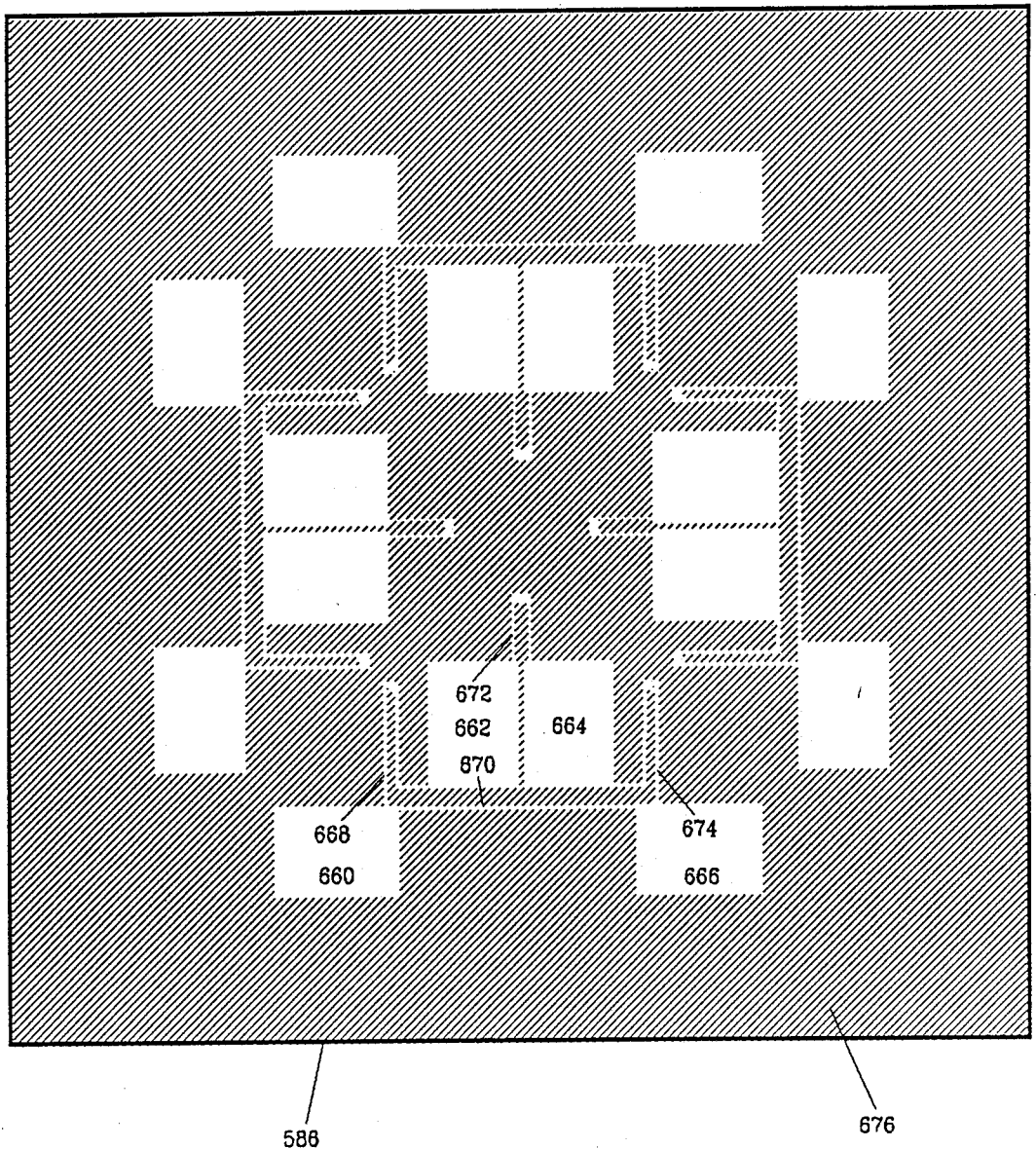

FIG. 87 is a top view of a pattern intend for use for a Front Boron Diffusion Mask.

Figure 88:
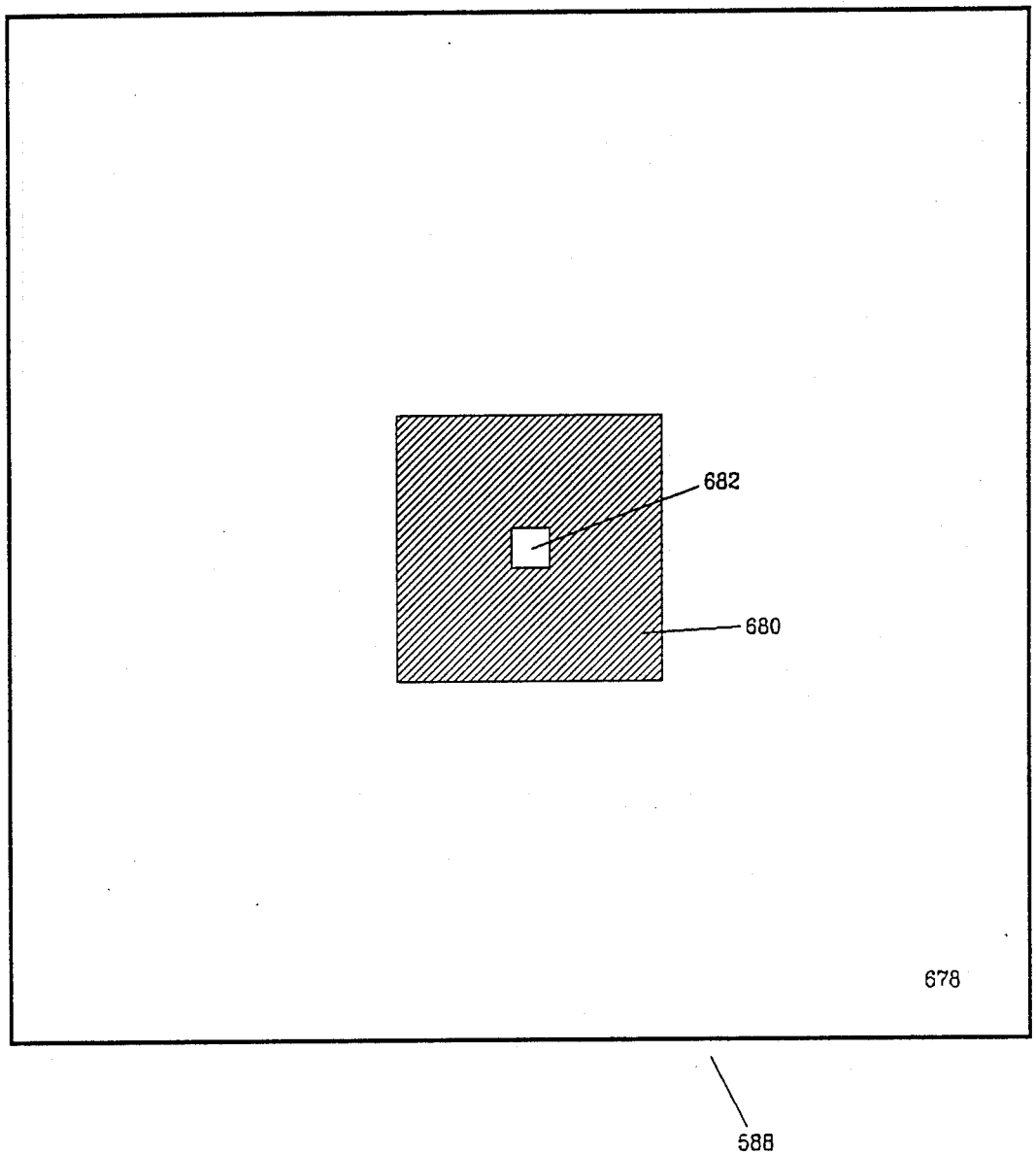

FIG. 88 is a top view of a pattern intended for use for a Back Boron Diffusion Mask.

Figure 89:
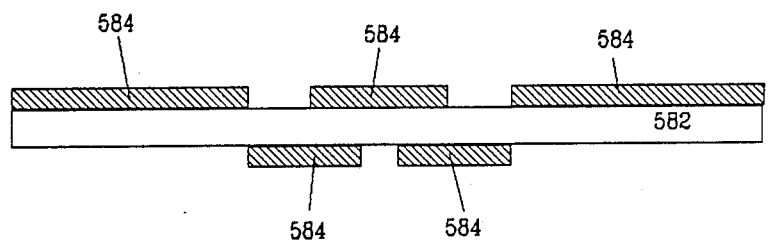

FIG. 89 is a cross-sectional view of the wafer represented in FIG. 86 following an oxide etch process.

Figure 90:
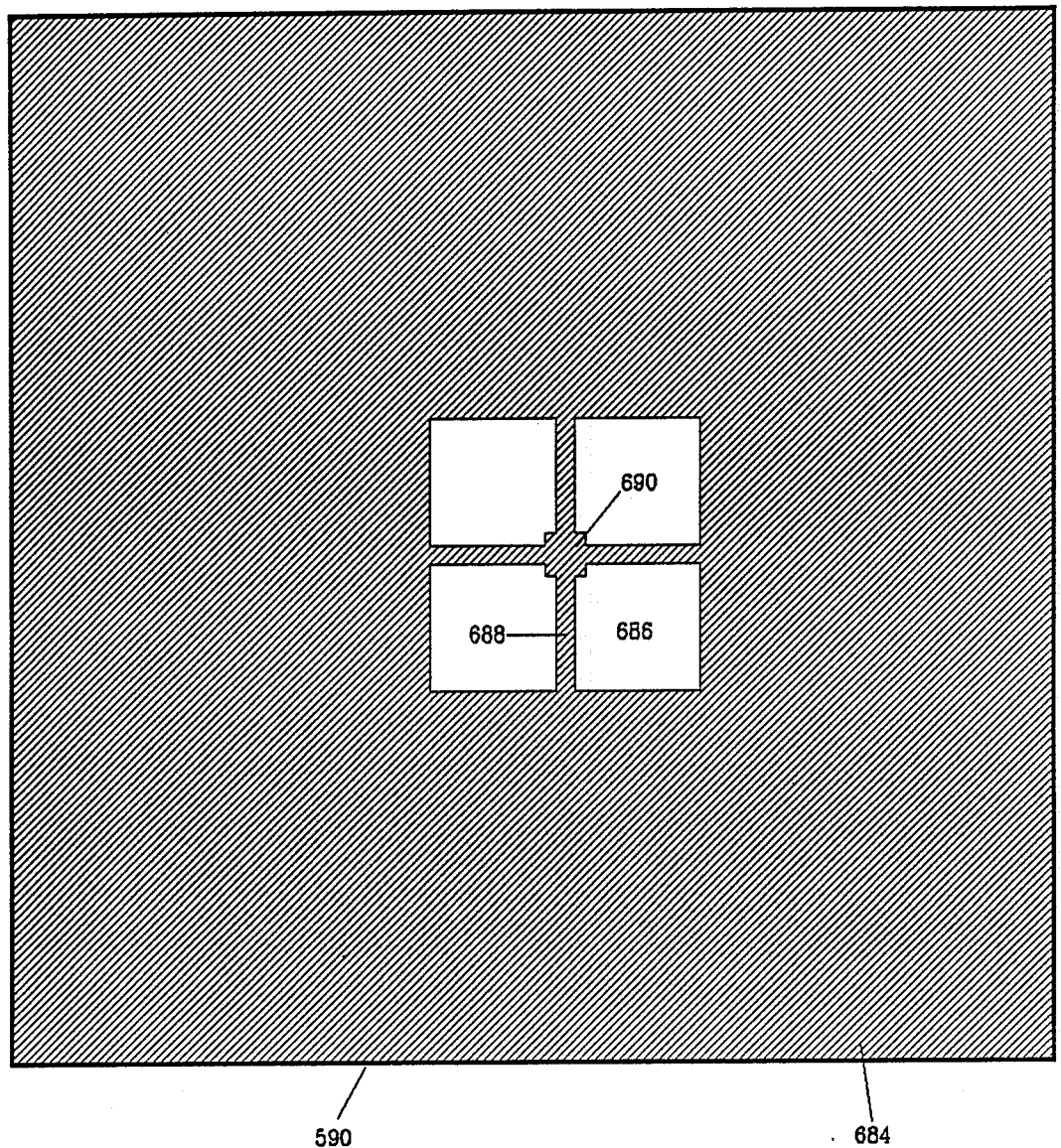

FIG. 90 is a top view of the pattern intended for a Front Etching Pattern Mask.

Figure 91:
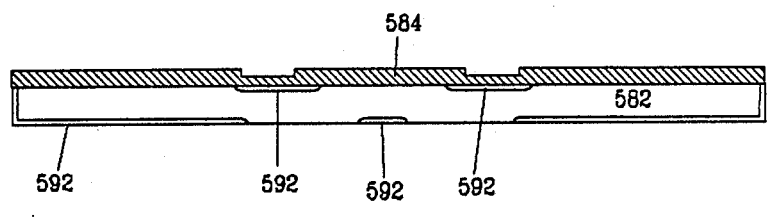

FIG. 91 is a cross-sectional view of the wafer of FIG. 89 following an oxide etch process prior to an initial silicon etch.

Figure 92:
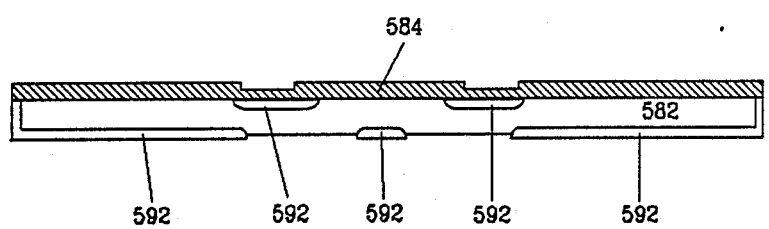

FIG. 92 is a cross-sectional view of the wafer of FIG. 91 following an initial silicon etching process.

Figure 93:
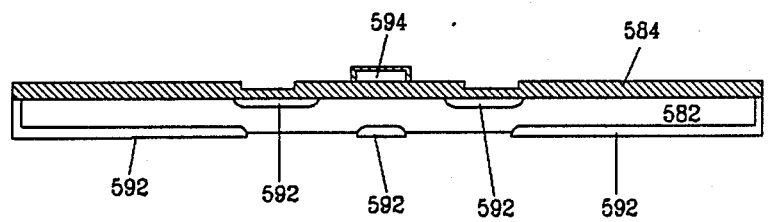

FIG. 93 is a cross-sectional view of the wafer of FIG. 92 following the attachment of a supplemental mass.

Figure 94:
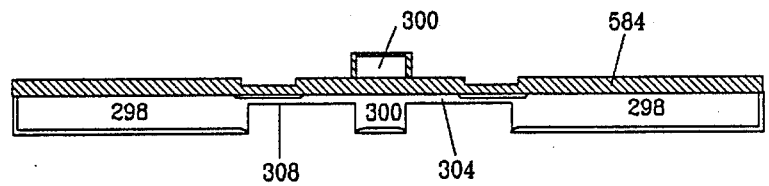

FIG. 94 is a cross-sectional view of the wafer of FIG. 93 following a second silicon etching process.

Figure 95:
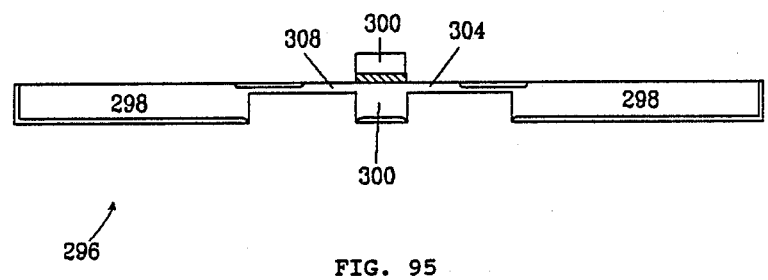

FIG. 95 is a cross-sectional view of the wafer represented in FIG. 94 following an oxide etch process.

Figure 96:
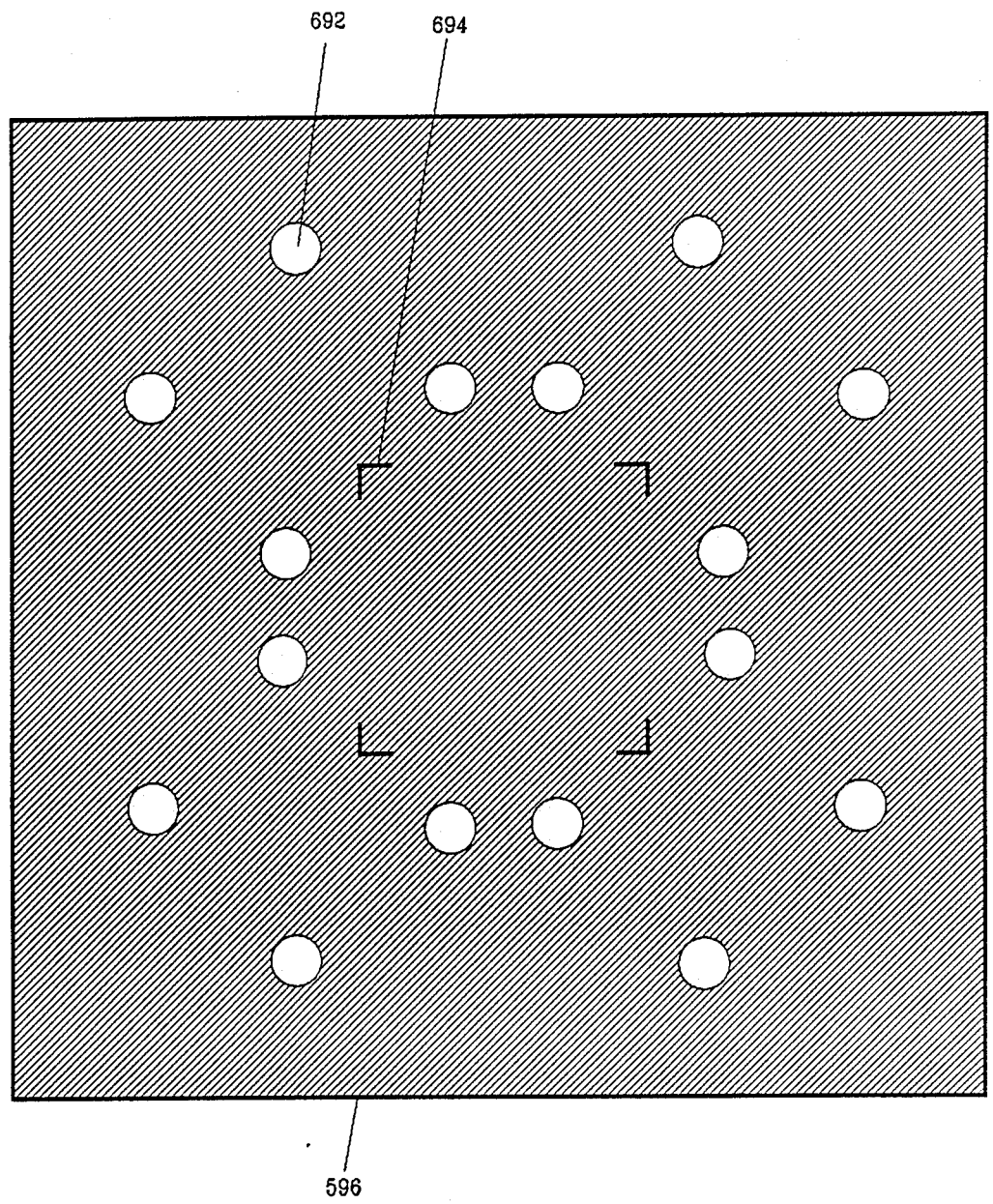

FIG. 96 is a top view of the pattern used for an Aluminum Contact Shadow Mask.

Figure 97:
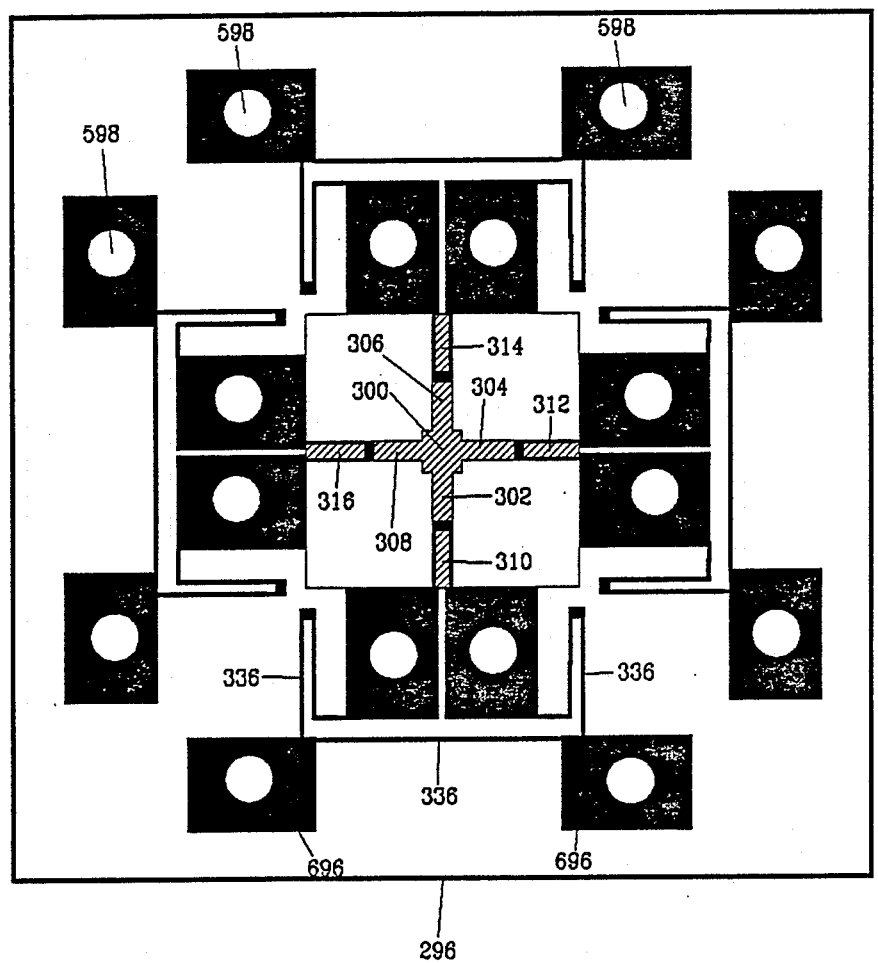

FIG. 97 is a top view of wafer of FIG. 95 following a metallization process.

Figure 98:
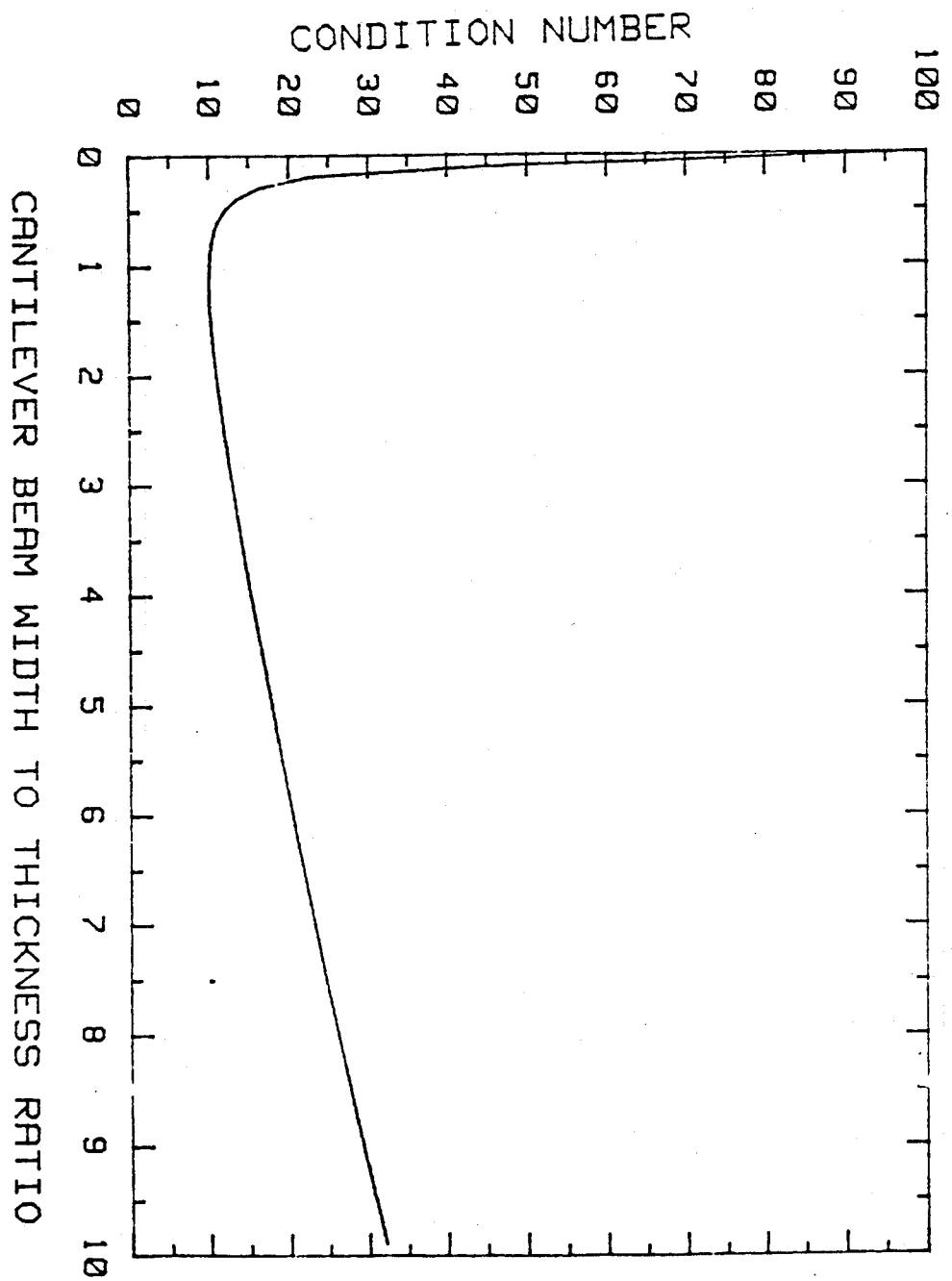

FIG. 98 is a graph of a condition number versus cantilever width to the cantilever beam thickness ratio.

DESCRIPTION OF PREFERRED EMBODIMENTS

1. THREE BEAMS-ONE APERTURE

One preferred embodiment of the present invention is a multibeam linear force sensor which uses capacitive sensing elements. Three components of linear acceleration are resolvable with the device.

Figure 1:
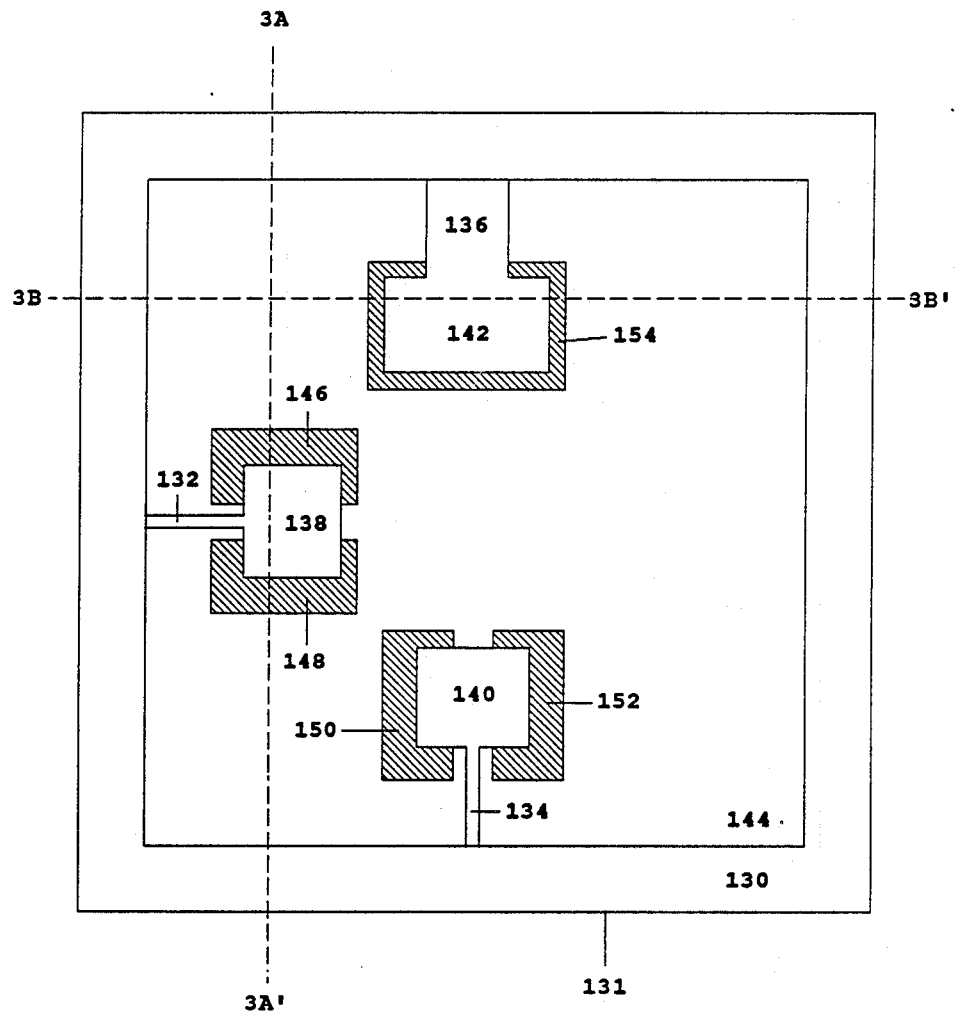
FIG. 1 is a top view of the main body of the Three Beam One Aperture Force Sensor Embodiment.

Referring to FIG. 1, shown is the top view of the main body 130. Cantilever beams 132, 134, and 136 support response elements 138, 140, and 142, respectively, in a cavity 143 etched in the main body 130. The main body 130 is attached to a substrate 144, which contains stationary conducting plates 146, 148, 150, 152, and 154, each of which forms one plate of a capacitor. The substrate material may consist of glass, silicon, or other suitable materials. References for bonding procedures are included in the appendix.

Figure 2:
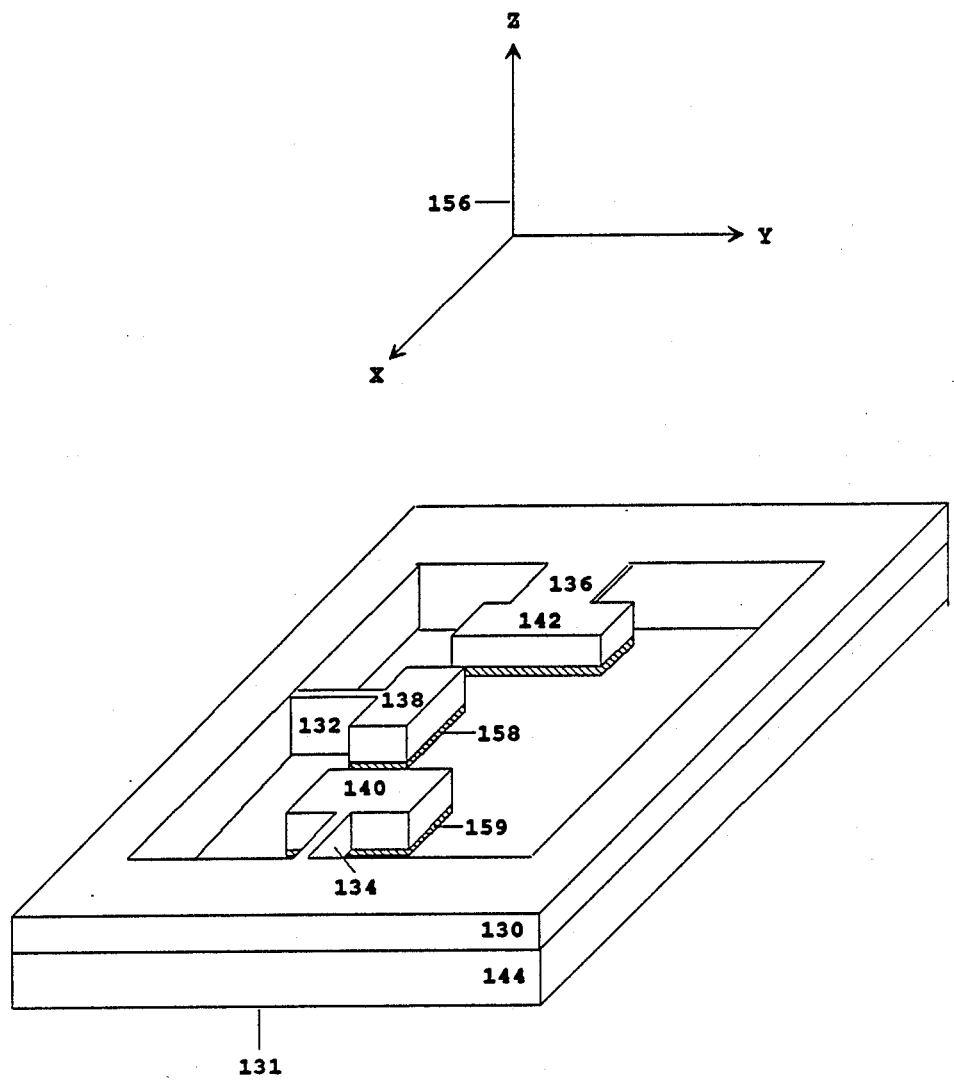
FIG. 2 is an oblique view of the main body of the Three Beam One Aperture Force Sensor Embodiment.
Figure 4:
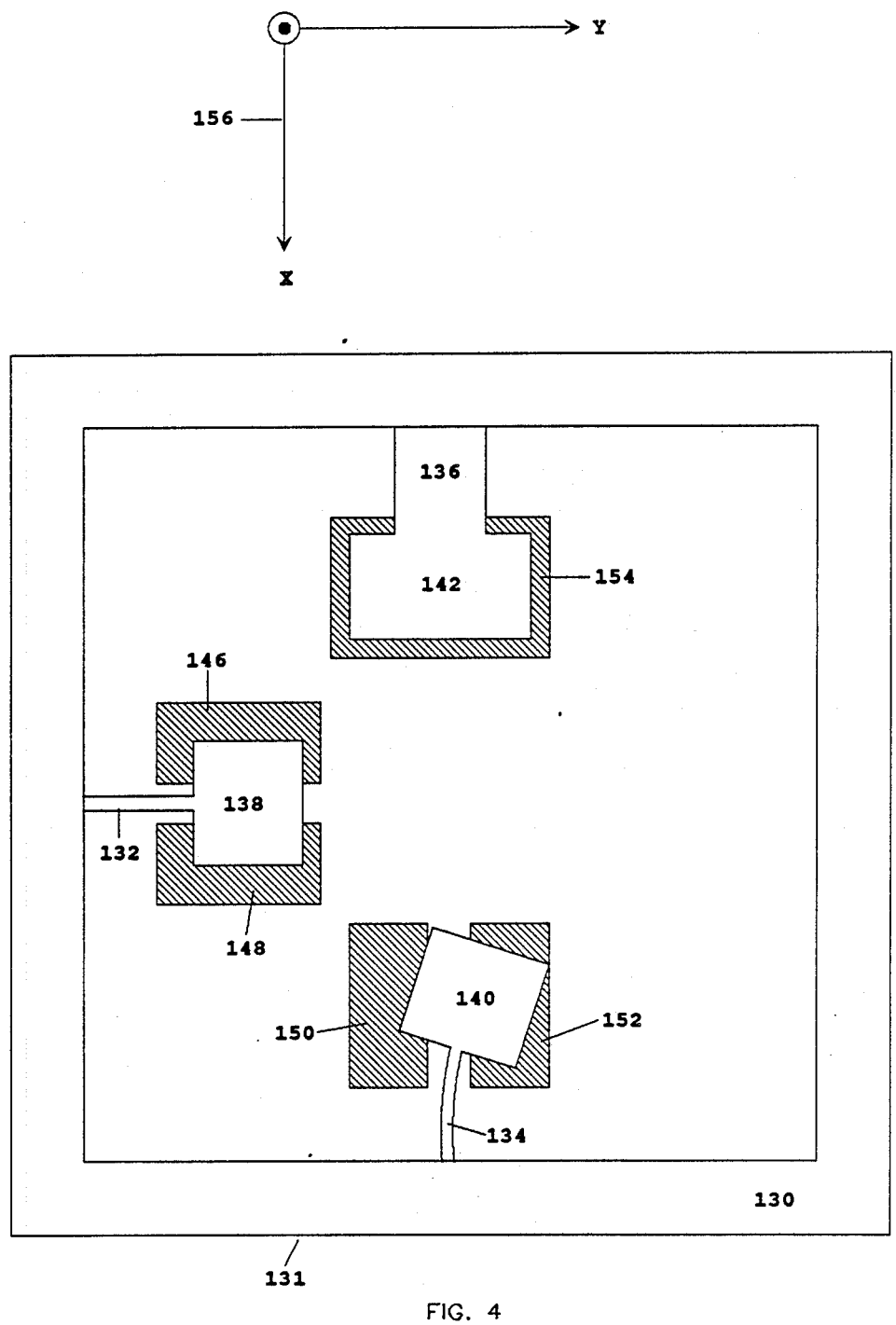
FIG. 4 is a top view of the main body of the Three Beam One Aperture Force Sensor Embodiment with a Y directed force applied. A large displacement of one beam is shown.

Referring to FIG. 2, shown is an oblique view of the main body 130. Cantilever beams 132 and 134 are arranged orthogonal to each other, and are designed with the same thick, narrow cross section allowing easy lateral, i.e., substantially planar, displacement. Cantilever beam 136 is designed to be thin and wide, allowing easy non-planar displacement. Beam 132 can bend due to forces along the X axis, beam 134 can bend due to forces along the Y axis, and beam 136 can bend due to forces along the Z axis of the coordinate system 156. The extreme aspect ratio (<1 or >1) of the cantilever cross section dimensions (the aspect ratio is defined as the beam width to thickness) results in negligibly small displacements in directions other than those desired. Where the two dimensions of a rectangular cross section of a beam are substantially different, the beam is relatively easily displaced in the direction normal to the wide dimension and is hard to displace, i.e., displays essentially negligible displacement in the other two directions due to applied forces. FIG. 4 shows the Three Beam One Aperture embodiment with beam 134 substantially bent due to an applied force with the other beams exhibiting negligible displacement in response to the same force. (The displacement of beam 134 in this example is severe and would introduce non-linear features, which can be compensated for with design of capacitor plate geometry or with suitable electronics, or with computer assisted treatment of the sensor element measurement data).

Figure 3A:
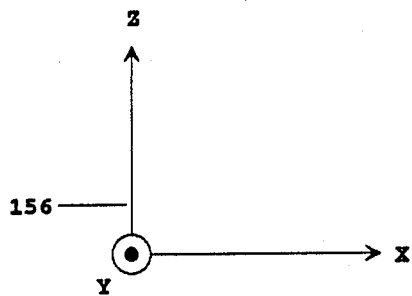
FIG. 3a is a cross sectional view of the main body of the Three Beam One Aperture Force Sensor Embodiment taken at A-A' in FIG. 1 and shows the capacitor plates for a dual Dual Mode Capacitor Sensor Element element.

Referring to FIG. 3a, shown is a cross sectional view of the main body 130 taken at A-A' of FIG. 1. Response element conducting surface 158 forms one plate of a "dual mode" pair of capacitor sensing elements. The dual mode capacitor pair provides a quantitative measure of both direction and magnitude of displacement of a response element in two directions. The device can be used to measure either of the directions in which the response element is displaced or both of these displacements simultaneously. While the multicapacitor arrangement shown in FIG. 3a shows only two capacitors, multiple capacitor arrangements of more than two capacitors functioning on similar principles can be devised.

Figure 3A:
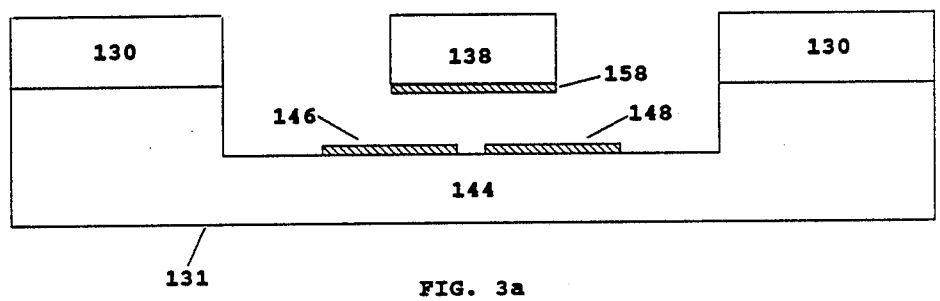
Figure 3B:
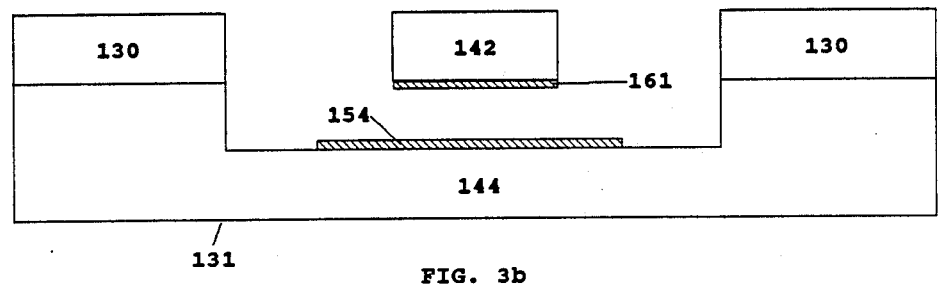
FIG. 3b is a cross sectional view of the main body of the Three Beam One Aperture Force Sensor Embodiment taken at B-B' of FIG. 1 and shows the capacitor plates single mode capacitor sensing element.

FIG. 3b is a cross-section taken at BB' in FIG. 1 and shows a single mode capacitor. Capacitor plate 161 is located on the bottom of response element 142. Capacitor plate 154 is located below capacitor plate 161 and is substantially larger than capacitor plate 154 in order to be substantially insensitive to motion along the x direction. Displacement of response element 142 in the z direction results in a capacitance change which is directly dependent upon the z directed force magnitude.

Figure 5:
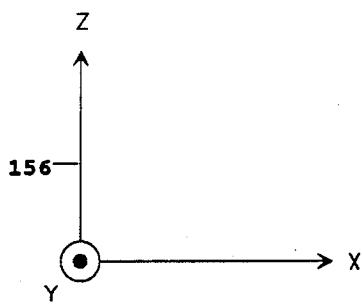
FIG. 5 is a cross sectional view of the main body of the Three Beam One Aperture Force Sensor Embodiment taken at A-A' in a device identical to of FIG. 1 except where an additional substrate is incorporated and two dual mode capacitor sensor elements are incorporated and coupled to the response element as shown.
Figure 5:
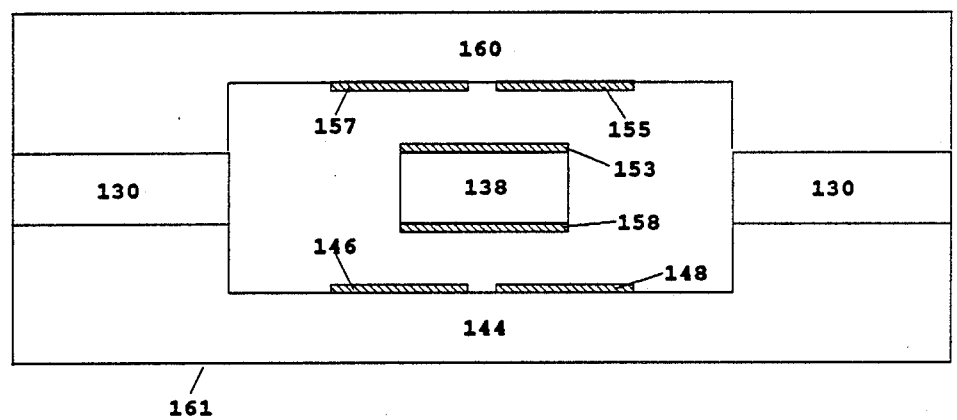

FIG. 5 is a cross-sectional view of response element 138 showing two dual capacitor sensor elements made up of capacitor plates: The first dual capacitor sensor element is made up of plates 146 and 158, and 148 and 158; the second dual capacitor mode sensing element consisting of plates 153 and 155, and 153 and 157. Both dual mode capacitive sensors measure y and z response element displacement. The advantage of using two dual mode capacitor sensors is to provide a reduction in measurement error.

The addition of a second substrate 160 can also be used in this and in other embodiments to form a casing (with parts 130 and 144) for limiting response element displacement. The casing can also provide containment of a fluid for damping purposes. Similar casings are also possible.

A further attractive feature of the capacitive sensing elements described is that they can be used simultaneously with piezoresistive sensing elements on the same beam-response element combination. This may have advantages in reducing measurement error in providing independent sensing elements which permit an increased number of simultaneous and separable force component measurements (Appendices D and E), and in building in more than one dynamic force measurement range in the same beam-response element combination.

Figure 6:
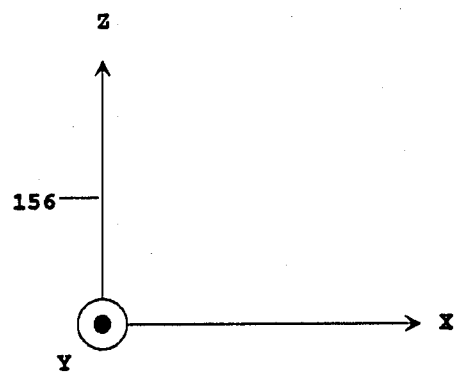
FIG. 6 is a cross sectional view of the main body of the Three Beam One Aperture Force Sensor Embodiment taken at AA' of FIG. 1 where a supplemental mass is incorporated on the response element.
Figure 6:
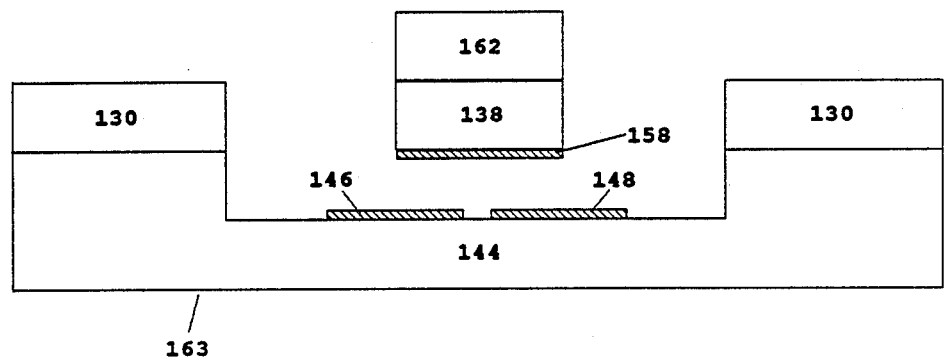

Referring to FIG. 6, shown is a cross sectional view of the main body 130 taken at A-A' of FIG. 1. A supplemental mass 162 may be attached to the response element to shift the center of mass to the plane of the cantilever beam 136 of FIG. 1, in order to minimize unwanted torque features.

Figure 7:
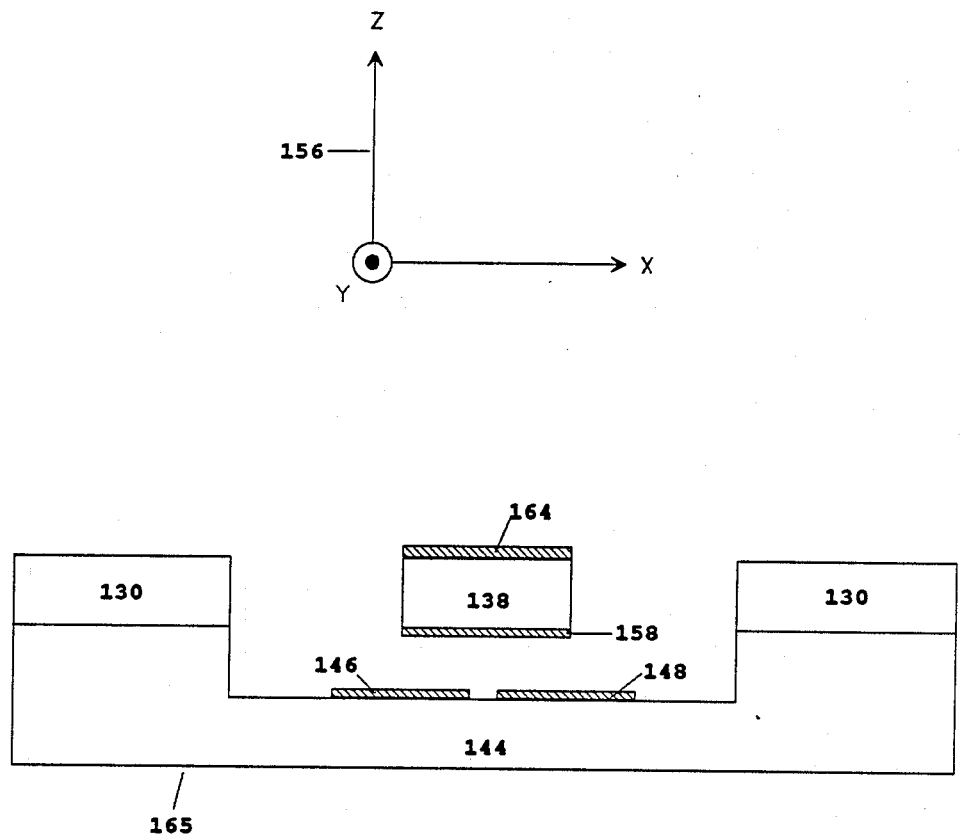
FIG. 7 is a cross sectional view of the main body of the Three Beam One Aperture Force Sensor Embodiment taken at A-A' of FIG. 1 where material responsive to an electric or magnetic field is incorporated on the response element.

Referring to FIG. 7, shown is a cross sectional view of the main body 130 taken at A-A' of FIG. 1. Magnetic or electric field responsive material 164 is incorporated on the response element. For example, the electric field responsive material may be a high dielectric constant polymer or a charged or uncharged plate; the magnetic field responsive material may be magnetizable, such as iron, or a permanently magnetized material such as permalloy.

BASIC OPERATION OF THE EMBODIMENT

Each cantilever beam of this embodiment is designed to bend in response to a single cartesian component of linear force, such as originating from acceleration, and to be relatively non-displaceable by forces applied in the two other cartesian directions. When this force sensing device is used as an accelerometer, the response elements are masses. Beam 132 is narrow and thick, and is aligned in the Y direction of the coordinate system 156. Therefore, beam 132 can deflect in response to an X-directed force on response element 138. But beam 132 experiences negligible displacement due to Y and Z directed forces acting on the response element 138. When an X directed force is applied, beam 132 deflects laterally (in-plane), and the overlapping area of the associated conducting surfaces is altered. The capacitance between these conductors is changed, and the capacitance can be measured to determine the X directed force component.

When dual mode capacitance sensing is utilized as indicated in FIG. 3, or when an off axis single mode sensing element is used (Appendix A), displacement of the response element 138 results in a change in capacitance between conducting surfaces 146 and 158. The changes in capacitance of the two capacitors will be of the opposite sign if the applied X-directed force is reversed. Thus, directions of the directed forces are distinguishable by the sign of the capacitance changes. The magnitude of the directed force is determined from the magnitude of the capacitance change as described in Appendix A.

Beam 134 has the same geometrical structure as beam 132, but is aligned along the X axis. Forces applied to the response element 140 directed along the Y axis are determined by measuring the force induced capacitance change of the dual capacitor sensing element coupled to response element 140 (capacitor plates 150, 152 and 141). Z-directed force components cause negligible bending of beam 134 due to the large beam dimension of beam 134 in the Z-direction. X-directed forces cause negligible displacement of the response element in the X-direction. Thus, for beam 134 and response element 140, only a Y-directed force results in significant displacement of beam 134 and response element 140. Thus, displacement of beam 134 and response element means 140 measure essentially only the magnitude and direction of Y-directed forces. The capacitance changes in the two capacitors of the dual capacitor pair provide force magnitude and direction in the same manner as described above and in Appendix A.

Beam 136 is wide and thin, and therefore deflects out-of-plane in response to forces applied to the response element 142. Thus, a Z-directed force applied to response element 142 can be measured by monitoring the capacitance associated with response element 142 (capacitor plate 143 and 154). The magnitude of the single mode capacitance change provides a measurement of the magnitude of the Z-directed force component. The sign of the capacitance change (increase or decrease) provides the direction of the Z-directed force: an increase in capacitance corresponds to a +Z directed force, a decrease in the capacitance corresponds to a −Z directed force. Alternatively, a piezoresistor placed at the surface of beam 136 and equidistance from the wide side edges, i.e., along the surface center axis, of the beam can be used to measure the −Z component of force in both magnitude and direction. If the response element 142 is displaced in the +Z direction, the change in the resistance of the piezoresistor is equal in magnitude and opposite in sign to the resistance change caused by a z-directed force of the same magnitude but directed in the −Z direction. The sign of the piezoresistance change provides a measure of force direction, and the magnitude of the piezoresistance or change provides a measurement of force magnitude for forces directed along the Z-direction.

By measuring the capacitances of the device 131, cartesian components of the applied forces can be determined. Each beam is essentially responsive to only one force component; thus, the measurement errors associated with influence of the other two cartesian component force components are minimized. Device sensitivity can be designed into the device by selection of the length, height and width of the beam and design of the response element, e.g., mass for a linear accelerometer type of force sensor.(See discussion on errors and on the condition number in Appendix E) The off-axis sensitivity of each beam is a function of beam geometries and response element used, and can be made small by design.

The forces affecting the response elements can be of inertial origin, i.e., arise due to acceleration, in which case the response element is a mass. The forces can be of field origin such as arising from electric, magnetic, or gravitational fields. In this latter case, the response elements would incorporate electric or magnetic response elements. For a gravitational field, the response elements are masses.

The beams of this present embodiment of the invention are designed to point inward for minimization of the effective undesirable moment arm forces or rotational origins. The three beam one aperture embodiment is intended to be used to measure linear forces such as linear acceleration and is not designed to be insensitive to forces of angular character such as centrifugal force or rotational acceleration forces.

Capacitance can be measured using various circuits and electronics such as oscillators or charge amplifiers. Such circuitry may be incorporated on the main body 130 with standard integrated circuit technology when silicon is used to fabricate device 131.

It is pointed out that the material of the device need not be a semiconductor. For example, quartz, glass or a ceramic material can be used. Here, capacitive sensing is used and the measurements are made in the same manner as described above. The quartz can be etched to shape using photolithographic techniques and etching techniques. Piezoresistors can be deposited on the beams, e.g., using CVD silicon technology, and for suitable orientation, the piezoelectric properties of quartz can also be incorporated. In the case of ceramics, ceramic structures can be formed using solgel technology and suitable forms. These forms can be micromachined out of silicon or other materials. Capacitor plates can be constructed using metal deposition techniques and photolithographic techniques. Glass substrates can be machined and structured in a manner similar to that of quartz. In certain instances, quartz, glass, or ceramic material may be the preferred material because of elasticity, resistance to chemicals, magnetic properties, insulating properties, etc.

The orientation of the beams need not be orthogonal to one another for the device to resolve the linear force components. The ribbon configuration can still be used. However, the preferred embodiment is the substantially orthogonal set of ribbon beams because of the essential elimination of influences of more than one component of force on each beam. This latter feature provides convenient determination of individual orthogonal components of the applied force and can reduce measurement error associated with the force as discussed in Appendix E.

For capacitive sensing, there may be one or more capacitors associated with each response element or beam (the preferred location for the capacitor plate (s) is on the response element but capacitor plate(s) can also be located on the beam). Special shapes of the conducting pads may be used for desirable capacitance features such as a particular power dependance of capacitance change on applied force or for non-linear compensation or for directionality information. For example, if large beam displacements occur for beams 132 and 134, the shape of the capacitor plates 150, 152, 159 (FIG. 4) can be curved so that the bending of the beam still provides a linear relationship between displacement and capacitance change. Similarly, non-linear bending effects of the beam can be compensated for by using a suitable capacitor plate geometry (first order effects should be linear, second order effects should be quadratic, etc.). That is, the capacitor plate geometry can provide an inverse transformation of non-linear device behavior to give an overall linear device output response to force.

For transverse motion of the beams, e.g., for deflection of response element 140 due to a Y-directed force component, the sensitivity of the dual mode capacitor sensing element can be enhanced by making plates 158, 146 and 148 into striped geometries as indicated in Appendix A.

For the dual capacitor striped geometry, the alignment of the stripes on the response element conducting plate 468 should align with the stripes on the two substrate conducting plates 464 and 466 in a manner to cause one of the two capacitances to increase and the other to decrease when the response element 468 undergoes a lateral displacement, i.e., +or -Y-direction. For the single mode capacitive sensing element used with beam 132 of the three beam three aperture embodiment of FIG. 1, a single capacitor with both plates constructed of a striped geometry would provide both force magnitude and force direction . The density of stripes directly affects the sensor element's sensitivity and dynamic measurement range. The stripes are designed such that the separation between the stripes is of a magnitude that is large compared to the separation between the two plates.

Additional stationary conducting plates may be incorporated on a second substrate 160 acting as a cover to sandwich the main body 130 between two substrates 144 and 160.

The cantilever beams also need not be fabricated in a common cavity Each may be fabricated within a separate cavity or all may use a common cavity.

The addition of electrically or magnetically responsive materials 164 to the response element allows the device to be utilized in sensing applications other than acceleration, such as for proximity detection, position extrapolation, fusing, and others. Electric and magnetic fields can be sensed. Additional beams can be incorporated into the structure 13 such that one set of beams can be used to measure force arising from one source, e.g., a magnetic field, while another set of beams measures a force arising from gravity.

2. Three Beams Three Apertures

Figure 8:
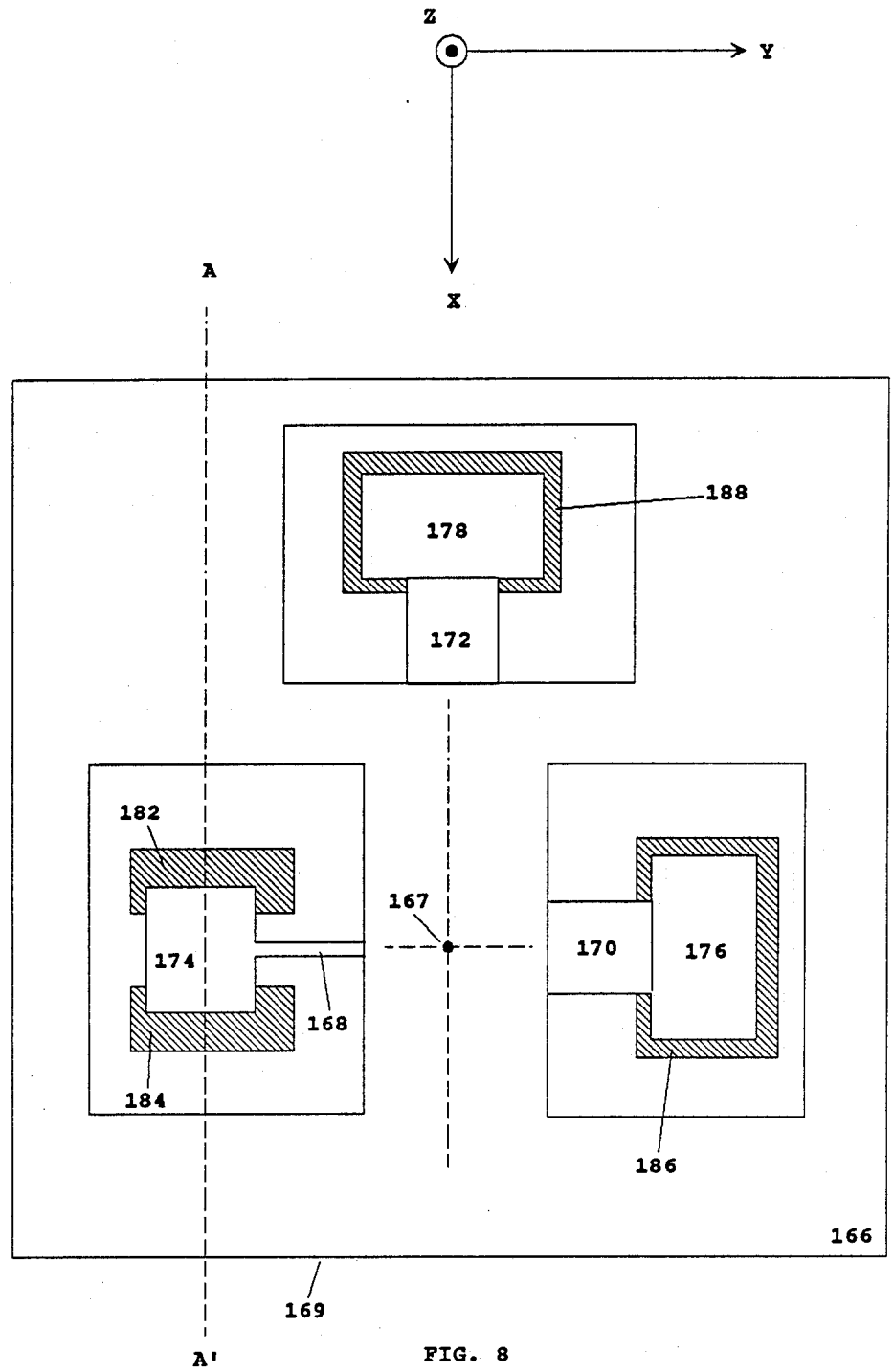
FIG. 8 is a top view of the Three Beam Three Aperture Force Sensor Embodiment.

Referring to FIG. 8, shown is another preferred embodiment of the present invention. A multibeam force sensor 165 is designed for resolution of the components of angular acceleration when the angular acceleration is about a center of rotation 167 and where only angular acceleration (radians/sec$^2$) is present. Centrifugal force arising from angular velocity about the point of rotation 167 provides only radially directed forces and therefore causes only tensile strain in beams 168, 170 and 172.

Figure 9:
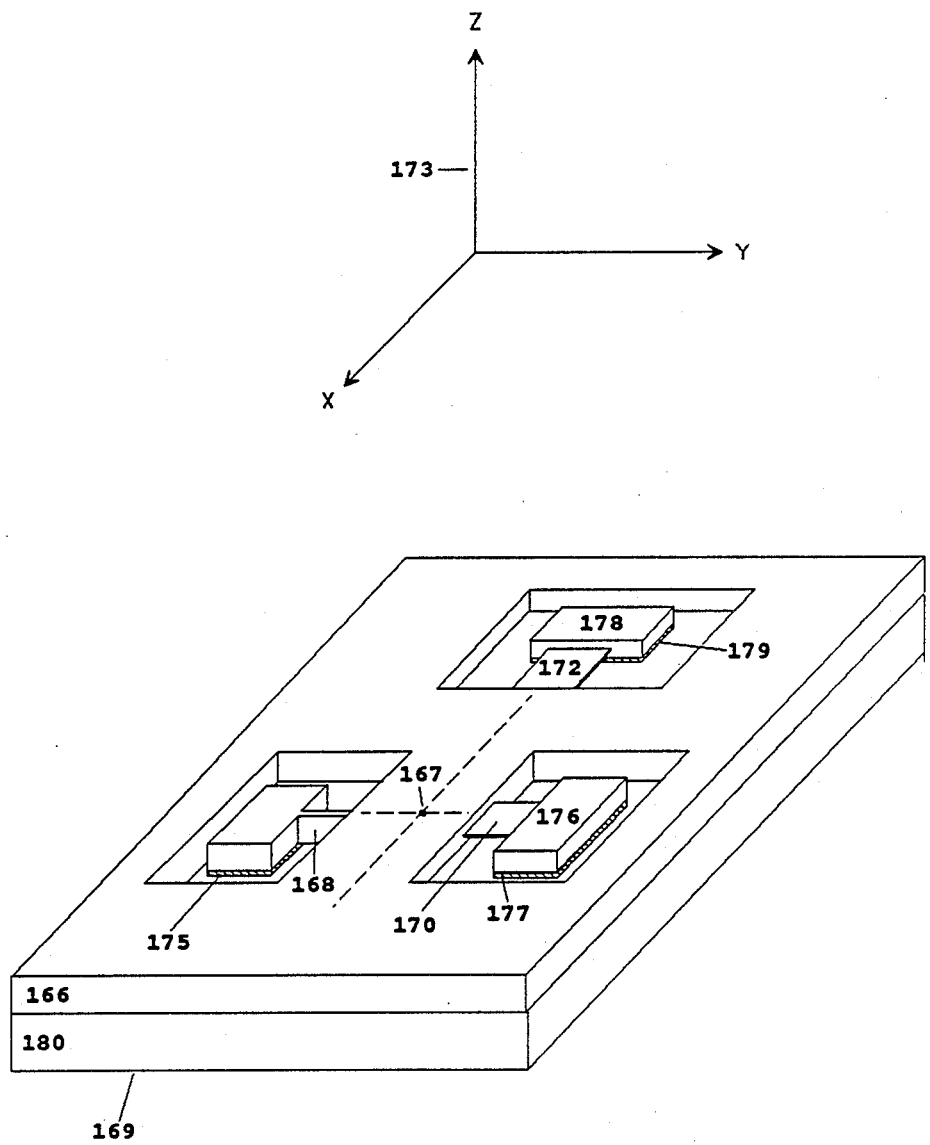
FIG. 9 is an oblique view of the main body of the Three Beam Three Aperture Force Sensor Embodiment.
Figure 10:
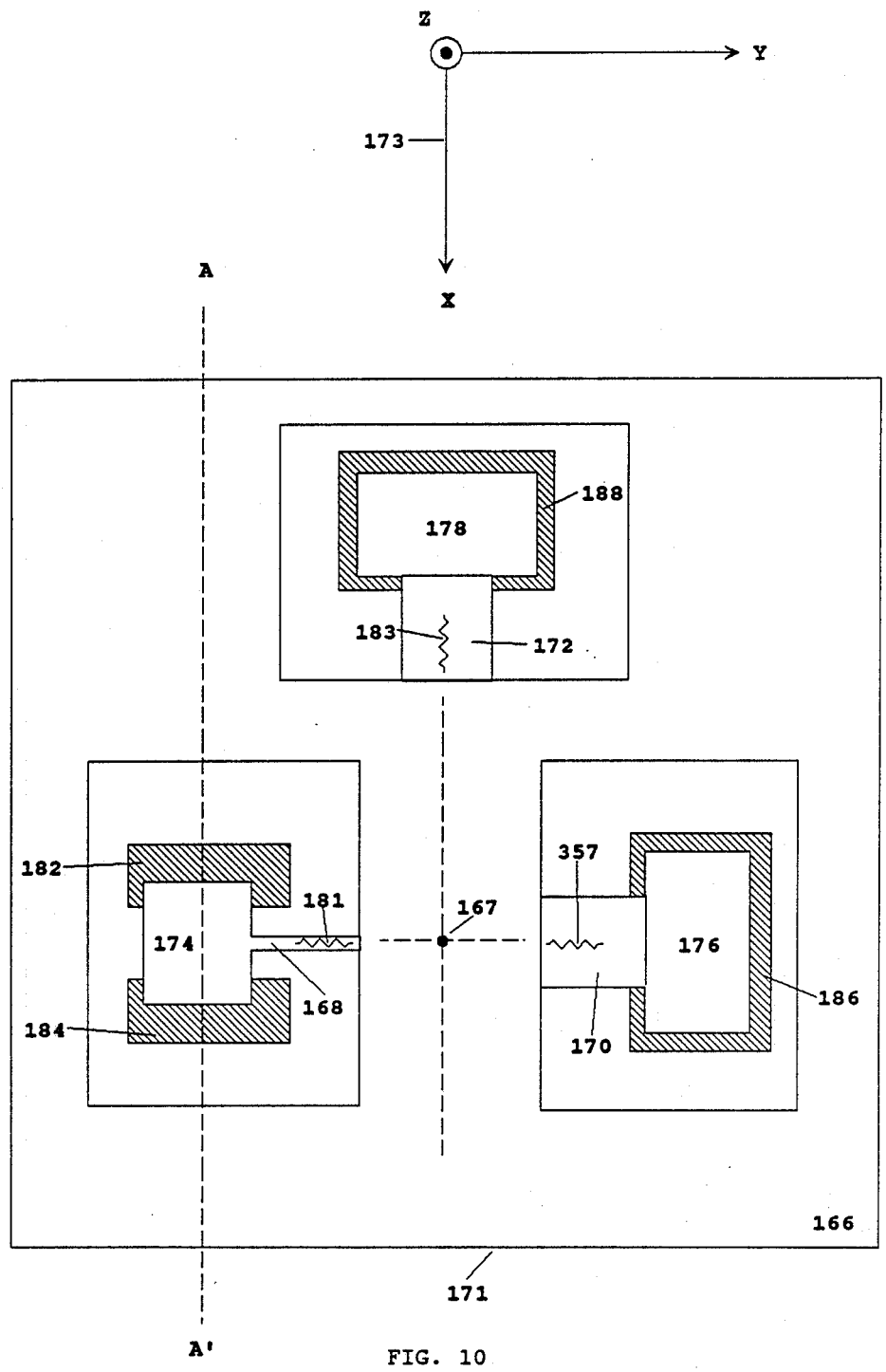
FIG. 10 is a top view of the main body of the Three Beam Three Aperture Force Sensor Embodiment with piezoresistors incorporated on the beams (represented by resistor symbols).

Embodiment 169 can be modified to also measure centrifugal force in addition to inertial force arising from angular acceleration by adding additional sensing elements to each of the beams (embodiment 171). In particular, adding a piezoresistor 181, 357 and 183 to each of the beams 168, 170 and 172 provides for the measurement of radially directed forces such as centrifugal forces arising from angular velocity effects. In this case the piezoresistors should have the symmetry of the beam. This latter design feature can be accomplished by placing piezoresistor 181, 357 and 183 at the center of each beam, e.g., a diffused resistor isolated by a p-n junction from the rest of the beam, or by using the beam itself as the piezoresistor. Here, an oxide coating can be grown on the silicon and a metal strip connected to a contact on the silicon response element mass. In this way the device can measure either only angular acceleration, i.e., the rate of change of angular velocity with respect to time, or, if only the piezoresistors are monitored, measure only centrifugal force, or, if both sets of sensor elements (capacitor and piezoresistive) are measured, the device can be used to measure both angular acceleration and centrifugal force. Since centrifugal force is dependent upon the angular velocity squared, measurement of the force induced change in the piezoresistors results in a measure of angular velocity. Therefore the device can also be used to measure angular velocity, e.g., such as the revolutions per minute of an electric motor. When the device is used to measure forces due to angular motion, the center of rotation is maintained at the center for rotation of the device 167. The device can respond to other forces such as those arising from linear acceleration and can measure such forces. However, the embodiment 171 represented in FIG. 10 is able to measure at most 6 independent force components since there are only six independent sensor elements. An attractive feature of the angular accelerometer 161 represented in FIG. 9 is that it measures the three orthogonal components of angular acceleration independently of one another, each sensor element is sensitive to only one angular acceleration component and each sensor element is insensitive to centrifugal force. This provides a reduced measurement error as discussed in Appendix E relating to the condition of sensitivity matrix. Further, when the embodiment 171 represented in FIG. 10 is used (angular acceleration and angular velocity, i.e., centrifugal force, measurement), the three angular acceleration measurements are made independently of one another and also separately from the centrifugal force measurements. Further, for centrifugal force measurements, embodiment 171 provides an independent measurement of centrifugal force arising from rotation about the Y-axis. The centrifugal force components due to rotation about the X-axis and Z-axis are determined by solving for the inverse of the sensitivity matrix S using the procedure describe in Appendix D (except that the S matrix has here a different form that in the Appendix D example). The ability of the embodiment 171 to provide a high degree of separation of measurement of the total number of force components (six in this case, i.e., three from angular acceleration and three from angular velocity) should reduce measurement errors associated with the individual force components when the force components are resolved from the sensor element measurements (see Appendices D and E). Here the aspect ratio (width/length) is <1 or >1 in order to constrain physical displacement of the beam to essentially only the direction normal to the wide dimension of the beam at the point of attachment to the main body. This feature provides advantages with respect to measurement error as referred to above and is discussed in Appendix E. It is generally desirable to measure only one component per beam when practical. Thus, device 169 is designed to be used for the measurement of angularly rotating forces, e.g., to measure angular acceleration about the X, Y, and Z axes 173. And the device is designed to measure independent components of angular velocity, and independently angular acceleration.

Here the dual capacitor element is referred to as a single sensing element even though it senses displacement in two dimensions. Also, the four plate capacitor element which provides sensing using three capacitors is referred to in this discussion as one sensing element since it is of a particular type, namely capacitive, and for convenience of discussion, even though the four capacitor structure measures displacement in two cartesian dimensions. For beams which are constructed of sufficiently elastic material, e.g., from a suitable polymer, a capacitor array (i.e., sensing element) which provides measurement of displacement in three cartesian coordinates is easily constructed from a five capacitor array following the principles of the dual capacitor sensing element described herein. And, any of these capacitor sensing structures are termed in this context as a single sensing element, in particular, a capacitive sensing element.

Embodiment 169 in represented in FIGS. 8 and 9, and uses a single mode capacitor sensing elements, a dual mode capacitor sensing element and a piezoresistive sensing elements.

FIG. 8 shows a top view of the main body 166 for the device 169, with cantilever beams 168, 170, and 172 supporting response elements 174, 176, and 178, respectively. Each cantilever beam/response element is located within a separate etched cavity in the main body 166. A substrate 180 is attached to the main body and contains stationary capacitor conducting plates 182, 184, 186, and 188, each of which forms one plate of a capacitor. The respective complementary conductive capacitor plates which form the respective capacitors are conductive plates 175, 177, and 179, respectively, and are attached to the response elements 174, 176, and 178 in this example.

FIG. 9 shows an oblique view of the main body 166. Cantilever beams 170 and 172 are arranged to be projecting substantially orthogonal to each other at the junction to the main body, and are designed with the same wide, thin cross section allowing easy non-planar displacement. Cantilever beam 168 is designed to be narrow and thick, allowing easy lateral displacement and is arranged to project substantially orthogonal to the projection direction of beam 172. Beam 170 can be deflected by rotational acceleration about the X axis, beam 172 be deflected by rotational acceleration about the Y axis, and beam 170 can deflected by rotational acceleration about the Z axis of the coordinate system 175. Each beam deflects in response to substantially only one orthogonal component of rotational acceleration, i.e., to rotational acceleration about the X, Y, or Z axes. The beam deflections are essentially insensitive to centrifugal forces for rotation about the rotation center location. For embodiment 165, when using the capacitor sensing elements, beam deflections correspond to response element deflections which alter the capacitances of said capacitor sensing elements.

The cantilevers need not be fabricated in separate cavities, and may be fabricated in a common cavity as long as a moment arm exists for rotational force components. Separate cavities have the advantage of providing convenient casings or portions of casings in which obstructions can be located to limit excessive beam and response element displacements. Said portion of a casing can be used together with additional structure located on the substrate to prevent device damage arising from excessive force and excessive displacement.

Device 171 in FIG. 10 is an embodiment which can measure angular acceleration forces and centrifugal forces simultaneously, as described above. The structure is identical to embodiment 165 except that three additional sensing elements which are piezoresistors have been added. These piezoresistors are made such that they respond principally to longitudinal forces directed along the axes of the beams. Such piezoresistors can be constructed by making the force sensor out of silicon and using the beams themselves as piezoresistors, or by diffusing an impurity of the opposite type as that of the beam material (e.g., phosphorus if the beam material is originally doped with boron) from all sides of the beam such that the pn junction confined piezoresistive core is symmetrical about the beam axis.

BASIC OPERATION OF THE EMBODIMENT

Each cantilever beam of the preferred embodiment 165 is designed to bend in response to substantially one component of rotational acceleration, that is acceleration about the X-axis, Y-axis or Z-axis, or rotational force. Since the cantilever beams are directed radially outward from the center 167 of the device structure, a significant moment arm exists for applied rotational forces. Beam 168 is narrow and thick, and its projection is aligned substantially along the Y direction of the coordinate system 173 at the point of attachment to the main body 166. Therefore, beam 172 (and response element 178) can deflect in response to rotational forces acting on the response element 178 about the Y axis, and is relatively insensitive to rotational forces along the other X and Z primary axes. When a rotational force is applied about the Z axis, beam 168 and response element 174 deflect laterally (in-plane, in the X-direction), and the overlapping area of the associated conducting surfaces is altered. The capacitance between these conductors is changed, and the capacitance can be monitored to determine force components about the Z axis. Dual mode capacitance sensing is utilized, so the change in capacitance between conducting plates 182 and 175 will be of opposite sign from the sign of the change in capacitance between conducting plates 184 and 175 when a rotational force is applied about the Z axis. Thus, $\pm Z$ oriented rotational forces are distinguishable by the sign of the capacitance changes using the dual capacitor sensing element. Similarly, using only two capacitor plates which overlap, e.g., remove plate 184 so that only one capacitor with displacement plates is present, can be used to sense direction and magnitude of the X-directed rotational force.

Beam 170 is wide and thin, and is aligned substantially along the Y direction of the coordinate system 173 at the point of attachment to the main body. Therefore, beam 170 and response element 176 can deflect in response to rotational forces acting on the response element 176 about the X axis, and is relatively insensitive to, i.e., deflects a negligible amount due to, rotational forces along the Y and Z primary axes. When an rotational force is applied about the X axis, beam 170 and response element 176 deflect out-of-plane in the z-direction. The separation between the conducting surfaces 186 and 177 associated with beam 170 is altered with displacement of the response element 176 along the Z axis. The capacitance between the conducting surfaces can be measured to determine the magnitude and sign of the X directed rotational forces. The sign of the capacitance change distinguishes $\pm X$ directed rotational forces.

Beam 172 has the same geometrical structure as beam 170, but is aligned orthogonally along the X axis. Thus, rotational forces applied to the device directed about the Y axis can be determined by measuring the capacitance associated with beam 172 and response element 178. When a rotational force is applied about the Y axis, beam 172 deflects out-of-plane along the Z axis. The separation between the conducting surfaces 177 and 188 and associated with response element is altered with displacement of the response element 178 along the Z axis. The capacitance between the conducting surfaces 177 and 188 can be measured to determine the forces rotational forces. The sign of the capacitance change distinguishes the direction of rotation of the rotational force.

The embodiment 165 is of a geometry such that each response element deflects substantially in only one direction for a specific component of the rotational force. Deflection of the beam and corresponding response element is substantially suppressed for the other two orthogonal components of the rotating force. (The orthogonal components here are force components rotating along the X, Y, and Z axes.)

Where both angular acceleration (or force) and centrifugal force components are desired to be measured, the use of additional sensor element applied to the structure of FIG. 8 is required. Piezoresistive and capacitive sensing elements on each beam and response elements combination can be used. The embodiment with both capacitive and piezoresistive sensing elements is represented in FIG. 10 where the resistors are represented by the usual notation for resistors for clarity (these resistors in practice may be diffused or deposited resistors).

The dimensions of the sensor affect the performance and the sensitivity range and measurement errors associated with the device.

By way of example, consider the silicon Three Beam Three Aperture Force Sensor and the Three Beam One Aperture Force Sensor embodiments where each sensor is constructed with a cantilever beam of 10 microns thickness, 500 microns width, 50 microns width. (All beams are assumed identical here except that different beams have different orientations. A response element for a beam can have dimensions 3000 microns wide by 3000 microns long by 500 microns thick resulting in a response element mass of 10.4 milligrams. For this example the vertical deflection sensitivity of the response element is calculated to be one micron per g. For a capacitor electrode spacing of about 8 microns the nominal air capacitance is calculated to be approximately 10 pF. For this example, the measurement range can extend approximately from a fraction of a g to a few g's for a force rotation about the Z-axis.

By way of a second example, one could choose a cantilever beam thickness of 500 microns and cantilever beam width of 10 microns and a cantilever beam length is 50 microns, and the dimensions of the response element could be 3000 by 3000 by 500 microns and use a dual mode capacitor sensing element. In this example, the lateral deflection sensitivity of the response element can be approximately 1 micron per g. If the electrode vertical plate separation spacing is about 8 microns then the nominal capacitances of the two capacitors of the dual mode sensing capacitors calculate to be about 5 pF each. The resulting measurement range of lateral acceleration extends to multiple g's.

Device sensitivity can be increased or decreased by changing the capacitor plate separations and capacitor plate areas and by using stripe capacitor plates as described herein and selection of beam cross sectional dimensions and dimensions of the response element. These adjustable design parameters provide a convenient set of design features to be used in tailoring the sensors for targeting particular force magnitude and sensitivity ranges and measurement error features.

3. One Beam One Aperture

In another preferred embodiment of the present invention, a single beam force sensor can be used for resolution of the components of linear forces. Both capacitive and piezoresistive sensing is used. Three independent components of linear force can be measured using this single beam single aperture device 191 shown in FIGS. 11, 12, 13 and 14. By incorporating a high degree of independent sensing, that is, by using sensors such that orthogonal force components can be measured independently, and the third force sensed by a sensor element which measures two components of force simultaneously, the measurement error associated with multiple force, multiply responsive response elements can be minimized compared to the situation where each sensor element measuring component is sensitive to all three forces (Appendix E).

Figure 11:
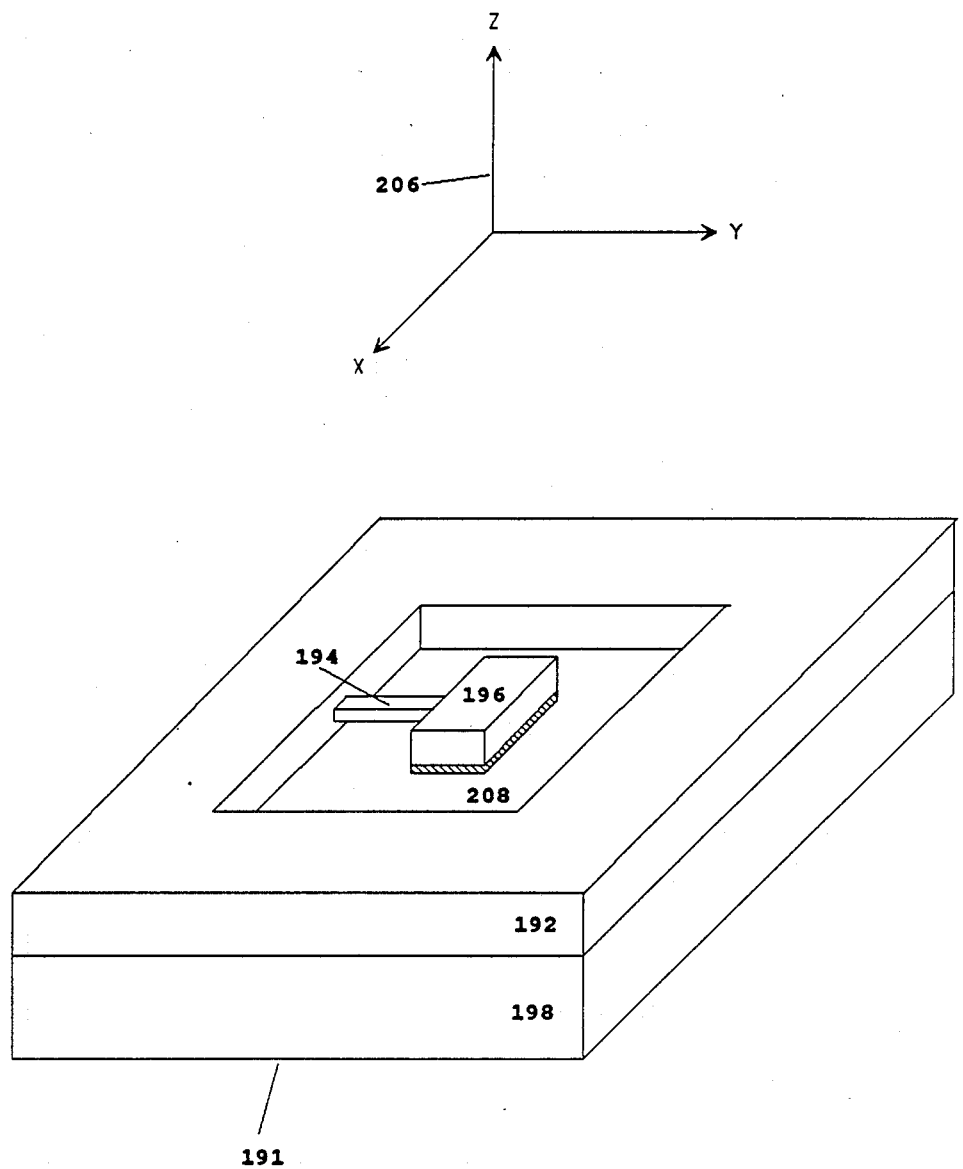
FIG. 11 is an oblique view of the main body of the One Beam One Aperture Force Sensor Embodiment.

Referring to FIG. 11, shown is an oblique view of the main body 192. The cantilever beam 194 can be fabricated with an essentially square or rectangular cross section, allowing beam 194 to have similar displacement magnitude arising from Z directed forces of similar magnitudes applied to response element 196 in co-ordinate system 206.

Figure 12:
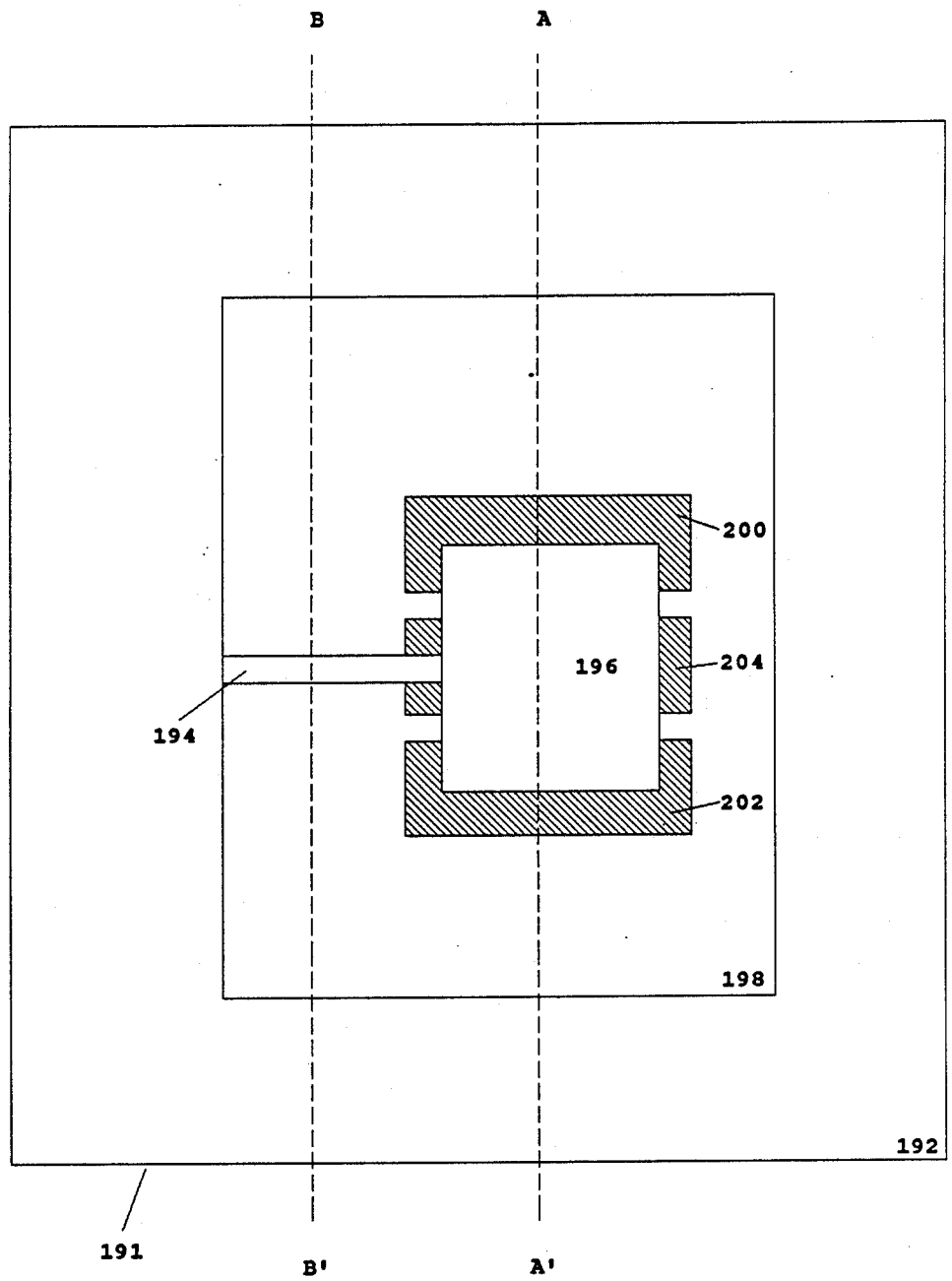
FIG. 12 is a top view of the One Beam One Aperture Force Sensor Embodiment.

Referring to FIG. 12, shown is a top view of the main body 192. Cantilever beam 194 supports response element 196 which can be made with a substantially square cross section, or with a suitable ratio of width to height chosen with sensitivity and other performance considerations in mand. The cantilever beam 194 and response element 196 are formed within a cavity etched in the main body 192. A substrate 198 is attached to the main body and contains stationary conducting pads 200, 202, and 204, each of which forms one plate of a capacitor. The complimentary plate 197 of each of these capacitors is placed on the bottom side of the response element 196 in proximity to and substantially parallel to capacitor plates 200, 202, and 204. FIG. 11 represents the geometry of the device.

Figure 13:
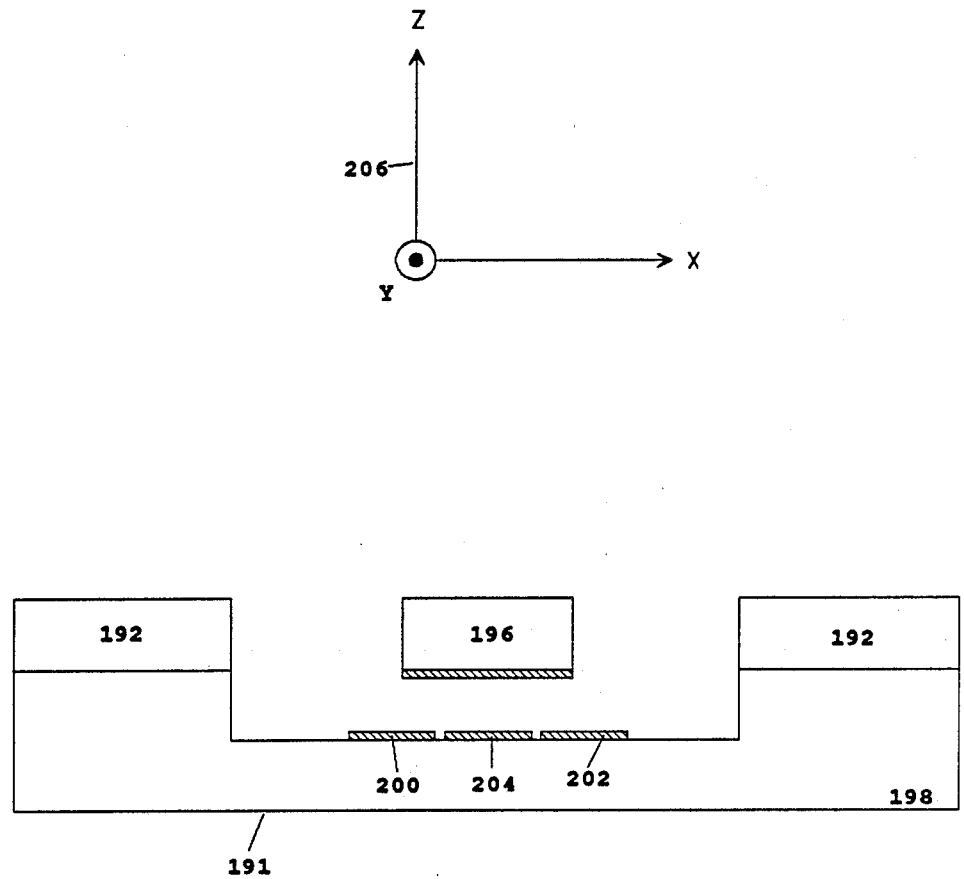
FIG. 13 is a cross sectional view of the main body of the One Beam One Aperture Force Sensor Embodiment taken at A-A' in FIG. 12.

Referring to FIG. 13, shown is a cross sectional view of the main body 192 taken at A-A' of FIG. 12. Response element conducting surface 208 forms one plate of the combination of the dual mode and single mode sensing capacitors. Stationary conducting plates 200 and 202 form the other plates of the dual mode sensing capacitors, and stationary conducting pad 204 forms the other plate of a single mode sensing capacitor. The stationary conducting pads are located on the substrate 198.

Figure 14:
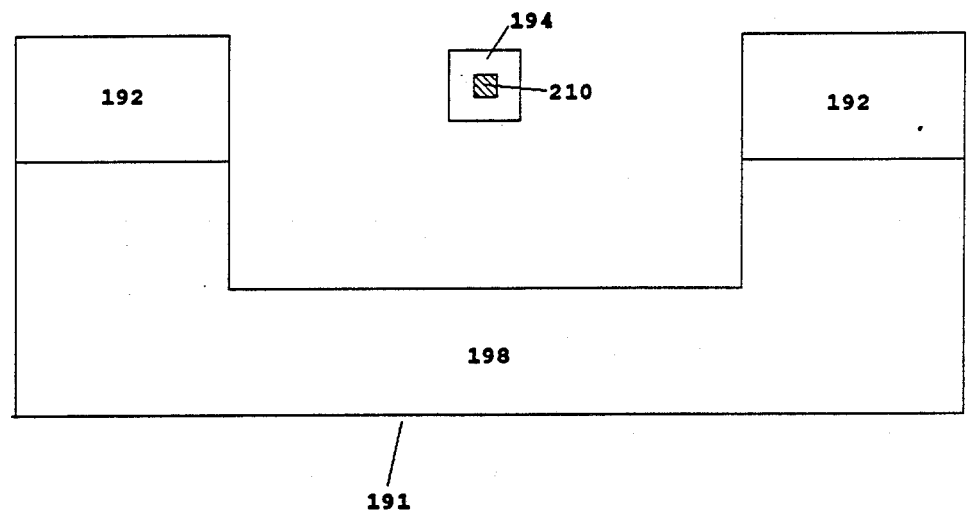
FIG. 14 is a cross sectional view of the main body of the One Beam One Aperture Force Sensor Embodiment taken at B-B' in FIG. 12.

Referring to FIG. 14, shown is a cross sectional view of the main body taken at B-B' of FIG. 12. A piezoresistor 210 is located at the center of beam 194. The resistor can be fabricated on beam 194 by simply using the beam itself as the resistor when the device is fabricated from silicon. Alternatively, the resistor can be formed by diffusing an impurity of the opposite type into the beam equally from all directions such that the resistor is centered on the axis of beam 194. For example, if the beam is of p-type silicon, an n type diffusion can be used to form a P-n junction by diffusing phosphorus or arsenic impurities. The beam itself can be etched down from a larger cross-section beam using a silicon etchant. The beam can be square or rectangular or oval or of another shape as determined by design and fabrication procedures.

Thinning of the beam using a silicon etchant may tend to convert the rectangular beam shape to one with rounded corners. Performance specifications are easily achieved by employing calibration procedures incorporating known forces.

BASIC OPERATION OF THE EMBODIMENT

The square cross section of the beam 194 allows displacement of the response element 196 in any of the three principal axes of the coordinate system 206. Forces directed along the X axis are measured by differential mode capacitive sensing. Plates 208 and 200 form one capacitor, and plates 208 and 202 form another capacitor. The changes in the overlapping area of the plates are used to determine X directed forces.

Plates 208 and 204 form a single mode sensing capacitor. Changes in the separation between the plates are used to determine Z directed forces.

The piezoresistor 210 is centered on the beam 194, and thus is sensitive only to axial displacement, i.e. strain, (along the Y axis) of the response element 196. Forces directed along the Y axis of the coordinate system 206 place the piezoresistor into tension or compression, and change the resistance in direct proportion to the induced strain. By monitoring the magnitude and sign of the resistance change, Y directed forces may be measured. Thus, three components of linear force may be resolved with a single beam force sensor.

Each beam with its multiple sensor elements can be used in an array of a multibeam, multiforce sensor to measure forces of multiple types, i.e., origins. Here, each beam has the capability of discriminating among three orthogonal components of linear force. The organization of an array of beams and response elements can be selected such that the determinant of the sensitivity matrix is non-zero (Appendix D). In this manner an array of said beams and response elements can be assembled to measure the three components of forces of more than one origin, e.g., linear, angular and centrifugal forces, and of forces of field origins such as derived from magnetic and electric field interactions.

For forces of sufficient magnitude that the displacement of the response elements are so large that the force component directed in the Y direction affects the response element displacement in the Z direction and the X direction, the measurement of the two force components in the X and Z directions may not be independent. However, by minimizing the sensitivity of the measurement of the X and Z displacements to the Y directed force, the overall measurement errors may be reduced. In mathematical terminology, this corresponds to minimizing the off diagonal elements of the sensitivity matrix S and maximizing the on diagonal elements as discussed in the Appendix.

Stated otherwise, the sensitivity of a sensor element should be maximized for a particular stimulus, i.e., a force component in this case, and the sensitivity to all other independent components of force components minimized. (Here maximum sensitivity and minimum sensitivity describe the relative sensitivities when the sensitivities are compared to one another and do not necessarily refer to absolute sensitivities.) For example, a sensor element should be made sensitive to only one force, and totally insensitive to other independent components of force. The next best case is to make a sensor element maximally sensitive to one component of the force and minimally sensitive to the remaining independent force components. For example, a sensor element which is sensitive to a Y directed force and insensitive to X and Z directed force components is desirable. The piezoresistor for embodiment 197 meets this criteria for small displacements.

4. One Beam One Aperture Inclinometer Embodiment

Figure 15:
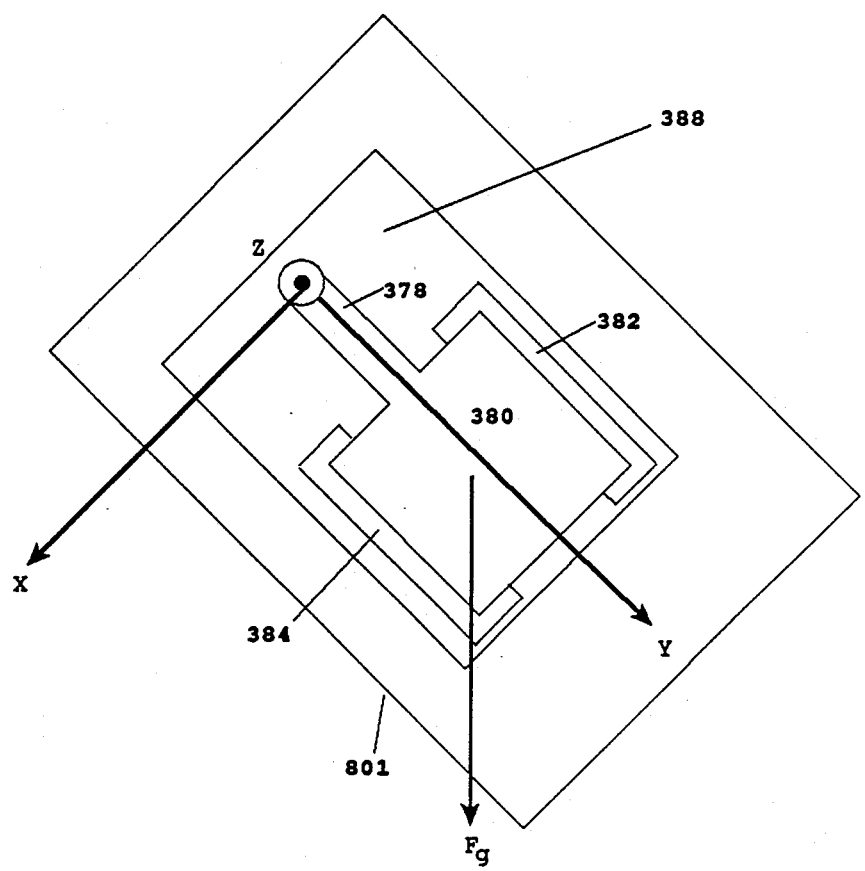
FIG. 15 is an approximate frontal view of the One Beam One Aperture Inclinometer Embodiment.
Figure 16:
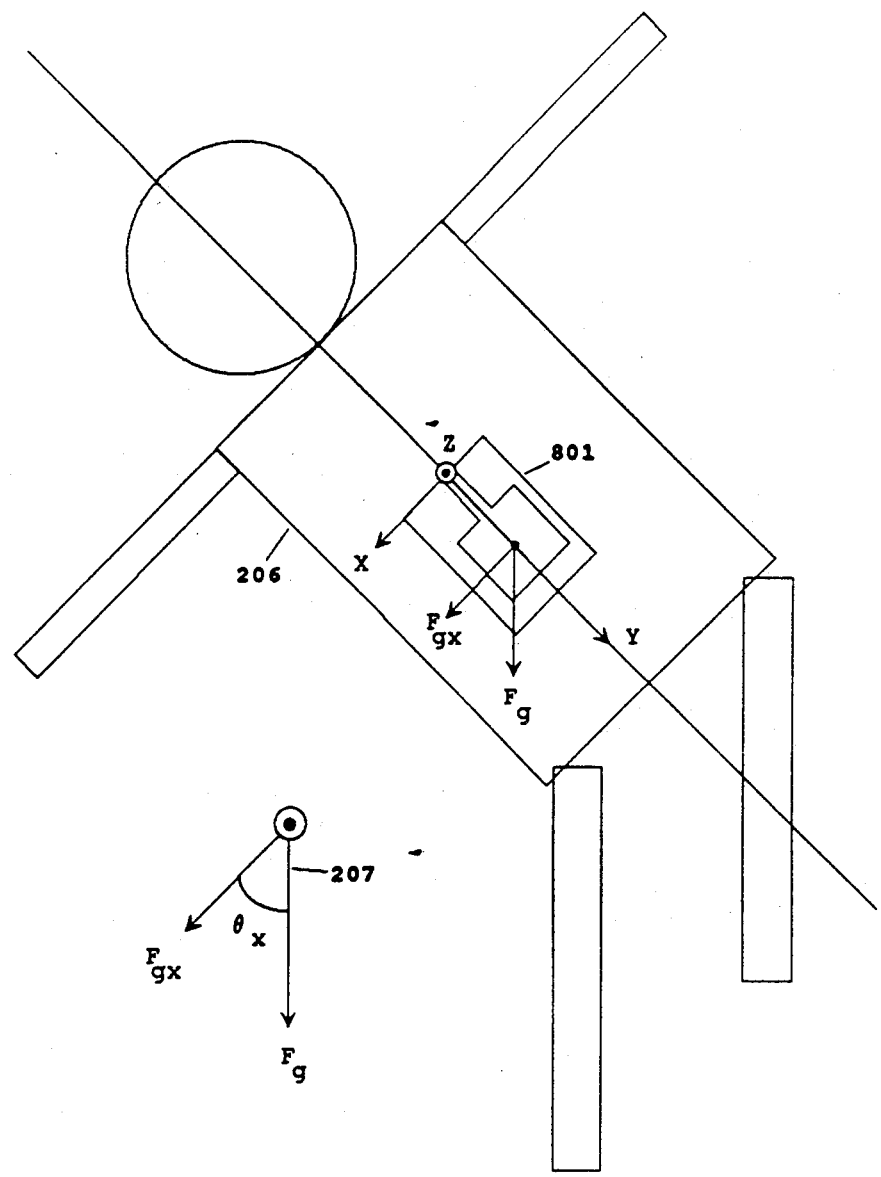
FIG. 16 is a diagram of the One Beam One Aperture Inclinometer Embodiment mounted on a free standing robot and used for balance control. The angle of in the x direction is shown.
Figure 17:
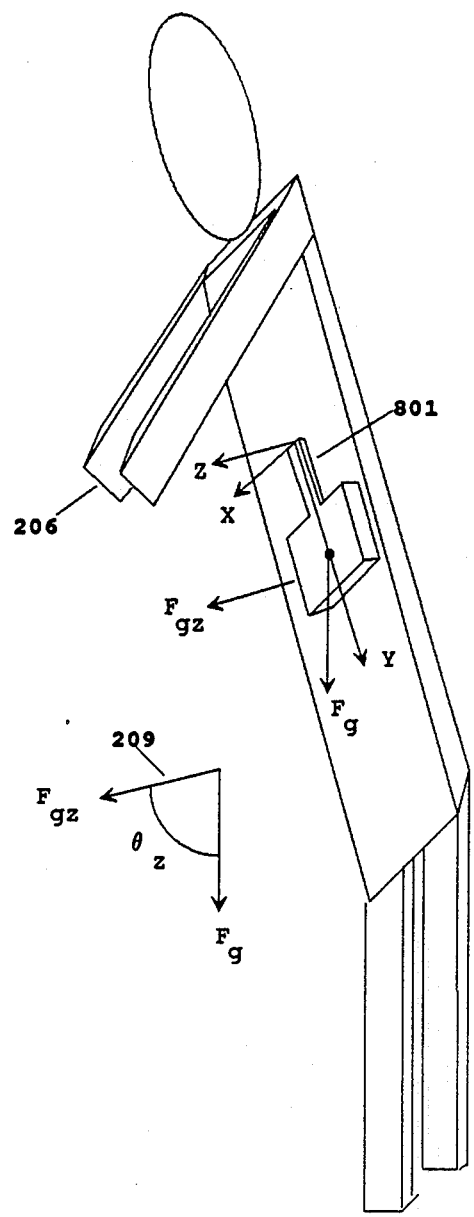
FIG. 17 is a diagram of a One Beam One Aperture Inclinometer Embodiment mounted, on a free standing robot and used for balance control. The angle of tilt in the z direction is shown.

Control of the position of a free standing robot and other systems which are subjected to tilting forces requires a device to measure the orientation of the system. A robotic system is referred to here by way of example (FIGS. 15, 16 and 17). However, the discussion applies to many different types of systems which require knowledge of their orientation with respect to a fixed reference. By way of example, the reference system for the free standing (or tethered) terrestrial robot is conveniently oriented with the direction of gravity. The robot must have some sort of a balancing system mechanism (as do humans) in order to maintain an orientation with respect to a fixed reference system such as gravity.

FIG. 15 illustrates a One Beam One Aperture Inclinometer Embodiment. The main body 801 is comprised of a single beam 378 projecting into a single aperture. The beam is attached to the main body 801 on one end and attached to response element 380 on the other end. A conductive plate 386 (not shown) is mounted on the response element. A complementary pair of conductive plates 382 and 384 are mounted on a substrate 388 in close proximity to the conductive plate 386. For an inclinometer, tilt in two directions is needed. A single beam device with a dual capacitor sensor element structure (FIG. 15), a single beam device with a three capacitor sensor element, a single beam device with a two or three capacitor sensor element and a piezoresistor (FIGS. 13 and 14), or any of the various embodiments described herein and which measure two orthogonal components of force can be used as an inclinometer sensing device. The preferred device has the minimum error associated with the force measurements (Appendix E).

The single beam with a dual capacitor sensor element will be used to describe the inclinometer.

BASIC OPERATION OF THE EMBODIMENT

The inclinometer provides the necessary balance information by measuring two components of gravitational acceleration (which must sum to 1 G) arising from the orientation of the inclinometer with respect to gravity. FIGS. 16 and 17 illustrate the orientation system and the gravitational force into components. When the robot is tilted at an angle, to the side or forward or both, the force sensor provides the measurement of the two tilt angles as shown in FIGS. 16 and 17 so that a feedback system can right the robot or keep the robot from tilting beyond a maximum angle which would cause it to fall (lose balance). For the example shown in FIGS. 15 and 16, measurement of the angles $\Theta_x$ and $\Theta_y$ provide the information needed. The relationship between the measured force $F_{gx}$ and $F_{gy}$ and $F_g$ are easily solved for the values of the angles which are then used to feed back control information to maintain the orientation of the robot with respect to the orientation of gravity in this case.

While the discussion here uses a free standing robot or telerobot by way of example, the inclinometer provides the necessary angle of tilt forward and sideways with respect to the fixed internal reference system of any system which needs angle of tilt information. Ships and aircraft are other examples.

5. Five Beams Five Apertures

In another embodiment of the present invention, five cantilever beams can be used with piezoresistive sensing for the complete separation of nine independent force components when both angular and linear forces may be present: three dimensions of linear acceleration, three dimensions of angular velocity (resulting in centrifugal force and a corresponding acceleration representation), and three dimensions of angular acceleration. (While the example used to described the devices does so in terms of acceleration as the type of force under consideration, the explanation of the application of the device and its extension to influence by other types of force is analogous. For example, forces due to applied electric or magnetic fields can also be measured with the five beam embodiment.) It is noted that it is convenient to represent angular acceleration in terms as angular velocity squared in order to compress the dimension of the arm from the center of mass to the center of rotation into the sensitivity matrix coefficients where it is easily incorporated via use of a calibration procedure for measuring the S matrix coefficients (Appendix B) thus avoiding the need to measure said arm experimentally. The result also is a measure of angular frequency which is often the quantity of interest to be measured, e.g., when a measure of rpms is desired.

Referring to the drawing in FIG. 18, the accelerometer consists of a main body 212 which may be constructed of p-type silicon and which provides a rigid support structure for the other components including the beams 214, 216, 218, 220, 222 of the multidimensional force sensor.

The essential components of the accelerometer include five flexible cantilever beams 214, 216, 218, 220, 222 attached to a main body 212. Attached to the beams are five response elements which for this accelerometer application example are masses composed of silicon material. The response elements 244, 246, 248, 250, and 252 are responsive to the acceleration applied to the main body. In this embodiment of the device, the cantilever beams 214, 216, 218, 220, 222 are designed to have the beam thickness roughly equal to that of the beam width in order to maximize lateral flexing with respect to out-of-plane bending, i.e., the beams are able to bend in two directions.

To achieve a high degree of sensitivity, the beam thickness and width are kept relatively thin with respect to the thickness (z direction) of the response masses and are of a thickness also much less than the thickness of the support structure. Eight n-type piezoresistors 224, 226, 228, 230, 232, 234, 236, 238 are located on four cantilever beams 214, 216, 218, 220. (While, p-type piezoresistors are often used because they are reported to be less temperature sensitive than n-type piezoresistors, the magnitude of the longitudinal piezoresistive effect for n-type piezoresistors is larger than the magnitude of the longitudinal piezoresistive effect for p-type piezoresistors and thus will be used in the present example.) The said four cantilever beams are oriented along the $<100>$ crystallographic directions on a (100) wafer. The piezoresistive coefficient is maximized along the $<100>$ equivalent crystallographic directions of silicon and theoretically the shear stress coefficients should be negligible for piezoresistors oriented along said $<100>$ and equivalent directions, i.e., said shear stress components are theoretically zero in the $<100>$ crystallographic directions. The fifth cantilever beam 222 is oriented along the $<100>$ direction, i.e., at forty five degrees from the $<100>$ direction and in the (100) plane. The $<110>$ for the fifth beam is chosen because of sensitivity considerations. In the $<100>$ direction, the n-type piezoresistive coefficient is relatively large which results in relatively good sensitivity to an applied acceleration. If the resistor 240 in beam 222 is made p-type, then the $<110>$ direction can be used for the orientation of the fifth beam because of a large piezoresistive sensitivity (of opposite sign to that of n-type silicon). Incorporation of a p-type piezoresistor with the other eight piezoresistors being n-type is accomplished using diffusion isolation. An alternative method of fabricating the piezoresistors is to deposit polysilicon resistors on the surface of said five beams. Using a (100) oriented wafer, the $<100>$ and $<110>$ directions are conveniently located 45 degrees apart, in the plane of the wafer. In this example of a five beam embodiment, all five cantilever beams 214, 216, 218, 220, 222 extend radially outward from the center of the accelerometer structure 242.

Each of the cantilever beams 214, 216, 218, 220, 222 is mass-loaded with response elements 244, 246, 248, 250, and 252, respectively. Inertial forces acting on the response elements 244, 246, 248, 250, and 252 induce bending of the cantilever beams 214, 216, 218, 220, 222 when the main body undergoes acceleration.

The response elements 244, 246, 248, 250, and 252 are defined and etched from a silicon substrate at the same time as the cantilever beams are etched. An orientation dependent (anisotropic) etchant is used to define the beams and response elements. When needed to increase sensitivity, additional mass can be placed on the response elements 244, 246, 248, 250, 252 by depositing lead or gold onto the said response elements.

Each of the cantilever beams 214, 216, 218, 220, and 222 contains a minimum of two stress sensing elements which are able to measure displacement in two dimensions except for cantilever beam 222 (FIG. 19) which has just one stress sensing element 240. Piezoresistors are used as the stress sensing elements in this example. The concept using two piezoresistors which are placed off axis along a beam to measure beam displacement has been reported by Oki and Muller (A. K. Oki and R. S. Muller, "Integrated Polysilicon Tactile Sensor," IEEE Solid State-State Sensors Workshop, June 2, 1986, pp. 7-9, incorporation by reference is intended). The concept is further discussed in Appendix B.

Figure 20:
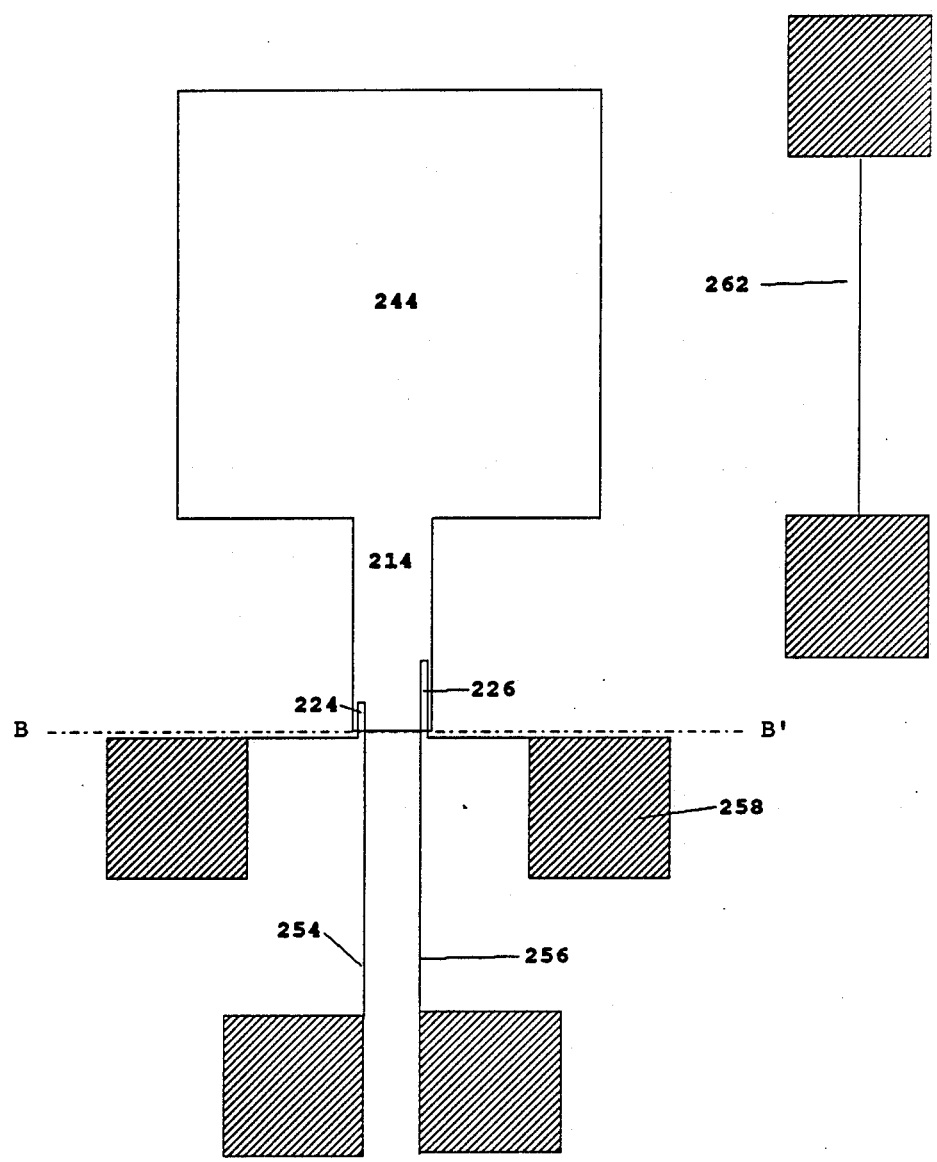
FIG. 20 is an enlarged top view of a cantilever beam of the Five Beam Five Aperture Force Sensor Embodiment with an associated temperature compensating resistor.

FIG. 20 shows an enlarged top view of a cantilever beam 214. The line B-B' denotes the location of the attachment of the cantilever beam 214 to the support structure. The attachment of the beam to the main body 212 projects substantially parallel to the plane of the main body 212. In the nomenclature intended herein, the use of the word "planar" structure in intended to mean planar in the absence of stress on any of the beams and in the absence of applied force on any of the beams. When the device is in operation to measure applied force components, the beams may flex out of the plane of the body 212. The device is still termed planar because the projection of the beams 214, 216, 218, 220, and 222 at the point of joining to the main body parallel to the main body 212.

The stress sensing elements used here are n-type piezoresistors 224 and 226 diffused along the edges of and running along a partial length of the cantilever beam 214 (FIG. 20). Alternatively p-type piezoresistors can be used, or deposited piezoresistors such as CVD deposited polysilicon piezoresistor can be used. The piezoresistors 224 and 226 are aligned along the $<100>$ equivalent directions to take advantage of the maximum longitudinal piezoresistive effect which occurs for n-type resistors oriented along said $<100>$ and equivalent directions thus providing the greatest sensitivity to acceleration derived forces. The stress sensing elements 224 and 226 provide electrical signals representing the stress distribution developed in a bending cantilever beam. The electrical signals are substantially proportional to the acceleration of the main body when operating in the linear piezoresistance regime. It is pointed out that the piezoresistors 224 and 226 extend from the cantilever beam to the main body overlapping the region of maximum stress developed in the cantilever beam (where the line B-B' intersects the cantilever beam 214). Conductive return paths 254 and 256 can be fabricated with photolithographically defined deposited metals. External electrical contacts are made using bonding pads 258 and 260.

The resistor 262 located in the non-stress support region 212 acts as a temperature compensating resistor and is connected to bridge circuits along with the piezoresistor 224.

Figure 21:
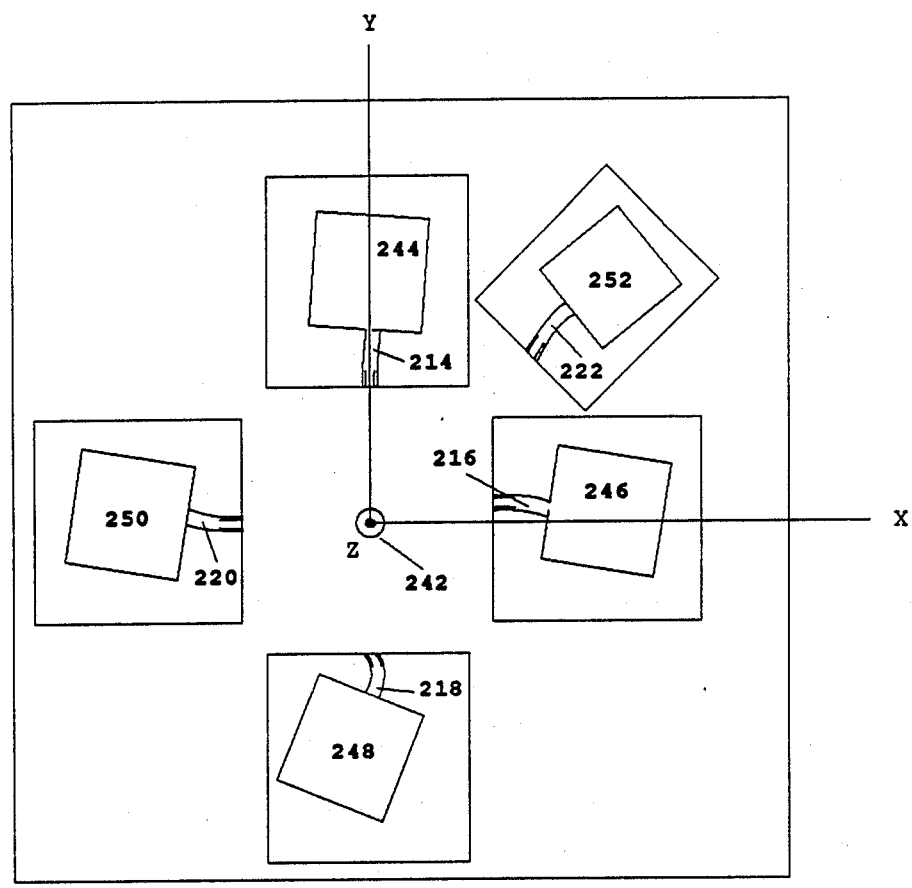
FIG. 21 is a top view of the Five Beam Five Aperture Force Sensor Embodiment subject to severe bending of beams responding to a multiple components of force.
Figure 22A:
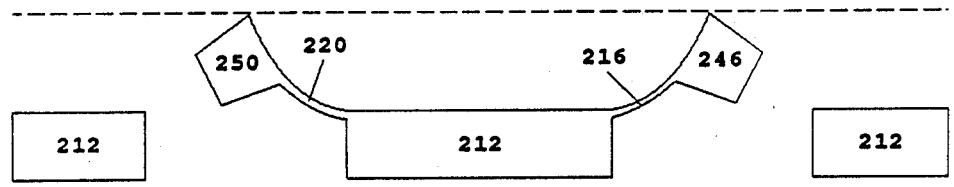
FIG. 22a is a cross-sectional view of the main body of the Five Beam Five Aperture Force Sensor Embodiment shown in FIG. 21 subjected to forces bending beams the same distance out-of-plane. The cross sectional-view is taken at AA' in FIG. 21.
Figure 22B:
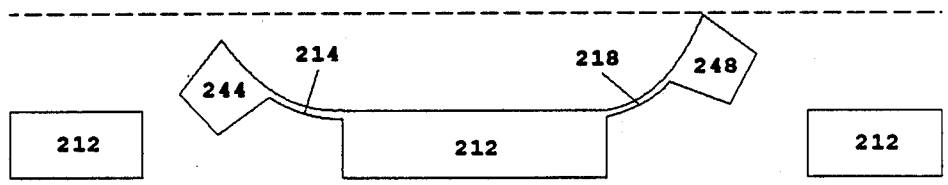
FIG. 22b is a cross-sectional view of main body of the Five Beam Five Aperture Force Sensor Embodiment subjected to forces bending beams different distances out of-plane. The cross-sectional view is taken at BB' in FIG. 21.

For sufficiently large forces the beams can be substantially away from their axial projection directions and also bend out of the plane. FIGS. 21, 22a and 22b illustrate bending extreme bending.

In order for the accelerometer to successfully separate and measure all of the independent force components, the measurement information provided by the sensor elements must be sufficiently independent. Where a large number of force components are present and where more than one response element is responsive to a multiple of independent force components, there may be complexity in determining values of the individual force components (even if the design of a particular sensor provides sufficiently independent sensor element measurement information).

A theory for the five arm five aperture embodiment is presented for two designs, in particular, two different piezoresistor designs, referred to here as case 1 and case 2 (See Appendix C). For the first case, all nine piezoresistor sensing elements are chosen to be identical. It is found that this embodiment including this set of piezoresistors does not provide sufficiently independent sensor element measurement information to permit the successful simultaneous resolution of all nine components of said acceleration when all nine components are simultaneously present. For the second case of the five beam five aperture embodiment with piezoresistor sensing elements (as described), the piezoresistor 224 located on the cantilever beam 214 is assumed to be shorter than it is in the case 1 while keeping all of the other eight piezoresistors of the same length as in case 1. That is, there are eight identical piezoresistors and a ninth which differs from the eight in that the length of the ninth is shorter than the length of the other eight resistors. The result in example two is that the five beam accelerometer with the piezoresistor 224 located on beam 214 constructed such that the piezoresistor has been shortened (by a factor of 10) compared to those eight piezoresistors located on the remaining five beams 216, 218, 220, and 222 does provide sufficiently independent sensor element measurement information to fully separate the influences of the nine independent force components and to permit simultaneous measurement of all nine independent force components. This conclusion is reached by considering the determinant of the S matrix. Thus, by removing a portion of the symmetrical features of the five beam accelerometer, the performance of the five beam accelerometer is improved in this example. Other methods of breaking up the symmetry or causing the determinant of the sensitivity matrix (S) to be non zero can be used. Sensor element type can be mixed, dimensions and geometry can be modified, and other sensor features adjusted to provide for simultaneous measurement of all nine force components.

A five beam accelerometer with identical piezoresistors can be used to measure a reduced set, i.e., less than nine, of independent force components.

The five beam force sensor embodiment can be constructed in the manner described here using other sensing elements. For example, pairs of sensing elements which discriminate two independent force components where the two components are lateral and vertical force components (as for the piezoresistor pair configuration described above) can be used with the same beam architecture. In particular dual capacitor sensing elements can be used instead of the piezoresistor pairs. The dual capacitors can also be used together with the piezoresistor sensing elements or in a mix or simultaneously with the piezoresistor sensing elements where the sensor element configuration is chosen such that sufficiently independent sensor element measurement information is provided as discussed herein. A mix of different types of sensor elements may be used to improve measurement accuracy, e.g., by reducing the condition number of the sensitivity matrix S as described in Appendix E, or by separating the various independent sensor stimuli (acceleration components in the example) into independent subgroups, as described in the discussion on the condition number in Appendix E.

The use of sensor element duplication using multiple types of sensor elements may provide additional information which may be used to increase the accelerometer accuracy. For example, both dual capacitor sensing elements and piezoresistor sensing elements can be used on each of the five arms (an arm is defined here as a beam plus a response element) of the five beam five aperture embodiment.

The basic operation of the nine independent force component resolving accelerometer using piezoresistive sensing elements is described in the Basic Operation of the Embodiment.

In this embodiment piezoresistive sensing elements are used to describe the device. Other sensor elements could also be used either instead of the piezoresistive sensing elements or together with the piezoresistive sensing elements. For example, dual capacitor sensing elements could be used as the sensing elements for this five beam embodiment.

Consider the piezoresistive sensing elements: Nine piezoresistors are used to measure nine independent force components (three components of three forces of three different origins as described). The nine sensors are of a character that when attached to the beams or mounted on the response elements with this beam geometry, the sensing elements produce sufficiently independent measurement information to separate the nine force components. The design of the device such that independent measurement information is provided requires consideration of device geometry, anisotropies and the features of the sensing elements. For example, not any selection of nine piezoresistors will provide sufficient independent measurement information to resolve the nine force components.

For the five beam five aperture embodiment which uses piezoresistive sensor elements, the outputs from the device consist in the most general case of nine changes in resistance for a particular applied force component. That is, a piezoresistance may change due to each of the said independent nine force components as may each of the remaining eight piezoresistors. The description of the sensor responses is a group of nine resistance changes which can be expressed conveniently mathematically as a column matrix or resistance change vector arising from nine force components in the most general case. The nine independent force constants are conveniently represented as a nine component column matrix or vector F. Since in general each resistance component in the resistance column is influenced by nine independent force components, the influence of each of the nine force component on a single resistor can be represented by a proportionality number. Thus, for nine types of forces in general there will be nine numbers of proportionality relating a change in resistance to each particular force component, respectively. The total change in the resistance is the sum of all the individual changes arising form the influence of each of the nine forces. These proportionality numbers describe the sensitivity of the piezoresistor to each force. For each resistor, the sensitivity numbers are organized in a row and called a row matrix. Since there are nine piezoresistors, there are nine such rows. Nine rows of nine resistances form a group, or array, or matrix of nine by nine elements. This nine by nine matrix relating the responses of the sensor element piezoresistors to the applied nine force components is called a force sensitivity matrix $S_F$. The more sensitive a resistor is to a particular force component the larger the corresponding proportionality number, or force sensitivity matrix element.

The relationship between the change in resistance of a piezoresistor and the force causing or stimulating (stimulus) the change is dependent upon the properties of the piezoresistive material (silicon in this example), upon crystal orientation, upon geometry of the beams, upon the mass of the response elements in the case of application as an accelerometer and thus on the dimensions of the response elements and on the dimensions of the beams. Thus, the sensitivity matrix is dependent upon material parameters (which include the piezoresistivity tensor, the strain tensor, and other properties), beam bending characteristics, beam geometries and beam orientations. In general the sensitivity matrix depends in an important way on the details of the sensor elements employed in the multiarm force sensor. The details of the sensitivity matrix are affected by device design.

The mathematical relationship relating the piezoresistance changes to the applied forces is $$\frac{\Delta R}{R_o} = S_F \cdot F \qquad (5.1)$$

were F is the force column vector (matrix). The relationship between the unknown force components F and the change in the piezoresistances is simply $$F = S_F^{-1} \cdot \frac{\Delta R}{R_o} \qquad (5.2)$$

Here $\Delta R/R_o$ is the column of ratios of each change $\Delta R$ in piezoresistance divided by its value of $R_{io}$ in the absence of applied forces.

The equation relating the nine force components to the values of the nine changes in the piezoresistors relates the unknown forces to piezoresistance changes via the inverse of the sensitivity matrix $S_F$, i e., via $S_F^{-1}$. The inverse of the sensitivity matrix is determined mathematically.

Measuring the changes in the piezoresistive sensing elements and substituting into Eq. (5.2) provides the measurement of the individual force components.

The design of the multibeam multiforce sensor such that measurement errors are minimized depends in detail on the values of the sensitivity numbers, that is, on the elements of $S_F$, and therefore on the details of the embodiment construction and the details of the sensor elements used. in general, is discussed in more detail in Appendix E using the five beam piezoresistive embodiment as an example. Similar considerations apply to other sensing systems which have individual sensing elements and response elements which depend on more than one independent stimuli, such as certain types of chemical sensors.

BASIC OPERATION OF THE EMBODIMENT

As the main body 212 undergoes acceleration, the inertial forces acting on the response elements 244, 246, 248, 250, and 252 bend the flexible cantilever beams 214, 216, 218, 220, and 222 with respect to the rigid support structure 212. This bending results in a stress distribution along the length of each cantilever beam 214, 216, 218, 220 and 222. The stress distribution causes changes in resistance in the piezoresistors 224, 226, 228, 230, 232, 234, 236, 238, and 240 residing on the surface of the cantilever beams 214, 216, 218, 220, and 222.

The cantilever beams 214, 216, 218, 220, and 222 are designed to be able to deflect in all directions, thus being responsive to acceleration in all directions. (Here, the strain along a beam axis is referred to in terms of deflection or displacement.) The stress distribution is directly proportional to all components of acceleration when the device is operated in the linear regime. Thus, the changes in resistance of the stress sensing resistors 224, 226, 228, 230, 232, 234, 236, 238, and 240 can be represented as proportional to the components of acceleration when the device is operating in its linear region.

There are a maximum of nine components of motion originating acceleration to be independently determined. Therefore a minimum of nine piezoresistors are required. Since two piezoresistors lie on each cantilever beam 214, 216. 218, 220, and 222, five cantilever beams are required for this particular device embodiment. However other arrangements such as placing multiple piezoresistors and other types of sensing elements on each cantilever beam are possible. The minimum number of beams required when multiple sensing elements are incorporated can be inspected using the process described in the appendices by inspection of the determinant of S, etc..

The collective response from the nine resistors 224, 226, 228, 230, 232, 234, 236, 238, and 240 located in the regions of maximum stress (line B-B' in FIG. 18) are then used to calculate the components of linear acceleration $a_i$, angular velocity $\omega_2$, and angular acceleration $\alpha_i$ where i represents the components of the cartesian coordinate system, i.e., i=x, y, z.

The change in resistance for all nine piezoresistors 224, 226, 228, 230, 232, 234, 236, 238, and 240 can be expressed as a column of numbers. i.e., as a column matrix and in a vector representation as $\Delta R/R_o$. The "vector" $\Delta R/R_o$ is related to the total acceleration vector A (which consists of the independent acceleration force components) by the sensitivity matrix S.

The values of the individual components of the S matrix are usually best measured using a calibration procedure when the device is used to measure acceleration.

A calibration procedure for determining the experimental values of the S matrix elements is described in Appendix C.

Figure 23:
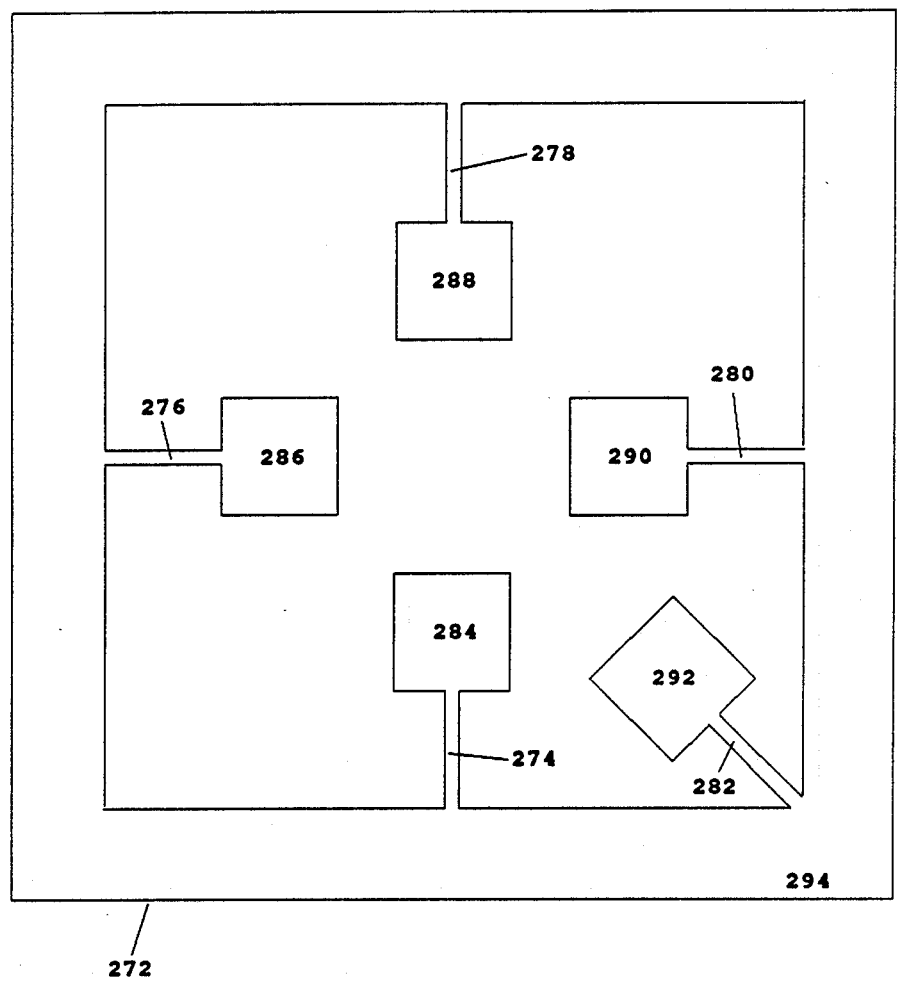
FIG. 23 is a top view of the main body of the Five Beam One Aperture Force Sensor Embodiment.

Another embodiment which is similar to the Five Beam Five Aperture embodiment described above is shown in FIG. 19. The embodiment consists of five cantilever beams 241, 243, 245, 247, and 249. Each cantilever beam is attached to the support structure 239. Each cantilever beam is mass-loaded on the free end. The cantilever beams point substantially radially from the point of attachment at the support structure. Similar to the Five Beam Five Aperture embodiment, a pair of piezoresistors reside on the surface of four of the cantilever beams 241, 243, 245, and 247, whereas the remaining cantilever beam 249 has only one piezoresistor residing on the surface. The embodiment of FIG. 23 operates in a similar manner to the Five Beam Five Aperture embodiment and can be analyzed in a similar way.

The attendant circuitry of the Five Beam One Aperture embodiment can be fabricated in proximity to the piezoresistors. This latter embodiment therefore offers advantages for fabrication and circuit performance. A temperature compensating resistor can be diffused next to each piezoresistor so that both resistors are approximately at the same temperature. The piezoresistor along with its companion temperature compensating resistor can be incorporated into a temperature compensating circuit such as a Wheatstone bridge to cancel the effects of temperature on the resistance change. Signal conditioning circuits such as amplifiers and analog to digital converters can be fabricated in close proximity to the piezoresistors. This may optimize the usage of the sensor system layout area.

6. Four Beams One Aperture

In another embodiment of the present invention, four flexible beams with strain sensing piezoresistors are attached to a rigid support frame at one end and a central response element is suspended at the free end of each of the four beams. In this embodiment, a single response element is common to all four beams. This structure is similar to the free hanging cantilever beams described above and exhibits similar principles of operation. Thus, the consideration of this structure as an embodiment of the present invention is appropriate. Beams are deflected by acceleration or other forces which can induce displacement of the response element. For acceleration applications, the response element is a mass affecting the displacement of each beam.

Strain sensing piezoresistors are coupled to the beams. Circuitry is used to convert force induced piezoresistance changes to voltages and to provide for temperature compensation. Measured output voltages are used to determine the components of forces causing the response element displacement.

The Four Beams One Aperture embodiment measures up to three orthogonal components of linear force. The basic embodiment can be supplemented and modified using special circuitry or capacitive sensing methods as will be discussed below.

DETAILED DESCRIPTION OF EMBODIMENT

Figure 24:
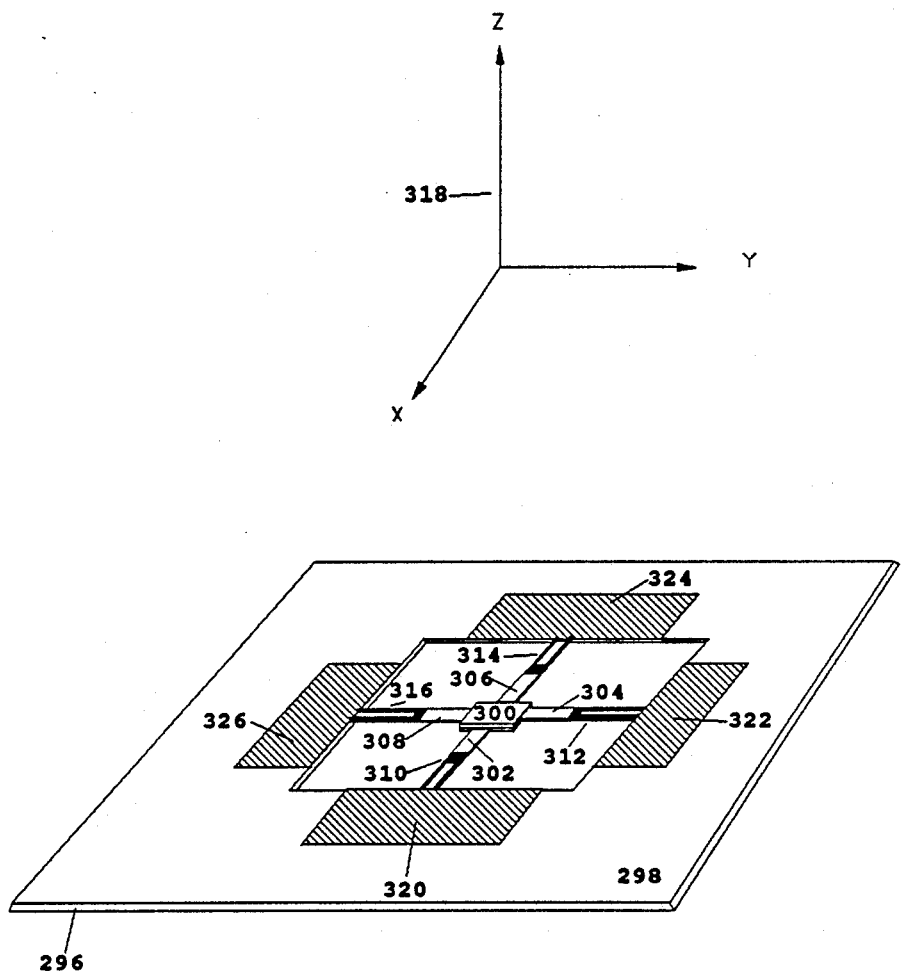
FIG. 24 is an oblique view of the main body of the Four Beam One Aperture Force Sensor Embodiment.

Referring to FIG. 24, an oblique view of the embodiment is shown.

Figure 25:
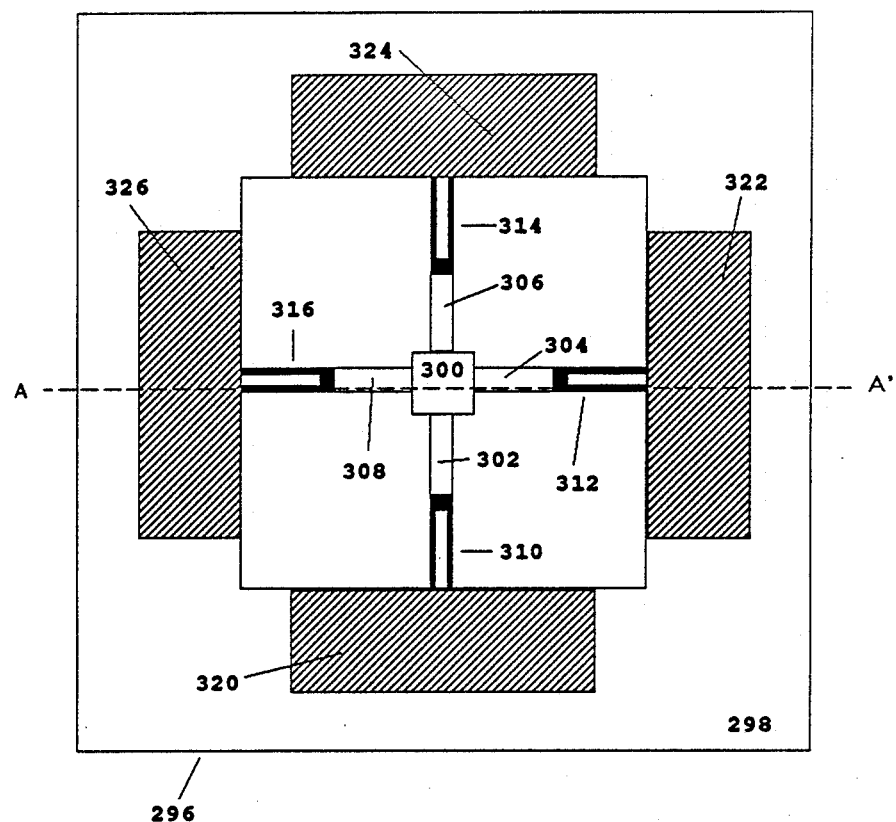
FIG. 25 is a top view of the main body of the Four Beam One Aperture Force Sensor Embodiment.

Referring to FIG. 25, represented is the top view of the accelerometer main body 298. A response element 300 is suspended within an etched cavity 299 by flexible beams 302, 304, 306, and 308. Piezoresistors 310, 312, 314, and 316 are located on beams 302, 304, 306, and 308 respectively, and are designated as R1, R2, R3, and R4, respectively. The resistors are connected to signal conditioning circuitry 320, 322, 324, and 326 located in the rigid support frame 298 of the main body 298.

Figure 26:
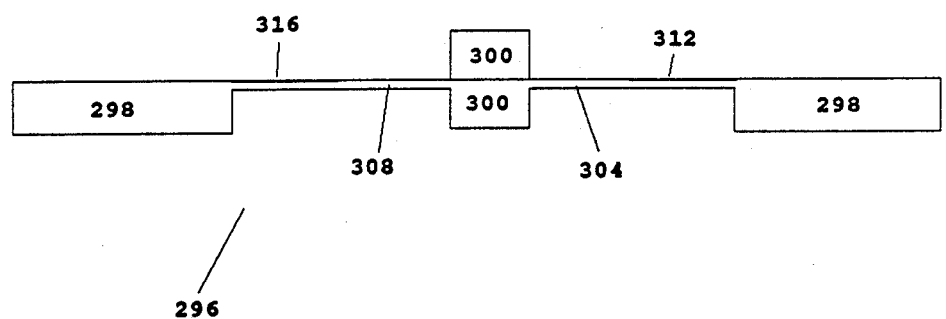
FIG. 26 is a cross-sectional view of the main body of the Four Beam One Aperture Force Sensor Embodiment of FIG. 25 taken along line A-A'.
Figure 27A:
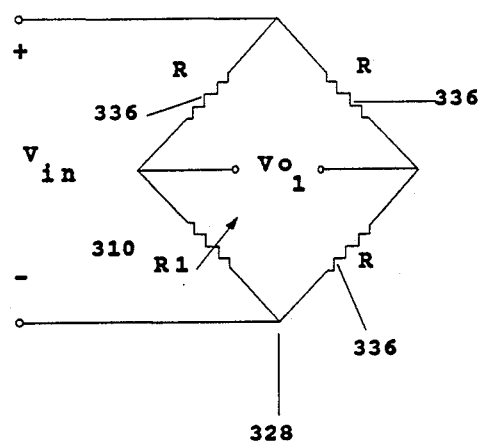
FIG. 27 is an electrical schematic diagram of the interconnections of the piezoresistors and bridge circuitry of the Four Beam One Aperture Force Sensor Embodiment.
Figure 27B:
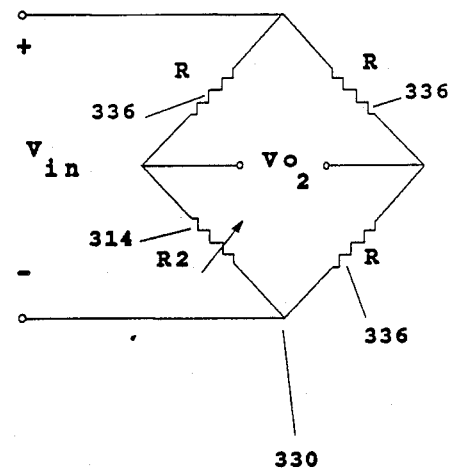
Figure 27C:
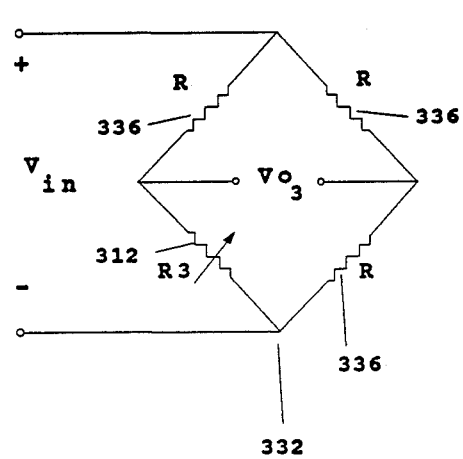
Figure 27D:
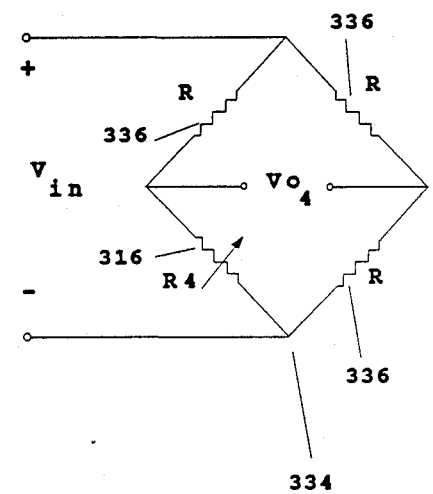
Figure 28A:
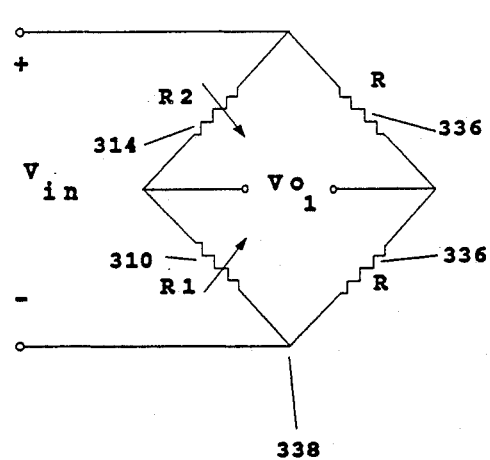
FIG. 28 is an electrical schematic diagram of the interconnections of the piezoresistors and bridge circuitry of the Two Dimension Resolving Four Beam One Aperture Force Sensor Embodiment.
Figure 28B:
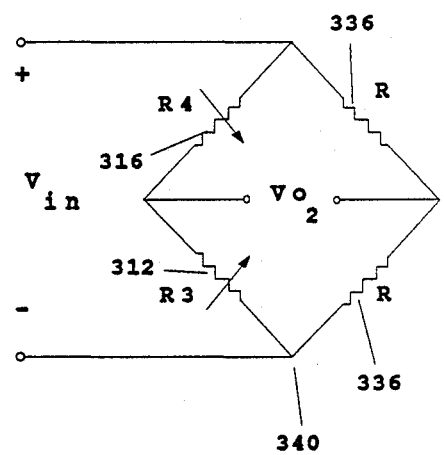

Referring to FIG. 26, represented is a cross sectional view of the main body 298 taken at A - A' of FIG. 25. The response element 300 is deemed to include material above and below the plane of the supporting beams 304 and 308 and its center lies on, or close to, the beam axis projection from the beam at the connection to the response element . . . The response element 300 is much thicker than the supporting beams 304 and 308. The response element 300 is displaced relative to the rigid support frame 298 as the main body 298 undergoes acceleration or when a force is applied or induced to the response element.

Referring to FIG. 24, represented is an oblique view of the main body 298. The beams 302, 304, 306, and 308 each contain a U-shaped piezoresistor 310, 312, 314, and 316 (R1, R2, R3, and R4, respectively). The ends of each resistor are connected to signal conditioning circuitry 320, 322, 324, and 326 formed in the rigid support frame 298. The beams 302, 304, 306, and 308 are oriented along the X and Y axes of the coordinate system 318.

Referring to FIG. 27, represented is an electrical schematic diagram of the bridge circuitry used to convert resistance changes to voltages. Four Wheatstone bridges 298, 300, 302, and 304 are used. Bridge resistors 306 are formed on the rigid support frame of the device, and are connected in four circuits to beam piezoresistors 310, 312, 314, and 316.

Referring to FIG. 24, represented is an electrical schematic diagram of the bridge circuitry of a Two-Dimension Resolving Configuration arranged to convert resistance changes to voltages and to provide a measurement of two orthogonal force components in the plane of the main body 298. Two special bridge circuits 308 and 310 are used. Bridge resistors 312 are formed on the rigid support frame of the device, and are connected in two circuits to beam piezoresistors 310, 312, 314, and 316. Two axially aligned piezoresistors (310 and 314 or 312 and 316) are connected in each bridge circuit to achieve additional features using this embodiment as described below.

Figure 29:
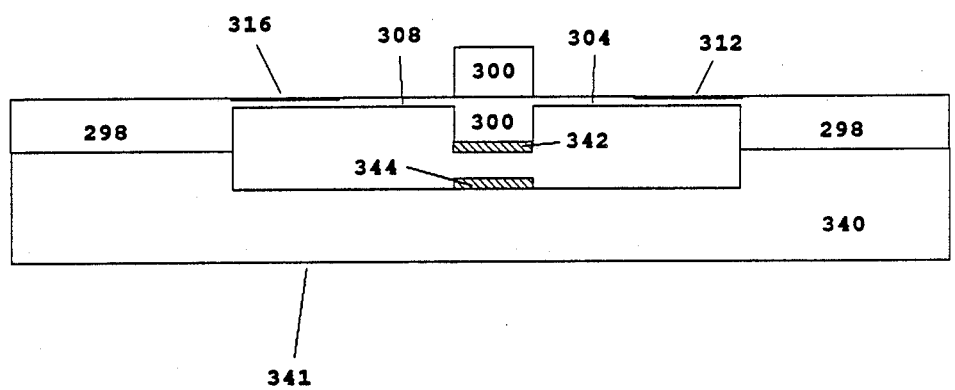
FIG. 29 is a cross-sectional view of the main body of the Four Beam One Aperture Force Sensor Embodiment of FIG. 24 taken along line A-A' with capacitor electrodes are incorporated on the response element and the underlying substrate.

Referring to FIG. 29, represented is a cross sectional view of the main body 298 when a single mode capacitor is included between the response element 300 and a substrate 340.

BASIC OPERATION OF THE EMBODIMENT

A force induced displacement of the response element induces strain in the supporting beams and resistance changes in the piezoresistors located in the beams. The resistance changes can be converted to output voltages by signal conditioning circuitry. The response element of the main body may be displaced with directly or indirectly applied force or acceleration in an arbitrary direction. Components of applied force or acceleration with respect to the coordinate system 318 relative to main body 298 may be measured from output voltages from the signal conditioning circuitry.

In-plane displacement of the response element from its rest position causes the axially aligned beam resistors R1 and R2 (310 and 312) to undergo opposite sign strains for the X directed force components. Induced tension and compression in the two beams aligned along the X-axis result in piezoresistive changes of opposite signs in resistors R1 and R2 (310 and 314). Axially aligned beams 304 and 308 are also deflected along the X axis, but the resistances values are not affected because the strain components should cancel out. Due to beam and piezoresistor symmetry, there is zero net resistance change in the transversely strained piezoresistors R3 and R4 (312 and 316). Axially aligned beam resistors R3 and R4 are sensitive to Y directed axial force components orthogonal to the sensitivity axis of R1 and R2. Piezoresistors R1 and R2 are not sensitive to transverse force components along the Y-axis. Piezoresistors R3 and R4 are not sensitive to transverse force components along the X-axis.

Out-of-plane (Z directed) displacement of the response element causes all of the beam resistors to deflect in the same direction. Thus, resistance values of piezoresistors R1, R2, R3, and R4 (310, 312, 314, and 316) change by the same sign and magnitude in this case.

Each piezoresistor extends no more than one half the beam length, exploiting the bending stress distributions in the beams when the response element is subject to an out-of-plane force. The surface stress distribution in the beams of this embodiment inverts at approximately one half of the beam lengths when an out-of-plane force is applied. Thus, at the surface (where the resistors are generally located) one half of the beam is in tension while the other half of the beam is in compression when Z directed force components deflect the response element out of-plane. By restricting the piezoresistors to the half of the beams nearest the support frame of the main body, +Z directed force components will induce only compressive forces into the piezoresistors. Force components directed along the −Z direction induce only tensile forces into the piezoresistors. A combination of tensile and compressive forces could reduce piezoresistive sensitivity if simultaneously applied to a piezoresistor. Because of the strategic placement of the resistors on the flexible beams, +Z directed acceleration components induce resistance changes of opposite sign to −Z directed forces.

The magnitude and direction of applied force or acceleration causing the response element to displace may be measured using the four beam single aperture embodiment. Subtracting the resistance values of R1 and R2 (310 and 314) yields twice the resistance change in each piezoresistor due to X directed forces, independent of the Y and Z directed force components present. Since the piezoresistive changes are substantially proportional to applied forces (operating in the linear regime). scaling of the force induced resistance changes provides values for the magnitude and direction of the X directed force component. A similar method is used for determining Y and Z directed force components from the force induced piezoresistance changes. By manipulating the output voltages from the bridge circuits which are representative of the resistance values of the four piezoresistors, three orthogonal components of linear acceleration or other displacing forces can be measured. The piezoresistors may be fabricated as deposited resistors, diffused devices, or, when semiconductor beams are used, the beams themselves may constitute the piezoresistors.

When the center of mass of the response element is located in the same plane as the supporting beams axes (planar configuration), torque effects on the response element due to linear forces are minimized.

If the response element's center of mass is not co-linear with the axes of the beams, torque effects may be present. In certain applications, torquing of the response element can be used to enhance the sensitivity of the strain sensing piezoresistors by increasing strain. The effective torquing moment arm acting on the response element can be increased by locating the center of mass of the response element off the axis of the beams. An example is the case where the beams are attached to the response element at its top side, such that the response element hangs below the plane of the beams.

Other beam and resistor designs are possible, including structures in which the beam material forms the piezoresistors themselves, and are formed with homogeneous material or by a resistive etch stop of diffused material. These designs and other related designs are considered structurally and functionally equivalent to the present invention.

The basic structure of this embodiment can be supplemented with a single mode capacitive sensing element between the response element 300 and the substrate 340. The capacitance of the electrodes 269 and 271 is varied with Z directed force components, but not significantly with X or Y directed force components. Capacitance measurements can be used to directly determine the Z directed force components independently of the piezoresistance measurements. Such a measurement may be used for redundancy of Z-axis force component resolving, a third dimension of resolution for the Two Dimension Resolving Configuration structure, or a reduction of the condition number of the system.

The circuit arrangement of this embodiment of FIG. 27 to out-of-plane sensitivity can be traded for other attractive features as described below. This configuration is called the Two Dimension Resolving Configuration, and utilizes a different bridge circuit design from that described above. The single mode capacitor described between the response element 300 and the underlying substrate 340 can provide an independent measure of the z-directed force component if needed.

In the Two Dimension Resolving Configuration, two piezoresistors are connected in each of two bridge circuits 308 and 310. This arrangement of resistors trades off out-of-plane piezoresistive sensitivity for other desirable performance features. The output voltage of bridge circuit 308 is directly proportional to X directed force components, and no computations need be performed to obtain directly scaled force component measurements. Similarly, the output voltage of bridge circuit 310 is directly proportional to Y directed force components.

Advantages of the bridges in the Two Dimension Resolving Configuration over a standard Wheatstone bridge include a doubling of sensitivity and a linear output when operating in the piezoresistance linear region. Fabrication requirements are eased since bridge resistor values need not be closely matched to piezoresistor values, thus increasing tolerance to resistor variation. Adverse temperature sensitivity should be virtually eliminated with this circuit configuration.

The piezoresistors are designed to change in value by the same magnitude, same sign for out-of-plane force components and same magnitude, opposite sign for in-plane force components. Under these conditions, the bridge circuit outputs are sensitive only to phenomena causing opposite sign resistance changes in R1 and R2 (310 and 314) or R3 and R4 (312 and 316). Only X and Y directed force components cause such resistance changes (neither temperature effects nor Z directed forces are likely to cause opposite signed resistance changes in R1 and R2 or R3 and R4).

With directly scaled outputs, linear bridge response, and temperature insensitivity, the Two Dimension Resolving Embodiment suggests simple and reduced instrumentation costs in some applications. Planar force components are measured while out-of-plane force components do not substantially influence the device output.

The basic structure of both the two and three dimension resolving Four Beam One Aperture embodiment configurations minimize sensitivity to in-plane rotational errors when the rotation is about an axis passing through the center of mass of the response element. Displacement stops can be built into the packaging to protect the device from damage due to excessive force application.

MULTIPLE BEAMS TWO APERTURE EMBODIMENT

Figure 30:
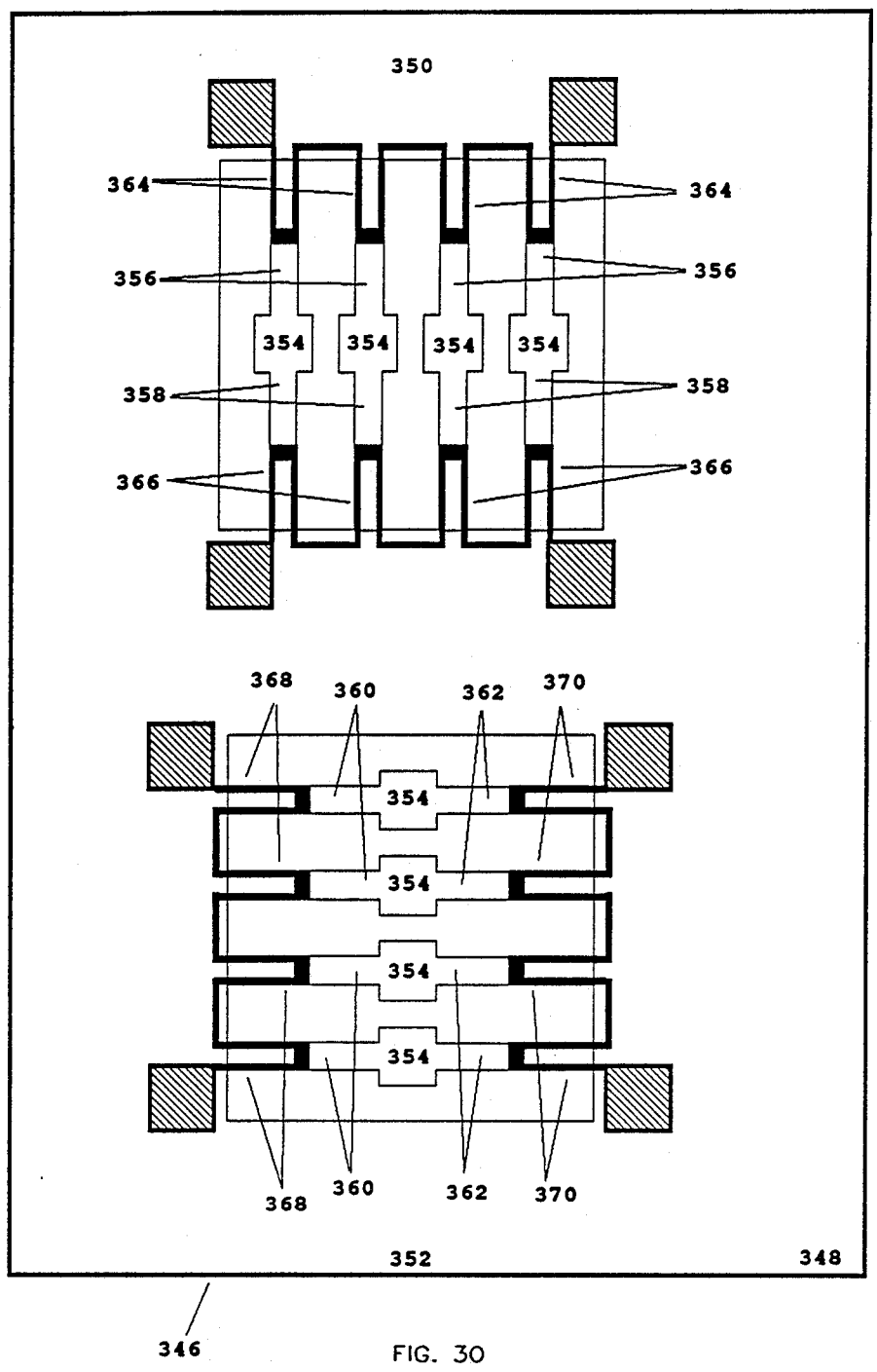
FIG. 30 is a top view of the Multiple Beam Two Aperture Force Sensor Embodiment.

Referring to FIG. 30, shown is the top view of another embodiment of the present invention. Two arrays of beam resistor pairs 314 and 316 are formed within etched cavities 318 and joined by response elements 320. Corresponding beam piezoresistors 322, 324, 326, and 328 are connected together, and are contacted on the rigid frame 330.

BASIC OPERATION OF THE EMBODIMENT

The Multiple Beam Two Aperture Embodiment is designed for increased force measurement resolution by increasing the effective piezoresistive lengths. Dual beam structures are utilized for efficient packing of etched cavities. Two arrays of etched cavities are used, each with series combinations of resistors. One array contains piezoresistors 322 and 324 corresponding to R1 and R2 (310 and 314 respectively) of the Four Beam One Aperture Embodiment. An orthogonal array contains resistors corresponding to R3 and R4 (312 and 316 respectively) of the Four Beam One Aperture Embodiment.

8. Three Dimensional Five Beams Four Apertures Embodiment

Detailed Description of the Embodiment

A three dimensional arrangement of five beams is described. The beams respond to the force components applied to the response elements. The beams' responses to force applied to the response elements are sensed by capacitive or by resistive sensing elements described herein.

Figure 31:
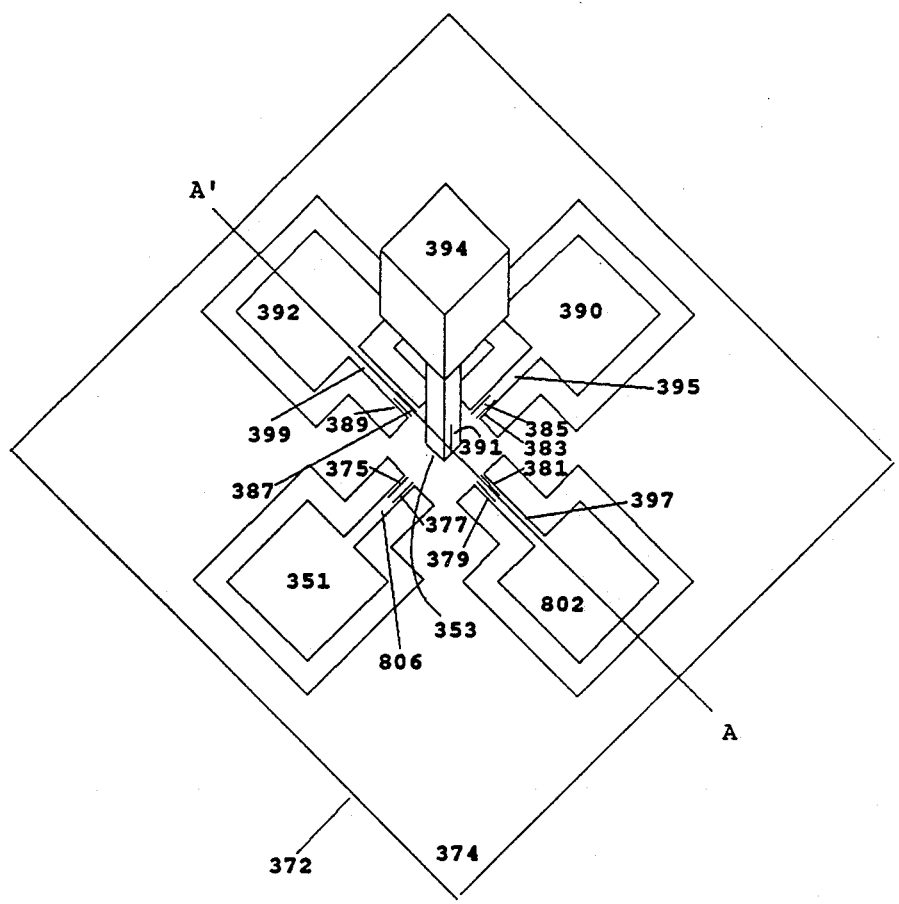
FIG. 31 is an oblique view of the main body of the Three dimensional Five Beam Four Aperture Force Sensor Embodiment.

FIG. 31 illustrates the Three Dimensional Five Beams Five Aperture embodiment 372. The main body 374 of the Three Dimensional Five Beams Five Aperture embodiment is comprised of four beams 806, 397, 395, and 399 which lie substantially in the same plane as the main body 374 when the sensor is not subjected to applied force. A fifth beam 353 attached to the center of the main body 374 is directed out of the main body's plane. The material of the main body and the beams may be of semiconducting material such as silicon and germanium, or of materials classified as quartz, glass, or ceramics. The attachment of the fifth beam 353 may be accomplished by silicon to silicon bonding with indium (Appendix F).

The response elements 351, 802, 390, 392, and 394 attached to the free ends of the cantilever beams 806, 397, 395, and 399, respectively, may be of the same materials used for the main body 374. The beams 351, 397, 395, and 395 and the response elements 351, 802, 390 and 392 are defined from the main body 374 using an anisotropic etchant. The fifth beam 353 and the associated response element 394 are defined and etched from a different substrate 396 and then mounted onto the main body 374. Supplemental materials such as gold may be mounted on the response elements 351, 802, 390, 392, and 394 to increase the response elements' sensitivity to force.

The sensing elements 375, 377, 379, 381, 383, 385, 387, and 389 are piezoresistors diffused into the surface of the p-type cantilever beams 806, 397, 395 and 399 are n-type. (p-type piezoresistors could be used instead of n-type). The piezoresistors are of opposite conductivity type from the main body 332. Alternatively, the sensing elements used could be capacitive in nature. For example, the "dual mode" capacitive sensing method described in Appendix A could be used in place of the piezoresistors. A description of the method of resolving the force components is presented next.

BASIC OPERATION The basic operation is similar to the five beam coplanar embodiment. Piezoresistive sensing elements are employed. Two off axis piezoresistors are attached to each of the four coplanar beams 806, 397, 395, and 399, as for the five beam five aperture coplanar embodiment described above. The fifth beam oriented substantially normal to the said four coplanar beams has a single piezoresistor sensing element. The device is analyzed in substantially the same manner as the five coplanar beam device using a sensitivity matrix and its inverse. One or more of the piezoresistors may be replaced by dual capacitor mode sensing elements. And, dual capacitor modes sensing elements can be used simultaneously with the piezoresistive sensing elements. The use of the device is similar to the use of the five coplanar beam embodiment. Here the use of the nonplanar direction can be made to affect the symmetry of the device in a beneficial way.

Figure 32A:
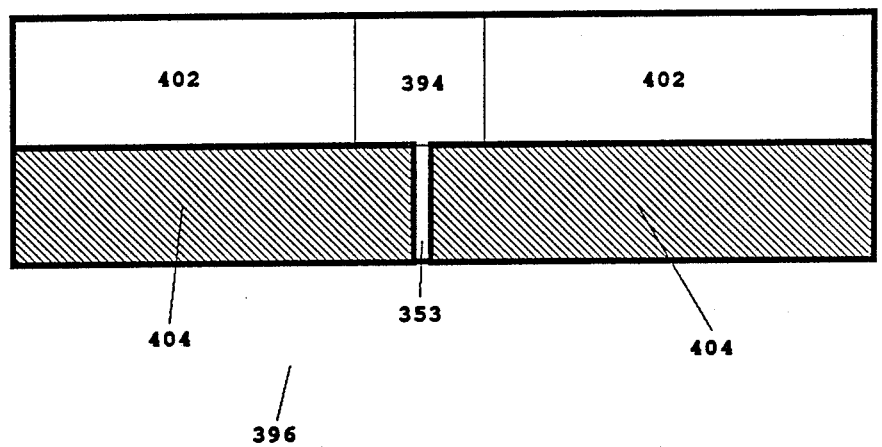
FIG. 32a is a cross sectional view of the vertical beam an its response element of the Three Dimensional Five Beam Four Aperture Force Sensor Embodiment taken at AA' in FIG. 31 and illustrating definition fabrication of the vertical beam.
Figure 32B:
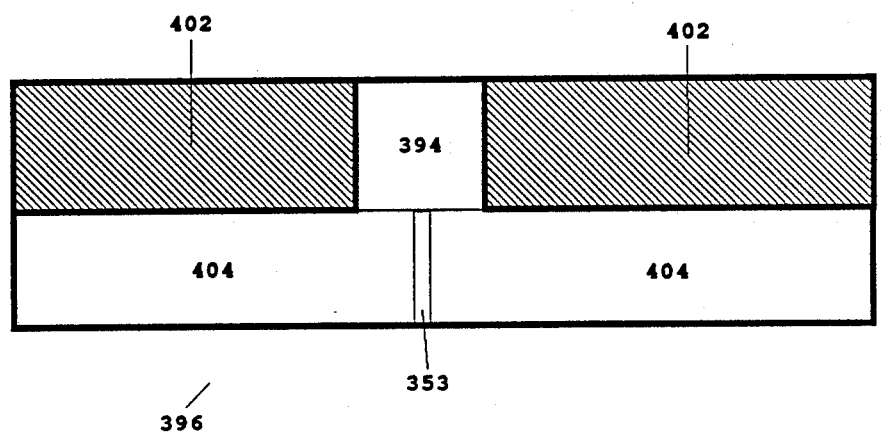
FIG. 32b is a cross sectional view of the vertical beam and its response element of the Three Dimensional Five Beam Four Aperture Force Sensor Embodiment taken at AA' in FIG. 31 and illustrating the fabrication definition of the response element.
Figure 33:
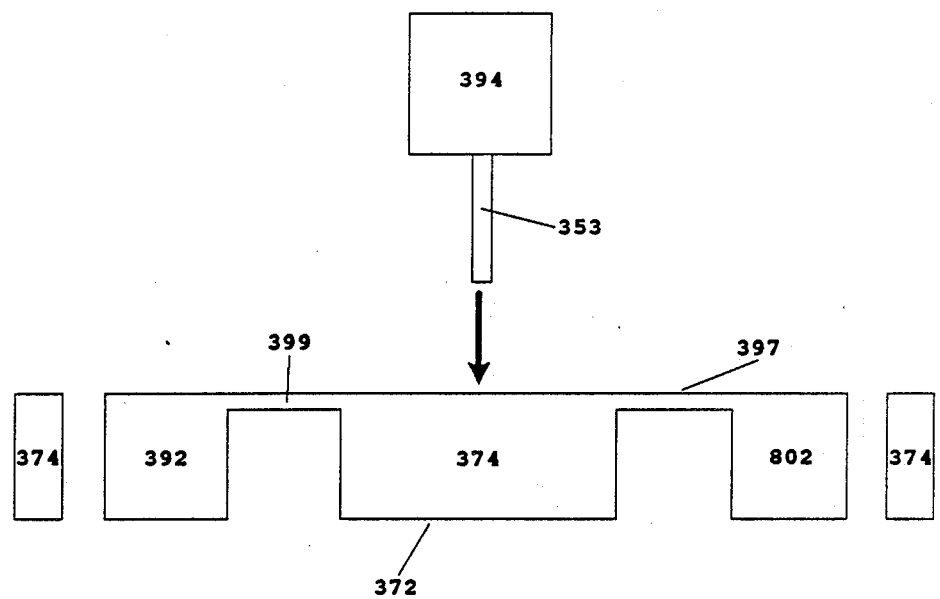
FIG. 33 is a cross sectional view of the main body of the Three Dimensional Five Beam Four Aperture Embodiment showing the vertical beam configuration.

Referring to FIGS. 31, 32a and 32b, fabrication of the device can proceed by partially etching a beam 353 normal to the surface of a first silicon wafer 396 by etching away substrate material 404, and fabricating one or more piezoresistors on the beam. Support material 402 for the response means remains. The first wafer 396 containing beam 353 is attached to the second wafer 374 on which the remaining four beams 806, 397, 395, and 399 have been defined. The two wafers can be attached to each other using indium (if silicon material is used for the body) which has been patterned to form contact pads for the piezoresistor of beam 353 and which interconnect to appropriate measurement circuitry or contact pads for external connection located on said wafer 2. The remaining support structure 402 is etched away on wafer 1 and defines a mass response element 394.

Monolithic three dimensional multiforce sensors can also be made and used. For example, the four beam single aperture embodiment consists of four beams and a shared inertial mass with a single mode capacitor sensing element. The shared mass can be viewed as a beam with the first beam coupled to the substrate via the capacitor electric field.

The use of ceramics and solgel processing technology is a convenient method of fabricating three dimensional embodiments multiforce sensors. Molds can be constructed such that a multiple beam three dimensional device can be fabricated. Similarly, a casing can be fabricated and assembled to house the multibeam force sensor. Capacitor plates placed on the response elements and on the appropriate plates and substrates of the casing could be used for sensing elements. Where the beam array can be made conducting, a convenient capacitor system is to ground the three dimensional beam array and to make the remaining capacitor plate electrical connections to the capacitor plates located on other substrates and on the casing.

Similarly, glass can be molded at high temperatures and placed in casings to form beams with capacitor sensing elements. Piezoresistive sensing elements can be formed using CVD silicon technology. Quartz can be etched to shape and assembled. Polymer three dimensional force sensors can also be made by forming the shape and incorporating appropriate substrates and casing.

DESIGN AND MEASUREMENT CONSIDERATIONS

Ill Conditioned Sensitivity Matrix: The Condition Number K

When more than one stimulus is to be sensed, e.g., more than one force component or more than one chemical (in the case of chemical sensing), more than one independent parameter must be measured. In general when N independent stimuli, e.g., force components, are to be measured, N sensor parameters must in general be measured and said N sensor parameters must have sufficient independence to allow the N unknown independent stimuli (forces in this example) to be determined. When the number of stimuli is large and when the sensor elements respond to multiple independent stimuli, then the individual influences on the sensor elements must be deconvolved. That is, the measurement data must be manipulated to provide the values of the stimuli to be measured. The example of the five beam five aperture force sensing device embodiment described above illustrates the concept. Each of the nine piezoresistors responds to a large number of independent force components.

The use of the sensitivity matrix S and its inverse as described above and in Appendix D provides a method for resolving out the various values of the force components from the sensor element measurements. However, this procedure however can add measurement error to the measurement of the force components. The measurement error associated with the determination of the force components can be larger than the measurement error associated with each sensor element. The preferred device embodiment usually maximizes resolution and minimizes error associated with force resolution (measurement). Related considerations are discussed in Appendices B, C and D. Design of the device can reduced the force measurement errors.

The condition number K provides an quantitative indication of the error introduced when using response elements which are sensitive to more than one stimuli, e.g., to more than one force component in the case of a force sensor, or to more than one chemical in the case of a chemical sensor. The condition number K provides a quantitative upper bound on the error which could be expected for a particular sensitivity matrix and therefore for the corresponding sensor design. That is, for a particular design, the error of measured force components should not be greater that a certain percentage which is characterized by the sensor element measurement error and the condition number K of the sensitivity matrix S.

This very useful feature of the condition number is discussed here by way of example for a force sensor. However, the concept extends to other sensors, in particular to chemical sensors. A discussion of the use of the condition number is given in Appendix E. The concept of the condition number is applied to certain embodiments described in this specification in Appendix C.

A number of considerations can be deduced from consideration of the condition number: 1. The sensor elements and response elements are to be selected to be responsive to the minimum number of independent stimuli; 2. Where the sensor element is influenced by more that one independent stimuli, it is usually preferable to select the sensor element or response element and embodiment design such that the sensor element is substantially sensitivity to one said stimulus with the sensitivities to the other stimuli minimized. Each sensor of the sensor array should be thus chosen.

The Three Beam Three Aperture embodiment (with the piezoresistors incorporated on the beams) is an example. With this embodiment independent measurement of three components of angular acceleration and an independent measurement of one of the components of centrifugal force (acceleration) are made with the remaining two components of centrifugal force being mixed. The S matrix is diagonal except for a two rows of a submatrix. The error in the force measurement in this embodiment is usually less than the error associated with the five beam embodiment using piezoresistive sensing elements assuming that the sensing elements have equal sensitivities.

Determination of Device Capability for Resolving Independent Force Components Where the intent is to simultaneously measure multiple force components in a single device, for successful and accurate application of the device it is necessary to insure that the sensor embodiment can separate the individual force components. This feature of a multiforce sensor can be characterized by inspection of the determinant of the sensitivity matrix S. Whether or not a sensor can measure all of the individual force components when many independent force components are present can be non-obvious when multiple sensor elements are present and were some of sensor elements are responsive to a multiple of said independent force components. In this latter case the sensitivity matrix S is non-diagonal. If the determinant of the S matrix is zero, the sensor is unable to successfully measure all of the force components simultaneously when all of said force components are present.

When the determinant of the sensitivity matrix S is non-zero, the sensor described by said S matrix is able to simultaneously provide some measure of all the independent force components when all of the force components are simultaneously present.

Although the invention has been described with reference to certain preferred embodiments described in the accompanying drawings, the invention is not limited to those embodiments and various changes and modifications may be made by those skilled in the art without departing from the spirit or scope of the invention. Accordingly, no limitations are to be inferred except for those specifically set forth in the attached claims. Further, in the claims, "displacement" shall be deemed to mean and include "stress", "strain" and "deflection", and "mounted" shall mean and include "diffused." Also, a response element mounted at an intermediate location on a beam shall be deemed to be equivalent to a response element with two beams attached to it. A beam shall be deemed to be projecting in a direction if the beam is projecting in that direction at the point where the beam is attached to a main body or a post. An electrical signal shall be deemed to include a change in current, voltage, capacitance, resistance or inductance. Finally, "Housing" shall be deemed to mean and include casing and "substrate."

APPENDIX A

Description of the Capacitive Sensing Methods and Elements

A preferred embodiment of the present invention is shown in FIG. 1 and is one of the embodiments described in this patent. The embodiments are characterized as having one or more flexible beams coupled to response elements and sensing elements. One type of sensing method used with the embodiments of the present inventions is based on capacitive plate displacement effects. Single mode, dual mode and trimode sensors are described herein together with finger shaped capacitor plates and capacitor plates of other geometric shape which can provide advantageous sensing elements.

There are three general approaches to capacitive sensing utilized in the present inventions. The Single Mode Capacitive Sensing method exploits the dependance of capacitance on the distance separating two conducting plates forming a capacitor structure. The single mode capacitor plate is represented in FIG. 34. The Dual Mode Capacitance Sensing method exploits the dependance of capacitance on the overlapping area of conducting plates forming a capacitor system which is made up of multiple capacitors. The dual mode capacitor is represented in FIG. 36. A special case of the dual mode capacitor sensing element is a two plate capacitor with the capacitor plates only partially overlapping in the absence of applied force and with the overlap changing when force is applied. The third capacitor sensing element described consists of four capacitor plates and is a combination of single mode and dual mode capacitors and is represented in FIGS. 12 and 13.

Referring to FIG. 34, the Single Mode Capacitive Sensing Element 428 consists of a cantilever beam 432 supporting a response element 434. The cantilever beam 432 is attached to a support structure 433. The structure is mounted on a substrate 430. The single capacitor consists of two electrodes 436 and 438 shown in FIG. 34. The electrode 436 is mounted beneath the response element 434 in close proximity to the complementing electrode 438 mounted on the substrate 430.

The force components act on the response element 434 to deflect the cantilever beam 432 and the response element 434. The displacement is proportional to the force components and this moves the electrode 436 of the capacitor mounted beneath the response element. The displacement of the electrode 436 relative to electrode 438 mounted on the substrate is sensed by measuring the capacitance changes induced by the displacement of the electrode 436.

Referring to FIG. 35, the substrate electrode 438 is constructed to be larger than the response element electrode 436 when the supporting cantilever beam may be of a cross section that allows for significant lateral (X) movement of the response element as well as Z displacement. Lateral force components displacing the response element in the X direction will not have a significant effect on the capacitance between electrodes 436 and 438. Substantially only the Z component of displacement will be measured. Alternatively, the supporting cantilever beam can be constructed with a cross section such that significant deflection can only occur along the Z axis. In the latter case, a structure responsive to Z axis directed force components (and essentially insensitive to X or Y axis directed forces) can use electrodes of the same area with either overlapping or partially overlapping plates.

A Dual Mode Capacitance Sensing Element 440 is shown in FIGS. 36 and 37. The dual mode capacitors consist of two capacitors $C_A$ and $C_B$ comprised of three conductive plates 448, 452, and 450. Conductive plates 448 and 452 comprise one capacitor $C_A$ and the conductive plates 448 and 450 comprise a second capacitor $C_B$. Multiple capacitor plates are used to increase the sensitivity. The electrode 448 is mounted beneath the response element 434 and the electrodes 452 and 450 are mounted onto the substrate 442.

If multiple sensing elements are placed on the same beam, for example, to minimize the number of beams necessary, the various sensing elements must have some "independent" features in order to allow resolution of independent force components. The sensing elements should be sufficiently independent if there is at least one direction in which displacement of the beam will cause the sensing elements to react differently.

When multiple sensing elements are placed on the same beam, independent response requires that each sensing element respond differently to at least one force component. Independent response is achieved with the dual mode capacitor sensor and with the trimode capacitor sensor. FIGS. 38 and 39 illustrate that lateral movement (in the negative X direction) of the response element 434 relative to the substrate 442 results in a decrease in the capacitance $C_A$ due to a decrease in the overlap area $A_A$ 455 of the electrode pair 448 and 452. A corresponding increase in the capacitance $C_B$ results due to an increase in the overlap area $A_B$ 453 of the electrode pair 448 and 450.

In contrast, a vertical force acting on the response element 434 changes the separation distance d between electrodes 448 and 452 and the separation d between electrode 448 and 450 by equal amounts $\Delta d$. In this case, the percentage capacitances change in $C_A$ and $C_B$ are equal and related to the Z directed displacement of the response element 434.

Referring to FIG. 39, a change in the electrode separation is given by $\Delta d$ and or the change in the electrode overlap area is given by $\Delta A$. The displacements $\Delta d$ and change in overlap area $\Delta A$ can be determined by measuring the capacitance changes in $C_A$ and $C_B$. Directionality of the response element displacement can be measured. The displacements $\Delta d$ and $\Delta A$ are functions of the force components. A quantitative analysis relating the force and the displacement components is presented.

Directionality of the response element displacement is determined for the capacitance values $C_A$ and $C_B$. The measured capacitance values $C_A$ and $C_B$ are compared with the reference values $C_{AO}$ and $C_{BO}$ which are measured in the absence of applied force, or in the presence of a known applied force such as the force of gravity. Response element displacement magnitude and direction can also be determined using capacitor plates of non-rectangular geometry such as those shown in FIGS. 40 (458 and 460) and 41 (458 and 462).

The conductive plate geometry can also be used to create a particular power dependence, i.e., non-linearity of capacitance change on the beam displacement, or the force, to provide useful electrical nonlinearities. Such nonlinearities can be used to compensate for the nonlinear relationships between acceleration and strain, to measure ac components of force via harmonic operation of a signal derived utilizing capacitances, or for other useful purposes.

The capacitance change can be determined by measuring the capacitance directly, by measuring a related "RC" time constant, by measuring the frequency of a relaxation oscillator, or by using another sensing circuit where the electrical behavior of a sensing circuit is altered in a measurable way by a force induced capacitance change.

To increase the sensitivity for a force displacement of response element 446 can be advantageous to fabricate a series of interconnected stripe capacitor plates such as those shown in FIG. 42a and 42b. A stripe capacitor plate 468 is mounted on the response element 446. A pair of stripe capacitor plates 464 and 466 are mounted on the substrate. In FIG. 43, the top view of the stripe capacitor plates illustrates the offset of the capacitor plates from each other due to the application of force on the response element. For example, for a lateral movement of the response element 446 of 1.5 micron for strip 468 width of 10 microns causes approximately a 15% capacitance change where as a 1500 micron wide rectangular capacitor electrode 448 would result in approximately a change 1.0×10.2% capacitance change.

Stripe capacitors are preferably designed with the strip width and strip separation greater than the separation between capacitor plates of a capacitor to minimize fringing field effects.

CAPACITIVE SENSING (QUANTITATIVE TREATMENT)

Consider the conductive plates 448, 452, and 450 in FIGS. 36 and 37 where the conductive plates 450 and 452 in FIGS. 36 and 37 are located below the response element 434 supported by beam 444, and conductive plate 448 is located on the bottom of response element 434, and in this case, conductive plates 448, 452, and 450 are rectangular in shape. The capacitance $C_A$ between conductive plates 448 and 450 separated by a distance d and capacitance $C_B$ with conductive plates 448 and 452 separated by a distance d can (to a good approximation fringe fields are neglected in this case) be expressed in terms of the area of overlap of each capacitor, $A_A$ for capacitor $C_A$ and $A_B$ for capacitor $C_B$, respectively. That is, $$C_A = \frac{\epsilon_o A_A}{d} = \frac{\epsilon_o L(W_A + \Delta W)}{d_o + \Delta d} \quad (A.1)$$

$$C_B = \frac{\epsilon_o A_B}{d} = \frac{\epsilon_o L(W_B - \Delta W)}{d_o + \Delta d} \quad (A.2)$$

where $A_A$ is the area of electrode overlap of the conducting plates 448 and 450 for capacitor $C_A$ and $A_B$ is the area of electrode overlap for capacitor $C_B$. Here $W_A$ and $W_B$ are the width of the overlapping electrode areas and $\Delta W$ is the change in the width $W_A$ and $W_B$ (FIGS. 37 and 39) resulting from a force induced displacement of the response element 434. The separation d between the conducting capacitor plates 450 and 448 and between the conducting capacitor plates 452 and 448 is the same for both capacitors in this example. The applied force creates a difference between d and the value of d in the absence of force, i.e., $d_o$, or the value of d with a fixed reference or background force, i.e., $d_o$, the difference is $\Delta d$ and is identical for both $C_A$ and $C_B$ in this example.

Solving equations A.1 and A.2 for $\Delta d$ and $\Delta W$:

$$\frac{\Delta d}{d_o} = \frac{(C_{Ao} + C_{Bo})}{(C_A + C_B)} - 1 \quad (A.5)$$

$$\Delta W = \frac{\frac{C_{Bo}}{C_B} - \frac{C_{Ao}}{C_A}}{\frac{C_{Ao}}{C_A}\frac{1}{W_A} + \frac{C_{Bo}}{C_B}\frac{1}{W_B}} \quad (A.6)$$

If $W_A = W_B = W$ then $$\frac{\Delta W}{W} = \frac{\frac{C_{Bo}}{C_B} - \frac{C_{Ao}}{C_A}}{\frac{C_{Ao}}{C_A} + \frac{C_{Bo}}{C_B}} \quad (A.7)$$

Thus, a simple measurement of $C_{Ao}$ and $C_{Bo}$ and $C_A$ and $C_B$ provide $\Delta d$ and $\Delta w$. The change in electrode spacing $\Delta d$ is proportional to the vertically (z) directed force $F_z$ and $\Delta W$ is proportional to the horizontally (x) measured force $F_x$ in the linear regime.

The sign of $\Delta d$ and $\Delta W$ provide the direction of $F_x$ and $F_z$, respectively. Magnitudes of $\Delta d$ and $\Delta W$ provide the magnitude of $F_x$ and $F_z$, respectively. The sensing elements are interfaced with a measurement system as shown in FIG. 37 for the conversion of sensing element responses to outputs representative of the applied force components.

Similar analysis is easily performed for capacitor conducting plates of non-rectangular geometries and for striped geometries of appropriate design.

APPENDIX B

Calibration Discussion

The use of a sensor to measure force components requires knowledge of the quantitative relationship between applied force and the sensing element responses (S matrix elements), and the inverse of this relationship ($S^{-1}$). The relationship between a sensing element response and force may be calculated using the principals of mechanics and from the properties and dimensions of the materials. A relationship can also be determined using calibration techniques and in general this latter method is the preferred method of determining a relationship between sensor response and force for a device which is intended to be used to measure unknown forces.

For example, for a Three Beam Three Aperture force sensor designed to measure forces in the neighborhood of one G (the gravitation force pull of the earth), the device can be calibrated by orienting it in three orthogonal positions (with respect to the earth's gravitational field) and measuring the resulting responses of the sensor. That is, the mathematical relationships between force components and device response are determined (the sensitivity matrix is empirically determined). This information is then used to determine the relationship between device response and force so that any device response can be converted into a measure of the response inducing forces. Similarly, for a magnetic sensor, known magnetic fields of differing orientation and magnitude can be applied to the sensor and likewise used to characterize and calibrate the magnetic sensor. Similarly for an electric field sensor and for a sensor used to measure angular acceleration and for measurement of angular velocity.

In general, if there are N independent force components to which the sensor is responsive, a minimum of N independent (independent in the mathematical sense) calibration measurements must be made to fully characterize the device. Similar procedures apply to other multiarm force sensing embodiments.

While theoretical relationships and partially theoretical relationships can be used to characterize a device, small variations in device dimensions and in piezoresistors and in capacitor dimensions and in the material properties and in other parameters can introduce errors in the theoretical characterization of the sensors, whereas experimental calibration can often provide better sensor measurement accuracy. Since many useful embodiments of the devices exist, there may at times be advantages in combining theoretical and experimental device characterization techniques for certain embodiments. Since the accelerometer has a number of dimensions which in certain instances may be difficult to measure accurately and which may vary somewhat from device to device, by using the angular frequency squared as the acceleration parameter, the radius factor (distance from the center of the response mass to the center of rotation) in the centrifugal acceleration is lumped into the appropriate S matrix parameters which is measured using a calibration procedure as described in Appendix C. This avoids the necessity to try to measure said radium factor directly. Likewise, certain response features of the response elements can be included in the sensitivity matrix element measurements. Such response element parameters include the response mass values in the case of accelerometer applications and detailed descriptive parameters such as the magnetic moment of response element in the case of magnetic field sensing. That is, the calibration procedure, by determining the value of the S elements experimentally, conveniently allows the "effective force vector" to be represented in terms of convenient quantities such angular frequency (squared), angular acceleration (rads/sec$^2$) and fields such as electric, magnetic and gravitational fields for the appropriate multidimensional force sensor.

APPENDIX C

Example of Calibration Procedure for the Five Beam Five Aperture Embodiment

While the theoretical representation of a multibeam multiforce sensor is useful in establishing various important design features of an embodiment such as the ability of the embodiment to successfully resolve all of the independent force components acting upon the device, and the upper bound on the measurement error related to the ill-condition features of the sensitivity matrix S, the theoretical values of the sensitivity matrix necessarily depends upon material constants, device geometry and dimensions. These materials parameters and dimensions parameters are not necessarily accurately known or easily measured. For example, a high concentration of boron which can be present as a result of using resistivity etch stop technology can significantly affect important material parameters in a way which may be difficult to determine accurately using theory. While these features may affect the quantitative results of the theory, the essential features of the S matrix are still determined and are still thus useful for design purposes. However, for actual measurements applications of the sensor, to establish the actual values of the sensitivity matrix elements in a manner which incorporates details of the dimensions and material parameters, an experimental calibration procedure can be desirable and preferred in order to maximize accuracy.

The general approach used to calibrate multiple sensor multiple stimuli sensor devices is to introduce the independent stimuli in a controlled way and to measure the response of the sensor elements. Precise knowledge of the calibration force magnitudes and directions and precise measurement of the sensitivity proportionality constant, i.e., the appropriate S matrix element, relating the sensor element response to the particular force, directly affects the error introduced into the sensitivity matrix S. The inverse of S is used as described in Appendix B to convert the sensor responses resulting from the influence of the unknown forces to the determined values of the force components to be measured. By way of example, a five beam five aperture calibration procedure is presented.

The resistance changes in the N resistor values of the column matrix $\Delta R/R_o$ are equal to the sensitivity coefficient matrix S (N×N matrix elements) multiplied by the acceleration component vector A. The acceleration components are determined by multiplying the inverse of the sensitivity coefficient matrix by the resistance change vector. In the present example there are forces of three origins: linear acceleration, angular acceleration and centrifugal force (dependent on angular velocity squared). That is, there are nine independent components of acceleration and thus N=9 for this example. Since nine components of acceleration are to be resolved, i.e., measured, nine independent responses for each sensor element, e.g., piezoresistor, to each component of acceleration are required. The proportionality constants between the force component and a particular piezoresistor thus constitute a group of 9×9 constants which are the 9'9 matrix S. Thus, S describes the sensing features of the sensor device.

The following is an example of a calibration procedure for the five beam five cavity accelerometer embodiment. To determine the sensitivity coefficient $S_3$ (matrix element $S_{13}$) which describes the resistance change caused by a linear acceleration $a_z$ in the z-direction, the sensor is suspended horizontally such that the plane of the substrate surface and the longitudinal axis of the piezoresistor are directed perpendicularly to the direction of gravity. The measured resistance change is divided by 1 g to yield the calibrated value of $S_3$ in units of ohms/G.

To determine the sensitivity coefficient $S_2$ which describes the resistance change caused by an axial linear acceleration $a_y$ directed in the y-direction, the sensor can be suspended such that the longitudinal axis of the piezoresistor is parallel to the direction of gravity. The measured resistance change is divided by 1 g to yield the calibrated value of $S_2$.

To determine the sensitivity coefficient $S_1$ which describes the resistance change caused by a lateral linear acceleration $a_x$ directed in the x-direction, the sensor can be suspended such that the longitudinal axis of the piezoresistor is perpendicular to the direction of gravity and the plane of the substrate surface is parallel to the direction of gravity. The measured resistance change is divided by 1 g to yield the calibrated value of $S_1$.

The determination of the sensitivity coefficient $S_6$ which relates the resistance change to the square of the angular velocity $\omega_z^2$ about the z-axis may be accomplished by horizontally mounting the sensor to a rotating shaft of a motor such that the plane of the substrate surface and the longitudinal axis of the resistor are perpendicular to the direction of the longitudinal axis of the shaft. The longitudinal axis of the rotating shaft is parallel to the gravitational reference. The sensor is rotated about the z-axis at a constant angular velocity and the measurement of the resistance change is taken. The previously measured resistance change resulting from a gravitational reference $a_x$ acting on the response element and the cantilever beam oriented such that the longitudinal axis of the cantilever beam and the plane of the substrate surface are parallel to the direction of gravity is subtracted from the measured response resulting from the square of the angular velocity about the z-axis. The result is then divided by the angular velocity magnitude squared to yield the sensitivity coefficient $S_6$.

It is pointed out here that the centrifugal component of the acceleration is not expressed in Eqs. D.26 an acceleration, i.e., in units of cm/sec$^2$, but instead in terms of angular frequency squared (rad$^2$/sec$^2$) for rotation about the $i^{th}$ axis. This is done for convenience and because the angular frequency is often a parameter of interest to be measured. Since the accelerometer has a number of dimensions which in certain instances may be difficult to measure accurately and which may vary somewhat from device to device, by using the angular frequency squared as the acceleration parameter, the radius factor (distance from the center of the response mass to the center of rotation) in the centrifugal acceleration is lumped into the appropriate S matrix parameters which is measured using a calibration procedure as described in Appendix B. This avoids the necessity to try to measure said radius factor directly. Likewise, certain response features of the response elements can be included in the sensitivity matrix element measurements. Such response element parameters include the response mass values in the case of accelerometer applications and detailed descriptive parameters such as the magnetic moment of response element in the case of magnetic field sensing. That is, the calibration procedure, by determining the value of the S elements experimentally, conveniently allows the "effective force vector" to be represented in terms of convenient quantities such angular frequency (squared), angular acceleration (rads/sec$^2$) and fields such as electric, magnetic and gravitational fields for the appropriate multidimensional force sensor.

The sensitivity coefficient $S_5$ which relates the resistance change caused by rotating the cantilever beam about the y-axis at an angular velocity $\omega_y$ can by determined by mounting the sensor on the rotating shaft such that the longitudinal axis of the cantilever beam on which the piezoresistor resides is aligned with the longitudinal axis of the rotating shaft. The previously measured resistance change caused by a gravitational acceleration acting on the response element and the cantilever beam which was oriented in the direction of gravity is subtracted from the measured resistance change and then divided by the angular velocity magnitude squared to determine the sensitivity coefficient $S_5$ in rads$^2$/sec$^2$.

The sensitivity coefficient $S_4$ relates the resistance change to the angular velocity squared $\omega_x^2$ caused by rotating the cantilever beam about the x-axis. The resistance change caused by the angular velocity squared $\omega_x^2$ can be determined by mounting the sensor on a rotating shaft such that the longitudinal axis of the cantilever beam and the normal substrate surface are perpendicular to the longitudinal axis of the rotating shaft. The longitudinal axis of the rotating shaft is parallel to the direction of gravity. The previously measured resistance change caused by the gravitational acceleration acting on the cantilever beam and the response element oriented perpendicularly to the direction of gravity is subtracted from the measured resistance change resulting from the centripetal motion about the x-axis. The result is divided by the magnitude of the angular velocity squared $\omega_x^2$ yielding the calibrated value for the sensitivity coefficient $S_4$.

The sensitivity coefficients for the angular acceleration components can be similarly derived by calibration. For example, to measure the sensitivity coefficient $S_9$ which relates the resistance caused by angular acceleration about the z-axis, the sensor is mounted on a rotating shaft such that the plane of the substrate surface and the longitudinal axis of the cantilever beam containing the diffused piezoresistor is perpendicular to the direction of the longitudinal axis of the rotating shaft which is aligned along the direction of gravity. The measured resistance caused by the angular acceleration about the z-axis is subtracted by the previously measured resistance change caused by both the linear acceleration in the z-direction and the angular velocity about the z-axis. Procedures similar to those described previously can be used here to determine the sensitivity coefficients $S_7$ and $S_8$. Each piezoresistor can be calibrated in a manner similar to that described above.

In certain instances of calibration, the sensor elements response measurements may contain significant errors. For example, such errors may occur when the resistance change is very small compared to the nominal resistance measured values thus creating significant uncertainty in the value of the corresponding S matrix element. In certain cases, it is conceivable that the uncertainty in the matrix element may be greater than inaccuracies associated with the theoretically determined matrix element. In such a case, it may be advantageous to use the theoretical value of the matrix element in the S matrix.

USE OF THE THEORETICALLY DETERMINED SENSITIVITY COEFFICIENTS

The theoretical values of the sensitivity coefficient may serve several functions. Firstly, as stated above, the theoretical sensitivity coefficient may be used to replace an inaccurately calibrated sensitivity coefficient. Secondly, the theoretical expression of the sensitivity coefficient in terms of the dimensions and the material parameters of the piezoresistor, the cantilever beam, and the response element can be useful in designing and characterizing the sensor to insure that it meets certain desired performance criteria. Iterative design procedures can be used.

In certain instances, the sensor may be designed to yield large magnitudes of the sensitivity coefficients for the diagonal elements and small values of the off diagonal elements by the appropriate choice of device dimensions and material parameters and geometry. These relative values of the sensitivity coefficients result in general in reduced measurement error arising from the ill conditioned S matrix features. The large sensitivity coefficients yield large resistance changes in response to acceleration. The small sensitivity coefficients yield small resistance changes in response to acceleration. (The effects of the sensor element sensitivity to different force components and the effects on overall sensor device measurement error is discussed further in Appendix E).

Thirdly, and importantly, the determinant of the sensitivity matrix S is a direct indication of whether or not all of the forces which are linked to the sensor elements can be independently resolved. If the determinant of the S matrix is zero, the set of all independent force components can not all be independently resolved using the multidimensional force sensor embodiment characterized by the sensitivity matrix S.

The theoretical values of the sensitivity coefficients are determined in the present example by incorporating the acceleration-induced stress distribution into the appropriate equations which relate the change in resistance to the stress components via the piezoresistive coefficients. The stress distribution within the cantilever beam results from the force and the moment components caused by the acceleration. The force and moment components are related to both the linear and the rotational acceleration components (these are discussed in David Halliday and Robert Resnick's *Fundamentals of Physics*. John Wiley & Sons, New York, 1974 pp. 173–208, incorporation by reference is intended). Discussions herein concerning the stress distributions within the cantilever beam resulting from the force and the moment components are found in E. J. Hearn's *Mechanics of Materials*. Pergamon Press, Oxford, 1985, pp. 1–19, 41–138, and 154–173; Stephen Timoshenko and J. N. Goodier's *Theory of Elasticity*, McGraw-Hill Book Company, Inc., New York, pp. 1–54 and 213–341; and L. M. Roylance's "Miniature Integrated Circuit Accelerometer for Biomedical Applications." Ph.D. Dissertation, Stanford University, Nov. 1977, pp 47–129 (incorporation by reference is intended). Discussions of the piezoresistive effect and the relationship between the stress components and the change in resistance are found in L.M. Roylance's "Miniature Integrated Circuit Accelerometer for Biomedical Applications," Ph.D. Dissertation, Stanford University, Nov. 1977, pp. 7–16 and 47–52; Donald R. Kerr's "Theory and Applications of Piezoresistance of Diffused Layers in Silicon and Germanium," Ph.D. Dissertation, Carnegie Institute of Technology, Pittsburgh, Penn., pp. 3–33; and W. P. Mason and R. N. Thurston's "Use of Piezoresistive Materials in the Measurement of Displacement, Force, and Torque," J. Acoust. Soc. Am. 29, no. 10, October 1957, pp. 1096–1101 (incorporation by reference is intended).

By way of example, the theoretical expression of the sensitivity coefficients is derived using the above theoretical S matrix and used to illustrate the usefulness of the method using the five beam five aperture embodiment, and also for the purpose of outline the general theoretical procedure used to analyze multibeam structures.

APPENDIX D

Quantitative Analysis of Five Beam Five Aperture Embodiment

An analytical representation of a multidimensional force sensor is useful for aiding in the design of particular performance features such as sensitivity. The theoretical representation of the sensitivity matrix S provides additional useful design information. The responsiveness of the individual sensor elements to multiple forces is represented in terms of the sensor matrix elements. The determinant of the sensor matrix S is a direct indication of whether or not the collection of beams and response elements can provide independent measurement of all of the independent forces present. A determinant of zero indicates that all of the individual force components can not be simultaneously resolved. A non-zero determinant indicates that a simultaneous resolution, i.e., measurement, of all of the independent force components can be made. The magnitude of the determinant and other parameters related to S indicates how precisely the independent force components can be simultaneously measured. The condition number K (discussed in Appendix E) provides an upper bound on the measurement error associated with the measurement of the unknown force components.

For the example discussed here, the sensor elements are piezoresistors, and the sensor device is intended to measure nine independent force components, that is, three orthogonal components of angular acceleration, three orthogonal components of centrifugal force (acceleration) and three orthogonal components of linear acceleration simultaneously. Stress sensitive resistors, i.e., piezoresistors convert the acceleration-induced components of linear and angular stress into a proportional electrical signal. The components of linear and rotational (rotational is here intended to refer to both angular acceleration and linear acceleration) acceleration can be calculated from a sufficient number of piezoresistor responses.

The physical interpretation of the piezoresistive effect involves a discussion of the transport process in semiconductors. Factors such as crystalline orientation, temperature, and dopant concentration are known to affect the magnitude of the piezoresistive effect. These effects are all incorporated in the measured phenomenological piezoresistive coefficients. A quantitative analysis of the five beam five aperture embodiment with piezoresistive sensing elements is presented here to provide an analytical evaluation of the device sensitivity matrix S arising from the sensitivity of the piezoresistors the applied nine independent force components described above.

The change in resistance also depends on the stress distribution within a cantilever beam. The stress distribution resulting from the acceleration components is analyzed in Appendix D using elementary bending theory. The results of that theory are incorporated here in the analysis of the piezoresistor responses to the applied forces. Together with the quantitative analysis of the piezoresistive coefficient, the accelerometer's response to acceleration is theoretically predicted. With this theoretical model, the accelerometer's dimension's can then selected to help optimize the device design. The results of the theory are used to illustrate certain design features relating to the sensitivity matrix S in Appendix D and how the S matrix is used in design applications.

QUANTITATIVE ANALYSIS OF FIVE BEAM FIVE APERTURE EMBODIMENT

List of Symbols $R_o$ Nominal resistance value $\delta \Delta AR$ Error in the measured resistance change vector $\oplus S$ Error in the sensitivity coefficient matrix $\oplus A$ Error in the acceleration vector k Condition number $\alpha$ Angle between the longitudinal axis of cantilever beam V and the z-axis m On-axis mass M Off-axis mass $A_{CB}$ Cross sectional area of the cantilever beam $n_1$ Distance from the bottom of the cantilever beam to the neutral axis
V Bottom width of the cantilever beam
$\phi$ Angle between Beam I and Beam V in FIG. 19
$\zeta$ Twist angle of the cantilever beam in torsion
G Modulus of rigidity
$\beta$ Coefficient which depends on the ratio of the cantilever beam width to the cantilever beam thickness
$L_r$ Piezoresistor length
$z_r$ Average location of the piezoresistor along the z-axis
S Sensitivity coefficient
$S_9$ Sensitivity coefficient of the piezoresistor with its longitudinal aligned along the <110> direction
A Acceleration vector containing the nine components of acceleration
$\Delta R$ Change in resistance
T1 Response element thickness
T2 Response element width
T3 Response element length
$C_i$ Center of mass coordinate for the off-axis mass
$D_i$ Center of mass coordinate for the on-axis mass
$F_i$ Force acting on the end of the cantilever beam
$M_i$ Moment acting on the end of the cantilever beam
$a_i$ Linear acceleration
$\omega$ Angular velocity
$\alpha$ Angular acceleration
$r_d$ Radial distance from the response elements center of mass to the axis of rotation
$\psi$ Angle between the radial distance $r_{dx}$ and $r_{dz}$
E Young's modulus
I Area moment of inertia
$E_i$ Electric field component
$J_i$ Current density component
$\tau_{oij}$ Nonstressed resistivity tensor component
$\Delta\tau_{oij}$ Stress-induced resistivity change tensor component
$\pi_{ijkl}$ Piezoresistive coefficient
$T_{kl}$ Stress tensor component
$\sigma$ Normal stress component
$\tau_{kl}$ Shear stress component
R Resistance
$\tau_O$ Isotropic nonstressed resistivity
L Cantilever beam length
H Cantilever beam thickness
W Cantilever beam top width
$\epsilon_i$ Normal strain components
$\gamma_i$ Shear strain components
$B_{ij}$ Strain tensor component
$c_{ij}$ Compliance constants One embodiment of the multiarm force sensor (211) uses nine piezoresistors 224, 226, 228, 230, 232, 234, 236, 238, and 240 and five beams 214, 216, 218, 220, and 222 (FIG. 18). This embodiment is intended to simultaneously measure linear acceleration (force), angular velocity (centrifugal force), and angular acceleration (force). Thus there are nine independent force components. Stress sensitive piezoresistors convert the acceleration-induced components of linear and angular stress into an electrical signal which is proportional to stress in the linear regime. The centrifugal forces and angular accelerations (radians/sec$^2$) are lumped here under the term rotational forces, which is intended to here mean forces arising from rotational origins when the response elements are sufficiently independent. The components of linear and rotational acceleration can be calculated from a sufficient number of piezoresistor responses.

Factors such as crystalline orientation, temperature, and dopant concentration are known to affect the magnitude of the piezoresistive effect. The piezoresistive coefficients are thus temperature and dopant dependent. Temperature effects can be treated using suitable electronics and circuitry.

The change in resistance also depends on the stress distribution within the cantilever beam. The stress distribution resulting from the acceleration of a response mass can be determined using elementary beam bending theory. Together with the quantitative analysis of the piezoresistive coefficient, the accelerometer's response to acceleration can be theoretically predicted. The accelerometer's dimension's can then adjusted to target optimum performance during the design stage.

I. MATHEMATICAL REPRESENTATION OF THE PIEZORESISTIVE EFFECT

To first order approximation, the change in resistivity is expressed as a linear function of stress. The resistivity and the stress components can each described by a symmetric second rank tensor. The piezoresistive coefficient which relates the change in resistivity to the applied stress is a symmetrical fourth rank tensor. Crystalline symmetry simplifies the relationship between the change in resistivity, the stress components, and the piezoresistive coefficients. (For further discussion, refer to Donald R. Kerr, "Theory and Applications of Piezoresistance of Diffused Layers in Silicon and Germanium," Ph.D. Dissertation, Department of Electrical Engineering, Carnegie Institute of Technology, Pittsburgh, Penn., 1962, p. 15. Incorporation by reference is intended.)

The change in resistivity $\Delta\tau_{ij}$ is related to the stress components $T_{kl}$ by the piezoresistive coefficient $\pi_{ijkl}$.

$$\Delta\rho_{ij} = \sum_{kl} \pi_{ijkl} T_{kl}. \tag{D.1}$$

$T_{kl}$ are the stress components which form a second rank tensor.

Stress is defined as the force per unit area. Strain is defined as the deformation per unit length. Deflection or displacement is the movement of a reference point. Deflection is related to strain. Stress, strain, and deflection/displacement may all be used to characterize forces applied to the beam systems of the present invention. (A discussion on the definitions and the concepts of stress, strain, and deflection are found in E. J. Hearn's *Mechanics of Materials*. Pergamon Press, Oxford, 1985, pp. 1–26, . pp. 62–138 (incorporation by reference is intend.) The stress tensor consists of two types of components: the normal stress components $\sigma_{kl}$ and the shear stress components $\pi_{kl}$. The normal and shear stress components acting on an elemental cubic volume are shown in FIG. 45.

The change in resistivity and the stress components are related by the piezoresistive coefficients. In general, there are 81 different piezoresistive coefficients. The number of unique coefficients can be reduced to three piezoresistive coefficients for silicon oriented along the crystalline axes, and the matrix representation is $$\pi = \begin{bmatrix} \pi_{11} & \pi_{12} & \pi_{12} & 0 & 0 & 0 \\ \pi_{12} & \pi_{11} & \pi_{12} & 0 & 0 & 0 \\ \pi_{12} & \pi_{12} & \pi_{11} & 0 & 0 & 0 \\ 0 & 0 & 0 & \pi_{44} & 0 & 0 \\ 0 & 0 & 0 & 0 & \pi_{44} & 0 \\ 0 & 0 & 0 & 0 & 0 & \pi_{44} \end{bmatrix} \quad \text{(D.2)}$$

Equation (D.2) is obtained from C. S. Smith's, "Piezoresistance Effect in Germanium and Silicon," Phys. Rev., vol. 94, no. 1, pp. 42–49 (incorporation by reference is intended).

If the resistive bar of FIG. 46 is subject to all components of stress and the electric field $E_i$ is measured in the same direction as the current density component $J_j$, then the change in resistivity becomes:

$$\frac{\Delta \rho_{ij}}{\rho_o} = \pi_{11}\sigma_1 + \pi_{12}\sigma_2 + \pi_{12}\sigma_3. \quad \text{(D.3)}$$

The shear stress components do not appear in Eq. (D.3) because the piezoresistive coefficients for the shear stress components are theoretically zero when the measurement orientation is taken along one of the crystalline axes, as is the case in the present example.

FIGS. 58a and 58b show the cross sections of the cantilever beam. These figures are useful for analyzing the shear stresses in a cantilever beam. The beam orientations for the Five Beam Five Aperture embodiment are such that shear stresses are reported to be zero. Nevertheless, since the present invention is intended to cover embodiments where the beams may be oriented in any direction, including those directions which require consideration of the shear stresses, FIGS. 58a and 58b have been included for completeness. And for further discussion on the shear stress effects, refer to L.M. Roylance's "A Miniature Biomedical Applications," Ph.D. Dissertation, Stanford University, November 1977, pp. 47–129, Timoshenko and J. N. Goodier's Theory of Elasticity, 2nd ed., McGraw.Hill Book Company, Inc., New York, 1951, pp. 323–329, and S. Timoshenko and D. H. Young's, Strength of Materials, 4th ed., C. Van Nostrand Company, Inc., New Jersey, 1962, pp. 125–133. Incorporation by reference is intended.

The total change in resistance can be written as $$\frac{\Delta R}{R_o} = \frac{\Delta \rho_{ij}}{\rho_{oij}} + \frac{dL_B}{L_B} - \frac{dH_B}{H_B} - \frac{dW_B}{W_B} \quad \text{(D.4)}$$

where $L_B$ is the length, $H_B$ is the thickness, and $W_B$ is the width of the resistive bar illustrated in FIG. 47. The first term on the right hand side of Eq. (D.4) represents the piezoresistive effect. The last three terms of Eq. (D.4) represent dimensional changes to the resistive bar and can also be represented as strain quantities and are reasonably negligible in the present example. The effects of strain have been incorporated and the definition of the strain components are shown in FIG. 48 for completeness.

For the case where a normal stress component $\sigma_1$ is applied along a crystalline axis, the change in resistance is given as $$\frac{\Delta R}{R_o} = (\pi_{11} + c_{11} - 2c_{12})\sigma_1. \quad \text{(D.5)}$$

where $c_{11}$ and $c_{12}$ represent the effect of dimensional changes on the length, thickness, and width of the resistive bar.

II. THE STRESS DISTRIBUTION OF THE MASS-LOADED CANTILEVER BEAM

The stress distribution of the cantilever beam is derived to theoretically characterize the change in resistance associated with each component of acceleration. A simplified analysis of the stress distribution based on the elementary bending theory of cantilever beams is presented. The stress analysis of a single cantilever beam presented and can be logically extended to the other cantilever beams which comprise the rest of the accelerometer. The complete stress distribution of all cantilever beams combined with the analytical description of the piezoresistive effect to provide the total static piezoresistor response of the accelerometer to the components of acceleration.

The stress analysis of a single mass-loaded cantilever beam presented is representative of the stress distribution of the other cantilever beams. The cantilever beam of thickness H, width W, and length L shown in FIG. 49 is assumed to be massless for convenience and this is a reasonable approximation for beams which are thin compared to the response element cross section, which is the case in the present example. The response element loading the free end of the cantilever beam is split into two components (FIG. 50). The dimensions of the on-axis mass m are $H \times T_2 \times T_3$. The dimensions of the off-axis mass M are $(T_1 - H) \times T_2 \times T_3$. The center of mass coordinates of the on-axis mass are $(p_x, p_y, p_z)$. The center of mass coordinates of the off-axis mass are $(c_x, c_y, c_z)$ (FIG. 51).

The analysis of stress distribution in a cantilever beam caused by linear acceleration is discussed in L.M. Roylance's "A Miniature Integrated Circuit Accelerometer for Biomedical Applications," Ph.D. Dissertation, Stanford University, November 1977, pp. 47–129 and repeated here for completeness (incorporation by reference is intended).

Linear and angular acceleration of the response element creates inertial forces and moments which bend the cantilever beam. The response element of the cantilever beam in FIG. 49 has been replaced by a free body diagram composed of a set of equivalent force and moment vectors acting on the free end of the cantilever beam shown in FIG. 52. The reactive force and moment components created by linear acceleration acting on the response element are given by $$F_x = -(m + M)a_x \quad \text{(D.6a)}$$
$$F_y = -(m + M)a_y \quad \text{(D.6b)}$$
$$F_z = -(m + M)a_z \quad \text{(D.6c)}$$
$$M_x = -M c_z a_y - (m p_y + M c_y)a_z \quad \text{(D.6d)}$$
$$M_y = -M c_z a_x + M c_x a_z \quad \text{(D.6e)}$$
$$M_z = -M c_x a_y + (m p_y + M c_y)a_x \quad \text{(D.6f)}$$

where $F_i$ and $M_i$ are the force and moment components, respectively, and $a_i$ are the components of linear acceleration shown in FIG. 53.

The force and moment components developed as a result of rotational motion derived if the components of angular acceleration (which includes centrifugal force in this usage) are converted to the components of linear acceleration. The angular acceleration includes the normal, i.e., radial components $\omega_i^2$ (centrifugal force component) and the tangential acceleration component $\alpha_i$. Linear acceleration a is the product of the normal component of angular acceleration $\omega^2$ and the radial distance of the radial distance from the response element's center of mass to the axis of rotation $r_d$.

$$a = \omega^2 r_d. \quad \text{(D.7)}$$

(A discussion of rotational kinematics is found in David Halliday and robert Resnick's *Fundamentals of Physics.* John Wiley & Sons, Inc., 1974, pp. 173–182. Incorporation by reference is intended.)

The reactive force and moment components created by the normal components of angular acceleration $\omega_i^2$ acting on the response element are shown in FIG. 54 and given by $$F_z = M \omega_x^2 r_{dx} \sin\psi + M \omega_y^2 r_{dy} \quad \text{(D.8a)}$$
$$F_y = (m + M)\omega_z^2 r_{dz} + m \omega_x^2 r_{dx} + M \omega_x^2 r_{dx} \cos\psi \quad \text{(D.8b)}$$
$$F_x = 0 \quad \text{(D.8c)}$$
$$M_z = 0 \quad \text{(D.8d)}$$
$$M_y = 0 \quad \text{(D.8e)}$$
$$M_x = -M c_y \omega_y^2 r_{dy} + M c_z \omega_z^2 r_{dz} - M c_y \omega_x^2 r_{dx} \sin\psi + M c_z \omega_x^2 r_{dx} \cos\psi. \quad \text{(D.8f)}$$

where the angle $\psi$ is defined as the angle between the radial vectors shown in FIG. 55.

$$\psi = \tan^{-1}\left(\frac{r_{dz}}{r_{dy}}\right). \quad \text{(D.9)}$$

In a similar manner, the reactive force and moment components created by the tangential component of angular acceleration $\alpha_i$ (rad/sec$^2$) acting on the response element are given by $$F_z = m \alpha_x r_{dx} + M \alpha_x r_{dx} \cos\psi \quad \text{(D.10a)}$$
$$F_y = -M \alpha_x r_{dx} \sin\psi \quad \text{(D.10b)}$$
$$F_z = -m \alpha_z r_{dz} - M \alpha_z r_{dz} + M \alpha_y r_{dy} \quad \text{(D.10c)}$$
$$M_z = -m p_y \alpha_z r_{dz} + M c_y \alpha_y r_{dy} - M c_y \alpha_z r_{dz} \quad \text{(D.10d)}$$
$$M_y = -M c_z \alpha_z r_{dz} - M c_z \alpha_y r_{dy} \quad \text{(D.10e)}$$
$$M_z = -m p_y \alpha_x r_{dx} - M c_y \alpha_x r_{dx} \cos\psi - M c_x \alpha_x r_{dx} \sin\psi \quad \text{(D.10f)}$$

The force and moment components due to angular acceleration $\alpha_i$ (rad/sec$^2$) are shown in FIG. 56.

The stress components due to each force and moment component is calculated next. The principle of superposition is used to combine the stress components resulting from each force and moment component to determine the total stress distribution. Elementary bending theory is used to determine the stress components. This theory relies on a number of assumptions found in E. J. Hearns', *Mechanics of Materials,* Pergamon Press, Oxford, 1985, pp. 63–64 (incorporation by reference is intended). The assumptions are enumerated below:

(1) The beam is initially unstressed.
(2) The beam material is isotropic and homogeneous.
(3) Stresses in the beam do not exceed the elastic limit.
(4) Young's modulus E is the same in tension and compression.
(5) The cross sections remain planar before and after bending.
(6) Every cross section of the beam is symmetrical about the neutral axis.
(7) There is no resultant force perpendicular to any cross section.

The stress components of the cantilever beam subject to a vertical force $F_z$ acting on the free end are found in S. Timoshenko and J. N. Goodier, *Theory of Elasticity,* 2nd ed., McGraw-Hill Book Company, Inc., New York, 1951, p. 35 and S. Timoshenko and D. H. Young, *Elements of Strength of Materials* 4th ed., Van Nostrand Reinhold Company, New York, 1962, pp. 125 –133 (incorporation by reference is intended). The stress components of the cantilever beam subject to a force $F_z$ shown in FIG. 57 are:

$$\sigma_{xx} = 0 \quad \text{(D.11a)}$$
$$\sigma_{yy} = -\frac{F_z(L - y)z}{I_x} \quad \text{(D.11b)}$$
$$\sigma_{zz} = 0 \quad \text{(D.11c)}$$

where $I_i$ is the area moment of inertia about the neutral axis i and L is the length of the cantilever beam.

The stress distribution of the cantilever beam subject to an axial force $F_y$ acting on the centroid of the free end of the cantilever beam shown in FIG. 59 is given as $$\sigma_{xx} = 0 \quad \text{(D.12a)}$$
$$\sigma_{yy} = \frac{F_y}{A_{CB}} \quad \text{(D.12b)}$$
$$\sigma_{zz} = 0 \quad \text{(D.12c)}$$

where $A_{CB}$ is the cross sectional area of the cantilever beam. The result of an axial force acting on the free end of the cantilever beam is either a compressive or tensile stress.

The stress distribution of the cantilever beam subject to a lateral force $F_x$ can be derived analogously to the stress derived for a vertical force $F_z$. The stress distribution within the cantilever beam shown in FIG. 60 is given as $$\sigma_{xx} = 0 \quad \text{(D.13a)}$$
$$\sigma_{yy} = -\frac{F_x(L - y)x}{I_z} \quad \text{(D.13b)}$$
$$\sigma_{zz} = 0 \quad \text{(D.13c)}$$

where $I_x$ is the area moment of inertia about the x-axis.

The stress components due to the bending moment $M_z$ acting on the free end of the cantilever beam shown in FIG. 61 are given as $$\sigma_{xx} = 0 \quad \text{(D.14a)}$$
$$\sigma_{yy} = \frac{M_z x}{I_z} \quad \text{(D.14b)}$$
$$\sigma_{zz} = 0 \quad \text{(D.14c)}$$

The bending moment $M_y$ produces torsion in the cantilever beam of FIG. 62. The stress components resulting from torsion take on considerable complexity and cannot be determined using the simple bending theory and are not included here. If the cross section of the cantilever beam is approximated to be rectangular, then the stress components are given as $$\sigma_{xx} = 0 \qquad (D.15a)$$

$$\sigma_{yy} = 0 \qquad (D.15b)$$

$$\sigma_{zz} = 0 \qquad (D.15c)$$

The stress distribution due to the bending moment $M_x$ is similar to the stress components caused by $M_z$ and is described by $$\sigma_{xx} = 0 \qquad (D.16a)$$

$$\sigma_{yy} = -\frac{M_x z}{I_x} \qquad (D.16b)$$

$$\sigma_{zz} = 0 \qquad (D.16c)$$

The cantilever beam subject to a moment $M_x$ is shown in FIG. 63.

The stress components presented describe the stress at particular points along the cantilever beam. The stress experienced by each piezoresistor is determined by averaging each stress component over the dimensions of the piezoresistor. The piezoresistive effect is predominant at the top surface of the cantilever beam where the dopant concentration of the piezoresistor is at its highest value. Hence, the z-coordinate in the stress equations is replaced by $$z = H - n_1 \approx \frac{H}{2} \qquad (D.17)$$

to represent the location of the piezoresistor on the top surface of the cantilever beam (FIG. 64). The stress components are also averaged over the length of the cantilever beam, i.e., $$\frac{\int_0^{L_r} (L-y)dy}{\int_0^{L_r} dy} = L - \frac{L_r}{2} \qquad (D.18)$$

where $L_r$ is the length of the piezoresistor shown in FIG. 65. The stress components are taken at the average position of the piezoresistor along the x-axis, i.e., $$x_r = \frac{\int_{x_1}^{x_2} x\,dx}{\int_{x_1}^{x_2} dx} = \frac{x_1 + x_2}{2} \qquad (D.19)$$

where $x_1$ and $x_2$ are the coordinates of the piezoresistor edge along the x-axis and $x_r$ is the average distance from the longitudinal axis of the cantilever beam to the longitudinal axis of the piezoresistor (FIG. 66).

The stress distribution within the piezoresistor is obtained by replacing x,y, and z coordinates in Eqs. (D.11)–(D.16) with the specific location of the piezoresistor described in Eqs. (D.17)–(D.19). Substituting the resulting equation with the equations describing the force and moment components, Eqs. (D.6)–(D.10), and rearranging in terms of the acceleration components, the stress components are as follows:

$$\sigma_{xx} = 0 \qquad (D.20a)$$

$$(D.20b)$$
$$\sigma_{yy} = \left( \frac{(m+M)(L - L_r/2)(H - n_1)}{I_x} + \right.$$

$$\frac{(m\,p_y + M\,c_y)(H - n_1)}{I_x} \bigg) a_z +$$

$$\left( -\frac{m+M}{A_{CB}} - \frac{M\,c_z(H - n_1)}{I_x} \right) a_y +$$

$$\left( \frac{(m+M)(L - L_r/2)x_r}{I_z} + \frac{(m\,p_y + M\,c_y)x_r}{I_z} \right) a_x +$$

$$\left( \frac{m+M}{A_{CB}} - \frac{M\,c_z(H - n_1)}{I_x} \right) \omega_z^2\, r_{dz} +$$

$$\left( -\frac{M(L - L_r/2)(H - n_1)}{I_x} + \frac{M\,c_y(H - n_1)}{I_x} \right) \omega_y^2\, r_{dy} +$$

$$\left( -\frac{M(L - L_r/2)(H - n_1)r_{dx}\sin\psi}{I_z} + \right.$$

$$\frac{(m\,r_{dx} + M\,r_{dx}\cos\psi)}{A_{CB}} + \frac{M\,c_y(H - n_1)r_{dx}\sin\psi}{I_x} -$$

$$\frac{M\,c_z(H - n_1)r_{dx}\cos\psi}{I_x} \bigg) \omega_x^2 +$$

$$\left( \frac{-(m+M)(L - L_r/2)x_r}{I_z} - \frac{(m\,p_y + M\,c_y)x_r}{I_z} \right) a_z\, r_{dz} +$$

$$\left( -\frac{M(L - L_r/2)x_r}{I_z} - \frac{M\,c_y\,x_r}{I_z} \right) a_y\, r_{dy} +$$

$$\left( \frac{(m\,r_{dx} + M\,r_{dx}\cos\psi)(L - L_r/2)(H - n_1)}{I_x} - \frac{M\,r_{dx}\sin\psi}{A_{CB}} + \right.$$

$$\frac{(m\,p_y\,r_{dx} + M\,c_y\,r_{dx}\cos\psi - M\,c_x\,r_{dx}\sin\psi)(H - n_1)}{I_x} \bigg) a_x$$

$$\sigma_{zz} = 0 \qquad (D.20c)$$

Using the stress components derived in this section, a set of linear equations expressing the change in resistivity for each piezoresistor due to the applied force components is written. These equations can be inverted to provide the force components when the force induced piezoresistance changes are known. In theoretically characterizing the device for design purposes, this relationship between piezoresistance and force is useful. The relationship is dependent upon device design, material properties, etc, as described above.

SENSITIVITY COEFFICIENTS

The stress components derived in the previous section are proportional to the acceleration components. The change in resistivity caused by the application of stress is expressed as a function of each acceleration component by combining Eqs. (D.5) and (D.20) and rearranging:

$$\frac{dR}{R} = S_1 a_x + S_2 a_y + S_3 a_z + S_4 \omega_x^2 + S_5 \omega_y^2 + S_6 \omega_z^2 + S_7 \alpha_x + S_8 \alpha_y + S_9 \alpha_z \quad \text{(D.21)}$$

where the sensitivity coefficients $S_i$ represents the change in resistance due to each acceleration component. The matrix elements $S_i$ are a measure of the sensitivity of the piezoresistors to the force components and are derived to be:

$$S_1 = \quad \text{(D.22a)}$$

$$\left( \frac{(m+M)(L - L_r/2)x_r}{I_z} + \frac{(m\, p_y + M\, c_y)x_r}{I_z} \right) \pi'$$

$$S_2 = \left( -\frac{m+M}{A_{CB}} - \frac{M c_x(H - n_1)}{I_z} \right) \pi' \quad \text{(D.22b)}$$

$$S_3 = \left( \frac{(M+m)(L - L_r/2)(H - n_1)}{I_x} + \frac{(m\, p + M\, c_y)(H - n_1)}{I_x} \right) \pi' \quad \text{(D.22c)}$$

$$S_4 = \left( -\frac{M(L - L_r/2)(H - n_1)\, r_{dx} \sin\psi}{I_x} + \frac{m\, r_{dx} + M\, r_{dx} \cos\psi}{A_{CB}} + \frac{M c_y(H - n_1) r_{dx} \sin\psi}{I_x} - \frac{M c_x(H - n_1) r_{dx} \cos\psi}{I_x} \right) \pi' \quad \text{(D.22d)}$$

$$S_5 = \quad \text{(D.22e)}$$

$$\left( -\frac{M(L - L_r/2)(H - n_1)}{I_x} + \frac{M c_y(H - n_1)}{I_x} \right) r_{dy}\, \pi'$$

$$S_6 = \left( \frac{m+M}{A_{CB}} - \frac{M c_z(H - n_1)}{I_x} \right) r_{dx}\, \pi' \quad \text{(D.22f)}$$

$$S_7 = \left( \frac{(m\, r_{dx} + M\, r_{dx} \cos\psi)(L - L_r/2)(H - n_1)}{I_x} - \frac{M r_{dx} \sin\psi}{A_{CB}} + \frac{(m\, p_y\, r_{dx} + M c_y\, r_{dx} \cos\psi - M c_x\, r_{dx} \sin\psi)(H - n_1)}{I_x} \right) \pi'. \quad \text{(D.22g)}$$

$$S_8 = \left( -\frac{M(L - L_r/2)x_r}{I_z} - \frac{M c_y x_r}{I_z} \right) r_{dy}\, \pi' \quad \text{(D.22h)}$$

$$S_9 = \left( \frac{(m+M)(L - L_r/2)x_r}{I_z} - \frac{(m\, p_y + M\, c_y)x_r}{I_z} \right) r_{dz}\, \pi' \quad \text{(D.22i)}$$

where $\pi'$ incorporates the effects of strain.

As discussed in the appendix discussing calibration considerations, the centrifugal force here is represented as the angular frequency term squared. A convenient aspect of the sensitivity matrix S is that the elements can be used to lump a number of response element parameters and other embodiment parameters which can result in a convenient measurement arrangement, etc. (See Appendix C.)

In general, there are three components of linear acceleration, three components of angular velocity representing centrifugal force), and three components of angular acceleration to be resolved. Nine "independent" sensor element responses are required to resolve all of the nine acceleration components. The nine independent responses are obtained in the nine piezoresistors which reside on the five cantilever beams ("independent" refers here to the linear algebra definition applying to a system of linear equations).

A pair of independent responses can be obtained from two piezoresistors residing on a surface of the cantilever beam (FIG. 20). The piezoresistors run along the sides of the cantilever beam. Piezoresistor 1 does not identically respond to all of the components of acceleration as piezoresistor 2. Thus piezoresistors 1 and 2 provide two independent responses to acceleration. For example, under positive vertical acceleration $a_z$, the piezoresistors are both in equal tension and hence increase by the same amount. However, for positive lateral acceleration $a_x$, the cantilever beam is bent sideways causing piezoresistor 1 to be in compression and piezoresistor 2 to be in tension. The resultant response is the resistance of piezoresistor 1 which increases by the same amount as the resistance of piezoresistor 2 decreases. In general, piezoresistor 1's and piezoresistor 2's response to $a_z$, $a_y$, $\omega_x^2$, $\omega_y^2$, $\omega_z^2$, and $\alpha_x$ are identical in this example. However, the symmetric location of piezoresistor 1 with respect to piezoresistor 2 about the cantilever beam's longitudinal axis results in piezoresistor 1's response to $a_x$, $\alpha_z$, and $\alpha_y$ being equal in magnitude but opposite in sign to piezoresistor 2's response.

The sensitivity coefficients for piezoresistors 3 and 4 on cantilever beam II are analyzed in a similar manner as described for piezoresistors 1 and 2 where the orthogonal orientation between cantilever beam I and II is taken into account. Piezoresistors 3's and 4's response to linear acceleration in the x-direction $a_x$ is identical to piezoresistor 1's and 2's response to linear acceleration in the y-direction $a_y$. Piezoresistors 3's and 4's response to acceleration in the y-direction $a_y$ is identical to piezoresistors 1's and 2's response to acceleration in the x-direction $a_x$.

The response to acceleration of piezoresistors 5 and 6 on cantilever beam III are analyzed in a similar manner to piezoresistors 1's and 2's response to acceleration by taking the 180° orientation difference between cantilever beam I and III into account. Similarly, piezoresistors 7's and 8's response to acceleration are analyzed in a similar manner to piezoresistors 1's and 2's response by taking the 270° orientation difference between cantilever beam I and IV into account.

Piezoresistor 9 on cantilever beam V is not aligned along the <100> axis. It is aligned along the <110> axis and therefore has a piezoresistive coefficient that is different from the other piezoresistors which lie along the <100> equivalent axes. The stress developed in cantilever beam V resulting from acceleration is different from the stress developed in the other cantilever beams because of the orientation of cantilever beam V. The change in resistance in piezoresistor 9's due to acceleration is expressed as:

$$\frac{\Delta R_9}{R_0} = S_1^9 a_x + S_2^9 a_y + S_3^9 a_z + S_4^9 \omega_x^2 + S_5^9 \omega_y^2 + S_6^9 \omega_z^2 + S_7^9 \alpha_x + S_8^9 \alpha_y + S_9^9 \alpha_z \quad (D.23)$$

where the nine $S_i^9$ sensitivity coefficients of piezoresistor can be written as:

$$S_1^9 = \left[\left(-\frac{(m+M)}{A_{CB}} - \frac{M c_z(H-n_1)}{I_x}\right)\cos\phi + \left(\frac{(M+m)(L-L_r/2)x_r}{I_z} + \frac{(mp+Mc_y)x_r}{I_z}\right)\sin\phi^p\right]\pi'' \quad (D.24a)$$

$$S_2^9 = \left[\left(\frac{(m+M)}{A_{CB}} - \frac{mc_z(H-n_1)}{I_x}\right)\sin\phi - \left(\frac{(M+m)(L-L_r/2)x_r}{I_z} + \frac{(mp+Mc_y)x_r}{I_z}\right)\cos\phi\right]\pi'' \quad (D.24b)$$

$$S_3^9 = \left(\frac{(M+m)(L-L_r/2)(H-n_1)}{I_x} + \frac{(mp+mc_y)(H-n_1)r}{I_x}\right)\pi'' \quad (D.24c)$$

$$S_4^9 = \left[\left(-\frac{M(L-L_r/2)(H-n_1)}{I_x} - u\frac{Mc_y(H-n_1)}{I_x}\right)r_{dx}\sin\psi + \left(\frac{u(mr_{dx}\cos\psi + mr_{dx})(L-L_r/2)x_r}{I_z}\right)u\cos d + u\left(\frac{mr_{dx} + mr_{dx}\cos r}{A_{CB}}\right)u\sin d + \left(\frac{Mc_z(H-n_1)r_{dx}\cos\psi}{I_x}\right)\sin\phi + \left(\frac{(mp r_{dx} + Mc_y r_{dx}\cos\psi)x_r}{I_z}\right)\cos\phi\right]\pi'' \quad (D.24d)$$

$$S_5^9 = \quad (D.24e)$$

$$\left[\left(-\frac{M(L-L_r/2)(H-n_1)}{I_x} - \frac{Mc_y(H-n_1)}{I_x}\right)r_{dy}\sin\psi - \left(\frac{(Mr_y\cos\psi + mr_{dy})(L-L_r/2)x_r}{I_z}\right)\sin\phi + \left(\frac{mr_{dy} + Mr_{dy}\cos\psi}{A_{CB}}\right)\cos\phi + \left(\frac{Mc_z(H-n_1)r_{dy}\cos\psi}{I_x}\right)\cos\phi - \left(\frac{(mp r_{dy} + Mc_y r_{dy}\cos\psi)x_r}{I_z}\right)\sin\phi\right]\pi'' \quad (D.24f)$$

$$S_6^9 = \left(\frac{b(m+M)}{A_{CB}} + \frac{Mc_z(H-n_1)r}{I_x}\right)r_{dz}\pi''$$

$$S_7^9 = \left[\left(\frac{(mr_{dx} + Mr_{dx}\cos\psi)(L-L_r/2)(H-n_1)}{I_z}\right) - \left(\frac{Mr_{dx}\sin\psi}{A_{CB}}\right)\sin\phi - \left(\frac{(Mr_{dx}\sin\psi)(L-L_r/2)x_r}{I_z}\right)\cos\phi - \left(\frac{(Mr_{dx}c_y x_r \sin\psi)}{I_z}\right)\sin\phi - \left(\frac{(mp r_{dx} + Mc_y r_{dx}\cos\psi + Mc_z r_{dx}\sin\psi\sin\phi)(H-n_1)}{I_x}\right)\right]\pi'' \quad (D.24g)$$

$$S_8^9 = \left[\left(\frac{(mr_{dy} + Mr_{dy}\cos\psi)(L-L_r/2)(H-n_1)}{I_x}\right) - \left(\frac{Mr_{dy}\sin\psi}{A_{CB}}\right)\cos\phi - \left(\frac{(Mr_{dy}\sin\psi)(L-L_r/2)x_r}{I_z}\right)\sin\phi - \left(\frac{Mr_{dy}c_y x_r \sin\psi}{I_z}\right)\sin\phi + \left(\frac{(mp_y r_{dy} + Mc_y r_{dy}\cos\psi + Mc_z r_{dy}\sin\psi\cos\phi)(H-n_1)}{I_x}\right)\right]\pi'' \quad (D.24h)$$

$$S_9^9 = \left(\frac{(m+M)(L-L_r/2)x_r}{I_z} + \frac{(mp+Mc_y)x_r}{I_z}\right)r_{dz}\pi'' \quad (D.24i)$$

The piezoresistive coefficient can be written as $$\pi'' = \{(\pi_{11}+\pi_{12}+\pi_{44})/2 + c_{44}/2 - c_{12}\} \quad (D.25)$$

if the angle $\phi$ between the longitudinal axis of cantilever beam I and the longitudinal axis of cantilever beam V is 45° (<110> orientation).

Using Eqs. (D.21) and (D.24), the total response to acceleration of the present example can be expressed in terms of the full sensitivity matrix:

$$\begin{bmatrix} \frac{\Delta R_1}{R_o} \\ \frac{\Delta R_2}{R_o} \\ \frac{\Delta R_3}{R_o} \\ \frac{\Delta R_4}{R_o} \\ \frac{\Delta R_5}{R_o} \\ \frac{\Delta R_6}{R_o} \\ \frac{\Delta R_7}{R_o} \\ \frac{\Delta R_8}{R_o} \\ \frac{\Delta R_9}{R_o} \end{bmatrix} = \begin{bmatrix} S_1 & S_2 & S_3 & S_4 & S_5 & S_6 & S_7 & S_8 & S_9 \\ S_1 & S_2 & -S_3 & S_4 & S_5 & S_6 & -S_7 & -S_8 & S_9 \\ S_1 & -S_3 & S_2 & S_4 & S_6 & S_5 & S_7 & -S_9 & S_8 \\ S_1 & S_3 & S_2 & S_4 & S_6 & S_5 & -S_7 & -S_9 & -S_8 \\ S_1 & -S_2 & -S_3 & S_4 & S_5 & S_6 & S_7 & -S_8 & -S_9 \\ S_1 & -S_2 & S_3 & S_4 & S_5 & S_6 & -S_7 & S_8 & -S_9 \\ S_1 & S_3 & -S_2 & S_4 & S_6 & S_5 & S_7 & S_9 & -S_8 \\ S_1 & -S_3 & -S_2 & S_4 & S_6 & S_5 & -S_7 & S_9 & S_8 \\ S_1^9 & S_2^9 & S_3^9 & S_4^9 & S_5^9 & S_6^9 & S_7^9 & S_8^9 & S_9^9 \end{bmatrix} \begin{bmatrix} a_x \\ a_y \\ a_z \\ \omega_x^2 \\ \omega_y^2 \\ \omega_z^2 \\ a_x \\ a_y \\ a_z \end{bmatrix} \quad (D.26)$$

To solve for the acceleration vector A, the inverse of the sensitivity coefficient matrix $S^{-1}$ is multiplied on both sides of Eq. (D.26), $$A = S^{-1} \left( \frac{\Delta R}{R_0} \right). \quad (D.27)$$

In the first example treated here it is assumed that all of the nine piezoresistors located on the five beams are identical. In this case, evaluating the S matrix elements and taking the determinant of the S matrix results in a zero value determinant. That is, the sensitivity coefficient matrix is found to be singular when all nine piezoresistors are made to be identical for the present beam geometry. This singular condition results from the fact that the response to $a_z$ cannot be distinguished from the response to $\omega_z$ in this particular case. This feature can be observed in the sensitivity coefficient matrix by noting that column 3 is proportional to column 6.

Column 3 and 6 can be made independent of each other by changing the length of the piezoresistor 1 which results in a change in the resistance and its functional dependence on the force. The sensitivity coefficients of piezoresistor 1 is represented by $S_i^*$. Incorporating the change in resistor length for piezoresistor 1, the sensitivity coefficient matrix now is found to have a nonzero determinant, i.e., it is now nonsingular.

$$\begin{bmatrix} \frac{\Delta R_1}{R_0} \\ \frac{\Delta R_2}{R_0} \\ \frac{\Delta R_3}{R_0} \\ \frac{\Delta R_4}{R_0} \\ \frac{\Delta R_5}{R_0} \end{bmatrix} = \quad (D.28)$$

-continued $$\begin{bmatrix} \frac{\Delta R_6}{R_0} \\ \frac{\Delta R_7}{R_0} \\ \frac{\Delta R_8}{R_0} \\ \frac{\Delta R_9}{R_0} \end{bmatrix}$$

-continued $$\begin{bmatrix} S_1^* & S_2^* & S_3^* & S_4^* & S_5^* & S_6^* & S_7^* & S_8^* & S_9^* \\ S_1 & S_2 & -S_3 & S_4 & S_5 & S_6 & -S_7 & -S_8 & S_9 \\ S_1 & -S_3 & S_2 & S_4 & S_6 & S_5 & S_7 & -S_9 & S_8 \\ S_1 & S_3 & S_2 & S_4 & S_6 & S_5 & -S_7 & -S_9 & -S_8 \\ S_1 & -S_2 & -S_3 & S_4 & S_5 & S_6 & S_7 & -S_8 & -S_9 \\ S_1 & -S_2 & S_3 & S_4 & S_5 & S_6 & -S_7 & S_8 & -S_9 \\ S_1 & S_3 & -S_2 & S_4 & S_6 & S_5 & S_7 & S_9 & -S_8 \\ S_1 & -S_3 & -S_2 & S_4 & S_6 & S_5 & S_5 & -S_7 & S_9 & S_8 \\ S_1^9 & S_2^9 & S_3^9 & S_4^9 & S_5^9 & S_6^9 & S_7^9 & S_8^9 & S_9^9 \end{bmatrix} \begin{bmatrix} q_x \\ q_y \\ q_z \\ \omega_x^2 \\ \omega_y^2 \\ \omega_z^2 \\ \alpha_x \\ \alpha_y \\ \alpha_z \end{bmatrix}$$

AREA

In Eq. D.28 the resistor length of piezoresistor 1 was changed to create a nonsingular sensitivity coefficient matrix. Other dimensional changes may be used to convert the singular sensitivity coefficient matrix to a nonsingular matrix. For example, if the cantilever beam thickness of cantilever beam I is different from the cantilever beam thickness of the other cantilever beams, then the resulting sensitivity coefficient matrix is nonsingular. Alternatively, a "dual mode" capacitive sensing element placed on the response mass 244 of beam 214 would also break up the symmetry.

A key to selecting the preferred design of the embodiment is to insure that there are nine independent sensing elements which is equivalent to a nonzero determinant of the sensitivity matrix.

Errors may still result in the resolution of the acceleration components even though the sensitivity coefficient matrix is nonsingular. Errors may originate from the measurement of the resistance changes and be compounded through the condition number features of S, as discussed in Appendix E, may arise from errors in the determination of the sensitivity matrix elements (which is usually preferable done using experimental calibration). The effect of such errors on the resolution of the acceleration components depends on the "condition" of the sensitivity coefficient matrix. The sensitivity coefficient matrix is said to be "ill-conditioned" if small perturbations in the nonsingular sensitivity coefficient matrix or in the measured resistance change vector creates relatively large errors in the resolved acceleration components. The sensitivity coefficient matrix is said to be "well-conditioned" if small errors in the sensitivity coefficient matrix or in the force-induced "measured" piezoresistance change column matrix result in small errors in the resolved acceleration components. An ill-conditioned matrix is a matrix that approaches a state of singularity whereas a well-conditioned matrix approaches a state of nonsingularity. The quantitative measure of the condition of the sensitivity coefficient matrix is presented in the next section.

In summary, the condition of the sensitivity coefficient matrix can be used to evaluate the design of the force sensor. The elements of the sensitivity coefficient matrix can be theoretically derived or they can be measured using calibration procedures. The determinant and the "condition number" of the sensitivity coefficient matrix can be used as an indication of independence between the responses of each sensing element. It is desirable to minimize the condition number of the sensitivity coefficient matrix to reduce the error in the resolved force components. The device geometry and architecture may be modified to reduce the condition number. The device dimensions may also be altered to reduce the condition number, e.g., the lengths of the piezoresistors can be made such that each resistor length is unique from each other.

APPENDIX E

Condition Number

In a multidimensional sensor, there are two types of sensor error: error introduced by the individual sensor elements, and error introduced by the process of resolving the force from individual components of the combined sensor element outputs. In this specification, measurement error shall be deemed to mean and include both types of error. Although error introduced by individual sensor elements cannot be reduced by the geometry or design of the multidimensional sensor, error introduced by resolving the individual components can be reduced by a geometry or design that minimizes the condition number (ill-condition factor).

The acceleration components are related to the resistance change by the sensitivity coefficient matrix:

$$\frac{\Delta R}{R_o} = S \cdot A \tag{E.1}$$

Measurement errors $\delta \Delta R/R_o$ contribute to perturbations in the data vector $\Delta R/R_o$. Errors in the acceleration component vector $\delta A$ result from perturbations in the experimentally or theoretically determined sensitivity coefficient matrix and in the data vector:

$$\left( \frac{\Delta R}{R_0} + \frac{\delta \Delta R}{R_o} \right) = (S + \delta S) \cdot (A + \delta A). \tag{E.2}$$

It can be shown that the relative error in the resolved acceleration components is bounded by:

$$\frac{\|\delta A\|}{\|A\|} \leq \frac{K}{1 - \frac{K\|\delta S\|}{\|S\|}} \left( \frac{\|\delta \Delta R/R_o\|}{\|\Delta R/R_o\|} + \frac{\|\delta S\|}{\|S\|} \right) \tag{E.3}$$

where A is the exact solution of the acceleration components, S is the theoretically calculated sensitivity coefficient matrix, $\Delta R/R_o$ is the change in resistance, $\delta A$ is the error in the resolved acceleration components, $\delta S$ is the difference between the actual and the theoretically calculated sensitivity coefficient, $\delta \Delta R/R_o$ is the error in measurement of the resistance change, and K is the condition number of the sensitivity coefficient matrix. The bound on the relative error in the solution is derived in E. Isaacson and B. H. Keller's Analysis of Numerical Methods, John Wiley & Sons, Inc., New York, 1966, pp. 37-38 (incorporation by reference is intended).

If the condition number K is small, the sensitivity coefficient matrix is said to be well conditioned since from Eq. (E.3), a small perturbation in the sensitivity coefficient matrix or in the data vector will result in small errors of the resolved acceleration components. If the condition number is large compared to unity, then from Eq. (E.3) small perturbations in the sensitivity coefficient matrix or in the data vector will result in large errors associated with the resolved acceleration components. The sensitivity coefficient matrix is then an ill-conditioned matrix. The condition number is defined to be:

$$K = \|S^{-1}\|_\infty \, \|S\|_\infty \tag{E.4}$$

where the row-sum norms have been used to define the condition number. The condition number is discussed in E. Isaacson and B. H. Keller's Analysis of Numerical Methods, John Wiley & Sons, Inc., New York, 1966, pp. 37-38 (incorporation by reference is intended).

Inspection of Eq. (E.3) indicates the error in solution of the acceleration components may be large if the condition number is large. Thus it is desirable to minimize the magnitude of the condition number K in order to obtain a precise resolution of the acceleration components. The condition number is reduced by adjustment of certain features of the sensitivity matrix S. The sensitivity coefficients of the sensitivity matrix are affected by the details of the design of the sensor device. Thus, the sensitivity matrix and the condition number should be considered in the design of a device with improved performance. The condition number is reduced by proper design of the accelerometer.

Ideally, the condition number is should be minimized to its lowest achievable value consistent with operation objectives such as sensitivity. Since the row sum norms are to be minimized and since the on-diagonal elements reflect the sensitivity of the sensor to the principal force component intended for that particular element, the off-diagonal S matrix elements are to be minimized. The conclusion drawn suggests that the lowest possible value is unity and this occurs when only on-diagonal elements are present in the S matrix, i.e., when all off-diagonal elements are zero, i.e., when each sensor element responds to one and only one response element. By designing each sensing element to be responsive to only one component of acceleration only on-diagonal elements are present. The next best case is to minimize the off-diagonal elements. By designing or choosing sensing elements such that the elements are sensitive to principally to the one force component for which the corresponding sensor element is intended, and of relatively minimum sensitivity to all other force components, the condition number can be reduced. When all of this is described in terms of matrix terminology, the above description of the best manner in which select sensing elements for a multiple stimulus sensor such as a multiple force sensor can be described as choosing sensing elements with relatively large on-diagonal matrix S matrix elements and a minimum number of off-diagonal elements, where the off-diagonal elements being minimized in value. That is, the sum of the norms of the off diagonal matrix elements should be made as small as is practical compared to the magnitude of the on diagonal elements. The resulting matrix is in general a group of square submatrices of $1 \times 1$ dimension or larger. The objective, described mathematically, includes making the dimension of the submatrices as small as possible and the number of $1 \times 1$ submatrices as many as possible, and of the remaining matrix, the dimension of the remaining submatrices as small as possible, and the off diagonal elements of the submatrices (with dimension greater than one) as small as possible consistent with the desired sensitivity represented by the on diagonal elements.

Analogously, the theoretically derived S matrix can be used to assist in the selection of the dimensions a geometry of a particular embodiment. In the case of a test prototype sensor device, the experimentally determined S matrix can be used to characterize important performance features of the device including measurement error features and degeneracy features.

For example, an accelerometer geometry shown in FIG. 67 is comprised of three mass-loaded cantilever beams with single capacitor sensing elements attached to each response element. Cantilever beam I (540) is dimensioned to be wide and thin whereas cantilever beam II (542) and III (544) are dimensioned to be narrow and thick. Ideally, the capacitor on the response element attached to cantilever beam I (540) only displaces in response to vertical acceleration (z-directed). The capacitor on the response element attached to cantilever beam II (542) only responds to linear acceleration along the y-axis and the capacitor on the response element attached to cantilever beam III (544) only responds to linear acceleration along the x-axis. For linear acceleration, the device response can be expressed in a matrix form shown below:

$$\begin{bmatrix} \frac{\Delta C_1}{C_{1o}} \\ \frac{\Delta C_2}{C_{2o}} \\ \frac{\Delta C_3}{C_{3o}} \end{bmatrix} = \begin{bmatrix} S_1 & 0 & 0 \\ 0 & S_2 & 0 \\ 0 & 0 & S_3 \end{bmatrix} \begin{bmatrix} a_x \\ a_y \\ a_z \end{bmatrix} \quad (E.5)$$

where the sensitivity coefficients $s_i$ represent the response to linear acceleration in the i-direction. Here the column vector on the right hand side of Eq. E.5 is the capacitor sensing element response to a particular acceleration column (vector) matrix indicated on the right hand side of the equation.

If the response of each capacitor sensing element (i.e., its sensitivity) to a unit of appropriately directed acceleration were identical (in general this is not the case), then the proportionality constants representing the sensitivities of each of the capacitor sensing elements would be the same, i.e., $$S_1 = S_2 = S_3. \quad (E.6)$$

The resolution of the acceleration components is obtained by multiplying the inverse of the sensitivity coefficient matrix with the resistance change vector. Thus, for the special case described here, one can write $$\begin{bmatrix} a_x \\ a_y \\ a_z \end{bmatrix} = \begin{bmatrix} S_1 & 0 & 0 \\ 0 & S_1 & 0 \\ 0 & 0 & S_1 \end{bmatrix}^{-1} \begin{bmatrix} \frac{\Delta C_1}{C_{1o}} \\ \frac{\Delta C_2}{C_{2o}} \\ \frac{\Delta C_3}{C_{2o}} \end{bmatrix} \quad (E.7)$$

In this case, the condition number of the sensitivity coefficient matrix is unity and small inaccuracies in the sensitivity coefficient matrix or in the measurement of the resistance changes will yield related small errors in the computation of the acceleration components. However, a potential increase in the measurement error above the magnitude indicated by the error associated with matrix element and each capacitor measurement should not occur (it could if off diagonal elements were present).

An example of the use of the condition number to optimize the beam cross section for a five beam five aperture embodiment is found in Appendix I.

APPENDIX F

Fabrication Description of Selected Embodiments

Fabrication procedures suitable for fabrication of selected embodiments are described in order to illustrated process techniques which may be used to fabricate the embodiments of the present invention. Semiconductor processing is well represented in the literature, and specific references for the major technologies will be given for convenience. A discussion of the thermal oxidation process is found in Stanley Wolf and Richard Tauber's "Silicon Processing for the VLSI Era," Lattice Press, Sunset Beach, 1986, pp. 198-241

(incorporation by reference is intended). A discussion of photolithographic methods is found in Stanley Wolf and Richard Tauber's "Silicon Processing for the VLSI Era," Lattice Press. Sunset Beach, 1986, pp. 407-513 (incorporation by reference is intended). A discussion of etching of silicon and other materials is found in Stanley Wolf and Richard Tauber's "Silicon Processing for the VLSI Era," Lattice Press, Sunset Beach, 1986, pp. 520-585 (incorporation by reference is intended). A discussion of diffusion in silicon is found in Stanley Wolf and Richard Tauber's "Silicon Processing for the VLSI Era," Lattice Press, Sunset Beach, 1986, pp. 520-585 (incorporation by reference is intended). A discussion of aluminum thin film deposition is found in Stanley Wolf and Richard Tauber's "Silicon Processing for the VLSI Era," Lattice Press, Sunset Beach, 1986, pp. 520-585 (incorporation by reference is intended).

In addition, several of the embodiments described utilize bonding of substrate or supplemental mass materials to the wafers or portion of wafers for casing or for support purposes. Silicon to silicon bonding may be effected by a low temperature alloying process or fusing process utilizing indium or other low melting point materials. The advantages of such a low temperature alloying process include simplicity, post processing suitability, electrical interconnects, etc. Silicon fusion bonding may also be used as reported by K. Petersen, et al, in "Silicon Fusion Bonding for Pressure Sensors", Solid-State Sensor and Actuator Workshop, IEEE Catalog No. 88TH0215-4, 1988 (144–147) (Incorporation by reference is intended). Glass to silicon bonding is an alternative technology for attaching a substrate to a wafer. Such bonding is reported in the literature by K. Albaugh in "Mechanisms of Anodic Bonding of Silicon to Pyrex Glass, Solid-State Sensor and Actuator Workshop, IEEE Catalog No. 88TH0215-4, 1988 (109–110) (Incorporation by reference is intended). And available adhesives may be used.

Features of a Fabrication Protocol for a Five Beam Five Aperture Embodiment

The sensor device may be fabricated using integrated circuit technology. By way of example, a fabrication protocol of the Five Beams Five Aperture Embodiment is discussed below.

Fabrication of the accelerometer is within the capabilities of current technology used to batch process integrated circuits. Features of a fabrication protocol are briefly described.

Referring to FIG. 68, an initial thick layer of thermal wet oxide 556 is grown on the silicon substrate 554 for two hours at 1100° C. Standard photolithographic methods are used to define the oxide layer to provide a mask against the anisotropic etchant which will be used to create the alignment holes. A mask for defining the alignment holes is shown in FIG. 69. FIG. 70 shows a cross sectional view of the definition an oxide using a standard photoresist procedure provides a mask to the anisotropic etchant used to create the alignment holes. FIG. 71 illustrates holes etched through the wafer 554 to aid in the alignment and future formation of a cantilever beam by using a combination of front side and backside etching.

Another oxide layer is grown with the purpose of providing a diffusion mask. The oxide layer pattern shown in FIG. 72 outlines areas of selected diffusion and can be defined using standard photolithographic methods. This is followed by a phosphorus diffusion for 30 minutes at 950° C.

A successive thick oxide layer is grown and defined to become the mask pattern shown in FIG. 73 which defines a cantilever beam and its response element from the top of the wafer. As shown in FIG. 74, the wafer is anisotropically etched until just short of the desired cantilever beam thickness. A thick oxide layer is grown over the previous layer followed by a photoresist procedure on the back of the wafer which is to be used to define the rest of the cantilever beam with its response element represented in FIG. 76 from the backside. The alignment holes are used to align the features on the backside of the wafer with those already defined on the topside of the wafer. FIG. 77 represents a cross sectional view of the substrate after the bottom has been partially etched. If the anisotropic etchant is a combination of KOH:Isopropyl Alcohol:DI then successive oxide growths and etching may be necessary because the oxide mask is also etched though at a much slower rate than elemental silicon.

Before the cantilever beam is completely etched, a photoresist procedure is performed on the top of the wafer to define the contact vias patterned shown in FIG. 78. Another oxide layer is grown and defined with photolithographic methods which is used to define the final etch of the cantilever beam. Once the cantilever beam is completely etched as shown in FIG. 79, the remaining oxide layer stripped off to exposed the contact vias.

Using the shadow mask shown in FIG. 80, aluminum or other conductive metals can be evaporated onto the topside of the wafer to provide electrical contact to the piezoresistors 224, 226, 228, 230, 232, 234, 236, 238, 240 and the temperature compensating resistors 262. FIG. 81 shows the top view of the accelerometer after completion and FIG. 82 shows a cross section along line A—A' in FIG. 19.

The piezoresistor residing on the cantilever beam and the resistor diffused into the nonstressed portion of the substrate in close proximity to the piezoresistor form two legs of a Wheatstone bridge (FIG. 83). The resistors within the bridge have a resistance value equal to the nominal value of the piezoresistor. The change from the nominal value of the piezoresistor due to acceleration of the main body results in a voltage signal proportional to the change in resistance and hence, is also proportional to acceleration.

The Wheatstone bridge contains a temperature compensating resistor which minimizes the effect of temperature on the output voltage signal. The proximity of the temperature-compensating resistor to the piezoresistor is close enough such that the two resistors are at the same temperature and respond to temperature in an identical manner. Hence, the resistance of the temperature-compensating resistor and the piezoresistor changes equally with temperature tending to cancel the temperature effect on the output voltage signal.

The operation of the Wheatstone bridge in extracting a voltage signal proportional to the acceleration of the main body is discussed in "A Miniature Integrated Circuit Accelerometer for Biomedical Applications" by Lynn Michelle Roylance, Ph.D. Dissertation, Department of Electrical Engineering, Stanford University, Stanford, Calif. 1978. pages 130-151 (incorporation by reference is intended).

The signal outputs from the nine Wheatstone bridges are conditioned and amplified. The analog signal is converted to a digital signal and held in a multiplexer until the microprocessor accesses the nine signals. The microprocessor along with its associate memory and input/output units multiplies the nines signals with the inverse of the sensitivity matrix to yield and display the nine components of acceleration (FIG. 84).

A beam lengths for the Five Beam Five Aperture embodiment may be on the order of 3000 microns, with beam cross sectional areas on the order of 1600 square microns calculates to a resolution on the order of milliG's of accelerational force. The geometries may be varied to effect variations in sensitivity, resolution, frequency response, and other key parameters.

Features of a Fabrication Protocol for a Four Beam One Aperture Embodiment

Referring to FIG. 85, represented is a cross-sectional view of the starting wafer material 582 taken at A-A' as indicated in FIG. 25.

Referring to FIG. 86, represented is the wafer 582 of FIG. 85 following a growth of thermal oxide 584.

Referring to FIG. 87, represented is the top view of a pattern used for the Front Boron Diffusion Mask 586.

Referring to FIG. 88, represented is the top view of a pattern used for the Back Boron Diffusion Mask 588.

Referring to FIG. 89, represented is the wafer of FIG. 86 following an oxide etch process.

Referring to FIG. 90, represented is the top view of a pattern used for the Front Etching Pattern Mask 590.

Referring to FIG. 91, represented is the wafer of FIG. 89 following a boron diffusion 592 and oxide etching prior to an initial silicon etch.

Referring to FIG. 92, represented is the wafer of FIG. 91 following an initial silicon etching process.

Referring to FIG. 93, represented is the wafer of FIG. 92 following the bonding of a supplemental mass 594 to the wafer.

Referring to FIG. 94, represented is the wafer of FIG. 93 following the second silicon etching process which defines the beams 308 and 304, the response element 300, and the rigid support frame 298.

Referring to FIG. 95, represented is the wafer 296 following a silicon dioxide etching process Referring to FIG. 96, represented is the top view of a pattern used for the Aluminum Contact Shadow Mask 596.

Referring to FIG. 97, represented is the top view of the wafer 296 of FIG. 95 following the deposition of aluminum bonding contacts 598.

The following represents characteristic fabrication methodology which can be used for the Four Beams One Aperture Embodiment and related structures. Variations and modifications in the materials used and processes outlined are possible. The accompanying fabrication figures are illustrative of the processing techniques, and are not drawn to scale.

Geometries may be varied to effect variations in sensitivity, resolution, frequency response, and other parameters. Since process influence on material properties and device dimensions can influence performance features, it is useful to experimentally calibrate prototype performance characteristics and to use the results to modify the design until the desired performance criteria is achieved. It is noted that variations and modifications of the above processes may be desirable, and additional steps included, depending on process objectives.

Starting material (FIG. 77):
N-type silicon wafers
Thickness: 0.015 inch
Resistivity: 1 ohm-cm
Fabrication steps:
1. Grow a silicon dioxide layer (FIG. 86).
2. Spin positive photoresist on back of wafer.
3. Prebake photoresist.
4. Spin positive photoresist on front of wafer.
5. Prebake photoresist.
6. Sandwich wafer between Front Boron Diffusion Mask (FIG. 87) and Back Boron Diffusion Mask (FIG. 88). This allows alignment of patterns on the front and back of the wafer. Beams should be oriented in the >110> direction.
7. Expose front of wafer through Front Boron Diffusion Mask. This defines the pattern for the beams, response element, p+ contacts, bridge circuitry, and the support region on the front surface of the wafer.
8. Expose back of wafer through Back Boron Diffusion Mask. This defines the pattern for the back of the response element and the support region on the back of the wafer.
9. Develop and postbake photoresist.
10. Etch silicon dioxide in buffered Hydrofluoric acid (FIG. 89).
11. Strip photoresist.
12. Diffuse boron pre.dep layer into front of wafer
13. Diffuse boron pre.dep layer into back of wafer.
14. Drive in diffusion.
15. Load for a low temperature wet oxide growth to facilitate boron glass removal.
16. Strip boron glass in 10:1 Hydrofluoric acid.
17. Grow a silicon dioxide layer.
18. Spin positive photoresist on front of wafer.
19. Prebake the photoresist.
20. Expose front of wafer through Front Etching Pattern Mask (FIG. 90). This opens the front surface window for the silicon etching process.
21. Develop and postbake photoresist.
22. Etch silicon dioxide in buffered Hydrofluoric acid (FIG. 91)
23. Strip photoresist.
24. Etch approximately ten microns of silicon from the front of the wafer (FIG. 92). Etch wafer with heated Ethylene Diamine Pyrocatechol, KOH, or with a suitable dry etching system.
25. Grow a silicon dioxide layer.
26. Attach a supplemental mass to locate the center of mass of the response element to the same plane as the beams using techniques described below (FIG. 93).
26. Spin positive photoresist on front of wafer.
27. Prebake, develop, and post bake photoresist.
28. Etch silicon dioxide from back of wafer.
29. Strip photoresist.
30. Continue silicon etching process until the cavity is completely etched through from the wafer back to the wafer front, releasing the beams from the bulk material. At this point, the beams should be approximately 10 microns thick (FIG. 94).
31. Etch silicon dioxide in buffered Hydrofluoric acid (FIG. 95).
31. Metallize wafer with shadow mask (FIG. 96) to provide Aluminum bonding contacts (FIG. 97).

The addition of a supplemental mass to the response element can be effected with a variety of technologies including deposition, adhesion, fusion bonding, and indium alloying. The use of silicon as the supplemental mass material may be desirable when the main body is also constructed of silicon. One approach for forming a fused response element is to fabricate a second wafer with a beam supported block. The block should be of the same mass as the response element material which will be formed below the plane of the piezoresistor containing beams, and the beams of the second wafer should be directed at angles other than the piezoresistor containing beams. After the initial 10 micron silicon etch and oxide growths (steps 24 and 25), the second wafer can be place over the wafer comprising the main body. The second wafer can be aligned so the etched block is centered directly over the beam junctions and bonded so as to double the thickness of the mass supported at the aperture center. The beams of the second wafer can be removed either by breaking or etching them, and the bulk material can be etched away or left intact for added strength, interconnect formation, added circuitry, etc. The block should be oxidized or highly doped for resistance to the second silicon etch of the main body.

PROCESS CONSIDERATIONS

Metal interconnects can be defined using photolithographic processes as are used in IC fabrication. Glass to silicon and silicon to silicon bonding can be accomplished in various ways including those referred to in the Appendix. Of particular usefulness in a preferred embodiment fabricated using silicon is the use of indium and indium alloys to adhere silicon to silicon, silicon to glass, silicon to silicon dioxide and silicon dioxide to silicon dioxide. Since indium and certain indium alloys join to glass, silicon dioxide and silicon, two surfaces to be joined can be both coated with patterns of indium or with one of its suitable alloys by placing the two surfaces to be joined in contact with one another and heated to above the appropriate silicon alloying or melting temperature, or metal alloy, or silicon alloy or melting temperature. The melted conduction material then fuses together to form a bond between the two surfaces. There is the added advantage of this method that, besides adhering the two materials together, the metal can be patterned to provide electrical interconnects and ohmic contacts. In this case, silicon dioxide can be used to selectively electrically insulate the substrate and, where the silicon dioxide is removed, to contact the substrate.

Where integrated circuits are placed on the same silicon chip as the sensing elements, the use of slow and shallow diffusants such as indium, lead, tin and others and their alloys is important to insure that the metal does not degrade the integrated circuit. The low melting and alloying temperatures of indium compounds allows for relatively low silicon to silicon, silicon to glass, and glass to glass bonding temperatures which can be important in preserving the integrity of the integrated circuit and other structures. Indium, lead and tin are slow diffusing impurities in silicon and thus do not migrate far into the silicon. Both indium and lead form ohmic contacts to the p-type silicon upon alloying and thus are easily used to make ohmic contacts to the p-silicon and particularly to p-type piezoresistors, and to boron defined beams and capacitor conducting plates.

In defining the beams and response elements, the depth of the etch and thus the thickness of the various components can be controlled using various etching procedures and wafer thinning procedures used in the integrated circuit industry. A combination of thinning and silicon to silicon bonding provides one method of fabricating a response element where the center of the support beam runs directly through the center of the response element for the Three Beams One Aperture Force Sensing Embodiment and the Three Beams Three Apertures Force Sensing Embodiment of FIGS. 1 and 8. The purpose of such alignment is to minimize the errors introduced by undesirable torque. However, if the supporting beam is fabricated in a manner that its axis does not pass through the center of mass of the response element, the errors introduced by torque can be minimized using the principals of mechanics.

APPENDIX G

Design Consideration Discussion

Dimensions and details of the geometry of the various embodiments may vary significantly from device to device depending upon the particular application targeted and the range of sensitivity desired. For example, for microG and milliG sensing, beam cross sections will generally be small and stripe capacitors may be desirable. In this case, the Three Beam One Aperture Embodiment of FIG. 1 will have the narrow dimension quite narrow in order to provide directionality of response and sensitivity of measurement. On the other hand, for larger forces such as multiple G forces, thicker beam cross section dimensions are required. There is a tradeoff in dimensions with respect to sensitivity, and in the case of response elements which are sensitive to more that one independent force stimuli, there are optimized dimensions which affect the condition of the sensitivity matrix and thus the accuracy associated with resolving all of the independent force components simultaneously. Additionally, there are other design considerations which may be taken into account such as main body size which affects, among other things, the number of devices which can be fabricated on a single wafer, which may affect the manufacturing cost per sensor device. In the latter case, one normally may want to select small dimensions in order to maximize the number of sensors fabricated per silicon wafer.

The large variety of dimensions and device architectures which are possible for various embodiments of the invention allow for flexibility of design and are a desirable feature of the invention. Designs and approximate related performance numbers are provided in the Appendix by way of example.

Additional design discussion is found in other appendices and in the specification.

APPENDIX H

Deflection of the Cantilever Beam

The displacement of the response element depends on the deflection of the cantilever beam. The deflection along the length of the cantilever beam may be theoretically characterized using a simplified theory. The deflection is characterized in this appendix assuming that the cantilever beam is flexible and of negligible mass compared to the rigid response element, for convenience and ease of derivation. (This is a good approximation for the five beam five aperture device 211 where the beam height is very small compared to the height of the mass response element as it is for which the beam analysis is used in Appendix D.) The derivation presented here follows that of L. M. Roylance's "A Miniature Integrated Circuit Accelerometer for Biomedical Applications," Ph.D. Dissertation, Stanford University, November 1977, p. 87. Incorporation by reference is intended. The analysis of the beam deflection is presented for completeness. Besides providing a portion of the theory used in Appendix D to characterize a five beam embodiment, the theory presented here provides an example of the approach to a theoretical representation of multiple beam force sensors.

For the cantilever beam subject to acceleration $a_z(t)$, the resulting curvature of the bending cantilever beam is related to the moment acting on the beam (E. J. Hearn, Mechanics of Materials, Pergamon Press, Oxford, pp. 62-91. Incorporation by reference is intended.), $$\frac{\partial^2 Z_{CB}(y,t)}{\partial y^2} = \frac{M_x}{E I_x}. \tag{H.1}$$

The moment $M_x$ is given as the inertial force $F_z$ multiplied by the moment arm, $$M_x(t) = F_z(t)(L + c_y - y'). \tag{H.2}$$

The determination of the mass-loaded cantilever beam's deflection assumes that the cantilever beam is flexible and that the response element is rigid. Substituting Eq. (H.2) into Eq. (H.1) and integrating twice with respect to y, the deflection along the cantilever beam only is given as $$X_{CB}(y) = \frac{F_x(t) y^2}{2 E I_z}\left(L + c_y - \frac{y}{3}\right). \tag{H.3}$$

The deflection of the rigid response element assumes a constant slope which is equal to the slope at the end of the cantilever beam. The deflection of the response element is obtained by adding the deflection at the end of the cantilever beam to the displacement of the response element. The deflection of the response element is given as $$Z_{PM}(y) = \frac{F_z(t) L_{CB}^2}{2 E I_x}\left(\frac{2L_{CB}}{3} + c_y\right) + \tag{H.4}$$

$$\left[\frac{F_z(t) L_{CB}^2}{2 E I_x} + \frac{F_z(t) L_{CB} c_y}{2 E I_x}\right](y' - L_{CB}).$$

The average separation of the two electrodes is the distance from the electrode mounted on the substrate to the deflection at the center of the response element. The displacement at the center of the response element is given by:

$$Z(y) = \frac{F_z(t)}{2 E I_x}\left(\frac{2L_{CB}^3}{3} + 2L_{CB}^2 c_y + L_{CB} c_y^2\right). \tag{H.5}$$

The deflection due to a lateral force $F_x$ is derived in a similar manner to the deflection due to the vertical force $F_z$. The deflection is given by:

$$X(y) = \frac{F_x(t)}{2 E I_z}\left(\frac{2L_{CB}^3}{3} + 2L_{CB}^2 c_y + L_{CB} c_y^2\right). \tag{H.6}$$

The elongation of the cantilever beam caused by the axial force $F_y$ is determined by converting the resultant axial stress into a normal strain component. Strain is related to stress by Young's modulus E, $$\epsilon = \frac{\sigma}{E} = \frac{F_y}{A E} = \frac{\delta L}{L} \tag{H.7}$$

Rearranging Eq. (H.7), the amount of elongation $\delta L$ is related to the axial force $F_y$ by $$\delta L = \frac{F_y L}{A E}. \tag{H.8}$$

APPENDIX I

Example of the Effect of the Device Dimension of the Condition of the Transformation (Sensitivity Coefficient) Matrix In the previous discussion of the ill-condition factor, the error in the resolved force components is dependent on the condition of the sensitivity matrix S. Hence, it is desirable to minimize the condition number in order to improve the accuracy of the resolved force components. The condition of the sensitivity matrix is dependent on the design and the dimensions of the sensor.

By way of example, the condition number of the a linear force sensor beam structure as a function of beam dimensions is calculated. In this example, one of the beams of the Five Beam Five Aperture embodiment is chosen for illustration purposes and condition number associated with the nine force resolving three beam three aperture device is plotted as a function of the ratio of the width and the thickness of the cantilever beams (FIG. 98). The cantilever beam thicknesses of all five cantilever beams are kept identical in this example and held constant while the width was varied. The condition number, shown in FIG. 98, reaches a minimum value for a specific cantilever beam width to thickness ratio. Since the condition number should be minimized to minimize the upper bound on the measurement error, the preferred beam width for a specific beam height for the device has been determined and can be incorporated into the device design having constraints described.

FIVE BEAM FIVE APERTURE EMBODIMENT PROGRAM LISTING FOR NINE FORCE COMPONENT

Determination Program Listing

For design objectives, the complexity of the theoretical expressions for the sensitivity coefficients, i.e., the sensitivity matrix elements, for the Five Beam Five Aperture embodiment, suggests the use of numerical techniques for theoretical evaluation of the sensitivity matrix elements. In principal, this can be done for different embodiment designs and for different types of sensor elements.

In this program, a five beam embodiment incorporating piezoresistor sensor elements is treated. The values of the sensitivity matrix elements are theoretically calculated. The theoretical sensitivity matrix is computed and the inverse of the theoretical sensitivity matrix is computed. The inverse S matrix used to convert an inputted piezoresistive response column matrix can be either a measured set of numbers or a theoretically derived set of numbers, depending upon the objective.

When the use of the program for measuring the values of unknown force components, an S matrix which has been determined using a calibration procedure is often preferable to a theoretically determined one. The program is easily modified to input the experimental S matrix elements. In the case where theoretically evaluated numbers are inputted for the S matrix, the performance of a particular design can be inspected and modified to optimize the design for particular application objectives.

Thus the program is useful for assisting with the design of a multicomponent force sensor and useful for measurement applications.

The following is a list of the symbols corresponding to the software program:
- H: Cantilever Beam Thickness [cm]
- W: Cantilever Beam Width [cm]
- L: Cantilever Beam Length [cm]
- Lr: Piezoresistor Length [cm]
- T1: Response element Thickness [cm]
- T2: Response element Width [cm]
- T3: Response element Length [cm]
- C1: Off-Axis Mass' Center of Mass Coordinate Along the X direction [cm]
- C2: Off-Axis Mass' Center of Mass Coordinate Along the Z direction [cm]
- C3: Off-Axis Mass' Center of Mass Coordinate Along the Y direction [cm]
- P: On-Axis Mass Center of Mass Coordinate Along the Y direction [cm]
- X: Location of the Piezoresistor Along the X direction
- Y: Location of the Piezoresistor Along the Y direction
- Z: Location of the Piezoresistor Along the Z direction
- V: Bottom Width of the Cantilever Beam
- Ix: Area Moment of Inertia about the X axis
- Iy: Area Moment of Inertia about the Y axis
- Iz: Area Moment of Inertia about the Z axis
- A: Cross Sectional area of the Cantilever Beam
- M: Mass of the Off-axis Mass
- PM: Mass of the On-axis Mass
- R1: Radial Distance From the Devices' CM to the On-axis Mass' CM
- R2: Radial Distance From the GB Longitudinal Axis to the PM
- R3: Radial Distance From the Devices CM to the Off-axis Mass' CM
- Theta: Angle Between R1 and R2
- Phi: Angle of CB V From the Z axis
- PC Piezoresistive Coefficient
- S: Coefficients of the Sensitivity Matrix
- S inv: Coefficients of the Inverse of the S Matrix
- O: Matrix Product of S inv and S
- K: Condition Number
- Mi: Row-sum of the Inverse SCM
- Ni: Row-sum of the SCM
- Q: Max Value of Mi
- I: Max Value of Ni
- Dp: Response of Each Piezoresistor The disclosure of the invention described herein represents several embodiments of the invention; however, variations thereof, in the form, construction, arrangement and combination of beam arms, response elements, sensing methods, and applications of the invention are possible without departing from the spirit and the scope of the appended claims. All of these structures, described herein, or conceptually related to the systems herein described, are intended to be covered by the descriptions and claims found herein.

```
10   !*********************************************************************
20   !
30   !            LINEAR AND ANGULAR ACCELEROMETER:
40   '
50
60
70
80
90
100
110
120
130
140
150
160
170
180
190
200
210
220
230
240
250
```

```
260
270
280
290
300
310
320
330    !
340    !
350    !
360    GCLEAR                           ! CLEAR THE TERMINAL SCREEN
370    DEG                              ! ALL ANGLES SHOULD BE IN UNITS OF DEGREES
380    N=0                              ! CLEAR THE SENSITIVITY COEFF. FLAG
390    !
400    !  SPECIFY THE DEVICE DIMENSIONS AND MATERIAL PARAMETERS
410    !
420    H=.0037                          ! CANTILEVER BEAM THICKNESS IN CM
430    W=.0041                          ! TOP WIDTH OF THE CANTILEVER BEAM IN CM
440    L=.3                             ! CANTILEVER BEAM LENGTH IN CM
450    Lr=.001                          ! PIEZORESISTOR LENGTH IN CM
460    T1=.05                           ! PROOF MASS THICKNESS
470    T2=.6                            ! PROOF MASS WIDTH
480    T3=.6                            ! PROOF MASS LENGTH
490    C1=T1/2-H/2                      ! CENTER OF MASS COORDINATES IN X-DIRECTION
500    C2=0                             ! CENTER OF MASS COORDINATES IN Y-DIRECTION
510    C3=T3/2                          ! CENTER OF MASS COORDINATES IN Z-DIRECTION
520    P=C3                             ! OFF-AXIS CENTER OF MASS COORD.
530    X=-H/2                           ! LOCATION OF PIEZORESISTOR ON X-AXIS
540    Y=-.00135                        ! AVERAGE LOCATION OF THE PIEZORESISTOR ON Y-AXIS
550    Z=Y                              ! AVERAGE LOCATION OF THE PIEZORESISTOR ON Z-AXIS
560    V=SQR(2)*H+W                     ! BOTTOM WIDTH OF THE CANTILEVER BEAM
570    Ix=H*(V+W)*(V^2+W^2)/48          ! AREA MOMENT OF INERTIA ABOUT THE X-AXIS
580    Iy=H^3*(V^2+4*V*W+W^2)/(36*(V+W))   ! AREA MOMENT OF INERTIA ABOUT Y-AXIS
590    Iz=Iy                            ! AREA MOMENT OF INERTIA ABOUT THE Z-AXIS
600    A=H*(V+W)/2                      ! AREA OF THE CANTILEVER BEAM
610    M=2.328*(T1-H)*T2*T3             ! OFF-AXIS MASS
620    Pm=2.328*H*T2*T3                 ! ON-AXIS MASS
630    R1=1+L+C3                        ! RADIUS FROM THE ORIGIN TO CM OF THE PROOF MASS
640    R2=C1                            ! RADIUS FROM THE AXIS TO CM OF THE PROOF MASS
650    R3=SQR(R1^2+R2^2)                ! RADIUS
660    Theta=ATN(R2/R1)                 ! ANGLE THETA
670    Phi=45                           ! ANGLE OF BEAM V
680    Pc=-6.0E-11                      ! PIEZORESISTIVE COEFFICIENT (PI)11
690    !
700    !
710    !  ROUTINE TO CHANGE THE DIMENSIONS OF EACH CANTILEVER BEAM, PIEZORESISTOR
720    !  OR PROOF MASS.
730    !
740 Chngprmtr:!
750    OFF KEY
760    PRINT "SELECT PARAMETER TO BE CHANGED"
770    ON KEY 0 LABEL "H",2 GOSUB Changeh
780    ON KEY 1 LABEL "W",2 GOSUB Changew
790    ON KEY 2 LABEL "L",2 GOSUB Changel
800    ON KEY 3 LABEL "LR",2 GOSUB Changelr
810    OFF KEY 4
820    ON KEY 5 LABEL "T1",2 GOSUB Changet1
830    ON KEY 6 LABEL "T2",2 GOSUB Changet2
840    ON KEY 7 LABEL "T3",2 GOSUB Changet3
850    ON KEY 8 LABEL "LIST PARAM",2 GOSUB Listparam
```

```
860    ON KEY 9 LABEL "EXIT",2 GOTO Calc
870    GOTO 770
880    !
890    !    PARAMETER CHANGING ROUTINES
900    !
910 Changeh:  ! CHANGE THE BEAM THICKNESS
920    INPUT "INPUT NEW VALUE OF THE BEAM THICKNESS",H
930    PRINT "BEAM THICKNESS, H=",H
940    X=-H/2
950    V=SQR(2)*H+W
960    Ix=H*(V+W)*(V^2+W^2)/48
970    Iy=H^3*(V^2+4*V*W+W^2)/(36*(V+W))
980    Iz=Iy
990    C1=T1/2-H/2
1000   A=H*(V+W)/2
1010   M=2.328*(T1-H)*T2*T3
1020   Pm=2.328*H*T2*T3
1030   R3=SQR(R1^2+R2^2)
1040   Theta=ATN(R2/R1)
1050   RETURN
1060   !
1070 Changew: ! CHANGE THE BEAM WIDTH
1080   INPUT "INPUT NEW VALUE OF THE BEAM WIDTH",W
1090   PRINT "THE BEAM WIDTH, W=",W
1100   V=SQR(2)*H+W
1110   Ix=H*(V+W)*(V^2+W^2)/48
1120   Iy=H^3*(V^2+4*V*W+W^2)/(36*(V+W))
1130   Iz=Iy
1140   A=H*(V+W)/2
1150   RETURN
1160   !
1170 Changel: ! CHANGE THE BEAM LENGTH
1180   INPUT "INPUT NEW VALUE OF THE BEAM LENGTH",L
1190   PRINT "THE BEAM LENGTH, L=",L
1200   R1=1+L+C3
1210   R3=SQR(R1^2+R2^2)
1220   Theta=ATN(R2/R1)
1230   RETURN
1240   !
1250 Changelr: ! CHANGE THE RESISTOR LENGTH
1260   INPUT "INPUT NEW VALUE OF THE RESISTOR LENGTH",Lr
1270   PRINT "THE RESISTOR LENGTH Lr=",Lr
1280   RETURN
1290   !
1300 Changet1: ! CHANGE THE PROOF MASS THICKNESS
1310   INPUT "INPUT NEW VALUE OF THE PROOF MASS THICKNESS",T1
1320   PRINT "THE PROOF MASS THICKNESS T1=",T1
1330   C1=T1/2-H/2
1340   M=2.328*(T1-H)*T2*T3
1350   R2=C1
1360   R3=SQR(R1^2+R2^2)
1370   Theta=ATN(R2/R1)
1380   RETURN
1390   !
1400 Changet2: ! CHANGE THE PROOF MASS WIDTH
1410   INPUT "INPUT NEW VALUE OF THE PROOF MASS WIDTH",T2
1420   PRINT "THE PROOF MASS WIDTH T2=",T2
1430   Pm=2.328*H*T2*T3
1440   M=2.328*(T1-H)*T2*T3
1450   RETURN
```

```
1460  !
1470  Changet3: ! CHANGE THE PROOF MASS LENGTH
1480   INPUT "INPUT NEW VALUE OF THE PROOF MASS LENGTH",T3
1490   PRINT "THE PROOF MASS LENGTH T3=",T3
1500   C3=T3/2
1510   P=C3
1520   R1=l+L+C3
1530   R3=SQR(R1^2+R2^2)
1540   Theta=ATN(R2/R1)
1550   RETURN
1560  !
1570  Listparam: ! LIST THE CURRENT PARAMETERS
1580   PRINT "CURRENT PARAMETERS:"
1590   PRINT USING "2A,D.3DESZZ,5X,2A,D.3DESZZ,5X,2A,D.3DESZZ,5X,3A,D.3DESZZ";"H=
",H,"W=",W,"L=",L,"LR=",Lr
1600   PRINT USING "3A,D.3DESZZ,4X,3A,D.3DESZZ,4X,3A,D.3DESZZ,4X,4A,D.3DESZZ";"T1
=",T1,"T2=",T2,"T3=",T3,"M+m=",M+Pm
1610   PRINT
1620   RETURN
1630  !
1640  !###############################################################
1650  !
1660  ! CALCULATE THE SENSITIVITY COEFFICIENTS
1670  !
1680  Calc: !
1690   SELECT N
1700   CASE =0
1710    GOTO Pr0
1720   CASE =1
1730    GOTO Pr1
1740   CASE =2
1750    GOTO Pr2
1760   CASE =3
1770    GOTO Pr3
1780   CASE =4
1790    GOTO Pr4
1800   CASE =5
1810    GOTO Pr5
1820   END SELECT
1830  !
1840  Pr0: !
1850  !   CALCULATE THE SENSITIVITY COEFFICIENTS FOR PIEZORESISTOR !
1860  !
1870  ! RESPONSE TO LINEAR ACCELERATION
1880  !
1890   S11=Pc*980.665*((M+Pm)*(L-Lr/2)*X/Iz+(M*C3+Pm*P)*X/Iz)
1900   S12=Pc*980.665*(-(M+Pm)/A-(M*C1*X)/Iz)
1910   S13=Pc*980.665*((M+Pm)*(L-Lr/2)*Z/Ix+(M*C3+Pm*P)*Z/Ix)
1920  !
1930  ! RESPONSE TO ANGULAR VELOCITY SQUARED
1940  !
1950   S14=-S12*R1/980.665
1960   S15=Pc*(-M*(L-Lr/2)*X/Iz-(M*C3*X)/Iz)*R2
1970   S16=Pc*(-(M*(L-Lr/2)*X/Iz)*R2+(Pm*R1+M*R1)/A+(M*C1*R1-M*C3*R2)*X/Iz)
1980  !
1990  ! RESPONSE TO ANGULAR ACCELERATION
2000  !
2010   S17=S13*R1/980.665
2020   S18=Pc*(-M*(L-Lr/2)*Z/Ix-M*C3*Z/Ix)*R2
```

```
2030   S19=Pc*(-(Pm*R1+M*R1)*(L-Lr/2)*X/Iz-M*R2/A-(Pm*P*R1+M*C3*R1+M*C1*R2)*X/Iz)
2040   !
2050   PRINT
2060   PRINT "PIEZORESISTOR 1:  RESPONSE TO LINEAR ACCELERATION"
2070   PRINT USING "4A,SD.15DESZZ";"S11=",S11
2080   PRINT USING "4A,SD.15DESZZ";"S12=",S12
2090   PRINT USING "4A,SD.15DESZZ";"S13=",S13
2100   PRINT
2110   PRINT "PIEZORESISTOR 1:  RESPONSE TO ANGULAR VELOCITY SQUARED"
2120   PRINT USING "4A,SD.15DESZZ";"S14=",S14
2130   PRINT USING "4A,SD.15DESZZ";"S15=",S15
2140   PRINT USING "4A,SD.15DESZZ";"S16=",S16
2150   PRINT
2160   PRINT "PIEZORESISTOR 1:  RESPONSE TO ANGULAR ACCELERATION"
2170   PRINT USING "4A,SD.15DESZZ";"S17=",S17
2180   PRINT USING "4A,SD.15DESZZ";"S18=",S18
2190   PRINT USING "4A,SD.15DESZZ";"S19=",S19
2200   PRINT
2210   !
2220   N=1            ! SET FLAG TO CALCULATE RESPONSE TO PIEZORESISTORS 2
2230   PRINT "PARAMETERS FOR PIEZORESISTORS 2"
2240   GOTO Chngprmtr
2250   !
2260   !    CALCULATE THE SENSITIVITY COEFFICIENTS FOR PIEZORESISTORS 2
2270   !
2280 Pr1: !
2290   !
2300   ! RESPONSE TO LINEAR ACCELERATION
2310   !
2320   S21=Pc*980.665*((M+Pm)*(L-Lr/2)*X/Iz+(M*C3+Pm*P)*X/Iz)
2330   S22=Pc*980.665*(-(M+Pm)/A-(M*C1*X)/Iz)
2340   S23=-Pc*980.665*((M+Pm)*(L-Lr/2)*Z/Ix+(M*C3+Pm*P)*Z/Ix)
2350   !
2360   ! RESPONSE TO ANGULAR VELOCIY SQUARED
2370   !
2380   S24=-S22*R1/980.665
2390   S25=Pc*(-M*(L-Lr/2)*X/Iz-(M*C3*X)/Iz)*R2
2400   S26=Pc*(-(M*(L-Lr/2)*X/Iz)*R2+(Pm*R1+M*R1)/A+(M*C1*R1-M*C3*R2)*X/Iz)
2410   !
2420   ! RESPONSE TO ANGULAR ACCELERATION
2430   !
2440   S27=S23*R1/980.665
2450   S28=-Pc*(-M*(L-Lr/2)*Z/Ix-M*C3*Z/Ix)*R2
2460   S29=Pc*(-(Pm*R1+M*R1)*(L-Lr/2)*X/Iz-M*R2/A-(Pm*P*R1+M*C3*R1+M*C1*R2)*X/Iz)
2470   !
2480   PRINT
2490   PRINT "PIEZORESISTOR 2:  RESPONSE TO LINEAR ACCELERATION"
2500   PRINT USING "4A,SD.15DESZZ";"S21=",S21
2510   PRINT USING "4A,SD.15DESZZ";"S22=",S22
2520   PRINT USING "4A,SD.15DESZZ";"S23=",S23
2530   PRINT
2540   PRINT "PIEZORESISTOR 2:  RESPONSE TO ANGULAR VELOCITY SQUARED"
2550   PRINT USING "4A,SD.15DESZZ";"S24=",S24
2560   PRINT USING "4A,SD.15DESZZ";"S25=",S25
2570   PRINT USING "4A,SD.15DESZZ";"S26=",S26
2580   PRINT
2590   PRINT "PIEZORESISTOR 2:  RESPONSE TO ANGULAR ACCELERATION"
2600   PRINT USING "4A,SD.15DESZZ";"S27=",S27
2610   PRINT USING "4A,SD.15DESZZ";"S28=",S28
2620   PRINT USING "4A,SD.15DESZZ";"S29=",S29
```

```
2630 ' PRINT
2640 !
2650 !
2660  N=2          ! SET FLAG TO CALCULATE RESPONSE TO PIEZORESISTORS 3-4
2670  PRINT "PARAMETERS FOR PIEZORESISTORS 3-4"
2680  GOTO Chngprmtr
2690 !
2700 !    CALCULATE THE SENSITIVITY COEFFICIENTS FOR PIEZORESISTORS 3-4
2710 !
2720 Pr2: !
2730 !
2740 ! RESPONSE TO LINEAR ACCELERATION
2750 !
2760  S31=Pc*980.665*((M+Pm)*(L-Lr/2)*X/Iz+(M*C3+Pm*P)*X/Iz)
2770  S32=Pc*980.665*(-(M+Pm)/A-(M*C1*X)/Iz)
2780  S33=-Pc*980.665*((M+Pm)*(L-Lr/2)*Z/Ix+(M*C3+Pm*P)*Z/Ix)
2790 !
2800 ! RESPONSE TO ANGULAR VELOCIY SQUARED
2810 !
2820  S34=-S32*R1/980.665
2830  S35=Pc*(-M*(L-Lr/2)*X/Iz-(M*C3*X)/Iz)*R2
2840  S36=Pc*(-(M*(L-Lr/2)*X/Iz)*R2+(Pm*R1+M*R1)/A+(M*C1*R1-M*C3*R2)*X/Iz)
2850 !
2860 ! RESPONSE TO ANGULAR ACCELERATION
2870 !
2880  S37=S33*R1/980.665
2890  S38=-Pc*(-M*(L-Lr/2)*Z/Ix-M*C3*Z/Ix)*R2
2900  S39=Pc*(-(Pm*R1+M*R1)*(L-Lr/2)*X/Iz-M*R2/A-(Pm*P*R1+M*C3*R1+M*C1*R2)*X/Iz)
2910 !
2920  PRINT
2930  PRINT "PIEZORESISTOR 3-4:  RESPONSE TO LINEAR ACCELERATION"
2940  PRINT USING "4A,SD.15DESZZ";"S31=",S31
2950  PRINT USING "4A,SD.15DESZZ";"S32=",S32
2960  PRINT USING "4A,SD.15DESZZ";"S33=",S33
2970  PRINT
2980  PRINT "PIEZORESISTOR 3-4:  RESPONSE TO ANGULAR VELOCITY SQUARED"
2990  PRINT USING "4A,SD.15DESZZ";"S34=",S34
3000  PRINT USING "4A,SD.15DESZZ";"S35=",S35
3010  PRINT USING "4A,SD.15DESZZ";"S36=",S36
3020  PRINT
3030  PRINT "PIEZORESISTOR 3-4:  RESPONSE TO ANGULAR ACCELERATION"
3040  PRINT USING "4A,SD.15DESZZ";"S37=",S37
3050  PRINT USING "4A,SD.15DESZZ";"S38=",S38
3060  PRINT USING "4A,SD.15DESZZ";"S39=",S39
3070  PRINT
3080  PRINT
3090  N=3          ! SET FLAG TO CALCULATE RESPONSE TO PIEZORESISTORS 5-6
3100  PRINT "PARAMETERS FOR PIEZORESISTORS 5-6"
3110  GOTO Chngprmtr
3120 !
3130 !    CALCULATE THE SENSITIVITY COEFFICIENTS FOR PIEZORESISTORS 5-6
3140 !
3150 Pr3: !
3160 !
3170 ! RESPONSE TO LINEAR ACCELERATION
3180 !
3190  S51=Pc*980.665*((M+Pm)*(L-Lr/2)*X/Iz+(M*C3+Pm*P)*X/Iz)
3200  S52=Pc*980.665*(-(M+Pm)/A-(M*C1*X)/Iz)
3210  S53=-Pc*980.665*((M+Pm)*(L-Lr/2)*Z/Ix+(M*C3+Pm*P)*Z/Ix)
```

```
3220  !
3230  ! RESPONSE TO ANGULAR VELOCIY SQUARED
3240  !
3250  S54=-S52*R1/980.665
3260  S55=Pc*(-M*(L-Lr/2)*X/Iz-(M*C3*X)/Iz)*R2
3270  S56=Pc*(-(M*(L-Lr/2)*X/Iz)*R2+(Pm*R1+M*R1)/A+(M*C1*R1-M*C3*R2)*X/Iz)
3280  !
3290  ! RESPONSE TO ANGULAR ACCELERATION
3300  !
3310  S57=S53*R1/980.665
3320  S58=-Pc*(-M*(L-Lr/2)*Z/Ix-M*C3*Z/Ix)*R2
3330  S59=Pc*(-(Pm*R1+M*R1)*(L-Lr/2)*X/Iz-M*R2/A-(Pm*P*R1+M*C3*R1+M*C1*R2)*X/Iz)
3340  !
3350  PRINT
3360  PRINT "PIEZORESISTOR 5-6:  RESPONSE TO LINEAR ACCELERATION"
3370  PRINT USING "4A,SD.15DESZZ";"S51=",S51
3380  PRINT USING "4A,SD.15DESZZ";"S52=",S52
3390  PRINT USING "4A,SD.15DESZZ";"S53=",S53
3400  PRINT
3410  PRINT "PIEZORESISTOR 5-6:  RESPONSE TO ANGULAR VELOCITY SQUARED"
3420  PRINT USING "4A,SD.15DESZZ";"S54=",S54
3430  PRINT USING "4A,SD.15DESZZ";"S55=",S55
3440  PRINT USING "4A,SD.15DESZZ";"S56=",S56
3450  PRINT
3460  PRINT "PIEZORESISTOR 5-6:  RESPONSE TO ANGULAR ACCELERATION"
3470  PRINT USING "4A,SD.15DESZZ";"S57=",S57
3480  PRINT USING "4A,SD.15DESZZ";"S58=",S58
3490  PRINT USING "4A,SD.15DESZZ";"S59=",S59
3500  PRINT
3510  PRINT
3520  N=4           ! SET FLAG TO CALCULATE RESPONSE TO PIEZORESISTORS 7-8
3530  PRINT "PARAMETERS FOR PIEZORESISTORS 7-8"
3540  GOTO Chngprmtr
3550  !
3560  !    CALCULATE THE SENSITIVITY COEFFICIENTS FOR PIEZORESISTORS 7-8
3570  !
3580 Pr4: !
3590  !
3600  ! RESPONSE TO LINEAR ACCELERATION
3610  !
3620  S1=Pc*980.665*((M+Pm)*(L-Lr/2)*X/Iz+(M*C3+Pm*P)*X/Iz)
3630  S2=Pc*980.665*(-(M+Pm)/A-(M*C1*X)/Iz)
3640  S3=-Pc*980.665*((M+Pm)*(L-Lr/2)*Z/Ix+(M*C3+Pm*P)*Z/Ix)
3650  !
3660  ! RESPONSE TO ANGULAR VELOCIY SQUARED
3670  !
3680  S4=-S12*R1/980.665
3690  S5=Pc*(-M*(L-Lr/2)*X/Iz-(M*C3*X)/Iz)*R2
3700  S6=Pc*(-(M*(L-Lr/2)*X/Iz)*R2+(Pm*R1+M*R1)/A+(M*C1*R1-M*C3*R2)*X/Iz)
3710  !
3720  ! RESPONSE TO ANGULAR ACCELERATION
3730  !
3740  S7=S3*R1/980.665
3750  S8=-Pc*(-M*(L-Lr/2)*Z/Ix-M*C3*Z/Ix)*R2
3760  S9=Pc*(-(Pm*R1+M*R1)*(L-Lr/2)*X/Iz-M*R2/A-(Pm*P*R1+M*C3*R1+M*C1*R2)*X/Iz)
3770  !
3780  PRINT
3790  PRINT "PIEZORESISTOR 7-8:  RESPONSE TO LINEAR ACCELERATION"
3800  PRINT USING "3A,SD.15DESZZ";"S1=",S1
3810  PRINT USING "3A,SD.15DESZZ";"S2=",S2
```

```
3820   PRINT USING "3A,SD.15DESZZ";"S3=",S3
3830   PRINT
3840   PRINT "PIEZORESISTOR 7-8:  RESPONSE TO ANGULAR VELOCITY SQUARED"
3850   PRINT USING "3A,SD.15DESZZ";"S4=",S4
3860   PRINT USING "3A,SD.15DESZZ";"S5=",S5
3870   PRINT USING "3A,SD.15DESZZ";"S6=",S6
3880   PRINT
3890   PRINT "PIEZORESISTOR 7-8:  RESPONSE TO ANGULAR ACCELERATION"
3900   PRINT USING "3A,SD.15DESZZ";"S7=",S7
3910   PRINT USING "3A,SD.15DESZZ";"S8=",S8
3920   PRINT USING "3A,SD.15DESZZ";"S9=",S9
3930   PRINT
3940   !
3950   ! CALCULATE THE SENSITIVITY COEFFICIENTS FOR PIEZORESISTOR 9
3960   !
3970   N=5            ! SET FLAG TO CALCULATE RESPONSE TO PIEZORESISTORS 9
3980   PRINT "PARAMETERS FOR PIEZORESISTORS 9"
3990   GOTO Chngprmtr
4000 Pr5: !
4010   !
4020   ! RESPONSE TO LINEAR ACCELERATION
4030   !
4040   S91=-2.18E-11*980.665*((M+Pm)*(L-Lr/2)*X/Iz+(M*C3+Pm*P)*X/Iz)
4050   S92=-2.18E-11*980.665*(-(Pm+M)*(L-Lr/2)*Z*COS(Phi)/Ix-(Pm*P+M*C3)*Z*COS(Phi)/Ix-(M+Pm)*SIN(Phi)/A-M*C1*X*SIN(Phi)/Iz)
4060   S93=-2.18E-11*980.665*((Pm+M)*(L-Lr/2)*Z*COS(Phi)/Ix+(Pm*P+M*C3)*Z*COS(Phi)/Ix-(M+Pm)*SIN(Phi)/A-M*C1*X*SIN(Phi)/Iz)
4070   !
4080   ! RESPONSE TO ANGULAR VELOCITY SQUARED
4090   !
4100   S94=-2.18E-11*((M+Pm)/A+M*C1*X/Iz)*R1
4110   S95a=-2.18E-11*(-M*(L-Lr/2)*X*R2*COS(Phi)/Iz+(Pm*R1*COS(Phi)+M*R1*COS(Phi))*COS(Phi)/A-(Pm*R1*COS(Phi)+M*R1*COS(Phi))*(L-Lr/2)*Z*SIN(Phi)/Ix)
4120   S95b=-2.18E-11*(-(Pm*P*R1*COS(Phi)+M*C3*R1*COS(Phi))*Z*SIN(45)/Ix+(M*C1*R1*COS(45)*COS(45)-M*C3*R2*COS(Phi))*X/Iz)
4130   S95=S95a+S95b
4140   S96a=-2.18E-11*(-M*(L-Lr/2)*X*R2*COS(Phi)/Iz+(Pm*R1*COS(Phi)+M*R1*COS(Phi))*COS(Phi)/A+(Pm*R1*COS(Phi)+M*R1*COS(Phi))*(L-Lr/2)*Z*SIN(Phi)/Ix)
4150   S96b=-2.18E-11*((Pm*P*R1*COS(Phi)+M*C3*R1*COS(Phi))*Z*SIN(45)/Ix+(M*C1*R1*COS(45)*COS(45)-M*C3*R2*COS(Phi))*X/Iz)
4160   S96=S96a+S96b
4170   !
4180   ! RESPONSE TO ANGULAR ACCELERATION
4190   !
4200   S97=-2.18E-11*((M+Pm)*(L-Lr/2)*Z/Ix+(M*C3+Pm*P)*Z/Ix)*R1
4210   S98a=-2.18E-11*((Pm*R1*SIN(Phi)+M*R1*SIN(Phi))*(L-Lr/2)*X/Iz+M*R2*SIN(Phi)*COS(Phi)/A-(M*R2*SIN(Phi)*SIN(Phi))*(L-Lr/2)*Z/Ix)
4220   S98b=-2.18E-11*(-M*R2*SIN(Phi)*SIN(Phi)*C3*Z/Ix+(Pm*P*R1*SIN(Phi)+M*C3*R1*SIN(Phi))*X/Iz+M*C1*R2*SIN(Phi)*COS(Phi)*X/Iz)
4230   S98=S98a+S98b
4240   S99a=-2.18E-11*(-(Pm*R1*SIN(Phi)+M*R1*SIN(Phi))*(L-Lr/2)*X/Iz-M*R2*SIN(Phi)*COS(Phi)/A-(M*R2*SIN(Phi)*SIN(Phi))*(L-Lr/2)*Z/Ix)
4250   S99b=-2.18E-11*(-M*R2*SIN(Phi)*SIN(Phi)*C3*Z/Ix-(Pm*P*R1*SIN(Phi)+M*C3*R1*SIN(Phi))*X/Iz-M*C1*R2*SIN(Phi)*COS(Phi)*X/Iz)
4260   S99=S99a+S99b
4270   !
4280   PRINT "PIEZORESISTOR 9:  RESPONSE TO LINEAR ACCELERATION"
4290   PRINT USING "4A,SD.15DESZZ";"S91=",S91
4300   PRINT USING "4A,SD.15DESZZ";"S92=",S92
4310   PRINT USING "4A,SD.15DESZZ";"S93=",S93
```

```
4320    PRINT
4330    PRINT "PIEZORESISTOR 9:  RESPONSE TO ANGULAR VELOCITY SQUARED"
4340    PRINT USING "4A,SD.15DESZZ";"S94=",S94
4350    PRINT USING "4A,SD.15DESZZ";"S95=",S95
4360    PRINT USING "4A,SD.15DESZZ";"S96=",S96
4370    PRINT
4380    PRINT "PIEZORESISTOR 9:  RESPONSE TO ANGULAR ACCELERATION"
4390    PRINT USING "4A,SD.15DESZZ";"S97=",S97
4400    PRINT USING "4A,SD.15DESZZ";"S98=",S98
4410    PRINT USING "4A,SD.15DESZZ";"S99=",S99
4420    PRINT
4430    PRINT "PRESS CONTINUE TO GO ON"
4440    PAUSE
4450    !
4460    !############################################################
4470    !
4480    !   THIS PORTION OF THE PROGRAM FORMS THE SENSITIVITY COEFFICIENT MATRIX
4490    !
4500    !
4510    OPTION BASE 1
4520    Siz=9                                    ! SPECIFY THE SIZE OF THE MATRIX
4530    ALLOCATE S(Siz,Siz),S_inv(Siz,Siz),O(Siz,Siz),Dp(Siz),Ac(Siz)
4540    !
4550    ! SPECIFYING MATRIX VALUES FROM THE SENSITIVITY COEFFICIENTS CALCULATED
4560    ! ABOVE.
4570    !
4580    !
4590        S(1,1)=S11                           ! FIRST ROW ELEMENTS
4600        S(1,2)=S12
4610        S(1,3)=S13
4620        S(1,4)=S14
4630        S(1,5)=S15
4640        S(1,6)=S16
4650        S(1,7)=S17
4660        S(1,8)=S18
4670        S(1,9)=S19
4680        !
4690        S(2,1)=S21                           ! SECOND ROW ELEMENTS
4700        S(2,2)=S22
4710        S(2,3)=S23
4720        S(2,4)=S24
4730        S(2,5)=S25
4740        S(2,6)=S26
4750        S(2,7)=S27
4760        S(2,8)=S28
4770        S(2,9)=S29
4780        !
4790        S(3,1)=S31                           ! THIRD ROW ELEMENTS
4800        S(3,2)=S33
4810        S(3,3)=S32
4820        S(3,4)=S34
4830        S(3,5)=S36
4840        S(3,6)=S35
4850        S(3,7)=-S37
4860        S(3,8)=-S39
4870        S(3,9)=-S38
4880        !
4890        S(4,1)=S31                           !FOURTH ROW ELEMENTS
4900        S(4,2)=-S33
4910        S(4,3)=S32
```

```
4920    S(4,4)=S34
4930    S(4,5)=S36
4940    S(4,6)=S35
4950    S(4,7)=S37
4960    S(4,8)=-S39
4970    S(4,9)=S38
4980    !
4990    S(5,1)=S51                          ! FIFTH ROW ELEMENTS
5000    S(5,2)=-S52
5010    S(5,3)=S53
5020    S(5,4)=S54
5030    S(5,5)=S55
5040    S(5,6)=S56
5050    S(5,7)=-S57
5060    S(5,8)=S58
5070    S(5,9)=-S59
5080    !
5090    S(6,1)=S51                          ! SIXTH ROW ELEMENTS
5100    S(6,2)=-S52
5110    S(6,3)=-S53
5120    S(6,4)=S54
5130    S(6,5)=S55
5140    S(6,6)=S56
5150    S(6,7)=S57
5160    S(6,8)=-S58
5170    S(6,9)=-S59
5180    !
5190    S(7,1)=S1                           ! SEVENTH ROW ELEMENTS
5200    S(7,2)=-S3
5210    S(7,3)=-S2
5220    S(7,4)=S4
5230    S(7,5)=S6
5240    S(7,6)=S5
5250    S(7,7)=-S7
5260    S(7,8)=S9
5270    S(7,9)=S8
5280    !
5290    S(8,1)=S1                           ! EIGTH ROW ELEMENTS
5300    S(8,2)=S3
5310    S(8,3)=-S2
5320    S(8,4)=S4
5330    S(8,5)=S6
5340    S(8,6)=S5
5350    S(8,7)=S7
5360    S(8,8)=S9
5370    S(8,9)=-S8
5380    !
5390    S(9,1)=S91                          ! NINTH ROW ELEMENTS
5400    S(9,2)=S92
5410    S(9,3)=S93
5420    S(9,4)=S94
5430    S(9,5)=S95
5440    S(9,6)=S96
5450    S(9,7)=S97
5460    S(9,8)=S98
5470    S(9,9)=S99
5480    !
5490    !
5500    !###############################################################
```

```
5510  !
5520  ! CALCULATE THE INVERSE OF THE SENSITIVITY MATRIX .
5530  !
5540  PRINT "DETERMINANT OF THE SENSITIVITY MATRIX=",DET(S)
5550  PRINT
5560  MAT S_inv= INV(S)                          !CALCULATE THE INVERSE MATRIX
5570  MAT O= S_inv*S                             !CHECK THE INVERSE MATRIX
5580  !
5590  FOR J=1 TO Siz                             !PRINT THE SENSITIVITY MATRIX, THE
5600    FOR K=1 TO Siz                           !INVERSE SENSITIVITY MATRIX, AND THE
5610      PRINT J,K,S(J,K),S_inv(J,K),O(J,K)    ! RESULT OF MULTIPLYING THE
5620    NEXT K                                   ! SENSITIVITY MATRIX WITH ITS
5630  PRINT                                      ! INVERSE.
5640  NEXT J
5650  !
5660  !##################################################################
5670  !
5680  ! THIS PORTION OF THE PROGRAM CALCULATES THE ROW-SUM NORM OF THE
5690  ! SENSITIVITY MATRIX AND THE INVERSE SENSITIVITY MATRIX.  THE CONDITION
5700  ! NUMBER K IS THEN CALCULATED BY MULTIPLYING THE MAXIMUM VALUE OF THE
5710  ! ROW-SUM NORMS OF EACH MATRIX.
5720  !
5730  !CALCULATING THE ROW-SUM NORM FOR THE INVERSE SENSITIVITY MATRIX:
5740  !
5750  M1=ABS(S_inv(1,1))+ABS(S_inv(1,2))+ABS(S_inv(1,3))+ABS(S_inv(1,4))+ABS(S_inv(1,5))+ABS(S_inv(1,6))+ABS(S_inv(1,7))+ABS(S_inv(1,8))+ABS(S_inv(1,9))
5760  M2=ABS(S_inv(2,1))+ABS(S_inv(2,2))+ABS(S_inv(2,3))+ABS(S_inv(2,4))+ABS(S_inv(2,5))+ABS(S_inv(2,6))+ABS(S_inv(2,7))+ABS(S_inv(2,8))+ABS(S_inv(2,9))
5770  M3=ABS(S_inv(3,1))+ABS(S_inv(3,2))+ABS(S_inv(3,3))+ABS(S_inv(3,4))+ABS(S_inv(3,5))+ABS(S_inv(3,6))+ABS(S_inv(3,7))+ABS(S_inv(3,8))+ABS(S_inv(3,9))
5780  M4=ABS(S_inv(4,1))+ABS(S_inv(4,2))+ABS(S_inv(4,3))+ABS(S_inv(4,4))+ABS(S_inv(4,5))+ABS(S_inv(4,6))+ABS(S_inv(4,7))+ABS(S_inv(4,8))+ABS(S_inv(4,9))
5790  M5=ABS(S_inv(5,1))+ABS(S_inv(5,2))+ABS(S_inv(5,3))+ABS(S_inv(5,4))+ABS(S_inv(5,5))+ABS(S_inv(5,6))+ABS(S_inv(5,7))+ABS(S_inv(5,8))+ABS(S_inv(5,9))
5800  M6=ABS(S_inv(6,1))+ABS(S_inv(6,2))+ABS(S_inv(6,3))+ABS(S_inv(6,4))+ABS(S_inv(6,5))+ABS(S_inv(6,6))+ABS(S_inv(6,7))+ABS(S_inv(6,8))+ABS(S_inv(6,9))
5810  M7=ABS(S_inv(7,1))+ABS(S_inv(7,2))+ABS(S_inv(7,3))+ABS(S_inv(7,4))+ABS(S_inv(7,5))+ABS(S_inv(7,6))+ABS(S_inv(7,7))+ABS(S_inv(7,8))+ABS(S_inv(7,9))
5820  M8=ABS(S_inv(8,1))+ABS(S_inv(8,2))+ABS(S_inv(8,3))+ABS(S_inv(8,4))+ABS(S_inv(8,5))+ABS(S_inv(8,6))+ABS(S_inv(8,7))+ABS(S_inv(8,8))+ABS(S_inv(8,9))
5830  M9=ABS(S_inv(9,1))+ABS(S_inv(9,2))+ABS(S_inv(9,3))+ABS(S_inv(9,4))+ABS(S_inv(9,5))+ABS(S_inv(9,6))+ABS(S_inv(9,7))+ABS(S_inv(9,8))+ABS(S_inv(9,9))
5840  !
5850  ! CALCULATING THE ROW-SUM NORM FOR THE SENSITIVITY MATRIX.
5860  !
5870  N1=ABS(S(1,1))+ABS(S(1,2))+ABS(S(1,3))+ABS(S(1,4))+ABS(S(1,5))+ABS(S(1,6))+ABS(S(1,7))+ABS(S(1,8))+ABS(S(1,9))
5880  N2=ABS(S(2,1))+ABS(S(2,2))+ABS(S(2,3))+ABS(S(2,4))+ABS(S(2,5))+ABS(S(2,6))+ABS(S(2,7))+ABS(S(2,8))+ABS(S(2,9))
5890  N3=ABS(S(3,1))+ABS(S(3,2))+ABS(S(3,3))+ABS(S(3,4))+ABS(S(3,5))+ABS(S(3,6))+ABS(S(3,7))+ABS(S(3,8))+ABS(S(3,9))
5900  N4=ABS(S(4,1))+ABS(S(4,2))+ABS(S(4,3))+ABS(S(4,4))+ABS(S(4,5))+ABS(S(4,6))+ABS(S(4,7))+ABS(S(4,8))+ABS(S(4,9))
5910  N5=ABS(S(5,1))+ABS(S(5,2))+ABS(S(5,3))+ABS(S(5,4))+ABS(S(5,5))+ABS(S(5,6))+ABS(S(5,7))+ABS(S(5,8))+ABS(S(5,9))
5920  N6=ABS(S(6,1))+ABS(S(6,2))+ABS(S(6,3))+ABS(S(6,4))+ABS(S(6,5))+ABS(S(6,6))+ABS(S(6,7))+ABS(S(6,8))+ABS(S(6,9))
5930  N7=ABS(S(7,1))+ABS(S(7,2))+ABS(S(7,3))+ABS(S(7,4))+ABS(S(7,5))+ABS(S(7,6))+ABS(S(7,7))+ABS(S(7,8))+ABS(S(7,9))
```

```
5940 N8=ABS(S(8,1))+ABS(S(8,2))+ABS(S(8,3))+ABS(S(8,4))+ABS(S(8,5))+ABS(S(8,6))
     +ABS(S(8,7))+ABS(S(8,8))+ABS(S(8,9))
5950 N9=ABS(S(9,1))+ABS(S(9,2))+ABS(S(9,3))+ABS(S(9,4))+ABS(S(9,5))+ABS(S(9,6))
     +ABS(S(9,7))+ABS(S(9,8))+ABS(S(9,9))
5960 !
5970 Q=MAX(M1,M2,M3,M4,M5,M6,M7,M8,M9)
5980 I=MAX(N1,N2,N3,N4,N5,N6,N7,N8,N9)
5990 PRINT "ROW-SUM MAX FOR THE SENSITIVITY MATRIX =",I
6000 PRINT "ROW-SUM MAX FOR THE INVERSE MATRIX=",Q
6010 K=Q*I                                  !   CALCULATING THE CONDITION NUMBER
6020 PRINT "THE CONDITION NUMBER K=",K
6030 !
6040 !###############################################################
6050 !
6060 ! THIS PORTION OF THE PROGRAM DETERMINES THE ACCELERATION COMPONENTS
6070 !
6080 !
6090 INPUT "INPUT THE RESPONSE OF THE FIRST PIEZORESISTOR",Dp1
6100 INPUT "INPUT THE RESPONSE OF THE SECOND PIEZORESISTOR",Dp2
6110 INPUT "INPUT THE RESPONSE OF THE THIRD PIEZORESISTOR",Dp3
6120 INPUT "INPUT THE RESPONSE OF THE FOURTH PIEZORESISTOR",Dp4
6130 INPUT "INPUT THE RESPONSE OF THE FIFTH PIEZORESISTOR",Dp5
6140 INPUT "INPUT THE RESPONSE OF THE SIXTH PIEZORESISTOR",Dp6
6150 INPUT "INPUT THE RESPONSE OF THE SEVENTH PIEZORESISTOR",Dp7
6160 INPUT "INPUT THE RESPONSE OF THE EIGTH PIEZORESISTOR",Dp8
6170 INPUT "INPUT THE RESPONSE OF THE NINTH PIEZORESISTOR",Dp9
6180 !
6190 ! FORM THE CHANGE IN RESISTANCE VECTOR
6200 !
6210 Dp(1)=Dp1
6220 Dp(2)=Dp2
6230 Dp(3)=Dp3
6240 Dp(4)=Dp4
6250 Dp(5)=Dp5
6260 Dp(6)=Dp6
6270 Dp(7)=Dp7
6280 Dp(8)=Dp8
6290 Dp(9)=Dp9
6300 !
6310 ! CALCULATE THE ACCELERATION COMPONENTS
6320 !
6330 MAT Ac= S_inv*Dp
6340 !
6350 FOR I=1 TO Siz              !PRINT THE ACCELERATION COMPONENTS
6360    PRINT Ac(I)
6370 NEXT I
6380 !
6390 !###############################################################
6400 !
6410    END
```

We claim:

1. A multidimensional force sensor, comprising:
a substantially planar main body having an aperture;
a wide and thin first beam having opposing wide sides attached at a first end to said main body and projecting into said aperture in a direction substantially parallel to the plane of said main body, with the normal of the wide sides of said first beam oriented substantially perpendicular to the plane of said main body;
a wide and thin second beam having opposing wide sides attached at a first end to said main body and projecting into said aperture in a direction substantially parallel to the plane of said main body and substantially perpendicular to the direction of said first beam, with the normal of the wide sides of said second beam oriented substantially parallel to the plane of said main body;
a wide and thin third beam having opposing wide sides attached at a first end to said main body and projecting into said aperture in a direction substantially parallel to the direction of said main body and substantially perpendicular to the direction of said second beam, with the normal of the wide sides of said third beam oriented substantially parallel to the plane of said main body; and sensing means coupled to each of said first, second and third beams, respectively, for sensing displacement of each of said first, second and third beams, respectively.

2. A multidimensional force sensor, as described in claim 1, further comprising:

first, second and third response elements attached to the second ends of each of said first, second and third beams, respectively.

3. A multidimensional force sensor, as described in claim 2, wherein said sensing means is coupled to each of said first, second and third response elements, respectively, for sensing displacement of each of said first, second and third response elements, respectively.

4. A multidimensional force sensor, as described in claim 3, wherein said sensing means comprises first, second and third capacitive sensor elements, each of which includes a movable plate element and a fixed plate element, each of said first, second and third capacitive sensor elements producing a change in capacitance in response to displacement of said first, second and third response elements, respectively.

5. A multidimensional force sensor, as described in claim 4, wherein said movable plate elements of said first, second and third capacitance sensor elements are mounted on said first, second and third response elements, respectively.

6. A multidimensional force sensor, as described in claim 2, further comprising limiting means partially surrounding one of said one response elements for limiting displacement of said one response element.

7. A multidimensional force sensor, as described in claim 6, wherein said limiting means comprises a casing.

8. A multidimensional force sensor, as described in claim 2, further comprising limiting means completely surrounding one of said response elements for limiting displacement of said one response element.

9. A multidimensional force sensor, as described in claim 2, wherein one of said response elements comprises a mass.

10. A multidimensional force sensor, as described in claim 2, wherein one of said response elements comprises a material responsive to a magnetic field.

11. A multidimensional force sensor, as described in claim 2, wherein one of said response elements comprises a material responsive to an electric field.

12. A multidimensional force sensor, as described in claim 2, wherein one of said response elements comprises an electrically charged material.

13. A multidimensional force sensor, as described in claim 2, wherein one of said response elements comprises a magnetized material.

14. A multidimensional force sensor, as described in claim 1, wherein said sensing means comprises first, second and third discrete electromechanical sensor elements, said first, second and third sensor elements producing electrical signals in response to displacement of said first, second and third beams respectively.

15. A multidimensional force sensor, as described in claim 14, wherein said first, second and third sensor elements are mounted on said first, second and third beams, respectively.

16. A multidimensional force sensor, as described in claim 14, wherein one of said sensor elements for sensing displacement of one of said beams comprises a piezoresistor embedded in the longitudinal axis of said one beam for sensing stress in said one beam.

17. A multidimensional force sensor, as described in any one of claims 14 or 15, wherein one of said sensor elements for sensing displacement of one of said beams comprises:

a first sensor component for sensing displacement of said one beam, coupled to said one beam; and a second sensor component for sensing displacement of said one beam, coupled to said one beam, wherein said second sensor component responds differently from said first sensor component to displacement of said one beam in one direction.

18. A multidimensional force sensor, as described in any one of claims 14 or 15, wherein one of said sensor elements for sensing displacement of one of said beams comprises a piezoresistor mounted on a surface of said one beam.

19. A multidimensional force sensor, as described in claim 1, wherein said main body and said beams comprise an integrally formed piece of semiconducting material.

20. A multidimensional force sensor, as described in claim 19, wherein said semiconducting material is silicon.

21. A multidimensional force sensor, as described in claim 19, wherein said semiconducting material is germanium.

22. A multidimensional force sensor, as described in claim 1, wherein said main body and said beams comprise an integrally formed piece of material selected from the group consisting of quartz, glass and ceramics.

23. A multidimensional force sensor, as described in claim 1, further comprising damping means surrounding one of said beams, for damping vibration of said one beam.

24. A multidimensional force sensor, as described in claim 23, wherein said damping means comprises a fluid.

* * * * *